US012799427B2

(12) United States Patent
Klingman et al.

(10) Patent No.: US 12,799,427 B2
(45) Date of Patent: Nov. 17, 2026

(54) METHODS AND COMPOSITIONS FOR REDUCING PERSISTENT ODOR IN CLOTHING AND MITIGATING BIOFILMS

(71) Applicant: LUME DEODORANT, LLC, Chaska, MN (US)

(72) Inventors: Shannon E. Klingman, Chaska, MN (US); Jeffrey Dean Lindsay, Appleton, WI (US)

( * ) Notice: Subject to any disclaimer, the term of this patent is extended or adjusted under 35 U.S.C. 154(b) by 172 days.

(21) Appl. No.: 16/926,514

(22) Filed: Jul. 10, 2020

(65) Prior Publication Data

US 2021/0009922 A1 Jan. 14, 2021

Related U.S. Application Data

(60) Provisional application No. 62/994,810, filed on Mar. 25, 2020, provisional application No. 62/931,213, filed on Nov. 5, 2019, provisional application No. 62/914,552, filed on Oct. 13, 2019, provisional application No. 62/881,212, filed on Jul. 31, 2019, provisional application No. 62/872,697, filed on Jul. 10, 2019.

(51) Int. Cl.

| | |
|---|---|
| ***C11D 3/00*** | (2006.01) |
| ***C11D 3/34*** | (2006.01) |
| ***C11D 3/38*** | (2006.01) |
| ***C11D 3/386*** | (2006.01) |
| ***C11D 3/48*** | (2006.01) |

(52) U.S. Cl.
CPC ............ *C11D 3/0068* (2013.01); *C11D 3/349* (2013.01); *C11D 3/381* (2013.01); *C11D 3/38618* (2013.01); *C11D 3/48* (2013.01); *C11D 2111/12* (2024.01)

(58) Field of Classification Search
CPC ....... C11D 3/0068; C11D 3/349; C11D 3/381; C11D 3/38618; C11D 3/48; C11D 11/0017; C11D 3/0084; C11D 3/2096; C11D 3/32; C11D 3/386
See application file for complete search history.

(56) References Cited

U.S. PATENT DOCUMENTS 3,519,570 A 7/1970 Mccarty
3,553,139 A 1/1971 McCarty et al.
(Continued)

FOREIGN PATENT DOCUMENTS

EP 0285123 A3 2/1989
EP 0252666 A3 3/1989
(Continued)

OTHER PUBLICATIONS

Study of the Chemical Treatment on Cotton Fabrics to Increase the UV Protection and Anti-Odour Retention Properties J. Moses, Venka Taraman Published Dec. 30, 2016 (Year: 2016).*
(Continued)

*Primary Examiner* — Angela C Brown-Pettigrew
*Assistant Examiner* — Preeti Kumar

(57) ABSTRACT

Novel methods and compositions for treating textiles and other materials are disclosed in which persistent odor or other symptoms of biofilm presence can be reduced through the use of compositions comprising a biofilm attack agent such as N-acetyl cysteine or certain enzymes, coupled with surfactants and other agents.

17 Claims, 29 Drawing Sheets

(56) References Cited

U.S. PATENT DOCUMENTS

| | | | |
|---|---|---|---|
| 3,600,319 | A | 8/1971 | Gedge et al. |
| 4,009,254 | A | 2/1977 | Renold |
| 4,101,457 | A | 7/1978 | Place et al. |
| 4,261,868 | A | 4/1981 | Hora et al. |
| 4,507,219 | A | 3/1985 | Hughes |
| 5,093,257 | A | 3/1992 | Gray |
| 5,238,155 | A | 8/1993 | Blake |
| 5,286,480 | A | 2/1994 | Boggs |
| 5,292,581 | A | 3/1994 | Viazmensky et al. |
| 5,443,569 | A | 8/1995 | Uehira et al. |
| 5,445,288 | A | 8/1995 | Banks |
| 5,576,282 | A | 11/1996 | Miracle et al. |
| 5,707,950 | A | 1/1998 | Kasturi et al. |
| 5,728,671 | A | 3/1998 | Rohrbaugh et al. |
| 5,766,578 | A | 6/1998 | Davis |
| 5,813,576 | A | 9/1998 | Iizuka et al. |
| 5,817,495 | A | 10/1998 | Pedersen et al. |
| 5,935,880 | A | 8/1999 | Wang et al. |
| 5,968,883 | A | 10/1999 | Cherry et al. |
| 6,082,586 | A | 7/2000 | Banks |
| 6,315,864 | B2 | 11/2001 | Anderson et al. |
| 6,365,734 | B1 | 4/2002 | Kim |
| 6,387,874 | B1 | 5/2002 | Schalitz et al. |
| 6,416,623 | B1 | 7/2002 | Hollmark |
| 6,451,063 | B1 | 9/2002 | Clarkson |
| 6,475,434 | B1 | 11/2002 | Darouiche |
| 6,489,279 | B2 | 12/2002 | Convents et al. |
| 6,498,137 | B1 | 12/2002 | Schalitz et al. |
| 6,509,028 | B2 | 1/2003 | Williams |
| 6,537,631 | B1 | 3/2003 | Rivera et al. |
| 6,601,737 | B1 | 8/2003 | Gartenberg |
| 6,727,215 | B2 | 4/2004 | Roberts |
| 6,737,068 | B2 | 5/2004 | Durden |
| 6,794,350 | B2 | 9/2004 | Johansen et al. |
| 6,818,204 | B2 | 11/2004 | Lapidus |
| 6,869,466 | B2 | 3/2005 | Day et al. |
| 6,881,713 | B2 | 4/2005 | Sommerville-Roberts |
| 6,995,126 | B2 | 2/2006 | Perkis |
| 7,005,168 | B2 | 2/2006 | Verrall et al. |
| 7,013,623 | B2 | 3/2006 | Fisher |
| 7,125,828 | B2 | 10/2006 | Catlin |
| 7,127,874 | B2 | 10/2006 | Viltro |
| 7,528,099 | B2 | 5/2009 | Wahl |
| 7,563,757 | B2 | 7/2009 | Kouvroukoglou |
| 7,754,705 | B2 | 7/2010 | Savage et al. |
| 7,964,549 | B2 | 6/2011 | Boutoille |
| 8,178,119 | B2 | 5/2012 | Stutte et al. |
| 8,267,284 | B2 | 9/2012 | Ray |
| 8,336,737 | B2 | 12/2012 | van der Heijden |
| 8,573,875 | B2 | 11/2013 | Gieux et al. |
| 8,579,159 | B2 | 11/2013 | Ciavarella |
| 8,591,207 | B2 | 11/2013 | Ciavarella |
| 8,952,065 | B2 | 2/2015 | Pavliv |
| 8,991,657 | B2 | 3/2015 | Ciavarella et al. |
| 8,992,898 | B2 | 3/2015 | Klingman |
| 9,132,296 | B2 * | 9/2015 | Wingfield .............. A61K 8/365 |
| 9,227,980 | B2 | 1/2016 | Scherman et al. |
| 9,228,284 | B2 | 1/2016 | Mchatton et al. |
| 9,248,462 | B2 | 2/2016 | Csaszar |
| 9,433,234 | B2 | 9/2016 | Kim et al. |
| 9,470,638 | B2 | 10/2016 | Khalaf et al. |
| 9,566,223 | B2 | 2/2017 | Klingman |
| 9,603,859 | B2 | 3/2017 | Genberg |
| 9,668,948 | B2 | 6/2017 | Klingman |
| 9,675,736 | B2 | 6/2017 | Burgess et al. |
| 9,689,089 | B2 | 6/2017 | Ishikawa et al. |
| 9,718,069 | B2 | 8/2017 | Creaghan et al. |
| 9,756,862 | B2 | 9/2017 | Cooper et al. |
| 9,926,404 | B2 | 3/2018 | Cheesman et al. |
| 10,132,029 | B2 | 11/2018 | Katzenmeier et al. |
| 10,206,479 | B2 | 2/2019 | Gieux et al. |
| 10,308,657 | B2 | 6/2019 | Coulston et al. |
| 10,443,024 | B2 | 10/2019 | Souter et al. |
| 10,479,981 | B2 | 11/2019 | Oestergaard et al. |
| 10,610,490 | B2 | 4/2020 | Stegemann et al. |
| 2003/0229141 | A1 | 12/2003 | Yu et al. |
| 2004/0136946 | A1 | 7/2004 | Fredenburgh et al. |
| 2006/0062742 | A1 | 3/2006 | Davis |
| 2006/0251597 | A1 | 11/2006 | Yu et al. |
| 2008/0014277 | A1 | 1/2008 | Medri |
| 2009/0057331 | A1 | 3/2009 | Fryan et al. |
| 2009/0199877 | A1 | 8/2009 | Koch et al. |
| 2010/0028070 | A1 | 2/2010 | Gieux et al. |
| 2010/0192986 | A1 | 8/2010 | Brooker et al. |
| 2011/0038840 | A1 | 2/2011 | Chen et al. |
| 2011/0256082 | A1 * | 10/2011 | Klingman .............. A61K 8/365 424/65 |
| 2011/0318289 | A1 | 12/2011 | Frodyma |
| 2013/0053294 | A1 | 2/2013 | Cooper et al. |
| 2013/0200098 | A1 | 8/2013 | Li |
| 2013/0247308 | A1 * | 9/2013 | Duerrschmidt ........ C11D 3/044 510/355 |
| 2014/0054323 | A1 | 2/2014 | McNulty |
| 2014/0203047 | A1 | 7/2014 | McNulty |
| 2015/0182436 | A1 | 7/2015 | Schmit |
| 2015/0297772 | A1 | 10/2015 | Kim et al. |
| 2015/0374719 | A1 | 12/2015 | Genberg et al. |
| 2016/0279043 | A1 | 9/2016 | Danenberg et al. |
| 2017/0157186 | A1 | 6/2017 | Shiach |
| 2017/0319637 | A1 | 11/2017 | Pouillot et al. |
| 2018/0193236 | A1 | 7/2018 | Son et al. |
| 2018/0245259 | A1 * | 8/2018 | Mchatton ............... C12N 1/205 |
| 2018/0305658 | A1 | 10/2018 | Glimp |
| 2019/0284647 | A1 | 9/2019 | Bach |

FOREIGN PATENT DOCUMENTS

| | | | | |
|---|---|---|---|---|
| EP | 0368341 | A2 | 10/1989 | |
| EP | 0525610 | A3 | 3/1993 | |
| EP | 0905282 | B1 | 1/2000 | |
| EP | 1 103 597 | A2 | 5/2001 | |
| JP | 2004-231671 | A | 8/2004 | |
| JP | 4763137 | B2 * | 8/2011 | ............. A61K 8/046 |
| KR | 20170026316 | A | 3/2017 | |
| WO | WO/1995/29979 | A1 | 11/1905 | |
| WO | WO/1989/006270 | A1 | 7/1989 | |
| WO | WO/1989/008694 | A1 | 9/1989 | |
| WO | WO1991000353 | A2 | 1/1991 | |
| WO | WO/1992/019729 | A1 | 11/1992 | |
| WO | WO/1993/007260 | A1 | 4/1993 | |
| WO | WO/1993/007263 | A2 | 4/1993 | |
| WO | WO/1994/001532 | A2 | 7/1993 | |
| WO | WO/1994/002597 | A1 | 2/1994 | |
| WO | WO1994018314 | A1 | 8/1994 | |
| WO | WO/1994/025583 | A1 | 11/1994 | |
| WO | WO1995010603 | A1 | 4/1995 | |
| WO | WO/1995/030010 | A1 | 11/1995 | |
| WO | WO/199530011 | A2 | 11/1995 | |
| WO | WO1995035382 | A2 | 12/1995 | |
| WO | WO1996005295 | A2 | 2/1996 | |
| WO | WO1997030143 | A1 | 2/1996 | |
| WO | WO/1996/017816 | A1 | 6/1996 | |
| WO | WO1995026397 | A1 | 10/1996 | |
| WO | WO/1998/034946 | A1 | 2/1997 | |
| WO | WO/1998/020116 | A1 | 11/1997 | |
| WO | WO/1998/020115 | A1 | 5/1998 | |
| WO | WO 99/00478 | A1 | 1/1999 | |
| WO | WO/2009/121183 | A1 | 10/2009 | |
| WO | WO2014/124927 | A1 | 8/2014 | |
| WO | WO2020126347 | A1 | 6/2020 | |

OTHER PUBLICATIONS

Good HousekeepingStay fresh & Safe, Kavita Devgan Jun. 24, 2010 (Year: 2010).*

Google Patents translation https://patents.google.com/patent/JP4763137B2/en (Year: 2011).*

Ush1468, Aug. 1995, Costa et al. "Detergent compositions containing cellulase enzyme and selected perfumes for improved odor and stability" SIR chrome-extension://efaidnbmnnnibpcajpcglclefindmkaj/https://patentimages.storage.googleapis.com/ec/b4/8c/cac32b7d4dd302/USH1468.pdf (Year: 1995).*

(56) References Cited

OTHER PUBLICATIONS

Zhao, Y. et al. "Barrier textiles for protection against microbes", Science Direct, Antimicrobial Textiles 2016, pp. 225-245 (Year: 2016).*
N. Meckelburg, "Antibacterial effect of coffee: calcium concentration in a culture containing teeth/biofilm exposed to Coffea Canephora aqueous extract," Letters in Applied Microbiology, 2014, doi:10.1111/lam.12281.
Andrea Giampreti, "N-Acetyl-Cysteine as Effective and Safe Chelating Agent in Metal-on-Metal Hip-Implanted Patients: Two Cases," Case Reports in Orthopedics, vol. 2016, Article ID 8682737, 2016, http://dx.doi.org/10.1155/2016/8682737.
Giancarlo Aldini, "N-Acetylcysteine as an antioxidant and disulphide breaking agent: the reasons why," Free Radical Research, 52:7 (2018): 751-762, DOI:10.1080/10715762.2018.1468564.
R.S. Lanigan, "Final report on the safety assessment of Sodium Metaphosphate, Sodium Trimetaphosphate, and Sodium Hexametaphosphate," Int J Toxicology, 20 (2001), Suppl 3:75-89. doi: 10.1080/10915810152630756.
American Regent, Inc., "ACETYLCYSTEINE—acetylcysteine inhalant," Daily Med, https://dailymed.nlm.nih.gov/dailymed/fda/fdaDrugXsl.cfm?setid=f56b4087-db48-4fd7-84ec-9c927962b805&type=display, accessed Jan. 21, 2021.
Andrea Giampreti et al., "N-Acetyl-Cysteine as Effective and Safe Chelating Agent in Metal-on-Metal Hip-Implanted Patients: Two Cases," Case Reports in Orthopedics, vol. 2016, Article ID 8682737, 7 pages, 2016. https://doi.prg/10.1155/2016/8682737 and https://downloads.hindawi.com/journals/crior/2016/8682737.pdf.
Jerónimo Rodriguez-Beltran, "N-Acetylcysteine Selectively Antagonizes the Activity of Imipenem inPseudomonas aeruginosaby an OprD-Mediated Mechanism," Antimicrobial Agents and Chemotherapy 59/6 (Jun. 2015): 3246-51, https://aac.asm.org/content/aac/59/6/3246.full.pdf.
Google Patents English translation of JP2004-231671, "Detergent composition and method for evaluating bacteria-removing power and deterging power," by H. Akimoto et al., Aug. 19, 2004.
Google Patents English translation of KR 2017-0026316, "Compositions for fabric-care," by Son Seong-gil et al., Mar. 3, 2017.
Daphne Benderly and Yelena Zolotarsky, "Beyond Thickening—Use of Alkyl Acrylate Crosspolymer in Personal Care Formulations," Conference Paper in ACS Symposium Series, Aug. 2012 DOI: 10.1021/bk-2013-1148.ch013.
Aleksandr B. Stefaniak and Christopher J. Harvey, "Dissolution of materials in artificial skin surface film liquids," Toxicology in Vitro 20 (2006): 1265-1283, doi:10.1016/j.tiv.2006.05.011.
R.S. Lanigan, "Final report on the safety assessment of Sodium Metaphosphate, Sodium Trimetaphosphate, and Sodium Hexametaphosphate," Int J Toxicology, 20 (2001), Suppl 3:75-89. doi: 10.1080/10915810152630756. (Abstract.).
C. Candal, "Using Enzymes to Improve Antibiotic Effectiveness on *Staphylococcus epidermidis* Biofilm Removal," NCSSSMST Journal (2012): 34-37; https://files.eric.ed.gov/fulltext/EJ973552.pdf.
"Cavcon Products," http://www.cyclo-dextrin.com/products.asp, Pocono Enterprise LLC, 2019, accessed Nov. 8, 2019.
Iris Schlomski, "Goodbye permastink!," Textile Network, Mar. 26, 2018, https://textile-network.com/en/Technical-Textiles/Textile-Flaechen/Goodbye-Permastink, accessed Nov. 8, 2019.
Maria Daglia, "Polyphenols as antimicrobial agents," Current Opinion in Biotechnology, 23 (2012):174-181.
Mark Witten, "Tips on how to stink less," New Trail, University of Alberta, May 26, 2018, https://www.ualberta.ca/newtrail/featurestories/summers-coming-tips-on-how-to-stink-less, accessed Nov. 8, 2019.
"Innovative Odor Control Function for polyester textiles: Sanitized® Odoractiv 10 with patented, dual-action technology," Sanitized AG, Burgdorf, Switzerland, Jan. 16, 2018, https://www.sanitized.com/sanitized-odoractiv-10/, accessed Nov. 8, 2019.
"Perma-Stink Be Gone!," Productive Mama, Jul. 13, 2016, http://productivemama.com/perma-stink-be-gone/, accessed Nov. 8, 2019.
"Sciessent Lava XL Odor Control," Sciessent.com, Aug. 2018, https://www.sciessent.com/wp-content/uploads/2019/08/Sciessent_LavaXL_Product_Sheet.pdf, also https://www.sciessent.com/product-sheet/lava-xl-product-sheet/, accessed Nov. 8, 2019.
Muhsin Jamal et al., "Bacterial biofilm and associated infections," Journal of the Chinese Medical Association, 81 (2018) 7-11.
Nithyanand Paramasivam et al., "Recent advances in biofilmology and antibiofilm measures," Biomedical Research Int. (2017):5409325.
Bo Fu et al., "Inhibition of Pseudomonas aeruginosa Biofilm Formation by Traditional Chinese Medicinal Herb Herba patriniae," BioMed Research International, vol. 2017, Article ID 9584703, 10 pages, https://doi.org/10.1155/2017/9584703 and https://www.hindawi.com/journals/bmri/2017/9584703/.
Philipp Stiefel, et al., "A simple and rapid method for optical visualization and quantification of bacteria on textiles," Scientific Reports, 6 (2016), paper 39635; doi: 10.1038/srep39635; https://www.ncbi.nlm.nih.gov/pmc/articles/PMC5177907/.
D.P. Bockmühl, et al., "Laundry and textile hygiene in healthcare and beyond," Microbial Cell, 6/7 (Jul. 2019): 299-306. DOI: 10.15698/mic2019.07.682.
M. Brandwein, "Microbial biofilms and the human skin microbiome," npj Biofilms Microbiomes 2, 3 (2016); doi: 10.1038/s41522-016-0004-z and https://www.nature.com/articles/s41522-016-0004-z.
Jennifer M. Nicoloro, "Fabric in Infection and Infection Control in Healthcare," Ph.D. Dissertation, Biomedical Engineering & Biotechnology, University of Massachusetts Lowell, 2018.
Eugenie Fredrich, "Daily battle against body odor: towards the activity of the axillary microbiota," Review Human Microbiome, 21/6 (Jun. 2013):305-312.
Dinty J. Musk Jr. and Paul J. Hergenrother, "Chemical Countermeasures for the Control of Bacterial Biofilms: Effective Compounds and Promising Targets," Current Medicinal Chemistry, vol. 13 , Issue 18 , 2006; DOI: 10.2174/092986706777935212 and https://pubmed.ncbi.nlm.nih.gov/16918346/. (Abstract).
George Denny et al., "Rapid Detection of Fungal Elements using Calcofluor White and Hand-Held Ultraviolet Illumination," Journal of the qAmerican Academy of Dermatology (2019), doi: https://doi.org/10.1016/j.iaad.2019.10.012.
A. Natsch, "Isolation of a bacterial enzyme releasing axillary malodor and its use as a screening target for novel deodorant formulations," Int J Cosmet Sci. Apr. 2005;27(2):115-22. doi: 10.1111/j.1467-2494.2004.00255.x.
M. Hisham El-Masry et al., "Bacterial populations in the biofilm and non-biofilm components of a sand filter used in water treatment," FEMS Microbiology Letters 131(1995) 263-269.
Edgardo Jofré et al., "Monitoring succinoglycan production in single Sinorhizobium meliloti cells by Calcofluor white M2R staining and time-lapse microscopy," Carbohydrate Polymers 181 (2018) 918-922.
E.F. Haney et al., "Critical Assessment of Methods to Quantify Biofilm Growth and Evaluate Antibiofilm Activity of Host Defence Peptides," Biomolecules, 8/29 (2018); doi:10.3390/biom8020029.
Juntao Liu et al., "Metabolic co-dependence gives rise to collective oscillations within biofilms," Nature, 253 *Jul. 30, 2015): 550-567.
Susan Hassan et al., "PeIN Is a New Pectate Lyase of Dickeya dadantii with Unusual Characteristics," May 2013 Journal of Bacteriology, 195/10 (May 2013): 2197-2206.
Cynthia B. Whitchurch et al., "Extracellular DNA Required for Bacterial Biofilm Formation," Science, vol. 295, issue 5559 (Feb. 22, 2002): 1487; DOI: 10.1126/science.295.5559.1487 and https://science.sciencemag.org/content/295/5559/1487/tab-pdf.
Hanna Lara da Cruz Dinéas de Oliveira et al., "Influence of papain in biofilm formed by methicillin-resistant *Staphylococcus epidermidis* and methicillin-resistant *Staphylococcus haemolyticus* isolates," Brazilian Journal of Pharmaceutical Sciences, vol. 50, n. 2 ( Apr./Jun. 2014); http://dx.doi.org/10.1590/S1984-82502014000200005 and http://www.scielo.br/pdf/bjps/v50n2/1984-8250-bjps-50-02-00261.pdf.
Yoshimi Matsumoto et al., "Antibacterial and Antifungal Activities of New Acylated Derivatives of Epigallocatechin Gallate," Frontiers in Microbiology, vol. 3, article 53 (2012): 1-10; doi: 10.3389/fmicb.2012.00053 and https://www.ncbi.nlm.nih.gov/pmc/articles/PMC3280433.
M.T. Nguyen et al., "Staphylococcal (phospho)lipases promote biofilm formation and host cell invasion," International Journal of

(56) References Cited

OTHER PUBLICATIONS

Medical Microbiology, 308/6 (Aug. 2018): 653-63; doi: 10.1016/j.ijmm.2017.11.013 and https://www.ncbi. hlm.nih.gov/pubmed/29203111.
R.M.Q. Shanks et al., "Catheter lock solutions influence staphylococcal biofilm formation on abiotic surfaces," Nephrology Dialysis Transplantation, 21/8 (Aug. 2006): 2247-2255, https://doi.org/10.1093/ndt/gfl170 and https://academic.oup.com/ndt/article/21/8/2247/1820732.
Sondes Mechri et al., "Identification of a New Serine Alkaline Peptidase from the Moderately Halophilic *Virgibacillus hatechei* sp. nov., Strain FarDT and its Application as Bioadditive for Peptide Synthesis and Laundry Detergent Formulations," BioMed Research International (2019), Article ID 6470897; https://doi.org/10.1155/2019/6470897.
Uma Kumari, "Validation of leaf enzymes in the detergent and textile industries: launching of a new platform technology," Plant Biotechnology Journal, 17 (2019): 1167-1182; https://www.ncbi.nlm.nih.gov/pmc/articles/PMC6523609/pdf/PBI-17-1167.pdf.
Erin Williams, "Bacterial Biofilms: Live Chat with Rob Hull," Nappy Science Gang blog, Oct. 8, 2016; https://nappysciencegang.wordpress.com/2016/10/08/bacterial-biofilms-live-chat-with-rob-hull/, accessed Mar. 13, 2020.
"Are X-Ray Garments 'Machine Washable'? Think Again," Radcareservices.com, no date; https://www. radcareservices.com/washing.html, accessed Mar. 13, 2020.
Philipp Stiefel et al., "A simple and rapid method for optical visualization and quantification of bacteria on textiles," Scientific Reports, 6 (Dec. 22, 2016): 39635; https://www.ncbi.nlm.nih.gov/pmc/articles/PMC5177907/ and DOI: 10.1038/srep39635. PDF: https://www.ncbi.nlm.nih.gov/pmc/articles/PMC5177907/pdf/srep39635.pdf.
L. Teufel et al., "Material-dependent growth of human skin bacteria on textiles investigated using challenge tests and DNA genotyping," Journal of Applied Microbiology, 108/2 (Feb. 2010): 450-461; https://doi.org/10.1111/i.1365-2672.2009.04434.x and https://sfamjournals.onlinelibrary.wiley.com/doi/full/10.1111/j.1365-2672.2009.04434.x.
R.H. McQueen, et al., "Odor intensity in apparel fabrics and the link with bacterial populations," Textile Research Journal, 77 (2007): 449-456; http://trj.sagepub.com/cgi/content/abstract/77/7/44 and https://www.researchgate.net/profile/Raechel_Laing/publication/249785647_Odor_Intensity_in_Apparel_Fabrics_and_the_Link_with_Bacterial_Populations/links/5844c66208aeda69681915e9/Odor-Intensity-in-Apparel-Fabrics-and-the-Link-with-Bacterial-Populations.pdf.
Thomas K. Wood et al., "Bacterial Persister Cell Formation and Dormancy," Applied and Environmental Microbiology, 79/23 (Dec. 2013): 7118-7121; https://www.ncbi.nlm.nih.gov/pmc/articles/PMC3837759/.
K. Lewis, "Persister Cells and the Riddle of Biofilm Survival," Biochemistry (Moscow), vol. 70, No. 2, 2005, pp. 267-274. Translated from Biokhimiya, vol. 70, No. 2, 2005, pp. 327-336; http://www.protein.bio.msu.ru/biokhimiya/contents/v70/pdf/bcm_0267.pdf.
A. Almatroudi, "*Staphylococcus aureus* dry-surface biofilms are more resistant to heat treatment than traditional hydrated biofilms," Journal of Hospital Infection, 98/2 (Feb. 2018): 161-167; https://www.journalofhospitalinfection.com/article/S0195-6701(17)30504-2/fulltext.
Tze Hau Lam et al., "Understanding the microbial basis of body odor in pre-pubescent children and teenagers," Microbiome, 6, article No. 213 (2018); https://microbiomejournal.biomedcentral.com/articles/10.1186/s40168-018-0588-z.
C. Callewaert et al., "Artificial sweat composition to grow and sustain a mixed human axillary microbiome," Journal of Microbiological Methods, 103 (2014) 6-8; https://www.researchgate.net/publication/262607922_Artificial_sweat_composition_to_grow_and_sustain_a_mixed_human_axillary_microbiome.
K. VanderWaal, "University of Minnesota Nano Center Standard Operating Procedure [for the Nikon C2 Confocal Microscope]," Univ. of Minnesota Nano Center, Minneapolis, MN, 2016, http://apps.mnc.umn.edu/pub/pdf/equipment/nikon_confocal_sop.pdf.
J. Edward Donnellan, Jr. et al., "Chemically Defined, Synthetic Media for Sporulation and for Germination and Growth of Bacillus Subtilis," J. Bacteriology, 87/2 (Feb. 1964): 332-336; https://www.ncbi.nlm.nih.gov/pmc/articles/PMC277012/.
Emo Chiellini et al., "Biodegradation of poly (vinyl alcohol) based materials," Progress in Polymer Science, 28 (2003) 963-1014; https://www.sciencedirect.com/science/article/pii/S0079670002001491 (abstract).
"Tailor-made sizing agents for your application," Dr. Petry Textile Auxiliaries, Reutlingen, Germany, https://drpetry.de/fileadmin/user_upload/Produkte/Sizing_agents_BROCHURE_en.pdf.
S.A. Yin et al., "The Interaction of N-Acetylcysteine and Serum Transferrin Promotes Bacterial Biofilm Formation," Cell Physiology and Biochemistry, 45 (2018) :1399-1409; https://doi.org/10.1159/000487566 and https://www.karger.com/Article/FullText/487566.
Anjali Sharma et al., "Green tea extract: Possible mechanism and antibacterial activity on skin pathogens," Food Chemistry 135 (2012) 672-675.
Theresa Renee Aponte, "Green Tea Polyphenol EGCG-S as an Antimicrobial Agent" (2018).Theses, Dissertations and Culminating Projects. 118; https://digitalcommons.montclair.edu/etd/118.
X. Zhang et al. in "Synthesis and Biological Testing of Novel Glucosylated Epigallocatechin Gallate (EGCG) Derivatives," Molecules, 21/5 (2016): 620; https://doi.org/10.3390/molecules21050620 and https://www.mdpi.com/1420-3049/21/5/620.
Y. Zhong and F. Shahidi in "Lipophilized epigallocatechin gallate (EGCG) derivatives as novel antioxidants," J Agric Food Chem, 59/12 (Jun. 22, 2011): 6526-33; doi: 10.1021/jf201050j and https://www.ncbi.nlm.nih.gov/pubmed/21526762.
MSDS for SmartShield Antimicrobial Protective Spray, https://www.sylvane.com/media/documents/products/SmartShield_RTU_MSDS.pdf.
"The Complete Guide tTo Trigger Pump Sprayers," Raepak.con, https://www.raepak.com/complete-guide-trigger-pump-sprayers/, accessed Jul. 10, 2020.
S. Kirmusaolu, "The effect of N-acetylcysteine on growth and biofilm formation in *Staphylococcus epidermidis* strains," Turkish Journal of Medical Science, 42/4 (2012): 689-694; https://citeseerx.ist.psu.edu/viewdoc/download?doi=10.1.1.475.7439&rep=rep1&type=pdf.
J.J Leyden, "The microbiology of the human axilla and its relationship to axillary odor," Journal of Investigative Dermatology, 77/5 (Nov. 1981):413-6. doi: 10.1111/1523-1747.ep12494624.
M. Kanlayavattanakul and N. Lourith, "Body malodours and their topical treatment agents," International Journal of Cosmetic Science, 33 (2011): 298-311; doi: 10.1111/j.1468-2494.2011.00649.x.
"Cathelicidin," Wikipedia.com, https://en.wikipedia.org/wiki/Cathelicidin.
Dinty J. Musk Jr. and Paul J. Hergenrother, "Chemical Countermeasures for the Control of Bacterial Biofilms: Effective Compounds and Promising Targets," Current Medicinal Chemistry (2006) 13, 2163-2177.
T. Suzuki et al., "Comparative study of catechin compositions in five Japanese persimmons (*Diospyros kaki*)," Food Chemistry, vol. 93, Issue 1, Nov. 2005, pp. 149-152.
Itziar Chapartegui-Gonzalez, "Acinetobacter baumannii maintains its virulence after long-time starvation, "PLoS One 13/8 (2018): e0201961. https://doi.org/10.1371/journal.pone.020196.
"Easy-to-Formulate Laundry Detergents," HAPPI, Jul. 2020, ,pp. 38-39; https://www.happi.com/issues/2020-07-01/view_features/easy-to-formulate-laundry-detergents/.
B. Andualema and A. Gessesse, "Microbial Lipases and their Industrial Applications," Biotechnology, 11/3 (2012): 100-118; DOI: 10.3923/biotech.2012.100.118.
"N-Acetyl Cysteine Reduces Biofilm Formation," https://www.wellnessresources.com/studies/n-acetyl-cysteine-reduces-biofilm-formation.
Isssam Raad et al., "Biofilm Inhibitors N-Acetyl Cysteine, EDTA, and Ethanol Exhibit Synergy with Antibiotics Against Biofilms of

(56) References Cited

OTHER PUBLICATIONS

C. albicans and S. epidermidis," IDSA Conference 2008, https://idsa.confex.com/idsa/2008/webprogram/Paper25959.html.
"Active Odor Control Function," Sanitized AG (Switzerland), https://www.sanitized.com/wp-content/uploads/2017/08/SAN_FS_Odoractiv10_EN_secure.pdf.
"Technical Bulletin: Swellex™ Silicone Swelling Agent," https://medical.microcare.com/wp-content/uploads/2018/04/SWX0-Medical-Silicone-SwellFluids-US-TDS.pdf, accessed Oct. 7, 2020.
Robin Michael Statham Thorn and John Greenman, "Microbial volatile compounds in health and disease conditions," J. Breath Research, 6 (2012): 024001 (25pp); doi:10.1088/1752-7155/6/2/024001.
Mark Witten, University of Alberta, New Trail, "Tips on how to stink less," May 26, 2018, https://www.ualberta.ca/newtrail/how-to/summers-coming-tips-on-how-to-stink-less.html.
Yangping Pei et al., "Biological Activities and Potential Oral Applications of N-Acetylcysteine: Progress and Prospects," Oxidative Medicine and Cellular Longevity, vol. 2018, Article ID 2835787; https://doi.org/10.1155/2018/2835787 and https://www.hindawi.com/journals/omcl/2018/2835787/.
M. Zanetti, "Cathelicidins, multifunctional peptides of the innate immunity," Journal of Leukocyte Biology, vol. 75, Jan. 2004, pp. 39-47.
Xin Li et al., "N-Acetyl cysteine and Mechanisms Involved in Resolution of Chronic Wound Biofilm", Journal of Diabetes Research, vol. 2020, Article ID 9589507 (2020),. https://doi.org/10.1155/2020/9589507 and https://www.hindawi.com/journals/jdr/2020/9589507/.
Mary Ann Jabra-Rizk et al., "Fungal Biofilms and Drug Resistance," Emerging Infectious Disease, 10/1 (2004): 14-19; doi: 10.3201/eid1001.030119 and https://www.ncbi.nlm.nih.gov/pmc/articles/PMC3031105/.
Fabíola Costa et al., "N-acetylcysteine-functionalized coating avoids bacterial adhesion and biofilm formation," Scientific Reports vol. 7, Article No. 17374 (2017); https://www.nature.com/articles/s41598-017-17310-4.
G.F. Helaly et al., "Dexpanthenol and propolis extract in combination with local antibiotics for treatment of Staphylococcal and Pseudomonal wound infections," Archives of Clinical Microbiology 2/4 (Dec. 2010); https://www.acmicrob.com/microbiology/dexpanthenol-and-propolis-extract-in-combination-with-local-antibiotics-for-treatment-of-staphylococcal-and-pseudomonal-wound-infections.php?aid=200.
Areej A Alfaifi et al., "Impact of Caffeine on Metabolic Activity and Biofilm Formation of Candida Albicans on Acrylic Denture Resin in the Presence of Nicotine," Journal of Prosthetic Dentistry, Nov. 5, 2019; DOI: 10.1016/j.prosdent.2019.09.007 and https://pubmed.ncbi.nlm.nih.gov/31703923/. (Abstract).
"Acetylcysteine," Wikipedia, https://en.wikipedia.org/wiki/Acetylcysteine, accessed Apr. 7, 2020.
Karin Rasmussen, et al., "N-Acetyl-L-cysteine Effe cts on Multi-species Oral Biofilm Formation and Bacterial Ecology," Letters in Applied Microbiology, 62/1 (Jan. 2016): 30-38, https://www.ncbi.nlm.nih.gov/pmc/articles/PMC4715549/ and doi: 10.1111/lam. 12513.
B.V.G. Nguyen, T. Nagakubo, M. Toyofuku, N. Nomura, and Andrew S. Utada, "Synergy between Sophorolipid Biosurfactant and SDS Increases the Efficiency of P. aeruginosa Biofilm Disruption," Langmuir, 36/23 (Jun. 1, 2020): 6411-6420; https://doi.org/10.1021/acs.langmuir.0c00643 and https://pubs.acs.org/doi/pdf/10.1021/acs. langmuir.0c00643.
Ivana Aleksic et al., "Anti-biofilm Properties of Bacterial Di-Rhamnolipids and Their Semi-Synthetic Amide Derivatives," Frontiers in Microbiology, 8 (Dec. 8, 2017): 2454; doi: 10.3389/fmicb.2017.02454 and https://www.ncbi.nlm.nih.gov/pmc/articles/PMC5727045/.
Cynthia A. Challener, "Excipient Selection for Protein Stabilization: The complex task of stabilizing proteins is made more challenging due to the limited number of approved excipients," Pharmaceutical Technology, vol. 2015 Supplement, Issue 3, Aug. 15, 2015, pp. s35-s39; http://www.pharmtech.com/excipient-selection-protein-stabilization.
https://www.sylvane.com/smartshield-antimicrobial-spray.html and at https://www.sylvane.com/media/documents/products/SmartShield_RTU_MSDS.pdf.
International Journal of Food Properties 20/4 (2017): 769-781; http://dx.doi.org/10.1080/10942912.2016.1180534.
T. Scott Brady et al., "Bystander Phage Therapy: Inducing Host-Associated Bacteria to Produce Antimicrobial Toxins against the Pathogen Using Phages," Antibiotics 7/4 (2018): 105; https://doi.org/10.3390/antibiotics7040105 and https://www.mdpi.com/2079-6382/7/4/105/htm.
"Puracy Natural Laundry Detergent," Puracy.com, https://puracy.com/collections/puracy-home-essentials/products/natural-laundry-detergent, accessed Aug. 24, 2020.
"Puracy Natural Multi-Surface Cleaner," Puracy.com, https://puracy.com/products/natural-multi-surface-cleaner, accessed Aug. 24, 2020.
"Nature's Miracle® Advanced Formula Severe Stain & Odor Eliminator," PetSmart.com, https://www.petsmart.com/ featured-brands/natures-miracle/dog/natures-miracle-advanced-formula-severe-stain-and-odor-eliminator-47028.html?cgid=5000064, accessed Aug. 24, 2020.
"Advanced Stain and Odor Eliminator," Nature's Miracle, http://www.naturesmiracle.com/products/dog/stain-and-odor/advanced-stain-and-odor-eliminator.aspx, accessed Aug. 24, 2020.
Untitled, SCOnline.org, https://www.scconline.org/wp-content/uploads/2014/10/konish.pdf.
"Lactobacillus/□Pumpkin Ferment Extract," https://incidecoder.com/ingredients/lactobacillus-pumpkin-ferment-extract.
Mukesh Kumar Yadav, et al, "Sinefungin, a Natural Nucleoside Analogue of S-Adenosylmethionine, Inhibits *Streptococcus pneumoniae* Biofilm Growth," BioMed Research International, vol. 2014, article ID 156987 (2014); https://www.hindawi.com/journals/bmri/2014/156987/.
Chen Niu et al., "LuxS influences *Escherichia coli* biofilm formation through autoinducer-2-dependent and autoinducer-2-independent modalities," FEMS Microbiology Ecology, 83/3 (Mar. 2013): 778-791; https://onlinelibrary.wiley.com/doi/abs/10.1111/1574-6941.12034 and https://academic.oup.com/femsec/article/83/3/778/597032.
Supeng Yin et al., "NAC and Serum Increases Biofilm Formation," Cellular Physiology and Biochemistry, 45 (2018): 1399-1409; https://www.researchgate.net/publication/323298548_The_Interaction_of_N-Acetylcysteine_and_Serum_Transferrin_Promotes_Bacterial_Biofilm_Formation and https://doi.org/10.1159/000487566.
Alexander G Zhdanko et al. in "One-step synthesis of N-acetylcysteine and glutathione derivatives using the Ugi reaction," Tetrahedron 65/24 (Jun. 2009):4692-4702; https://www.sciencedirect.com/science/article/abs/pii/S0040402009005778.
Karin Rasmussen et al., "N-Acetyl-L-cysteine Effects on Multi-species Oral Biofilm Formation and Bacterial Ecology," Letters in Applied Microbiology, 62/1 (Jan. 2016): 30-38; doi: 10.1111/lam.12513 and https://www.ncbi.nlm.nih.gov/pmc/articles/PMC4715549/pdf/nihms-734574.pdf.
Yangping Pei et al., "Biological Activities and Potential Oral Applications of N-Acetylcysteine: Progress and Prospects," Oxidative Medicine and Cellular Longevity, vol. 2018 (Apr. 22, 20198), Article ID 2835787; https://doi.org/10.1155/2018/2835787 and http://downloads.hindawi.com/journals/omcl/2018/2835787.pdf.
Ahlam Al-kamel et al., "Evaluation of N-acetyl cysteine mouth wash as anew treatment approach for gingivitis," ResearchGate.com, Jul.-Sep. 2017, https://www.researchgate.net/project/evaluation-of-N-acetyl-cysteine-mouth-wash-as-anew-treatment-approach-for-gingivitis, accessed Sep. 30, 2020.
Mayo Clinic, "Acetylcysteine Rinse in Reducing Saliva Thickness and Mucositis in Patients With Head and Neck Cancer Undergoing Radiation Therapy," ClinicalTrials.gov, 2014-2019, https://clinicaltrials.gov/ct2/show/NCT02123511, accessed Sep. 30, 2020.
Ahlam Al-Kamel et al., "N-acetyl cysteine versus chlorhexidine mouthwashes in prevention and treatment of experimental gingivitis: a randomized, triple-blind, placebo-controlled clinical trial,"

(56) References Cited

OTHER PUBLICATIONS

Clinical Oral Investigations vol. 23 (2019): 3833-3842; https://link.springer.com/article/10.1007/s00784-019-02813-3.
Ahlam Al-Kamel et al., "Subgingival microbiome of experimental gingivitis: shifts associated with the use of chlorhexidine and N-acetyl cysteine mouthwashes," Journal of Oral Microbioligy, 11/1 (2019): 1608141; doi: 10.1080/20002297.2019.1608141 PMID: 31275528; PMCID: PMC6598494 https://pmc.ncbi.nlm.nih.gov/articles/PMC6598494/pdf/zjom-11-1608141.pdf.
Ahlam Al-Kamel, "N-acetyl cysteine versus chlorhexidine mouthwashes in prevention and treatment of experimental gingivitis: a randomized, triple-blind, placebo-controlled clinical trial," Clinical Oral Investigations, 23/10 (Oct. 2019): 3833-3842; doi: 10.1007/s00784-019-02813-3.
Sakonwat Kuepethkaew et al., "Laundry detergent-stable lipase from Pacific white shrimp (*Litopenaeus vannamei*) hepatopancreas: Effect of extraction media and biochemical characterization," International Journal of Food Properties 20/4 (2017): 769-781; http://dx.doi.org/10.1080/10942912.2016.1180534 and https://www.tandfonline.com/doi/pdf/10.1080/10942912.2016.1180534.
K. VanderWaal, "University of Minnesota Nano Center Standard Operating Procedure [for the Nikon C2 Confocal Microscope], " 2016; http://apps.mnc.umn.edu/pub/pdf/equipment/nikon_confocal_sop.pdf.
Material Safety Data Sheet File No. 200-2, SmartShield RTU Ready to Use Antimicrobial Surface Protectant; https://www.sylvane.com/media/documents/products/SmartShield_RTU_MSDS.pdf.
"SmartShield Antimicrobial Protective Spray," Sylvane.com, https://www.sylvane.com/smartshield-antimicrobial-spray.html, accessed Oct. 1, 2020.
"Odor-Management: A New Dimension with the Sanitized® Odor Control Function," Sanitized AG, Switzerland, https://www.sanitized.com/odor-control-function/.
"The Complete Guide to Trigger Pump Sprayers," Raepak.con, https://www.raepak.com/complete-guide-trigger-pump-sprayers/, accessed Jul. 10, 2020.
"Active Odor Control Function," Sanitized AG, Switzerland, https://www.sanitized.com/wp-content/uploads/2017/08/SAN_FS_Odoractiv10_EN_secure.pdf, accessed Oct. 1, 2020.
"Clothing," Sanitized AG, Switzerland, https://www.sanitized.com/wp-content/uploads/2018/12/SAN_SegmentFlyer_Clothing_EN_secure.pdf, accessed Oct. 1, 2020.
"Nature's Miracle Carpet Shampoo," http://www.naturesmiracle.com/products/more-products/floor-cleaners/carpet-shampoo.aspx.

* cited by examiner

METHODS AND COMPOSITIONS FOR REDUCING PERSISTENT ODOR IN CLOTHING AND MITIGATING BIOFILMS

CLAIM TO PRIORITY

This application claims priority to U.S. Patent Appl. Ser. No. 62/994,810, filed Mar. 25, 2020; U.S. Patent Appl. Ser. No. 62/931,213, filed Nov. 5, 2019; U.S. Patent Appl. Ser. No. 62/914,552, filed Oct. 13, 2019; U.S. Patent Appl. Ser. No. 62/881,212, filed Jul. 31, 2019; and U.S. Patent Appl. Ser. No. 62/872,697, filed Jul. 10, 2019; all by Shannon Klingman and Jeffrey Dean Lindsay, all of which are hereby incorporated by reference in their entireties for all purposes.

BACKGROUND

Field of the Invention

This invention pertains to products and methods for treating clothing or other textiles to reduce the presence of malodor and/or to reduce biofilm.

Background/Description of Related Art

Much uncertainty exists in the laundry, textile, and personal care industries regarding the challenges of human body odor in fabrics, especially in synthetic fabrics such as polyester. Persistent odor in polyester has been reported by many users, especially those who engage in strenuous exercise regularly. Many report that malodor, especially in the axillary regions, returns quickly after thorough laundering, and sometimes may not be thoroughly removed by laundering.

It is known that polyester is lipophilic and can attract lipids from human sebum or apocrine sweat, and it has been speculated that such lipids on the surface of polyester may provide energy sources for bacteria such as *Micrococcus* species, *Corynebacteria*, or other bacteria species, with *Micrococcus* said to be an especially abundant malodorous bacteria that can reside on polyester. But optimum steps to reduce the impact of microbial biofilm formers have not yet been developed.

Many have proposed treating polyester surfaces with antimicrobial materials such as silver or triclosan. Some have proposed chemical treatments of fibers aimed at decreasing adhesion of microbes to prevent serious odor issues. Even if advanced surface treatments prove viable, there remains a need to treat existing clothing that suffers from or is likely to suffer from persistent odor.

There is a growing recognition that clothing can, over time, begin to suffer from "perms-odor" or "perms-stink," wherein the odor either seems to be embedded or the nature of the clothing has changed such that odor returns quickly during use after washing, particularly after contact with human sweat, almost as if the article itself were catalyzing production of malodor from sweat. We have observed, for example, that some sports apparel may continue to have symptoms of perma-odor even after treatment with dilute bleach or other harsh agents that normally might be expected to eliminate microbial sources of odor. Repeated washing is often ineffective, even with advanced enzymes, detergents, chelants, etc. Many users simply feel they have to discard such infected clothing. There is a long-standing need for means to reduce such perma-odor or other forms of persistent odor in clothing.

Without wishing to be bound by theory, we propose that the recalcitrance of perma-odor is akin to the recalcitrance of bacterial infections when a microbial biofilm is present. Biofilms are remarkable adaptations of bacteria and other microbes such as protists and fungi, including yeasts, in which polysaccharides, proteins, DNA, and other materials may be used to create a protective matrix that can prevent antimicrobials or harsh chemical agents from penetrating effectively. In a biofilm, microbes, sometimes from more than one species, share chemical signals and cooperate to create protective materials that help secure them on a solid surface and protect them from external threats, allowing them to reproduce and thrive. However, there has not yet been a widespread recognition of the role of biofilms in athletic clothing and ordinary attire, ranging from sports gear to casual wear, office wear, and formal attire, including socks, shoes, underwear, shirts, pants, bedding, medical attire, and so forth, but especially clothing items in contact with portions of the body such as the underarms where sweat commonly occurs. Indeed, a common view is that conventional washing and drying is likely to prevent biofilms from forming. See, for example, Erin Williams, "Bacterial Biofilms: Live Chat with Rob Hull," *Nappy Science Gang* blog, Oct. 8, 2016; https://nappysciencegang.wordpress.com/2016/10/08/bacterial-biofilms-live-chat-with-rob-hull/. Our explorations, discussed below, raise an important contrary viewpoint, surprisingly showing that biofilm material in clothing can survive and continue to provide a microbial stronghold for generation of perma-odor.

Perma-odor can occur in numerous materials, but appears especially likely when synthetic fibers such as polyester are present. These lipophilic materials can absorb lipids from human skin (e.g., sebum) and from apocrine sweat that remain on the surface of the fibers and serve as food sources for bacteria, or as materials that can biodegrade to release malodor. The microbial sources may be from contact with the skin or other sources. Synthetic fibers are known to often host a different distribution of bacteria than the human skin they were in contact with, which may result in odor different from the skin itself. Since some bacteria such as Micrococci are known to be capable of forming biofilms on various synthetic surfaces, we propose that they or other species often found on skin other sources such as washing machines may be capable of forming a biofilm on a textile. Such a biofilm can resist removal by conventional washing and can be a platform for odor creation.

Without wishing to be bound by theory, one aspect of biofilms that may help them endure even the harsh conditions of washing and even drying is believed to be the presence of a small percentage of "persister cells" in biofilms that are essentially dormant and may be able to survive various stress factors, including antibiotics, elevated temperature, etc. These cells can later awake when conditions are favorable. See Thomas K. Wood et al., "Bacterial Persister Cell Formation and Dormancy," *Applied and Environmental Microbiology,* 79/23 (December 2013): 7118-7121. See also K. Lewis, "Persister Cells and the Riddle of Biofilm Survival," *Biochemistry* (*Moscow*), 70/20 (2005): 267-274; translated from *Biokhimiya,* 70/2 (2005): 327-336. Also without wishing to be bound by theory, we propose that another factor that may allow some bacteria in biofilms in clothing to survive the harsh conditions of drying in a conventional tumble dryer is the thermal resistance that has recently been documented for bacteria in a dry biofilm. A dry biofilm is one that forms as a biofilm goes through cycles of elevated moisture and dryness, causing the moist, often slimy biofilm to become dry in the dry cycles. A study of the thermal resistance of one species of bacteria was reported in A. Almatroudi et al., "*Staphylococcus aureus* dry-surface biofilms are more resistant to heat treatment than traditional hydrated biofilms," *Journal of Hospital Infection,* 98/2 (February 2018): 161-167; https://www.journalofhospitalinfection.com/article/S0195-6701(17)30504-2/fulltext. Almatroudi et al. showed that *S. aureus* in a typical wet biofilm was more resistant to elevated temperatures than in a "planktonic" (free-swimming) state without the protection of the biofilm, but was even more resistant when protected inside a dry biofilm. In fact, a large fraction of the bacteria in the dry biofilm were able to survive exposure to 100° C. for 60 minutes, or 121° C. for 20 minutes, a remarkable finding. The area of dry biofilms and the unusual properties they may provide does not yet appear to have been extended to studies of the typical odor-causing bacteria in the underarm, but we propose that the alternating cycles of moistness and dryness that occur in clothing may result in dry biofilms that are more able to withstand the high temperatures of conventional drying following treatment in a washing machine. We propose that the toughened or hardened dry biofilm may not only effectively resist the chemicals including enzymes of conventional machine washing, but may also provide resistant to the elevated temperatures of a conventional dryer. But in light of the observations we have made in various studies of perma-odor and the response of biofilm detected in clothing, we also propose that even if the bacteria in a dry biofilm are largely decimated by elevated temperatures, the biofilm matrix and its extracellular polymeric substances may remain, at least in part, and provide a foundation upon which fresh bacteria can begin forming microcolonies and biofilm. As a result, the biofilm material, even if no living bacteria remain therein, may provide a place where live malodorous bacteria can rapidly attach, proliferate, and release malodor much faster than would occur in a new item of clothing.

Thus, to solve the problem of perma-odor, in many cases it may be necessary to undermine the biofilm matrix, either removing it or weakening it. Again without wishing to be bound by theory, it is believed that the formulations described herein work in part by undermining biofilm material and thereby reducing the ability of malodorous bacteria to proliferate (either by removing protective biofilm matter and/or by removing sources of energy that may be attached to the fibers of an article of clothing). In some cases, the ability of, say, enzymatic or bioenzymatic materials to undermine a biofilm or to remove energy sources associated with the biofilm may be enhanced with treatment of the biofilm with an agent such as N-acetyl cysteine that may reduce biofilm matrix viscosity, increases permeability, or otherwise increase the ability of enzymatic or bioenzymatic materials to be effective in attacking the biofilm.

While microbial biofilms on fabrics have received vastly less attention than biofilms on hard surfaces or in medical environments such as surgical sites, implants, catheters, stents, etc., or have even been discounted as unlikely to persist through washing and drying, we propose that biofilms may be able to become established on clothing over time and house bacteria with little risk of being destroyed during conventional washing, or, even if antimicrobial agents or the heat of drying eradicates much of the bacterial population in the biofilm, the biofilm itself, coupled with the lipids and other energy sources on the fibers, may provide a comfortable home where microbes may come and become established, or, itself may increase the tendency of the textile to absorb and release some malodors associated with sweat. It may also be possible that proteins or other materials in the biofilm may help catalyze some reactions that release malodor from various materials such as sweat and sebum. Thus, there is the possibility that biofilms, once established, may have lasting deleterious effects on the odor characteristics of an item of clothing.

Some malodor-generating species on the human body such as Micrococci are known to produce biofilms on some hard surfaces such as metal or plastic surfaces. While we are not aware of reports of *Micrococcus* biofilms on fabrics, we propose that biofilms from one or more species found on human skin and/or in other sites such as washing machines may be at the core of the perma-odor problem and may account for the observed recalcitrance of odor problems, especially for synthetic fabrics. However, it may also be possible that multiple bacterial species may benefit from or inhabit a biofilm that is largely produced by a species that need not be a malodor generator per se, but may contribute to a biofilm that increases the ability of malodor generators like Corynebacteria, Brevibacteria, or Micrococci to proliferate in textiles and create malodor in clothing when worn on the human body. Thus, the primary cause of the biofilm need not be a malodor generating species, but it may provide an environment that increases the activity of a malodor generating species or increases malodor release or duration, thereby contributing to the problem of perma-odor. There are various mechanisms that may be at play, but regardless of the specific mechanisms, we have demonstrated that the methods and compositions described below can be effective against the problem of perma-odor, even if the theory behind its existence is not yet fully understood.

Another complex issue contributing to odor may be the warp sizing agent that is applied to the surface of fibers to improve processing. Starches and waxes are often used on cottons and other fabrics, including starch derivatives such as carboxymethyl potato starch and waxes comprising natural fats, emulsions of paraffin and polyethylene, aliphatic ester oil and fatty alcohol polyglycolether, polyethylene glycol wax, and mixtures of natural fat, waxes and emulsifiers. Starch and wax compounds can serve as food for odor-causing bacteria. Polyvinyl alcohol is often used for polyester and other fibers, and may be used directly or as a copolymer or in combination with other agents. Other sizing agents include sodium carboxymethyl cellulose (CMC), galactomannan, chitosan and its derivatives, etc. Sizing agents may be used in combination with one another such as preparations made of starch, polyvinyl alcohol and galactomannan. Without wishing to be bound by theory, it is proposed that polyvinyl alcohol or other sizing agents may also provide a surface that allows a variety of materials to better adhere to fibers, even if the materials are not directly metabolized by the bacteria, thus raising the possibility that these materials may promote establishment of biofilms that might not so readily take hold otherwise. Alternatively or further, polyvinyl alcohol can be degraded by a variety of microbes including certain *Pseudomonas* species and *Brevibacterium incertum*, which can produce a variety of relatively small carboxylic acids, ketones, and other products, as reported in Emo Chiellini et al., "Biodegradation of poly (vinyl alcohol) based materials," *Progress in Polymer Science,* 28 (2003) 963-1014. Some of the degradation products reported may have the potential to contribute to malodor. In any case, there is a need for enhanced approaches to limiting the ability of bacterial colonies to become established in fabrics and that can cause persistent odor or other problems in spite of being thoroughly washed.

Without wishing to be bound by theory, through our examination and analysis of the problem of "perms-odor" in certain textiles for certain people, we propose that the problem in general or for specific cases involves at least several if not most of the following factors:

(1) Lipohilic textiles can readily retain lipids on their surfaces or within pores in the fabric structure (spaces between adjacent fibers, pores within fibers, grooves or depressions on fibers, regions adjacent asperities on fibers or fiber defects, etc.). Lipids may occupy relatively protected regions reducing the chance of being removed by frictional forces during agitation in a wash cycle.

(2) Bacteria from contact with a human wearer or other sources, such as from a washing machine, can reside on fabrics near lipids and other food sources, including proteins and carbohydrates from sweat or other sources.

(3) Warp sizing materials on fibers may provide surfaces to which bacteria may more readily attach, or may provide sources of food for some bacteria, and thus may contribute to biofilm formation or odor generation.

(4) Besides contributing materials from sweat and sebum that can sustain bacterial growth, a human may also add a variety of other materials to fabrics that can sustain bacteria growth or odor generation, including the lipids and other materials used in many common antiperspirants and deodorants, lipids and other agents in fabric conditioners, foodstuffs such as carbohydrates, proteins, and lipids from eating, etc. These materials can provide food sources to sustain microbial sources of malodor or may be biodegraded into malodorous compounds.

(5) In a warm, moist environment provided on a human body, bacteria can flourish and convert the materials in the sweat or on fabrics into malodor.

(6) Bacteria may attach to fiber surfaces and through quorum sensing or other means, form a community and build a protective biofilm from extracellular polymeric substances (EPS) that may include polysacchaides, genetic material of dead microbes, proteins, and other materials, including water and ions in the biofilms.

(7) Cycles of wetness and dryness may convert a typical wet biofilm into a dry biofilm in which bacteria may be more resistant to heat than in a regular moist biofilm, which in turn is more resistant to heat than the planktonic bacteria may be. Such heat resistance may allow the biofilm to remain viable after washing and drying, contrary to common viewpoints among experts in some related fields.

(8) The biofilm can provide a home for bacteria to survive washing and drying. Alternatively or in addition, the biofilm may provide a foothold or a home for a new generation of bacteria from "newcomers," such that they can occupy or use the existing biofilm even if the former inhabitants were killed. When wetted again with sweat and bacteria from a human host, the attached or embedded bacteria may quickly flourish and produce malodor. The primary bacteria that create the biofilm need not be the direct sources of the malodor. Some malodor-generating bacteria may benefit from an existing biofilm made by other bacteria.

Known methods to control biofilm include physical abrasion such as brushing teeth or scrubbing other hard surfaces, antimicrobials to prevent a quorum of bacteria from establishing a foothold, surface coatings to reduce the ability of bacteria to adhere to target surfaces, acidic and alkali washes to remove bacteria and biofilms from food processing equipment, and a variety of chemical compounds or drugs tailored for specific threats, often with limited efficacy.

It must be noted that factors which may promote biofilms in one environment with one specific set of bacteria may hinder their formation in other environments or with other bacteria, making the field of biofilm control a complex one where results are not easily predictable. For example, for *Streptococcus pneumonia*, S-adenosyl methionine plays a key role in the bacterium's activated methyl cycle (AMC) that is part of its biofilm formation capabilities; see Mukesh Kumar Yadav, et al, "Sinefungin, a Natural Nucleoside Analogue of S-Adenosylmethionine, Inhibits *Streptococcus pneumoniae* Biofilm Growth," *BioMed Research International*, vol 2014, article ID 156987 (2014); https://www.hindawi.com/journals/bmri/2014/156987/. On the other hand, for a different bacterium, *E. coli*, "addition of the methyl donor S-adenosyl methionine or aspartate prevented the luxS-complemented strain from producing a thick biofilm," as reported by Chen Niu et al., "LuxS influences *Escherichia coli* biofilm formation through autoinducer-2-dependent and autoinducer-2-independent modalities," *FEMS Microbiology Ecology,* 83/3 (March 2013): 778-791; https://onlinelibrary.wiley.com/doi/abs/10.1111/1574-6941.12034 (abstract). Also see Dinty J. Musk Jr. and Paul J. Hergenrother, "Chemical Countermeasures for the Control of Bacterial Biofilms: Effective Compounds and Promising Targets," *Current Medicinal Chemistry*, Volume 13, Issue 18, 2006; DOI: 10.2174/092986706777935212. Likewise sodium citrate, depending on its concentration, can either inhibit biofilm formation or promote it, for some bacteria. See R. M. Q. Shanks et al., "Catheter lock solutions influence staphylococcal biofilm formation on abiotic surfaces," *Nephrology Dialysis Transplantation,* 21/8 (August 2006): 2247-2255, https://doi.org/10.1093/ndt/gfl170.

The role of enzymes in particular can also be unpredictable in some settings. For example, while proteases presumably can attack the proteins in a biofilm, one study reported that "protease may actually aid *S. epidermidis* biofilm formation rather than inhibit it." See C. Candal, "Using Enzymes to Improve Antibiotic Effectiveness on *Staphylococcus epidermidis* Biofilm Removal," *NCSSSMST Journal* (2012): 34-37. Also see M. T. Nguyen et al., "Staphylococcal (phospho)lipases promote biofilm formation and host cell invasion," *Intl. J. of Medical Microbiology,* 308/6 (August 2018): https://www.ncbi.nlm.nih.gov/pubmed/29203111, where we learn that the action of a lipase can also promote biofilm formation, underscoring the danger of assuming that the effect of an enzyme on a biofilm can be easily predicted.

While the use of enzymes has allowed washing machines to operate at low temperatures resulting in significant energy saving, low temperatures also allow bacteria to proliferate in washing machines and remain active in clothing even after washing. There is a need for methods that do not rely on harsh chemicals such as chlorine bleach or high-temperatures to keep odor-causing bacteria from persisting in fabrics, particularly synthetic fabrics.

There appears to be a long unmet need in the laundering industry and related fields for a system to attack biofilms or other sources of perma-odor in textiles such as articles of clothing, carpets, fabrics used in bedding, medical attire, etc.

While biofilms in many industrial fields are attacked using strong acids or bases, oxidizers or using other powerful cleansers and antimicrobial agents, there is a need for safe, effective means that, when possible, rely on natural materials or derivatives of natural materials to reduce malodor-supporting biofilms on certain fabrics and clothing items, especially those comprising lipophilic fibers or a wide variety of synthetic fibers such as polyester, nylon, Spandex, Modal, cotton-synthetic blends, and other fibers, where odor is an issue, including both synthetic and natural fibers or mixes thereof that have been treated with sizing agents or other additives that may exacerbate odor problems. Even if the theory regarding biofilm as an important factor in perma-odor is incomplete or incorrect, there is no question that perma-odor is a serious problem that remains in need of the solutions described below, which have demonstrated significant success in reducing perma-odor.

It should be noted that biofilms in fabrics may present problems in a variety of other areas also in need of improved solutions, and the advances disclosed herein may be helpful in those areas. For example, sanitation of clothing, medical apparel, linens, draperies, carpets, upholstery fabrics, protective apparel, towels, rags, wall coverings, and other fabrics used in medical care facilities and by healthcare workers is an increasingly serious problem, as it may be in homes, hotels, senior care facilities, aircraft, automobiles, buses, trains, aquatic vessels such as boats and submarines, laundromats or public or private laundry facilities, airports, prisons, schools, and institutions of many kinds. It is possible some of the recalcitrant microbial challenges faced there may be exacerbated by the formation of biofilms or by other mechanisms similar to those at play with perma-odor. The materials and methods shown to be useful in reducing perma-odor therefore may also be applied to such environments to mitigate fabric-based biofilms or other biofilms and strengthen the ability to attack such biofilms or related structures during cleaning or laundering of the surfaces (e.g., fabrics) with the methods and materials described herein.

SUMMARY OF THE INVENTION

It has been discovered that perma-odor in a variety of textiles can be significantly mitigated through the use of natural or naturally-derived agents applied as a pretreatment to clothing items or other textiles with persistent odor prior to conventional cleaning such as laundering in a washing machine with a commercial laundry detergent. Such pretreatments may comprise particular enzyme blends with surfactants and optional bacterial spores for breaking down microbial biofilm material, coupled with other agents such as biofilm attack agents comprising, for example, an effective amount of N-acetyl cysteine.

Thus, in one embodiment, a method is provided for treating a textile item having or suspected of having microbial biofilm matter in one or more regions associated with persistent odor, the method comprising applying an enzymatic composition to the one or more regions having biofilm matter, providing suitable time for the enzymatic mixture to attack the biofilm, and then washing the textile item, wherein the enzymatic composition comprises: (a) water, (b) from 5% to 60% of a surfactant, (c) from 1% to 20% of an enzyme mixture comprising at least two of lysozyme, proteinase, amylase, mannanase, lipase, pectinase, DNAse and cellulase; and (d) from 0.1% to 10% of N-acetyl cysteine. In some embodiments, the enzymatic composition further comprises from 0.01% to 8% by weight of bacterial spores adapted to become active in response to the presence of contaminants on textiles selected from at least one of proteins, carbohydrates, lipids, and carbohydrates, the spores then producing enzymes that attack a portion of said contaminants.

The enzymatic composition may comprise at least two portions, a first portion comprising an enzyme mixture and a second portion comprising N-acetyl cysteine (NAC), further associated with indicia instructing a user to apply both portions to the one or more regions of the textile item associated with persistent odor. The enzyme mixture may be in a liquid or may comprise dry granulated enzymes that can be combined with liquid prior to application to an item of clothing. The second portion comprising NAC may be in liquid or powder form separate from the enzymes but adapted to be combined with the enzymes on the clothing, such as by adding the powder or a solution to the clothing before, after, or while adding the enzyme mixture and other components of the composition. The second portion of the enzymatic composition may comprise from 1% to 90% N-acetyl cysteine, optionally from 1% to 10% panthenol, and sufficient alkaline agents such that when the second portion of the enzymatic composition is combined with enough water at pH 7.0 to bring the concentration of the N-acetyl cysteine to 1%, that the pH of the resulting aqueous mixture is at least 6.0. Such a composition can be effective in reducing the amount of biofilm matter present or the surface area with biofilm matter present in the textile item, and is also effective in reducing malodor in the textile item, while also being substantially free of non-enzymatic bleaching agents.

Some embodiments also comprise visualizing the presence of suspected biofilm matter using UV light. In such embodiments, the textile item with malodor may have been treated with a suitable dye that fluoresces in UV light to identify one or more regions that show relatively high fluorescence in UV light, wherein the enzymatic composition is applied to at least one of the one or more regions that show relatively high fluorescence. Such a dye may comprise any known optical brightener such as Calcofluour White and other compounds known to preferentially absorb onto cellulose fibers and onto biofilm material.

In some embodiments, the enzymatic compositions and biofilm attack agents described herein are applied to textile items with malodor, while the wearer is also provided with a deodorant adapted to transform the skin microbiome such that malodorous bacteria, particularly in the region of the body associated with the malodor in clothing with persistent odor, become less prevalent through the application of the deodorant, the deodorant comprising at least 0.1% of an alpha hydroxy acid having and having a pH from 2.8 to 5.5, from 2.8 to 5, or from 2.8 to 4.5, wherein the wearer is instructed to apply the deodorant at least once to the underarms or region on the body associated with malodor detected in the textile item, followed by or preceded by wearing the item of clothing while also using the deodorant applied to the portion of the body associated with malodor in the textile item.

Through extensive experimental work, possible solutions to reduce or eliminate perma-odor have been found using materials that are generally safe and suitable for use in consumer products and in some cases may even be known as edible dietary supplements or components of natural edible products, rather than harsh compounds or restricted pharmaceutical compounds. Application of the pretreatment followed by conventional laundering can be effective in reducing perma-odor in clothing, and the effect is believed to be achieved at least in part by undermining biofilm material that may exist in articles with perma-odor.

The pretreatment can be applied with a liquid medium that is sprayed, poured, wiped, daubed, rolled on, or otherwise transferred to articles of clothing, particularly to regions suspected of having malodor. The liquid medium may be provided to the user in ready-to-use form, or may be provided as a concentrate such as a liquid, slurry, paste, or solid such as a powder that can be prepared by the user through addition of water or through the mixing of two or more components to create the ready-to-use composition. The pretreatment may involve comprise two or more physically distinct compositions, such as first and second sprays or mixtures in any suitable form (powder, paste, etc.) applied before or after the first spray is applied.

In some embodiments, evidence for the existence of a biofilm may be considered by the user in applying the pretreatment and verifying its success. Thus, in one embodiment, a method of detecting and mitigating a microbial infection in an article of clothing comprises: 1) exposing an item of clothing one or more times to a solution comprising at least 0.001% of one or more fluorescent optical brighteners such as Calcofluor White (an optical brightener believed to be present in many common laundry detergents), 2) shining UV light on the item of clothing following exposure to the one or more optical brighteners to determine if there is preferential absorption of optical brighteners in a region of the clothing, 3) treating the region of the clothing having preferential absorption of optical brighteners with an effective amount of an enzymatic mixture comprising an effective amount of bacterial spores, one or more surfactants, and a mix of at least three laundry enzymes, 4) allowing the enymatic mixture to reside on the clothing for at least one hour, and then 5) washing the clothing to remove the enzymatic mixture, wherein the treatment results in reduction of fluorescence and/or reduced perma-odor characteristics.

In one embodiment, the enzymatic mixture is provided as a liquid concentrate comprising: (1) surfactant at a concentration of 10% to 55%, more specifically 15% to 45%, and more specifically still from 20% to 35%, such as naturally-derived non-ionic surfactants derived from plant carbohydrates (e.g., from corn or potatoes) and from plant oils such as coconut and palm oil; (2) a mixture of at least 3, 4, 5, or 6 more different classes of enzymes, such as a mix of protease, cellulase, amylase, lipase, mannanase and pectinase (pectin lyase), wherein the enzymes are provided in liquid concentrate form that comprise from 5% to 20% of the mass of the mixture (including water), such as from 8% to 20% or 8% to 15%, wherein the total protein mass can be from 3% to 15% of the concentrate, the protease mass from 1% to 5% of the concentrate, and wherein the lipase comprises between 1% and 25%, or between 1% and 10%, or between 1% and 7% of the total enzyme mass (or, in some embodiments, the concentrate has less than 0.6% total lipase or is substantially lipase free); (3) from 1% to 10% salts for pH control and enzyme stability, such as from 1% to 4% sodium citrate and 1 to 4% sodium bicarbonate; (4) optionally an effective amount of a mixture of bacterial spores, such as *Bacillus subtilis* marketed by Novozymes Biologicals, Inc., USA or JTech Sales (Baton Rouge, FL), or the spores described in US Patent Application No. 20190284647, "Spore Containing Granule," published Sep. 19, 2019 by P. Bach.

In another embodiment, the bioenzymatic mixture ready for application to clothing comprises (1) an effective amount of bacterial spores comprising between $1\times10^5$ and $5\times10^{10}$ CFU/ml (colony forming units per ml) of bacillus spores, more specifically from $1\times10^7$ and $5\times10^9$ CFU/ml, such as from $1\times10^7$ to $8\times10^8$, (2) a mix of at least three or at least four or at least five laundry enzymes from at least three different categories of enzymes collectively having a total enzyme concentration from 1% to 20% and optionally no more than 1.5% or 3% lipase, (3) at least one surfactant such as non-ionic surfactants having a concentration from 5% to 40% in the bioenzymatic mixture, (4) at least 15% water such as from 10% to 80% water or from 30% to 80% water; (5) optionally from 1% to 10% of a solvent other than water such as propanediol, 3-phenyl-1-propanol, (2,2-Dimethyl-1,3-dioxolan-4-yl)methanol (also known as Solketal, isopropylidene glycerol, or Augeo Multi Clean), propane diol, propane glycol, propylene glycol, glycerin, isopentyldiol, pentylene glycol (in general, any alkyl diol having from 3 to 9 carbons and a viscosity at 20° C. of at least 5 mPa-s and more specifically any 1,n-alkanediols for n less than 9), 2-methoxy-2-phenylethanol, 2-phenylethanol, methyl chavicol, and myristicin aldehyde. Liquid alkyl triols may be considered such as butanetriol. Esters having up to 7 carbons with carboxylic acids having up to 8 carbons may be considered, including, for example, neopentyl glycol diheptanoate and other mono- and diglicerides.

In one embodiment, an item of clothing is treated with a biofilm attack agent in a target region suspected of harboring a biofilm, the method comprising:

1) applying an effective amount of a naturally-derived biofilm attack agent to the target region, the biofilm attack agent being selected from one or more of N-acetyl cysteine, panthenol or a derivative thereof, a catechin, and a biofilm attack enzyme such as DNase, lysozyme, etc.,
2) simultaneously, subsequently, or previously applying a bioenzymatic mixture comprising bacterial spores suitable for attacking typical energy sources for bacteria, one or more surfactants, and an enzyme mixture of three of more categories of laundering enzymes selected from proteases, cellulases, amylases, mannanes, lipases, pectinases, and DNases;
3) providing suitable conditions for the spores to become active (i.e., providing sufficient time such as 1 hour or more or 2 hours or more at a suitable temperature such as 15° C. to 60° C., 18° C. to 45° C., or 20° C. to 40° C. with suitable moisture such as at least 10% moisture in the item of clothing, or from 10% to 80%, 15% to 50%, or 20% to 50% moisture relative to the dry fiber weight);
4) washing the item of clothing in a commercial washing machine with a commercial detergent and then drying the item of clothing, wherein the method is effective in reducing the amount of biofilm matter present relative to what is possible with conventional washing alone.

Applicant has found that "biofilm attack agents" (so termed even though our understanding of the theory behind the success of these agents may be incomplete) useful for undermining perma-odor may comprise one or more of:

1. N-acetyl cysteine (NAC), a relatively non-toxic medication often used to treat overdoses of acetaminophen and to help treat cystic fibrosis in part by reducing phlegm viscosity, and also known as a commercial dietary supplement due to its antioxidant properties. The mechanism by which phlegm viscosity is reduced involves attacking disulfide bonds, which is also believed to be useful in undermining the biofilms that can be formed by some pathogenic bacteria. Though the environments where NAC has been shown to be useful in biofilm reduction are strongly different than those found in fabrics for use as items of clothing, and the problems being addressed in those largely medical cases are generally unrelated to the problem of perma-odor or odor reduction in general, we have made the surprising discovery that NAC treatment of textiles suffering from perma-odor can be highly effective in restoring fabrics to a state substantially free of perma-odor or with significantly reduce perma-odor symptoms, or a state in which the time required to develop malodor during wear after washing is significantly increased. In some embodiments, NAC treatment is combined with treatment with other agents such as enzymes, antimicrobials, catechins, bacterial phages and the like, wherein, without wishing to be bound by theory, NAC is believed to open up the biofilm at least temporarily in order to allow a second agent to be more effective, often giving strongly synergistic results in the reduction of perma-odor symptoms.

2. Lysozyme, pectinase including fruit pectinases and other pectinases that may optionally have an optimum efficiency under acidic conditions such as from a pH of 4 to 6.5, and other enzymes capable of attacking portions of the biofilm matrix or reducing the ability of the biofilm or bacteria to adhere to a fabric. Such other enzymes may include certain endoglucans or cellulases, proteinases, amylases, mannanases, DNase, alginate lyase, F-actin, and bacterial-produced enzymes for lysing portions of a mature biofilm. Selection of enzymes depends on the fabric substrate, the bacteria leading to malodor or biofilm formation, the environment of the fabric that contributes to malodor formation, and the nature of the energy sources that are consumed by the odor-causing or biofilm producing bacteria.
3. Herbal extracts that may assist in lysing biofilms, such as the Chinese medical herb *Herba patriniae*, also known as Bai Jiang Cao, *Dahurian patrinia* herb and Whiteflower Patrinia herb, of the family Valerianaceae.

In one embodiment, a laundering composition comprising a biofilm attack agent is provided for users to apply to an item of clothing suffering from strong odor. The composition may be provided as a powder, a liquid concentrate, or ready-to-use material that may be in the form of a liquid, a foam, a paste or slurry, etc., and may be provided in two or more containers for application in two or more steps, such as rubbing a paste or applying a foam or spraying a solution or sprinkling a powder onto a malodorous region of an article of clothing, followed by further treatment with another material such as spraying a solution, applying a foam, rubbing a paste, sprinkling a powder, etc., followed by rinsing or washing and drying.

Thus, by way of example, in one embodiment, a method for removing persistent odor in clothing is provided comprising applying an aqueous composition to clothing prior to washing, comprising from 0.1% to 10% NAC, one or more laundering enzymes at a concentration of from 0.1% to 7% or from 0.5% to 5% or from 0.6% to 3%, and from 0.1% to 25% or from 0.5% to 10% of one or more surfactants, buffered or otherwise at a suitable pH such as from 2 to 6.7, 7 to 10.5, 6 to 8.5, 4.5 to 8, 3 to 6.5, 2.5 to 5, 7 to 11, 8 to 10.5, 7.5 to 10, and so forth.

In one embodiment, a multi-step method to reduce perma-odor comprises:

a) identifying an article of clothing with persistent odor in one or more odorous regions such as the regions adjacent armpits or other high-odor or high-sweating zone of the human body;
b) treating the article of clothing by applying a first solution comprising N-acetyl cysteine (NAC) such that at least 0.1 g, 0.2 g, or 0.3 g of NAC per 50 $cm^2$ area is delivered to the one or more odorous regions; and
c) applying a solution comprising one or more laundry-suitable enzymes, and optionally one or more species of bacterial spores selected for the ability to assist in cleaning of textiles by producing one or more laundry-suitable enzymes in response to the presence of suitable contaminants; such that both NAC and the enzymes and/or spores are present simultaneously.

The first and/or second solution may further include surfactants such as polyalkoxy glycosides, sodium laureth/lauryl sulfate, etc., which may be applied in yet another step before or after the steps mentioned above.

In a related method, the enzyme solution may be applied first, followed by applying the NAC solution while the enzymes are present in the high-odor region.

In one embodiment, a laundry pretreatment with a biofilm attack agent is followed by or simultaneous with treatment by a cleaning composition comprising one or more of (1) enzymes known to be effective in stain removal or laundering (e.g., proteinases, lipases, amylases, mannanases, cellulases, etc.), (2) a detergent, (3) optionally an antimicrobial agent such as a chemical antimicrobial agent or bacterial phages including bystander phages that may assist in attacking targeted microbes, particularly once the biofilm has been weakened or undermined to some degree. Other agents may be present such as soyethyl morpholinium ethosulfate.

In another embodiment, the biofilm attack treatment is followed directly by washing such as in a conventional top-loading or front-loading machine in cold, warm, or hot water using known laundry detergents such as Tide®, Gain®, Persil®, Arm and Hammer®, and the like. The laundry detergent may comprise a variety of laundering enzymes and surfactants, chelants, builders, bleaching agents, etc.

In one embodiment, the method for odor control further comprises providing suitable time for the biofilm attack agent and/or cleaning composition to be effective, such as a dwell time before adding the cleaning composition or a dwell time before washing of at least about 2, 5, 10, 15, 20, 30, or 60, minutes, or 2, 4, 6, or 8 hours, such as from 3 minutes to 1 hour, 5 minutes to 30 minutes, 3 minutes to 3 hours, 30 minutes to 8 hours, 1 minute to 30 minutes, etc.

In one embodiment, the user is provided with the biofilm attack agent and the cleaning agent, with suitable instructions. In another embodiment, the user is provided with the biofilm attack agent, the cleaning agent, and a suitable laundry detergent, with suitable instructions. In another embodiment, the user is provided with the biofilm attack agent, the cleaning agent, a suitable laundry detergent, and a freshener for use between washes such as during the day when odor may begin to occur, with suitable instructions. In another embodiment, the user is provided with a kit comprising a biofilm attack agent and cleaning agent, and a deodorant having a pH from 2.5 to 5.5 for enhancing the skin microbiome in odorous regions of the body. Thus, in one embodiment, a method is provided for controlling odor that comprises periodic pretreatment with a biofilm attack agent followed by an optional treatment with a cleaning composition and then a washing step, coupled with use by the wearer of a suitable low pH deodorant such as Lume Deodorant®.

DETAILED DESCRIPTION

Definitions

As used herein, "N-acetyl cysteine" unless otherwise specified, includes N-acetyl cysteine, N-acetyl-L-cysteine, N-acetyl-D-cysteine, salts thereof such as pharmaceutically acceptable salts, and mixtures thereof. As used herein, derivatives of N-acetyl cysteine include esters, amides, anhydrides, and thio-esters and thio-ethers of the sulfhydryl moiety. Nonlimiting examples of these derivatives include: methyl N-acetylcysteine, ethyl N-acetylcysteine, stearyl N-acetylcysteine, N-acetylcysteine methylthioether, N,S-diacetylcysteine, N-acetylcysteine amide, and the mixed anhydride of N-acetylcysteine and acetic acid.

As used herein, “odorants” and “odorous compounds” are the chemical sources of malodor, which are frequently derived from the action of microbes on typically non-odorous compounds in the sweat, sebum, or otherwise on the human body or in other materials that may be present on fabrics. Odorants created by the action of bacteria on human sweat on the skin or in clothing have been described in studies such as: Tze Hau Lam et al., “Understanding the microbial basis of body odor in pre-pubescent children and teenagers,” *Microbiome,* 6, article 213 (2018). Also see C. Callewaert et al., “Artificial sweat composition to grow and sustain a mixed human axillary microbiome,” *Journal of Microbiological Methods,* 103 (2014) 6-8.

Odorants may include the following and a variety of other compounds not listed here or not even yet identified in the literature: 3-methyl-3-sulfanylhexanol (3M3SH), 3-methyl-2-hexenoic acid (3M2H), and 3-methyl-3-hydroxy-hexanoic acid (HMHA) (these three are known odorants said to be responsible for common axilla odor in adults). Other odorants that may be found on children, teenagers, or adults include acetic acid, isovaleric acid, 2-methyl-butanoic acid, 3-methylbutanoic acid, butanoic acid, (E)-3-methyl-3-hexenoic acid, ethylbutanoate, (Z)-4-heptenal, (E)-2-nonenal, 2-methoxyphenol (guaiacol), 4-methyloctanoic acid, sulfanylalkanols and particularly 3M3SH (3-methyl-3-sulfanylhexan-1-ol), and the odoriferous steroids androstenone (5α-androst-16-en-3-one) and androstenol (5α-androst-16-en-3α-ol).

“Deodorants” as used herein include agents applied to the skin that help reduce odor. “Deodorants” may comprise antiperspirants as used herein, even though deodorants are often treated as a distinct category due to the use of compounds that stop production of sweat. Deodorants are typically applied to the underarms, but some products can be safely applied to many other parts of the body.

As used herein, “synthetic fibers” refer to fibers used in producing textiles that are not obtained from natural plant or animal sources (e.g., not wool, cotton, silk, etc.), such as nylon, polyester, acrylic and polyolefin fibers. Synthetic fibers are generally manufactured by polymerization and often involve extruding or spinning fiber-forming materials through spinnerets. Further non-limiting examples include modacrylic, Spandex or elastin, rayon (e.g., viscose, modal and lyocell), vinyon, saran, vinalon, aramids (e.g., Nomex, Kevlar and Twaron), PLA, etc. In some embodiments, the compositions and methods herein may be applied to synthetic fibers generally, to synthetic fabrics comprising at least one of polyester, nylon, and acrylic; synthetic fabrics comprising cellulose derivatives such as rayon, and fabrics that are substantially free of cellulose derivatives or of any one or more of the previously mentioned fibers.

As used herein, “optical brighteners,” sometimes known as fluorescent whitening agents (FWAs), include dyes and related materials that fluoresce in UV and/or blue light to enhance the brightness or appearance of colors in various fabrics. Optical brighteners often absorb effectively onto cotton, wool, silk, and other natural fibers, and may be less absorbent on polyester or many other synthetic fibers. They also often absorb onto biofilm matter. Typical optical brighteners are frequently stilbene compounds, particularly anionic diamino stilbene (DAS) or distyryl biphenyl (DSBP) derivatives, such as di- and tetra-sulfonated triazole-stilbenes and di-sulfonated stilbene-biphenyl derivatives. Optical brighteners such as those used in laundry detergents may include Calcofluor White (CAS 4404-43-7) or Calcofluor White M2R; C.I. Fluorescent brightener 260; Fluorescent Brightener FWA-1 (CAS 16090-02-1); Disodium 4,4'-bis(2-sulfostyryl)biphenyl (CAS 27344-41-8), also known as Tinopal CBS-X (BASF, Ludwigshafen, Germany); Uvitex 2B, Phorwite MBBH, 4,4'-bis(benzoxazolyl)-cis-stilbene, 2,5-bis(benzoxazol-2-yl)thiophene, 4,4'-diamino-2,2'-stilbenedisulfonic acid (amsonic acid, CAS 81-11-8), and the like. In laundry detergent, optical brighteners may be present at concentrations from about 0.02% to about 1%. Aqueous solutions or other solutions of optical brighteners used to identify the presence of biofilm matter may have any effective concentration, such as from about 50 PPM to 2%, 100 PPM to 1%, 100 PPM to 0.05%, 0.2% to 1%, and the like.

As used herein, “fabric infection” refers to a state in which a textile product contains one or more regions with persistent bacteria present that are not readily removed by ordinary low-temperature washing. Such textile products, clothing, for example, may have persistent odor or other manifestations of the presence of persistent bacteria, or may, for example, quickly yield malodor during exercise much faster than would be expected for similar clothing in a new state without persistent bacteria. The persistent bacteria may be present due to establishment of a biofilm. Alternatively, it is believed that suitable surfaces with attached energy sources such as lipids on the surface of lipophilic fibers may support persistent bacteria without a genuine biofilm if coupled with suitable footholds or dwelling places in a fabric, such as sheltered regions in grooves or pores on or in non-circular fibers or fibers having high porosity or significant surface asperities. It is believed that fabric infections tend to be highly nonuniform, such as preferentially being on regions that may repeatedly be expose to high amounts of biologic materials such as sebum and sweat, or that are at elevated temperatures and humidity relative to other parts of the fabric of a garment, where fabric near regions of the body such as arm pits or the groin may be especially susceptible to fabric infections.

As used herein, the term “textile” means any material made of interlacing fibres, including fabrics, carpeting, geotextiles, etc., whether woven or nonwoven, or comprising including yarns, yarn intermediates, fibers, natural or synthetic materials, and fabrics made of these materials as well as products made from fabrics (e.g., garments and other articles). Items made at least in part from textiles may include shirts, pants, socks, shoes, hats, gloves, underwear, suits, dresses, gowns, face masks, robes, linens, draperies, upholstery materials, etc.

As used herein, a “fabric” is a material made through weaving, knitting, spreading, crocheting, or bonding that may be used in production of further goods (garments, etc.). Product forms may include knits, felts, multilayered materials, composites, wovens, denims, nonwovens, yarns, and towelling. Raw materials may be natural or synthetic, such as cellulosics, including cotton, flax/linen, jute, ramie, sisal or coir or manmade cellulosics (e.g. originating from wood pulp, bamboo, bagasse, milkweed, etc.) including viscose/rayon, cellulose acetate fibers (tricell), lyocell or blends thereof. A textile or fabric may also be non-cellulose based such as natural polyamides including wool, camel, cashmere, mohair, rabbit and silk or synthetic polymers such as nylon, aramid, polyester, acrylic, polypropylene and spandex/elastane, or blends thereof as well as blends of cellulose based and non-cellulose based fibers. Blends may be used such as blends of cotton and synthetic fibers, blends of rayon/viscose with one or more companion material such as wool, synthetic fiber (e.g. polyamide fiber, acrylic fiber, polyester fiber, polyvinyl chloride fiber, polyurethane fiber, polyurea fiber, aramid fiber), and/or cellulose-containing fiber (e.g. rayon/viscose, ramie, flax/linen, jute, cellulose acetate fiber, lyocell). Fabric may be conventional washable laundry such as household laundry. When the term fabric or garment is used, it is intended to include the broader term textiles as well.

As used herein, "fabric" refers to a cloth-like object which is typically produced by weaving or knitting textile fibers, although nonwoven materials can also be considered (e.g., meltblown webs, spunbond webs, spunlace webs, coform webs, needled webs, and the like) as well as combinations of woven and nonwoven materials. Fabric can be made into articles of clothing but can also be in other forms and products. Fabric can include both natural, synthetic, and a combination of natural and synthetic fibers. Examples of fabric that may be treated by the composition of this disclosure include, but are not limited to, carpets, rugs, drapes/curtains, automobile upholsteries, mats, furniture, home décor fabrics, denims, corduroys, polyesters, flannels, fleeces, cottons, silks, elastane, linens, lyocells, rayons, nylons, polyurethanes, viscoses, polyamides, acetates, tweeds, velour, wool, and others. A person having skill in the art will recognize what is considered a fabric.

As used herein, "detergent composition" refers to compositions for removal of undesired compounds from surfaces such as textile surfaces. Such compositions may be in any suitable product form such as liquid, gel, slurry, dispersion, powder, solid stick, granulate, paste, or spray compositions. It may include liquid and/or solid laundry detergents and fabric detergents; fabric fresheners; fabric softeners; and textile and laundry pre-spotters/pretreatment systems). The detergent formulation may contain one or more enzymes such as hemicellulases, peroxidases, proteases, cellulases, xylanases, lipases, phospholipases, esterases, cutinases, pectinases, mannanases, pectate lyases, keratinases, reductases, oxidases, phenoloxidases, lipoxygenases, ligninases, pullulanases, tannases, pentosanases, malanases, beta-glucanases, arabinosidases, hyaluronidase, chondroitinase, laccase, DNase, chlorophyllases, amylases, perhydrolases, peroxidases, xanthanase and mixtures thereof. The detergent composition may further comprise detergent ingredients such as surfactants, builders, chelators or chelating agents, bleach system or bleach components, polymers, fabric conditioners, foam boosters, suds suppressors, dyes, perfume, tarnish inhibitors, bactericides, fungicides, soil suspending agents, anti-corrosion agents, enzyme inhibitors or stabilizers, enzyme activators, transferase(s), hydrolytic enzymes, oxido reductases, bluing agents and fluorescent dyes, antioxidants, and solubilizers, or may be substantially free of any one, two, three, or more of the above-listed detergent ingredients, such as substantially free of lipid-containing fabric conditioners, dyes, perfume, lipase, enzyme inhibitors, bluing agents, peroxides, bleaching agents, oxidizers, non-enzymatic oxidizers, and non-enzymatic bleaching agents such as hypochlorites and/or chlorinated compounds.

As used herein, a "cleaning composition" can include a detergent composition for cleaning laundry or other textile material, but can include cleaning aids of use in cleaning many other surfaces such as bathroom surfaces, kitchen surfaces, walls, floors, machinery, foods, and the like. For example, in one embodiment of a laundry cleaning composition comprising water, NAC at a level of 0.01% to 7%, such as from 0.5% to 2.5%, can be combined with 5-30% of a detergent formulation such 20% of Pilot Chemicals' (Cincinnati, OH) super concentrate blend comprising anionic, nonionic, and zwitterionic surfactants, plus 1-3% each of three or more enzymes, such as 2% Progress Uno 100 L protease of Novozymes, 1% Mannaway 4.0 L mannanase of Novozymes, and 1% Amplify Prime 100 L amylase of Novozymes, an optional solvent or stabilizer up to roughly 7% such as propylene glycol or propane diol, chelants and builders, various salts and buffering agents such as sodium citrate, sodium formate, calcium chloride, sodium carbonate, etc., to assist in stabilizing enzymes and providing a suitable pH. It may also comprise up to 4% rheology modifiers such as 1%-2% ACULYN™ 22 Rheology Modifier (Dow Chemicals, Midland, MI), an anionic hydrophobically modified alkali-soluble acrylic polymer emulsion (HASE), or other polyacylates or other suitable polymers. Such a cleaning composition can be applied to clothing items or other surfaces prior to or during washing processes.

As used herein, the term "laundering" relates to both household laundering and industrial laundering and means the process of treating textiles with a liquid composition, e.g. a wash liquor containing a detergent composition. The laundering process can for example be carried out using e.g. a household or an industrial washing machine such as front-loading or top-loading washers, or by hand. It may include a cycle of washing and rinsing only, or additional steps such use of a pre-spotter or stain removal pretreatment, a liquid or solid fabric softener during washing or drying, and various modes of drying (tumble drying, sun/air drying, infrared, etc.).

As used herein, "derivatives of panthenol" may include pantothenic acid and salts thereof (e.g., the calcium, sodium, potassium salts, etc.), pantethine, pantetheine, and so forth. Panthenol has shown success in biofilm treatments, particularly when coupled with NAC. Panthenol is closely related to its derivative, pantothenic acid, and a derivative also to be considered is pantethine (bis-pantethine or co-enzyme pantethine), a dimeric form of pantetheine produced from pantothenic acid (vitamin B5) by addition of cysteamine. Pantethine is composed of two molecules of pantetheine linked by a bridging disulfide. Most vitamin B5 supplements are in the form of calcium pantothenate. However, in one embodiment, a composition may be substantially free of pantothenic acid while containing panthenol or derivatives thereof. Without wishing to be bound by theory, it may be that panthenol's observed efficacy against perma-stink and biofilms in infected fabrics is related to the uptake of panthenol by microbes that need pantothenic acid as a nutrient, wherein the structural similarity of panthenol to panthothenic acid "fools" the microbes into taking up panthenol or other derivatives thereof as if it were a needed nutrient when it is not. Such a possibility in another microbiological context is proposed in G. F. Helaly et al., "Dexpanthenol and propolis extract in combination with local antibiotics for treatment of Staphylococcal and Pseudomonal wound infections," Archives of Clinical Microbiology 2/4 (December 2010). If that speculative mechanism is applicable to the results Applicant has observed with panthenol, then panthenol or derivatives thereof without panthothenic acid may be most advantageous. However, it may also be possible that panthenol (a.k.a. dexpanthenol) may have a softening effect or other useful secondary effect on the biofilm of an infected fabric.

As used herein, "post-treatment" in the context of the washing of clothing refers to an application of a formulation as described herein to all or a portion of an item of clothing after it has been washed. For washing done in an aqueous system, the post-treatment may be done prior to drying, after drying, or while the item of clothing is only partially dried, such as having a bone dry fabric mass to wet fabric mass ratio of from 20% to 90% or from 30% to 80% or from 60% to 90%, or when the bone dry fabric mass to wet fabric mass ratio is at least 50%, 70% or 90%.

As used herein, "washing" of clothing or other items made from fabrics or textiles generally refers to the use of water and a cleaning agent such as a detergent to remove soil, food, or other agents from the clothing, and may comprise the use of an automated washing machine running a programmed washing cycle comprising combinations of soaking, agitation, rinsing, and spinning to remove water. However, "washing" may also refer to dry cleaning, hand cleaning, chemical bleaching, solar or UV bleaching, treatment with disinfecting or cleansing vapors, etc.

As used herein, "cucurbituril" generally refers to macrocyclic molecules made of glycoluril (=C4H2N4O2=) monomers linked by methylene bridges (—CH2-). The oxygen atoms are generally located along the edges of the band and are tilted inwards, forming a partly enclosed cavity. Cucurbituril molecules can be written as cucurbit[n]uril, where n is the number of glycoluril units, such as n=5, 6, 7, or 8 (or, for example, with n=4 to 20). Cucurbituril and methods of preparation are described in U.S. Pat. No. 9,433,234, "Composition for odor removal comprising cucurbituril," issued Sep. 6, 2016 to Kim et al., U.S. Pat. No. 6,869,466, "Cucurbiturils and method for binding gases and volatiles using cucurbiturils," issued Mar. 22, 2005 to A. I. Day et al., and U.S. Pat. No. 9,227,980, "Methods for the purification of cucurbituril," issued Jan. 5, 2017 to O. A. Scherman et al. For derivatives and other information related to cucurbituril, see U.S. Pat. No. 6,365,734, "Cucurbituril derivatives, their preparation methods and uses," issued Jun. 28, 2000 to K. Kim; U.S. patent Ser. No. 10/308,657, "Composition comprising cucurbituril and/or one or more derivatives thereof," issued Jun. 4, 2019 to R. Coulston et al.; U.S. Pat. No. 9,926,404, "Curing compositions," issued Mar. 27, 2018 to Ben Cheesman et al.; and US Patent Application 20150297772, "Composition for Odor Removal and Fragrance Emission Comprising Complexes of Cucurbituril and Fragrance," Oct. 22, 2015, by K. Kim et al. Cucurbituril or derivatives thereof may be present at 0.1% to 10% by weight, such as from 0.2% to 5%, 0.5% to 2% by weight, etc.

As used herein, percentages in a composition should be taken as weight percent values unless otherwise specified. Thus, a suspension said to comprise 2% of, say, cucurbituril is understood to have 2% cucurbituril particles relative to the mass of the suspension itself, including the water or other liquids.

As used herein, ranges such as concentration ranges for a compound may be comprise as a lower limit and as an upper limit any concentration value mentioned herein for that compound. In embodiments where a compound is to be excluded or kept at a low level, the concentration range may be from zero or substantially zero (e.g., 0.1%, 0.05%, 0.01%, 0.001%, 100 ppm, 10 ppm, or 1 ppm) to an upper limit of any concentration mentioned herein for that compound or salts thereof.

N-Acetyl Cysteine

N-acetyl cysteine (NAC), a derivative of a vital amino acid, cysteine, is used as a medical agent to treat overdoses of acetaminophen and to help in treatment of cystic fibrosis. It is an antioxidant that is also marketed as a dietary supplement. We have found that aqueous solutions of NAC can help reduce perma-odor, either through direct attack or by enhancing the ability of cleaning agents such as enzymes or other compounds to clean the surfaces of infected fibers. NAC has been reported to have success in certain medical environments against several species of bacteria that can create biofilms. However, it can also promote biofilm formation under some circumstances, such as in the presence of other proteins found in the blood (see Supeng Yin et al., "NAC and Serum Increases Biofilm Formation," Cellular Physiology and Biochemistry, 45 (2018): 1399-1409).

The ability of NAC or any other medical agent does not appear to have been considered previously in terms of reducing malodor on clothing or in affecting the hypothesized biofilm formation that may account for some of the more intractable issues of odor control that occur for some users and clothing types. Of course, the usefulness of any compound in one environment against one particular bacterial species does not indicate success in another environment, especially when the target may be different bacteria.

NAC solutions in the range of 0.01% to 15% or more appear to be useful in reducing biofilm on fabrics with persistent odor, especially when combined with or followed by treatment with additional agents such as panthenol or derivatives thereof, laundry enzymes or other enzymes, catechins, detergents, and various solvents. Suitable formulations may have 0.1% to 13%, 0.5% to 13%, 1% to 10%, 0.3% to 8%, and 0.5% to 6% NAC, such as from 0.7% to 3.5% NAC. Without wishing to be bound by theory, it is believed that NAC may help opening up the biofilm (reducing viscosity or thickness, or increasing permeability of the biofilm) to allow the enzymes or other actives to more effectively attack the food source for the odor causing bacteria, or to allow antimicrobial agents or enzymes to more effectively attack the bacteria, or both.

NAC can be found in garlic, onion, etc., or derived from natural materials such as corn, typically through fermentation and extraction. It can be derived from cysteine through acetylation, or produced according to the methods described in EP0905282B1, or by Alexander G Zhdanko et al. in "One-step synthesis of N-acetylcysteine and glutathione derivatives using the Ugi reaction," *Tetrahedron* 65/24 (June 2009):4692-4702. NAC can be obtained in dietary supplements such as those marketed by Swanson.com, or from a variety of chemical suppliers. For some embodiments, low-odor NAC such as Ajipure (Swanson Pharm., Fargo, North Dakota) or Fluimicil (Zambon Italia S.r.l., Milan, Italy) may be useful (odor varies depending on age and manufacturing method).

In one embodiment, the method includes a step of removing blood sources (human, bovine, etc.) that may contaminate a clothing item before applying NAC. This may be useful in light of research pointing to a condition in which NAC may promote biofilm growth (one more clue about the unpredictable and complex world of biofilm management): see S. A. Yin et al., "The Interaction of N-Acetylcysteine and Serum Transferrin Promotes Bacterial Biofilm Formation," *Cell Physiology and Biochemistry,* 45 (2018):1399-1409; https://doi.org/10.1159/000487566.

Fresheners

A wide variety of odor-absorbing or freshening compounds can be considered for the fresheners that may be used herein. Some of those described here are considered novel and described or employed here in inventive ways, while others are known or commercially available. Fresheners may include:

(1) Odor absorbing ring compounds such as cyclodextrin and cucurbituril. Cyclodextrin solutions may comprise any known cyclodextrin or derivative such as alpha-cyclodextrin, beta-cyclodextrin, and gamma-cyclodextrin or any combination thereof, as well as derivatives with increased water solubility such as hydroxypropyl cyclodextrin (e.g., hydroxypropyl-alpha-cyclodextrin, 2-hydroxypropyl-beta-cyclodextrin or 2-hydroxypropyl-gamma-cyclodextrin), methylated alpha-cyclodextrin, methylated beta-cyclodextrin, and mixtures thereof or any of the cyclodextrin derivatives marketed by Pocono Enterprise LLC (Philadelphia, PA) described at http://www.cyclo-dextrin.com/products.asp, including methyl cyclodextrin, mercapto cyclodextrin such as mono-(6-mercapto-6-deoxy)-beta-cyclodextrin, iodo-cyclodextrin such as hexakis-(6-iodo-6-deoxy)-alpha-cyclodextrin, amino cyclodextrin such as mono-(6-amino-6-deoxy)-β-cyclodextrin, and complexes of cyclodextrin such as salicylic acid-hydroxypropyl-beta-cyclodextrin complex, menthol-hydroxypropyl-beta-cyclodextrin complex, vanillin-beta-cyclodextrin complex, soybean isoflavone inclusion complex, curcumin inclusion complex, and beta-cyclodextrin-epichlorohydrin copolymer (soluble beta cyclodextrin polymer, CAS 25655-42-9). Commercial products from Procter& Gamble (Cincinnati, Ohio) comprising cyclodextrin include Febreze® Fabric Free Nature, a cyclodextrin-based product that is free of added fragrance, and Febreze® Sport, Febreze® Air, Febreze® One, etc.
(2) Metazene, from Alpha Aromatics (Pittsburgh, PA), believed to be Lauryl methacrylate/Dodecyl 2-methylacrylate (CAS 142-90-5). Further information is provided in U.S. Pat. No. 4,009,254.
(3) Meelium, from Alpha Aromatics (Pittsburgh, PA).
(4) 4-O-DOR™, from Alpha Aromatics (Pittsburgh, PA).
(5) N-Soya-N-Ethyl Morpholinium Ethosulfate, such as Spectraquat SMES marketed by Spectrum Surfactants (Boca Raton. FL).
(6) Ethanol solutions (e.g., aqueous solutions comprising ethanol at 75% by volume, 70% by volume, 62% by volume, 40% by volume, pure ethanol, etc.). Ethanol or more specifically vodka is sometimes used as a freshener for musty clothing, and may operate by dissolving or redistributing some odor sources. Other alcohols may also be considered such as isopropyl alcohol or menthol in ethanol.
(8) Duo-2-0 from Alpha Aromatics (Pittsburgh, PA), a compound said to contain both Metazene® and N-Soya-N-Ethyl Morpholinium Ethosulfate.
(9) Antimicrobial solutions such as those comprising benzalkonium chloride, including Comfort™ Clothing Care, an antimicrobial spray marketed by Unilever in China said to contain benzalkonium chloride as well as fragrances, solvents, surfactant, and other agents.

Fresheners may also comprise antimicrobial agents aimed at eliminating bacterial odor sources. Any known antimicrobial agent or preservative may be considered to the extent it is applied in ways that meet relevant safety and environmental regulations, including: benzalkonium chloride, benzoic acid and salts such as sodium benzoate, sorbic acid or salts thereof such as potassium sorbate, disodium edentate, Cetrimide, chlorobutanol, chloramines, tris(N-hydroxyethyl) hexahydrotriazine, etc. Quaternary ammonium compounds and complexes therewith can also be considered, many of which are known to be antimicrobial, including benzalkonium chloride, quaternary ammonium N,N-dichloroamines, (cetylpyridium chloride), diaparene chloride, etc. However, in one embodiment, only preservatives are used that are safe for skin contact and not known to be immunotoxins or to induce allergic responses in humans or to bioaccumulate.

Other agents can also be employed to provide antimicrobial effects to fabric surfaces, including SmartShield Antimicrobial Spray made by Envirotrades, LLC (Bloomsbury, NJ), an organosilane-based product described at Sylvane.com. Other fabric treatments include products comprising silver for gradual release of silver ions, zeolites and silver-laden zeolites, the silane treatments of Sanitized AG (Brug, Switzerland), etc. But such treatments are believed to be ineffective or less effective if applied to a fabric that already has a biofilm established in it. Before such treatments can be more effective for persistent odor, a biofilm attack procedure according to various embodiments described herein should first be carried out.

Other Additives

Odor neutralizers can also be included, including soyaethyl morpholinium ethosulfate, Metrazene®, cyclodextrins, and sulfhydrl reagents such as those discussed in U.S. Pat. No. 5,766,578, issued Jun. 16, 1998 to Iris J. Davis.

In some embodiments, enzymes and/or bacteria or spores may be provided in a mixture having high ionic strength such as having at least 2% or higher, 5% or higher, 8% or higher, or 10% or higher, such as from 2% to 20%, 5% to 20%, 8% to 20%, 10% to 25%, etc., of a salt such as sodium citrate, sodium chloride, aluminum sulfate, ammonium sulfate, potassium chloride, and the like. Citrate ions may be particularly beneficial in some embodiments, and thus solutions of sodium citrate, potassium citrate, ammonium citrate, zinc citrate, and the like may be used.

Other agents can also be considered. Without wishing to be bound by theory, it is believed that some liquids may be useful as solvents or "biofilm modification" agents to soften or weaken a biofilm or enhance its permeability so agents may be more effective. Such agents may include 2"-hydroxycinnamic acid, 3-methyl-2(5H)-furanone, phenyl propanol such as 3-phenyl-1-propanol, propane diol, propane glycol, pentylene glycol, DMSO, panthenol, pantothenic acid, glycerin, 3-methoxyphenylacetic acid, 4"-hydroxyphenylacetic acid, 2-methoxy-2-phenylethanol, 2-phenylethanol, methyl chavicol (Basil oil) and other essential oils, myristicin aldehyde, 3,4-dihydroxybenzoic acid, and isopropylidene glycerol, also known as (2,2-dimethyl-1,3-dioxolan-4-yl)methanol or Solketal. They may be present at levels of at least 1%, 3%, or 5% or from 0.5% to 15%, 1% to 8%, 1.5% to 6%, etc.

EGCG is known as an oral care agent, a probiotic agent for human consumption, and as an agent with various health benefits. Its potential in odor control and especially odor control of fabrics appears to have not yet been recognized. We have found particularly useful odor control systems can be produced using aqueous EGCG solutions. EGCG is most commonly available as an extract of green tea, typically produced in China. EGCG is widely consumed as a dietary supplement in green tea extracts having from 25% to 70% EGCG, but these commercial products, typically provided as capsules, comprise a variety of highly colored materials such as polyphenols or tannins, making such material likely to stain clothing if it were applied. For use as a laundry treatment, EGCG can be provided in a highly purified form with much less color. Applicant has found EGCG to be particularly useful at a purity of 98% or above, although purity levels of at least 80%, 85%, 90%, 92%, 95%, 97% and the like can also be used in some embodiments. EGCG may be combined with ascorbic acid, citric acid, mandelic acid, lactic acid, etc., to prevent color formation from dimerization or other reactions involving EGCG.

The cleaning composition can comprise a wide variety of other natural or naturally-derived compounds and synthetic compounds. Other compounds can include soy-derived amines or other amines derived from or extracted from natural sources that may be effective in odor capture, odor control, or in attacking undesirable bacteria; chelating agents; hydrotopes; odor absorbers; preservatives; essential oils or other fragrances; acids; bases; thickeners; neutralizers; builders; minerals such as magnesium oxide or silica; fabric softeners; foaming agents., etc.

In various embodiments, the composition may be substantially free of any or all of the following: ethanol, methanol, propanol, alcohols, alcohols having 3 our fewer carbons, alcohols having 2 or fewer carbons, glycolic acid, acetic acid, critic acid, latex, spermicides, Octoxynol-9, TEA (triethylamine, a compound which may contribute to unwanted odor) or derivatives of TEA, TMA (trimethylamine), ammonia or complexes thereof, amines, polyhydroxy fatty acids, polyhydroxy acids, alpha-hydroxy acids having 14 or greater carbons, fatty acids, polyhydroxy fatty acid esters (or polyhydroxy fatty acid derivatives such as esters, amides, and alcohols), benzoic acid, preservatives, perfumes, artificial colors, sodium bicarbonate, bicarbonates in solid or ionic form, retinol, or Retin-A. "Substantially free" in this context may mean lacking an effective quantity. For alcohols and acids this may be taken as less than 0.1%. In some cases, the concentration may be less than 0.05%.

Other Products

The benefits of the systems and methods described herein may also be applied to deodorants and antiperspirants, such as stick, roll-on, and spray deodorants, either aluminum and zirconium free products or products containing aluminum and/or zirconium. Cream or lotion deodorants may be used, such as Lume® Deodorant and stick deodorants. A small amount of NAC may be provided in the deodorant or antiperspirant, such as from 0.01% to 5%, 0.01% to 1%, 0.02% to 0.8%, or 0.01% to 0.35%. In some embodiments, a trace amount is present such as from 0.001% to 0.05%, or 0.005% to 0.04%. Such agents on skin can complement biofilm attack in odorous clothing by changing a wearer's skin biome to favor non-odorous bacteria while the clothing is also being treated as described herein.

The laundry composition may comprise an effective amount of at least one of: (1) one or more enzymes selected from a protease, a lipase, an amylase, a mannanase, a pectinase, a lysozyme, a cellulase, and a DNase; (2) one or more quaternary amines such as, by way of example, soyethyl morpholinium ethosulfate, a quat known to be useful in reducing odor; (3) one or more essential oils with odor control and antimicrobial efficacy, such as the mix of essential oils marketed under as Odor Medicine O.F. Concentrate by Odor Medic, LLC (Minneapolis, MN); and (4) a biological agent such as a bio-enzymatic cleaner or deodorizer comprising one or more bacteria strains or one or more microbial phage strains that can be directly or indirectly effective in attacking targeted bacteria species.

Bacterial Spores and Other Microbial Agents

Bacterias spores used herein may be any of those described in U.S. Pat. No. 9,228,284, "Mitigation of odor in cleaning machines and cleaning processes," issued Jan. 5, 2016 to S. C. Mchatton, et al., particularly the strains of *B. subtilis*. See also U.S. Pat. No. 9,756,862, "Proportioner-ready bioenzymatic concentrated cleaning product," issued Sep. 12, 2017 to D. A. Cooper et al.

The spores are obtained from non-pathogenic spore-forming microorganisms that are capable of reacting with and removing various organic substances. Such spores can produce extracellular enzymes that may include protease enzymes, urease enzymes, amylase enzymes, lipase enzymes, cellulase enzymes, and combinations thereof. Commercially available concentrated of spores suspended in liquid may be used. Such spore concentrates may comprise from 1% to 50% of the compositions described herein, or from 5% to 30% or from 10% to 25%. The *bacillus* spores may constitute 0.05% to 60% by weight of the spore concentrate, and after blending with enzymes, surfactants, and other agents to form a concentrate or ready-to-use mixture for treating laundry, the bacterial spore concentration may be from about 0.01% to about 10% or 0.05% to 5%, or from 0.1% to 4%. Alternatively, the number of colony forming units (CFU) per ml in the concentrate or diluted mixture may be $1\times10^5$ to $1\times10^{10}$, $1\times10^5$ to $1\times10^9$, or $1\times10^6$ to $1\times10^8$.

The *bacillus* spores may have an average particle diameter of about 2-50 microns, such as from about 10 to 45 microns. *Bacillus* spores are commercially available in blends in aqueous carriers. Commercially available bacterial spore blends include without limitation Freshen Free™ CAN (10×), from Novozymes Biologicals, Inc.; J-Zyme AB-20XNF of JTech Sales (Baton Rouge, FL), a 20× liquid concentrate comprising spores from *Bacillus subtilis*; Bio-Enzymatic Odor Eliminator from Ecolab (St. Paul, MN); and Evogen® Renew Plus (10×) and Evogen® GT (10×, 20× and 110×), both from Genesis Biosciences, Inc. (Lawrenceville, GA). Here, the parenthetical notations (10×, 20×, and 110×) indicate relative concentrations of *bacillus* spores. Useful spores may include those made according to the methods described in J. Edward Donnellan, Jr. et al., "Chemically Defined, Synthetic Media for Sporulation and for Germination and Growth of *Bacillus Subtilis,*" *J. Bacteriology,* 87/2 (February 1964): 332-336, or the spores described in US Patent Appl. No. 20190284647, "Spore Containing Granule," published Sep. 19, 2019 by P. Bach, which not only describes many spores but also describes how granulated enzymes capsules can be coated with bacterial spores in a single dry product, which may be of use in dry precursors to the liquid-based mixtures described herein.

Examples of commercially available bacteria to consider include Ecolab's Bio-Enzymatic Cleaner, bio-enzymatic "Biologicals" mixes provided by Novozymes Corp. (Bagsværd, Denmark), bacterial mixes distributed by Maroon Group (Boca Raton, FL) such as J-Zyme™ AB-20X NFC distributed by J Tech Sales (Boca Raton, FL), a variety of Nature's Miracle products from Spectrum Brands (Middleton, WI), as well as the Bio-Enzymatic Stain & Odor Remover of Xion Labs (Kissimmee, FL) and the NATURE'S SOLUTION™ Bio-Enzymatic Deodorizer/Spotter/Digester of National Chemical Laboratories, Inc. (Philadelphia, PA). Also to be considered are bacteria described in US Patent Application 20180305658, "Composition of Bacterial Mixture and Uses Thereof" by M. T. Glimp, published Oct. 25, 2018. Such bacteria may include, for example, species and strains from Nitrospira including Comammox bacteria, *Nitrosospira, Nitrobacter, Nitrosomonas, Nitrosococcus, Lactobacillus; Lactococcus*, etc. The use of bacteria in the systems described herein should also comply with relevant health and safety requirements.

Also see US Patent Publication 20060062742, "Compositions for reduction of human malodor" by C. Davis, Mar. 23, 2006. Such bacteria, said to be useful in reducing human malodor, include bacteria selected from *Lactobacillus iners*, and similar clones. The composition may further comprise *Lactobacillus* variants such as *crispatus, casei, gasseri, fermentum, amylolyticus, acidophilus, jensenii, coleo-hominis*, etc. Other species may include *Anaerococcus, Dialister, Finegoldia magna, Bifidobacterium, Bacteroides, thetaiotaomicron, Lachnospiraceae, Leptotrichia, Streptococcus, Comamonas, Aerococcus, Veillonella, Mycoplasma*, and *Micromonas*. Other examples of bacterial compositions for odor control are described in US Patent Application 20110318289, "Methods and Compositions for Reducing Body Odor," published by M. Frodyma of Novozymes Corp., Dec. 29, 2011.

Bacteria or spores may be provided in an aqueous suspension, a gel, a foam, a wipe, in microspheres, etc. One vehicle for delivery of beneficial bacteria may be microspheres comprised of poly (D.L-lactide-co-glycolide) (PLGA) and poly(D,L-lactide)(PLA) as described in Goodman, et al, "Microsheres Under In Vitro Release Conditions," *APPS PharmSCiTech,* 2003: 4(4) article 50. Other methods for delivery are described in U.S. Pat. No. 6,509,028 issued to Williams, et. al on Jan. 21, 2003.

In an aqueous suspension, the concentration of bacteria or their spores may be 10 billion or more per liter such as form 10 billion to 200 billion per liter, or can be about 5 billion or more per liter, 500 million or more per liter, or 50 million or more per liter. The bacteria may comprise any number of species such as any integer from 1 to 1000, such as 1 species, 3 or more species, from 3 to 10, etc. Such agents can be present in a cleaning composition or in the biofilm attack agent, if compatible.

In some embodiments, the cleaning composition may comprise phages that attack bacteria associated with malodor such as *Micrococcus luteus* or other micrococci. Phages are virus-like agents that attack specific strains of bacteria. Examples of phages for use in products intended for human use are described in United States Patent Application 20170157186, "Phage to Treat Bacteria on Skin," published Jun. 8, 2017 by Jacob Shiach. See also US Application 20110038840, "Disinfectant Composition Comprising Phage," issued Feb. 17, 2011 to L-kuang Chen and Nien-tsung Lin, and US Application 20170319637 "Phage Therapy," issued Nov. 9, 2017 to F. Pouillot et al. Commercial phage therapy for nutritional purposes to enhance the bacteria in the GI tract is marketed at Flora88.com by Optium, LLC (Provo Utah), and similar phages can be considered for use with the compositions described herein. Another source of phages for commercial products is Micreos Food Safety B.V. (Wageningen, The Netherlands), which markets PhageGuard technology.

Phages can be provided in aqueous solution and applied with NAC, enzymes, flavanols and other agents to attack odorous bacteria or their biofilms. One disadvantage of phages is that each phage generally attacks a single strain of a particular bacterium, requiring multiple strains to attack the multiple strains of typical bacteria. A related approach is the use of bystander phage technology, in which a phage attacks a specific microbe but induces the targeted microbe to release defensive antimicrobials in response, which in turn can target a broad spectrum of nearby bacteria. Bystander phage therapy is being offered for commercial use through Brigham Young Univ. from the research of Dr. Sandra Hope, as described by T. Scott Brady et al., "Bystander Phage Therapy," *Antibiotics* 7/4 (2018): 105.

Enzymes

Enzymes, particularly hydrolases, have been used as a tool for laundering fabrics for decades. Among hydrolases, originally proteases were employed to assist in the removal of proteinaceous materials. Later it was found that lipases can assist in removal of foodstuffs and stains containing lipids and that amylases can break down stains containing starch such as gravies and barbecue sauce. Cellulases are now also commonly employed to assist in maintaining the quality of cotton or viscose fibers, and to enhance the stain removal effect of other enzymes. More recently mannanases and other enzymes are being employed to help break down foodstuffs such as containing galactomannan gums such as guar gum or other polysaccharides. Lysozymes, pectinases, and DNases may also be considered.

Enzymes may be of any suitable origin, such as vegetable, animal, bacterial, fungal and yeast origin. Purified or non-purified forms of these enzymes may be used. Also included are mutants of native enzymes obtained by protein and/or genetic engineering, chemical and/or physical modifications of native enzymes, etc. Expression of the enzyme can be via host organisms in which the genetic material responsible for the production of the enzyme has been cloned. The enzymes can be added as separate single ingredients (prills, granulates, stabilized liquids, etc. containing one enzyme) or as mixtures of two or more enzymes (e.g. cogranulates).

There are a wide variety of specific enzymes for each enzyme type, and a variety of manufacturing methods including production by bacteria or plants, extraction from natural materials, etc. Numerous powder and liquid detergents for washing machines, including machines for clothes washing as well as dish washing, now comprise blends of enzymes to provide detergency effects. These may be used in primary detergent compositions or in pre-treatments such as stain sprays. Examples include Tide® Laundry Detergent (Procter & Gamble, Cincinnati, Ohio), Zout® Stain Remover (Henkel AG, Dusseldorf, Germany), and Shout® Stain Remover (S. C. Johnson, Racine, Wisconsin). Enzymes are also known to assist in odor removal by breaking down some of the materials that might create malodor or be converted by microbes into malodorous compounds.

Enzymes useful with the formulations described herein may include any combination of lipases, proteases, amylases, cellulases and mannanases, pectinases, and may also include other enzymes such as hemicellulases, peroxidases, lysozymes, xylanases, phospholipases, esterases, cutinases, pectinases, laccases, keratanases, reductases, oxidases, phenoloxidases, lipoxygenases, ligninases, pullulanases, tannases, pentosanases, malanases, β-glucanases, arabinosidases, hyaluronidases, DNAse, chondroitinases, and hexosaminidases, including those described in U.S. Pat. No. 6,489,279, "Laundry and cleaning compositions containing xyloglucanase enzymes," issued Dec. 3, 2002 to A. C. Convents et al. However, in some embodiments the composition may be substantially free of particular enzymes, such as substantially free of any particular class of enzymes such as lipase or laccase (e.g., having less than 0.2%, less than 0.1% or less than 0.05% by weight of the excluded enzyme or enzyme category) or substantially free of the bacteria or bacterial spores that produce the excluded enzyme or enzyme category. Without wishing to be bound by theory, it is believed that some lipases in certain concentration ranges can sometimes result in a rancid or sour odor for some articles of clothing after multiple washes, possibly due to reaction products when lipids from dairy products or other sources are treated by the lipase. Some lipases may be most effective at low moisture levels, such as from 10% to 40% moisture in fabric, acting primarily at air-water interfaces, and thus the peak activity of lipase applied to laundry may occur after washing as the clothing is air dried or tumble dried, resulting in some components that may remain in the clothing until washed again, raising the risk of malodor when lipase concentration is too high. Thus, it may sometimes help to limit lipase to less than 25%, 15%, 10%, or 5% of the enzymes present, with lower limits of, say, 1%, 3%, 5%, or 10%, when feasible.

As used herein, "laundering enzymes" refers to enzymes commonly incorporated into laundry detergents, both liquid and granulated detergents, such as lipase, cellulase, mannanase, protease, pectinase, and amylase. These are often engineered to be active at an alkaline pH such as from 7 to 9.5 or 7.5 to 8.5 but may individually or collectively be adapted for optimum performance in other pH ranges such as from 3 to 12, 3 to 6, 4 to 7, 5 to 8, 6 to 8, 4.5 to 8.5, 5 to 7.6, 3.5 to 6.5, etc.

Enzymatic treatments may include enzymes in liquid or powder form that, when mixed in an aqueous solution and applied to clothing, may help attack a biofilm or remove energy sources for odorous bacteria. Enzyme treatments may, in the presence of agents described herein, be effective in attacking bacteria or in mitigating the odorous compounds they produce. Such enzymes can include known enzymes used for various commercial products such as stain and spot removers, odor removers for carpet and other materials, laundry detergents, etc. Enzymes may be incorporated in the ready-to-use product at levels from 0.01% to 20% of active enzyme by weight of the composition, or from 1% to 15%, 2% to 12%, and the like.

Examples of potentially useful enzymes are disclosed in U.S. Pat. Nos. 5,576,282, 5,728,671 and 5,707,950. Several proteases are described in PCT publications: WO 95/30010 published Nov. 9, 1995; WO 95/30011 published Nov. 9, 1995; and WO 95/29979 published Nov. 9, 1995. Peroxidase enzymes are disclosed in U.S. Pat. Nos. 5,576,282; 5,728,671; 5,707,950; 5,817,495; 5,968,883 and in European Patent application EP No. 96870013.8, filed Feb. 20, 1996. A range of enzyme materials and means for their incorporation into detergent compositions is also disclosed in WO 9307263 and WO 9307260 to Genencor International, WO 8908694 to Novo, and U.S. Pat. No. 3,553,139, Jan. 5, 1971 to McCarty et al. Enzymes are further disclosed in U.S. Pat. No. 4,101,457, Place et al, Jul. 18, 1978, and in U.S. Pat. No. 4,507,219, Hughes, Mar. 26, 1985. Enzyme materials useful for liquid detergent formulations, and their incorporation into such formulations, are disclosed in U.S. Pat. No. 4,261,868, Nora et al, Apr. 14, 1981. Enzymes for use in detergents can be stabilized by various techniques. Enzyme stabilization techniques are disclosed and exemplified in U.S. Pat. No. 3,600,319, Aug. 17, 1971, Gedge et al, EP 199,405 and EP 200,586, Oct. 29, 1986. Enzyme stabilization systems are also described in U.S. Pat. No. 3,519,570. A useful *Bacillus*, sp. AC13 giving proteases, xylanases and cellulases, is described in WO 9401532 to Novo.

As used herein, "lysozyme" is a glycoside hydrolase that can be found in egg whites of chickens, in human milk and the milk of some mammals. It catalyzes the hydrolysis of 1,4-beta-linkages between N-acetylmuramic acid and N-acetyl-D-glucosamine residues in peptidoglycan, a component of gram-positive bacterial cell walls that can cause lysis of the bacteria. Lysozyme activity generally increases with increasing temperatures, up to about 60° C., with a pH range of 6.0-7.0 for best activity. Suitable concentrations of salts such as sodium chloride or potassium salts can increase lysis by lysozyme (e.g., a salt concentration from 0.01 to 7%, 0.1% to 3%, 0.02% to 1.5%, 0.05% to 1%, or any combination of the above lower limits with the above upper limits, with percentages taken as weight percentages). Alternatively, a lysozyme or any other enzyme solution may be substantially salt free, such as having an upper limit in concentration of less than 0.1%, less than 0.05%, less than 0.01%, or less than 0.001% salt; upper limits to be considered may also include 100 ppm, (parts per million), 10 ppm, 1 ppm, 100 ppb (parts per billion), 10 ppb, 1 ppb, and 10 ppt (parts per trillion). These upper limits can also be applied to limit the amount of any optional ingredient or potentially adverse ingredient described herein or otherwise known to those skilled in the art. These limits can be taken as applicable if desired to any known toxin, pollutant, dye, pharmaceutical compound, and so forth, in order to achieve such objectives as meeting safety guidelines, reducing harm to the environment, or preventing harms to the treated products.

Proteases (sometimes known as peptidases) may include serine proteases, which include a serine group in the catalytic center, or metallo proteases, cysteine proteases (including papain and bromelain), aspartic proteases, threonine proteases, and the like. Examples of alkaline proteases are subtilisins, especially those derived from *Bacillus*, e.g., subtilisin Novo, subtilisin Carlsberg, subtilisin 309, subtilisin 147 and subtilisin 168 (described in WO 89/06279), such as Subtilisin A (Enzyme Commission or EC number 3.4.21.62), marketed by Novozymes, an alkaline non-specific serine protease from *Bacillus subtilis* that catalyzes the hydrolysis of proteins and peptide amides. Variants include subtilisin BPN' (also subtilisin B, subtilopeptidase C, nagarse, nagarse proteinase, subtilisin Novo, bacterial proteinase Novo) and subtilisin Carlsberg (subtilisin A, subtilopeptidase A, alcalase Novo). Examples of trypsin-like proteases are trypsin (e.g. of porcine or bovine origin) and the *Fusarium* protease described in WO 89/06270 and WO 94/25583. Other examples of useful proteases are the variants described in WO 92/19729, WO 98/20115, WO 98/20116, and WO 98/34946. Proteinase K may also be considered, but can pose a threat to keratin and thus to wool.

Other commercial serine proteases from Novozymes include: Alcalase®, an esterase that hydrolyzes amino esters which include heterocyclic amino esters; Savinase®, which can hydrolyse some esters as well as strained amides under alkaline conditions; Esperase®, an endo-peptidase with a broad specificity; Neutrase® (E.C.3.4.24), a neutral, zinc metallo endo-protease from *Bacillus amyloliquefaciens* that randomly hydrolyses internal peptide bonds and also facilitates enzymatic synthesis of oligopeptides, and the related protease thermolysin, a zinc dependent metallo endo-protease; rTrypsin® (EC 3.4.21.4), an endopeptidase that preferentially hydrolyses ester bonds whose carboxyl groups are contributed by lysine (Lys) or arginine (Arg) except when either is followed by proline; and nattokinase, a protease with 275 amino acid units made by the bacterium *Bacillus subtilis* var. *natto*, manufactured by Daiwa Pharmaceutical (Tokyo), Contek Life Science Co., Ltd. (Taibei) and the Japanese Nattokinase Association organized by Japan Bio Science Laboratory (Osaka). Proteases may also include the peptidase known as SAPV from the halophilic Virgibacillus natechei sp. nov., strain FarD$^{T}$.

Pectinases can include those from any known source such as from bacteria, fungi and nematodes, and can include the XPect® series of pectinase marketed by Novozymes and related Pectinex® products. Pectinase products are often provided as a mixture of enzymes that may include pectin-transeliminase, polygalacturonase and pectinesterase and small amounts of hemicellulases and cellulases. Pectinex® and several related enzymes are believed to be produced by a strain of the fungus *Aspergillus niger*, said to exhibit optimum activity around pH 4.5. In some embodiments, the pectinase includes one or more pectinases produced by bacterial species such as *Dickeya dadantii*, noted for its production of many pectinases, including the PelN pectate lyase which is optimum at a pH of 7.4.

Lipases (triacylglycerol acyl-hydrolases, EC 3.1.1.3) are typically classified as serine hydrolases and act to hydrolyze various lipids, typically only when present at an oil-water interface and generally do not hydrolyze dissolved substrates in the bulk fluid. Lipases, when used in the compositions described herein, may be biological or engineered lipases that are extracted from living organisms or combinations thereof. Microbial sources may include *Candida rugosa, Pseudomonas aeruginosa* and other *Pseudomonas* species, *Aeromonas* species, *Acinetobacter* species, *Burkholderia* species, *Aspergillus oryzae, Bacillus cereus, Bacillus coagulans*, and other *Bacillus* species, *Penicillium roquefort, Geortrichum* species, etc. Others include M1 Lipase® and Lipomax® (Gist-Brocades) and Lipolase® and Lipolase Ultra® (Novozymes). Lipase may also be extracted from arthropods, marine animals and mollusks, including lipase from the hepatopancreas of Pacific white shrimp (*Litopenaeus vannamei*), as described by S. Kuepethkaewa et al., "Laundry detergent-stable lipase from Pacific white shrimp (*Litopenaeus vannamei*) hepatopancreas," *International Journal of Food Properties* 20/4 (2017): 769-781.

Some lipases can actually promote biofilm formation (see MT Nguyen et al., "Staphylococcal (phospho)lipases promote biofilm formation and host cell invasion," *Int J Med Microbiol.* 308/6 (August 2018): 653-663 at https://www.ncbi.nlm.nih.gov/pubmed/29203111), again indicating the sometimes unpredictable nature of biofilms with respect to various ingredients.

Cellulases may include any combination of known cellulases including those used for laundry detergents or proposed for that purpose, including alkali stable endoglucanase from alkalothermophilic *Thermomonospora* sp. (T-EG).

Mannanases may include Mannaway® from Novozymes, Cp-mannanase marketed by PhylloZyme (Philadelphia, PA) and extracted from *Trichoderma reesei*, or mannanase extracted from various leafs as described in Uma Kumari, "Validation of leaf enzymes in the detergent and textile industries: launching of a new platform technology," *Plant Biotechnology Journal,* 17 (2019): 1167-1182.

Cutinases [EC 3.1.1.50] can be considered as a kind of lipase that does not require interfacial activation. Addition of cutinases to detergent compositions have been described in e.g. WO 88/09367 (Genencor).

DNase can include deoxyribonuclease and related peptides or enzymes such as those described in U.S. Pat. No. 10,479,981, "DNase Variants," issued Nov. 19, 2019 to L. H. Oestergaard et al. Also to be considered are the compositions of WO 06/017816 and the Deoxyribonuclease I (bovine DNase I) of WO 2009/121183 and the materials of U.S. Pat. No. 9,675,736, "Compounds and methods for biofilm disruption and prevention," issue Jun. 13, 2017 to J. G. Burgess et al.

Known amylases (α and/or β) can be included. WO 94/02597, Novo Nordisk A/S published Feb. 3, 1994, describes cleaning compositions which incorporate mutant amylases. See also WO94/18314, Genencor, published Aug. 18, 1994 and WO95/10603, Novo Nordisk A/S, published Apr. 20, 1995. Other amylases known for use in detergent compositions include both α- and β-amylases. α-Amylases are known in the art and include those disclosed in U.S. Pat. No. 5,003,257; EP 252,666; WO 91/00353; FR 2,676,456; EP 285,123; EP 525,610; EP 368,341; and British Patent Specification No. 1,296,839 (Novo). Other suitable amylase are stability-enhanced amylases including Purafact Ox Am® described in WO 94/18314, published Aug. 18, 1994 and WO96/05295, Feb. 22, 1996.

Examples of commercial α-amylases products are Termamyl®, Ban®, Fungamyl® and Duramyl®, all available from Novo Nordisk A/S Denmark. WO95/26397 describes other amylases: α-amylases characterized by having a specific activity at least 25% higher than the specific activity of Termamyl® at a temperature range of 25° C. to 55° C. and at a pH value in the range of 8 to 10, measured by the Phadebas® α-amylase activity assay. Other amylolytic enzymes with improved properties with respect to the activity level and the combination of thermostability and a higher activity level are described in WO95/35382.

In addition to lysozyme discussed above, other enzymes produced by bacterial phages may also be employed, including polysaccharide depolymerases or EPS depolymerases (EPS stands for extracellular polymeric substance, referring to the materials used to form a microbial biofilm, which can include proteins, polysaccharides, genetic material, lipids, and remnants of bacteria) and phage endolysins, any of which may be extracted or purified from phages for use in some embodiments described herein. Alternatively, phages may be employed directly such that they can product suitable enzymes or other agents to undermine a biofilm or attack one or more of the bacterial species in a biofilm of "fabric infection." The enzymatic activity of such phases capable of attacking EPS can include alginate lyases, amylases, cellulases, dextranases, endohexosaminidases, exopolygalacturonic acid lyases, galactosidases, glucosidases, guluronan lyases, hyaluronate lyases, and pullulanases. Such phages may include λW60 (*Escherichia coli* phage), *E. coli* phases T4, T5, and T7, PB-1 (*P. aeruginosa* phage), ØIBB-PF7A (a phage against *P. fluorescens*), ØIBB-SL58B (a phage against *Staph. lentus*), lactococcal c2, *P. aeruginosa* phage ϕE2005-A, *S. lentus* phage fIBB-SL58B, and *P. fluorescens* phage fIBB-PF7A, *S. Typhimurium* phage SP6, *S. aureus* phage phiIPLA-RODI phage and philPLA-C1C phage, phage P22, and phages targeted for *Corynebacteria, Micrococcus, Brevibacteria* linens, and other malodorous bacteria.

Some potentially useful enzymes are produced by biofilm-forming bacteria in late stages of biofilm development to release portion of their own biofilms in order to allow bacteria to escape and spread. For example, *Escherichia coli* produces N-acetyl-heparosan lyase, *Pseudomonas aeruginosa* and *Pseudomonas fluorescens* produce alginate lyase, and *Streptococcus equi* produces hyaluronidase for the lysis of portions of the biofilm matrix. Such lyase materials from bacteria or other sources can be considered for many of the embodiments described herein.

In some embodiments, the composition described herein may also comprise enzymes having lysostaphin activity. Lysostaphin is a glycyl-glycine endopeptidase (EC 3.4.24.75), a metalloendopeptidase from *Staph. simulans* that can have antimicrobial action against some *Staphylococci*. While *Staphylococci* may not be major sources of body odor, we propose that their biofilm forming capabilities may contribute to biofilms in clothing that also host malodorous bacteria and may be part of the problem for some cases of perma-odor. Methods of obtaining and employing lysostaphin or enzymes with such activity are described in U.S. Pat. No. 6,794,350, "Reduction of malodor from laundry," Sep. 21, 2004 to C. Johansen et al.

In many embodiments, a combination of enzymes is provided, either in solution or in powdered form. The combination may comprise commercial combinations such as Novozymes Leviti® mix of protease, cellulase, mannanase, amylase and pectinase, though such a mix can be assembled from individual sources. A mix can be fortified with additional individual enzymes such as lipase and other forms of protease such as papain, lysozyme, DNAse, and the like.

Antimicrobials

Antimicrobial agents may be present in any of the solutions used in the methods described herein. For example, common preservatives such as banzalkonium chloride, 1,2-benzisothiazolin-3-one or other isothiazolinones, methylchloroisothiazolinone/methylisothiazolinone, phenoxyethanol, potassium sorbate, propylparaben, benzyl alcohol, dehydroacetic acid, or benzoic acid may be present that also attack odor causing bacteria. Alternatively or in addition, nisin, lysozyme, antimicrobial peptides, etc. may be present. However, in some embodiments, the composition may be substantially free from certain preservatives such as parabens and/or formaldehyde generators. Also to be considered are essential oil blends, certain quaternary amines with anti-odor efficacy, and bacterial phages including bystander phages that may assist in attacking targeted microbes, particularly once the biofilm has been weakened or undermined to some degree through the application of NAC, enzymes, catechins, or other biofilm attack agents. Antimicrobials may be present in a composition at a level of 0.01% to 15%, 0.01% to 5%, or 0.05% to 2%, etc., and the NAC or salt or derivative thereof may comprises from 0.1% to 20% of the dry or wet mass of the composition.

Other antimicrobial agents to be used with NAC include tetrahydroxypropyl ethylenediamine (THPE), optionally with 0.001 to 10% by weight of at least one compound selected from a biphenol as described in WO2020126347A1, "An antimicrobial composition," published Jun. 25, 2020 by R. Kapoor et al. Other agents may include cetylpyridinium chloride, imidazolidinyl urea, propyl benzoate, sodium benzoatre, potassium sorbate, and the like. Other antimicrobial or bacteriostatic agents that may be considered include, by way of example only, biguanide, chitosan derivatives, silver nanoparticles or other silver-based compositions and products capable of releasing silver ions, and the like. Nisin, a polycyclic peptide antibacterial agent, may also be incorporate in some embodiments of the formulations of the present invention.

Antimicrobial agents can include the cationic steroidal antimicrobial (CSA) compounds described by Paul Savage and D. Leung in U.S. Pat. No. 7,754,705, "Cationic steroid antimicrobial compositions and methods of use," issued Jul. 13, 2010; Carl Genberg and Paul Savage, U.S. Pat. No. 9,603,859, "Methods and products for increasing the rate of healing of tissue wounds," issued Mar. 28, 2017; and Carl Genberg, C. S. Beus, and Paul B. Savage, United States Patent Application 20150374719, "Methods for Treating Fungal Infections," issued Dec. 31, 2015. Any of the compounds described therein such as CSA-13, CSA-25, CSA-54, CSA-90, CSA-92, CSA-190, CSA 191, and CSA 1921 and the like may be combined with the compositions described herein. For example, one or more CSA compounds may be present in an aqueous solution at a total concentration of from 0.01% to 1%, such as from 0.01% to 0.5%, or from 0.02% to 0.4% by weight. Such compounds are commercially available from Purishield Life Sciences, LLC (Walnut Creek, CA) under the PuriShield®, Purifect® or Ceragyn® brands, for which the PuriShield® line for animal care is believed to also be licensed to FarnAm Co. (Phoenix, AZ).

An antimicrobial/preservative system used with the compositions described herein may be substantially free of any one or more of parabens, formaldehyde donors, halogens, isothiazolinones, and phenoxyethanol.

In some embodiments quaternary amines such as soyethyl morpholinium ethosulfate or other quats may be used, such as alkyl dimethyl benzyl ammonium chloride, wherein the alkyl moiety may, by way of example, have a chain length of from 4 to 30, or more specifically from 10 to 18, such as a mix of compounds have alkyl chain lengths of 12, 14, and 16 (C12-C16). Also to be considered are benzalkonium chloride, octyl decyl dimethyl ammonium chloride, didecyl dimethyl ammonium chloride, dioctyl dimethyl ammonium chloride, and other known quats.

Surfactants

A surfactant or surfactant system can comprise nonionic and/or anionic and/or cationic and/or ampholytic and/or zwitterionic and/or semi-polar nonionic surfactants. The surfactant may be present at a level of from 0.01% to 25% by weight, such as from 0.1% to 5%, 0.5% to 20%, etc., or otherwise at an effective concentration to enable the solution comprising the surfactant to achieve the intended purpose of the surfactant, which may be, for example, enhancing penetration of the solution into a woven or nonwoven fabric or assisting in removing foodstuffs or other contaminants from a fabric. The surfactant can be formulated to be compatible with enzyme components. Thus, surfactants generally should not degrade the enzyme or cause the enzyme to be unstable.

Surfactants may be bio-based such as GlucoPure® Sugar Surfactants of Clariant, Spectrapon of Spectrum Chemical (Boca Raton, FL), Glucopon alkyl polyglycoside surfactants from BASF (Ludwigshafen, Germany), Sucranov SF from Jarchem (Newark, NJ) comprising a blend of Sodium cocoamph-oacetate, glycerin, lauryl glucoside, sodium cocoyl glutamate, and sodium lauroyl lactylate, or other systems comprising such components as glycosides of fatty acids and alcohols, polyether glycosidic ionophores and macrocyclic glycosides, carotenoid glycosides and isoprenoid glycolipids, biologically active glycosides of aromatic metabolites, lipopeptides, biologically active marine and terrestrial alkaloid glycosides, fatty acid amide glycosides and their analogs and derivatives, surfactants produced by bacteria such as actinobacteria of the order Actinomycetales, those marketed by Avanti Polar Lipids (Alabaster, Alabama) such as Avandecrys® and Avandesol®, etc.

Biosurfactants may also include fungal extracts such as sophorolipids, a class of glycolipid surfactants produced by yeast. Synergy between sophorolipid biosurfactant and sodium dodecyl sulfate (SDS) has been shown to cause the catastrophic disruption of *Pseudomonas aeruginosa* PAO1 biofilms in microfluidic channels. See B. V. G. Nguyen, T. Nagakubo, M. Toyofuku, N. Nomura, and Andrew S. Utada, "Synergy between Sophorolipid Biosurfactant and SDS Increases the Efficiency of *P. aeruginosa* Biofilm Disruption," *Langmuir,* 36/23 (Jun. 1, 2020): 6411-6420; https://doi.org/10.1021/acs.langmuir.0c00643. While the sophorolipids do not directly attack the bacteria, they appear to weaken the EPS biofilm matrix, leading to surface-detachment and breakup of the biofilm. Without wishing to be bound by theory, it is believed that this synergy between surfactants in undermining a biofilm may be similar in some ways to the synergy we have observed between NAC or other ingredients with surfactants and enzymes in prespotter mixes described herein, resulting in an opening up, softening, weakening, or partial removal of the biofilm matrix. Other biosurfactants may also be considered such as rhamnolipid.

Polysorbate surfactants may be used such as Polysorbate 20 (often known as Tween 20), a nonionic surfactant formed by the ethoxylation of sorbitan before the addition of lauric acid. Polysorbate 40, 60, 65, 80 or other polysorbate surfactants may be used with other surfactants. Examples of nonionic, anionic, cationic, ampholytic, zwitterionic and semi-polar nonionic surfactants are in U.S. Pat. Nos. 5,707,950 and 5,576,282. Another nonionic class of surfactants is the TEGITOL™ series of surfactants of Dow Chemical (Midland, MI). Other known surfactants include alpha olefin sulfonates (AOS), cocamide MEA (CMEA), cocamidopropyl betatine (CAPB), lauryl alcohol ethoxylates, lauryl amine oxide, sodium coco sulfate, sodium lauryl ether sulfate, sodium lauryl sulfate, etc. Examples include are alkylamidopropyl-dimethylamine oxides such as NEOMINOX®CPG and NEOMINOX®LP of Oxtiteno.

Anionic surfactants include alkyl alkoxylated sulfate surfactants that are water soluble salts or acids of the formula $RO(A)_m SO3M$ wherein R is an unsubstituted $C_{10}$-$C_{24}$ alkyl or hydroxyalkyl group having a $C_{10}$-$C_{24}$ alkyl component, preferably a $C_{12}$-$C_{20}$ alkyl or hydroxyalkyl, more preferably $C_{12}$-$C_{18}$ alkyl or hydroxyalkyl, A is an ethoxy or propoxy unit, m is greater than zero, typically between about 0.5 and about 6, more preferably between about 0.5 and about 3, and M is H or a cation which can be, for example, a metal cation (e.g., sodium, potassium, lithium, calcium, magnesium, etc.), ammonium or substituted-ammonium cation. Alkyl ethoxylated sulfates as well as alkyl propoxylated sulfates are contemplated herein. Another example is BIO-TERGE® AS-40 of Stepan Co. (Northfield, IL).

Cationic surfactants include water-soluble quaternary ammonium compounds and various compounds with ethylene oxide moieties. The surfactant may further comprise a co-surfactant selected from the group of primary or tertiary amines such as amines. Other amines to be considered include 1-octylamine, 1-hexylamine, 1-decylamine, 1-dodecylamine, $C_8$-$C_{10}$oxypropylamine, N coco 1-3diaminopropane, coconutalkyldimethylamine, lauryldimethylamine, lauryl bis(hydroxyethyl)amine, coco bis(hydroxyehtyl)amine, lauryl amine 2 moles propoxylated, octyl amine 2 moles propoxylated, lauryl amidopropyldimethylamine, $C_8$-$C_{10}$ amidopropyldimethylamine and $C_{10}$ amidopropyldimethylamine.

Also to be considered are n-alkyl amines. Such amines for use herein may be selected from 1-hexylamine, 1-octylamine, 1-decylamine and laurylamine. Other primary amines include $C_8$-$C_{10}$ oxypropylamine, octyloxypropylamine, 2-ethylhexyl-oxypropylamine, lauryl amido propylamine and amido propylamine. Other amines, such as tertiary amines and amidoamines, are described in U.S. Pat. No. 6,489,279.

Regimens for Odor Control

The treatments and compositions described herein can be used as part of a regimen for odor control that includes not only applying pre- and post-treatments to laundered clothing, but can also be used in conjunction with personal deodorants, particularly with substantially aluminum-free and zirconium-free deodorants that reduce odor by enhancing the skin microbiome under the arms or on any part of the body where it is applied. Of particular value is use of the compositions described in U.S. Pat. No. 8,992,898, "Antiperspirants and Deodorants," issued Mar. 31, 2015 to Shannon Klingman; U.S. Pat. No. 9,566,223, "Products and methods for reducing malodor from the pudendum," issued Feb. 14, 2017 to Shannon Klingman, and U.S. Pat. No. 9,668,948, "Antiperspirants and Deodorants," issued Jun. 6, 2017 to Shannon Klingman; all of which are hereby incorporated by reference. As described in the aforementioned Klingman patents, applicant has discovered regulating the bacterial flora on the skin can often greatly reduce the production of malodors with long-lasting results. Applicant has discovered that mandelic acid, for example, is successful in decreasing odor production on many parts of the body, including the pudendal region, the underarm area, and other parts of the body. It has also been discovered that caffeine can also have a synergistic effect in deodorant formulations. Related formulations are commercially available under the brand of Lume® Deodorant for Underams and Private Parts (https://lumedeodorant.com), which have helped users overcome once seemingly intractable odor problems without harsh antibiotics or harsh metal compounds. Clinical trials have demonstrated superior, lasting odor control. The enhancements to the skin microbiome with such products can have synergistic benefits as microbes in the clothing are also controlled.

Such a regimen can also include periodic sanitizing of a washing machine to reduce the risk of microbes being transferred to clothing. In one embodiment, the laundry treatments are packaged with a washing machine treatment such as a powder, liquid, or tablet that can be placed in a washing machine and run in a washing cycle not to launder clothing but to attack biofilm and/or microbes in the washing machine. For example, current washing machine cleaners such as AFFRESH® brand cleaning tablets from Whirlpool Corp. (Benton Harbor, MI) and related products on the market could be adapted to more effectively undermine biofilm with the use of the biofilm attack agents described herein such as NAC, panthenol or derivatives thereof, catechins, herbal agents, etc., in addition to the typical ingredients used therein (boric acid or borax, sodium carbonate peroxyhydrate or other peroxides, sodium carbonate or other alkaline salts (sodium bicarbonate, potassium carbonate, sodium hydroxide, and so forth), etc. An effective concentration of quaternary amines and other antimicrobials can also be employed to attack microbes. Surfactants and other agents may also assist. Thus, in one embodiment, a composition for the cleaning of biofilm material in washing machines for clothing and/or dish washers or other washers may comprise: from 1% to 50% of a biofilm attach agent such as NAC, panthenol, and a catechin, such as 3% to 30% NAC and 1% to 25% panthenol; from 1% to 30% of boric acid, a borate salt such as sodium borate, or a combination thereof; from 5% to 20% sodium carbonate; from 2% to 25% sodium carbonate peroxyhydrate; up to 20% of a laundry enzyme or other enzyme described herein such as an enzyme mix in powder form comprising protease, cellulase, mannanase and lipase; and up to 25% of an anionic, cationic, or nonionic surfactant. In one embodiment, all the ingredients are provided in a single integral product that may comprise solid and liquid portions embedded in a water soluble polymeric film similar to that used in TIDE® pods (Procter & Gamble) or CASCADE® dishwasher pods, with the liquid portion comprising an enzyme solution, for example. A two-step process may also be employed comprising first spraying the interior of a washing machine with an enzymatic composition comprising enzymes and surfactants, optionally also comprising bacterial spores and one or more biofilm attack agents and/or antimicrobials, and after allowing the sprayed-on enzymatic mixture to reside for a predetermined time such as 1, 2, 4, or 6 hours, a wash cycle is then started which uses the solid ingredients that may be in the form of a solid tablet, capsule, or powder that is added to the interior, or which may be in liquid form or both. The water soluble film that may encapsulate all or part of the ingredients may comprise polyvinylalcohol (PVA) or a derivative of PVA, and may contain from 5 to 20% water when encasing dry ingredients or from 10% to 60% water when encasing liquids. MonoSol LLC (Merriville, Indiana) is a producer of such water-soluble films. Exemplary patents for such materials include U.S. Pat. No. 7,005,168, "Starch-loaded polyvinyl alcohol copolymer film for packaging non-liquid product and method for making the same," issued Feb. 28, 2006 to A. P. Verrall et al., and U.S. patent Ser. No. 10/443,024, "Water-soluble unit dose articles made from a combination of different films," issued Oct. 15, 2019 to P. F. Souter et al.

Returning to clothing, in general, clothing that once was prone to perma-odor by those who sweat frequently can be maintained in low-odor states through the regimens described herein, including: 1) periodically treating with biofilm attack agents such as NAC solutions in combination with cleaning agents, 2) conventional laundering, 3) regular use of a Lume® Deodorant, a natural deodorant that maintains a health low-pH on the skin for long-lasting enhancement of the skin microbiome, and 4) optional use when needed of a suitable freshener, such as a spray-on product comprising cucurbituril particles in an aqueous solution optionally comprising ethanol.

The step of periodically treating a material with biofilm attack agents can a single-step application process such as spraying, pouring, daubing, wiping on, or applying by dipping or any other method a single mixture onto the material being treated. However, a multi-step application process may be used in some embodiments. This may include use of a product comprising two or more materials in discrete containers or discrete portions of a single container. For example, one material may be in the form of a powder or tablet in a first container such as a plastic pouch, blister pack with a foil seal, a foil sealed packet, plastic or glass bottle or tube, a shaker similar to a salt shaker for shaking powder onto a surface, and so forth. A tablet may be an effervescent table that can be added to a quantity of water or other liquid to rapidly dissolve to form a solution. Sealed packets or pouches may be opened by tearing, popping a blister, peeling a peelable layer, and so forth. Packets. pouches, or pods may also be made with a water soluble film such as the films used in detergent "pods" such as TIDE® Pods or other films such as polyvinyl alcohol films, films made from starch, cellulose, or derivatives thereof, etc., including WATERSOL® film made by Arrow Green Technologies (Liverpool, UK) and SOLUBLON® film from Aicello (Toyohashi, Japan). Thus, a pouch or pod containing NAC and/or other biofilm attack agents could simply be dropped into a container of water such as a spray bottle or other applicator, and upon dissolving, could be applied to a target region of a textile item.

One material may be in liquid form such as a concentrate in a bottle or pouch or flexible container to be mixed with water. The concentrate may be provided in a container large enough to accommodate the requisite amount of added water to turn the concentrate into a normal strength solution, or the concentrate may be poured or squeezed from a small container such as a tearable pouch or small rigid container into a larger container that can hold the additional water needed for dilution, which may be added before or after the concentrate is placed inside the larger container. The larger container may be a spray bottle or other liquid applicator for spraying, daubing, pouring, dipping, wiping, brushing, or otherwise applying the liquid to an item of clothing, a textile product, or other surface to be treated. In one embodiment, a powder is provided that can be mixed with water in a dispensing container such as a spray battle, sponge applicator, roll-on, a foam generating spray applicator, etc.

Separation of two or more components of the treatment may be designed to overcome challenges were the components mixed prior to marketing such as potential instability of a pre-mixed treatment during shipping and prolonged storage at widely variable temperatures, different optimum pH ranges or other conditions required for two or more components of the treatment, potential gradual denaturing of enzymes when dilute, unwanted chemical reactions that might gradually occur between some ingredients over time, excess shipping costs for materials that can be provided in concentrated or dry form, etc. In some embodiments, a first component is at a relatively low pH while a second components is at a relatively high pH. Each of these components may be applied in separate steps. For example, a first component may comprise a formulation that is most effective or most stable at low pH, such as a mixture comprising NAC and/or a flavanol such as EGCG and/or a fruit pectinase or other enzyme having a peak efficacy at a pH below 7, which may further comprise acidifying agents such as citric acid, ascorbic acid, acetic acid, lactic acid, mandelic acid or other alpha-hydroxy carboxylic acids, and other buffering agents such as citrate salts, acetate salts, bicarbonates, etc. The pH of the first composition may be from 1.5 to 7, from 1.9 to 6.9, from 2 to 6.5, from 2 to 6, from 2.5 to 5.5, from 2 to 5, from 2.5 to 4.5, from 2.5 to 4.2, and so forth. A second composition may have a higher pH such as from 7 to 12, from 7.1 to 11.8, from 7.2 to 11, from 7.3 to 10.5, from 8 to 11, from 7.5 to 10.5, and so forth. The difference in pH between the first and second compositions may be at least 0.3, at least 0.5, at least 1.0, or at least 1.5, such as from 0.3 to 8, from 0.3 to 6, from 0.3 to 5, from 0.5 to 7, from 0.5 to 5, from 0.5 to 3, from 0.7 to 9, from 0.7 to 6, or from 0.7 to 3.5.

The first or second composition may be applied first, followed by application of the second application, or visa versa. In some embodiments, they may be applied substantially simultaneously (e.g., via dissolution of the water soluble film of a pod having two or more isolated chambers within), or the user may be directed to wait a period of time between application, such as from as at least 1 minute, 3 minutes, 5 minutes, 10 minutes, 20 minutes, 30 minutes, an hour, 2 hours, 4 hours, 8 hours, 12 hours, or 1 day. A time range may be provided in the user instructions (e.g., in the indicia associated with the product providing directions for use) using any of the aforementioned times as a lower limit, with an upper limit exceeding the lower limit by about 20%, 40%, 50%, 100%, 150%, 200%, 300%, 500%, or 1000% or more, such as time ranges of 1 to 10 minutes, 2 to 30 minutes, 5 to 60 minutes, 1 to 24 hours, 10 minutes to 1 hour, etc. A intermediate action may be recommended between the two applications, such as rinsing the area being treated following the first treatment, changing the pH of the treated region by applying a powder or spray of an agent such as a base or acid such as sodium bicarbonate, vinegar, etc.

DETAILED DESCRIPTION OF THE DRAWINGS

Unless otherwise stated, all percentages (%) are percentages by weight.

Figure 1:
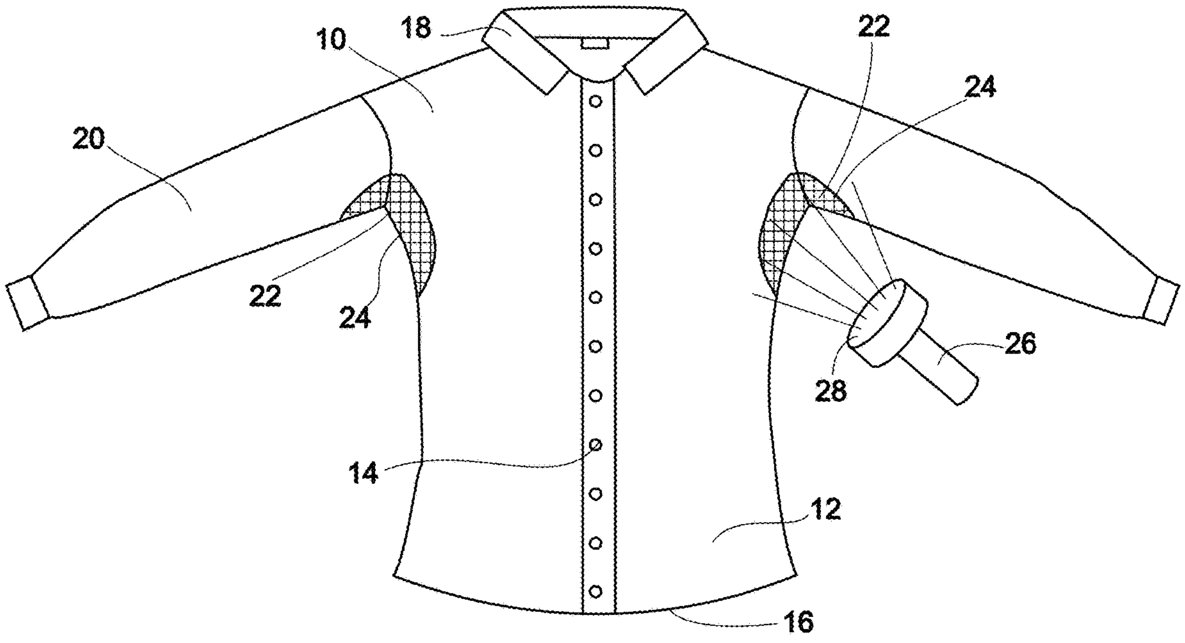
FIG. 1 depicts a shirt with UV-fluorescent biofilm-laden zones in the armpits of a shirt being illuminated with UV light.

FIG. 1 depicts a shirt 10 having a main body 12, sleeves 20, a collar 18, a lower hem 16, buttons 14 for fastening, etc., with underarm regions 22. Depicted generally in the underarms region 22 is a malodorous biofilm region 24, present in both underarm regions 22. A handheld UV lamp 22 with multiple LED UV lights forming the illuminating face 28 of the lamp 26 is shown shining UV light toward an underarm region 22 to assist in visualizing the biofilm region 24. If the shirt has been repeatedly washed in a detergent comprising optical brighteners or has had an optical brightener solution applied to it followed by rinsing, the preferential absorption of the optical brightener(s) onto the biofilm may cause the biofilm region 24 to fluoresce (not shown), even under normal lighting conditions but most clearly visible in dim light or darkness as the UV light is applied. When repeated treatments of compositions described herein are needed, periodically inspecting fluorescence can assist in gauging progress as biofilm size and fluorescence intensity is gradually reduced. In some cases, a single treatment may show dramatic change.

Figure 2:
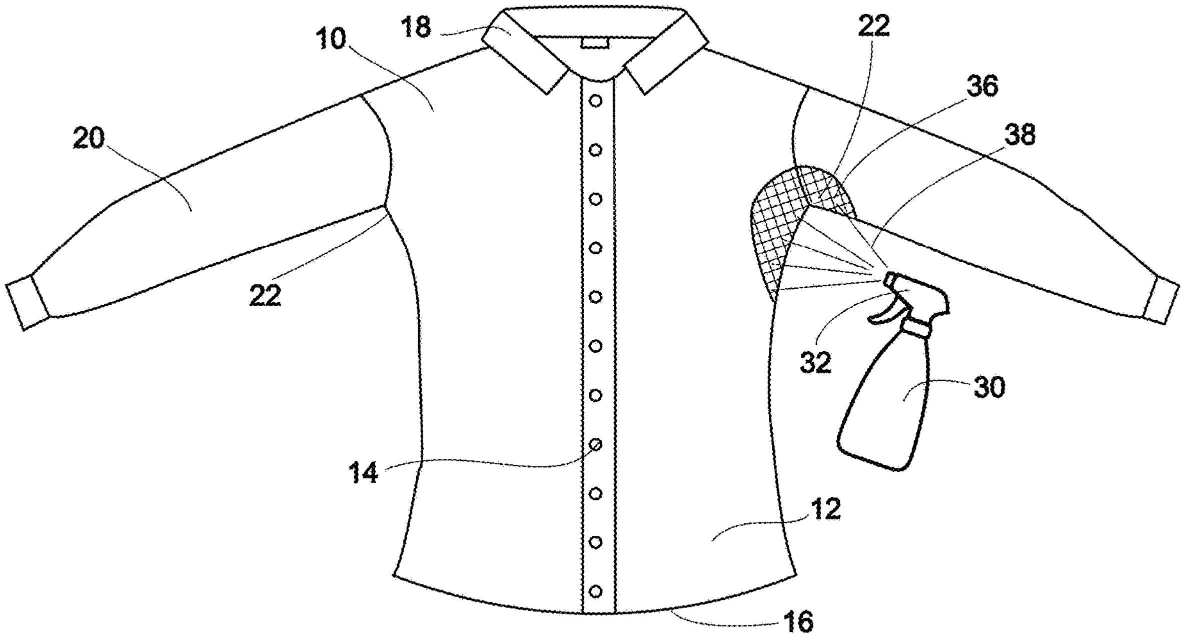
FIG. 2 depicts spraying a cleaning composition on a biofilm region.

FIG. 2 shows the shirt 10 of FIG. 1 but instead of biofilm regions (24 of FIG. 1), a wetted region 36 in an underarm region 22 indicates where the liquid in a spray bottle 30 is being applied as a spray 38 using a trigger spray mechanism 32. The liquid may comprise the enzymatic mix of detergents, enzymes, and optional bacteria or bacterial spores described herein, with or without additional biofilm attack agents such as NAC, panthenol, catechins, and/or biofilm modification agents. After spraying, the user may be instructed to wait about 15 or 30 minutes before washing.

Figure 3:
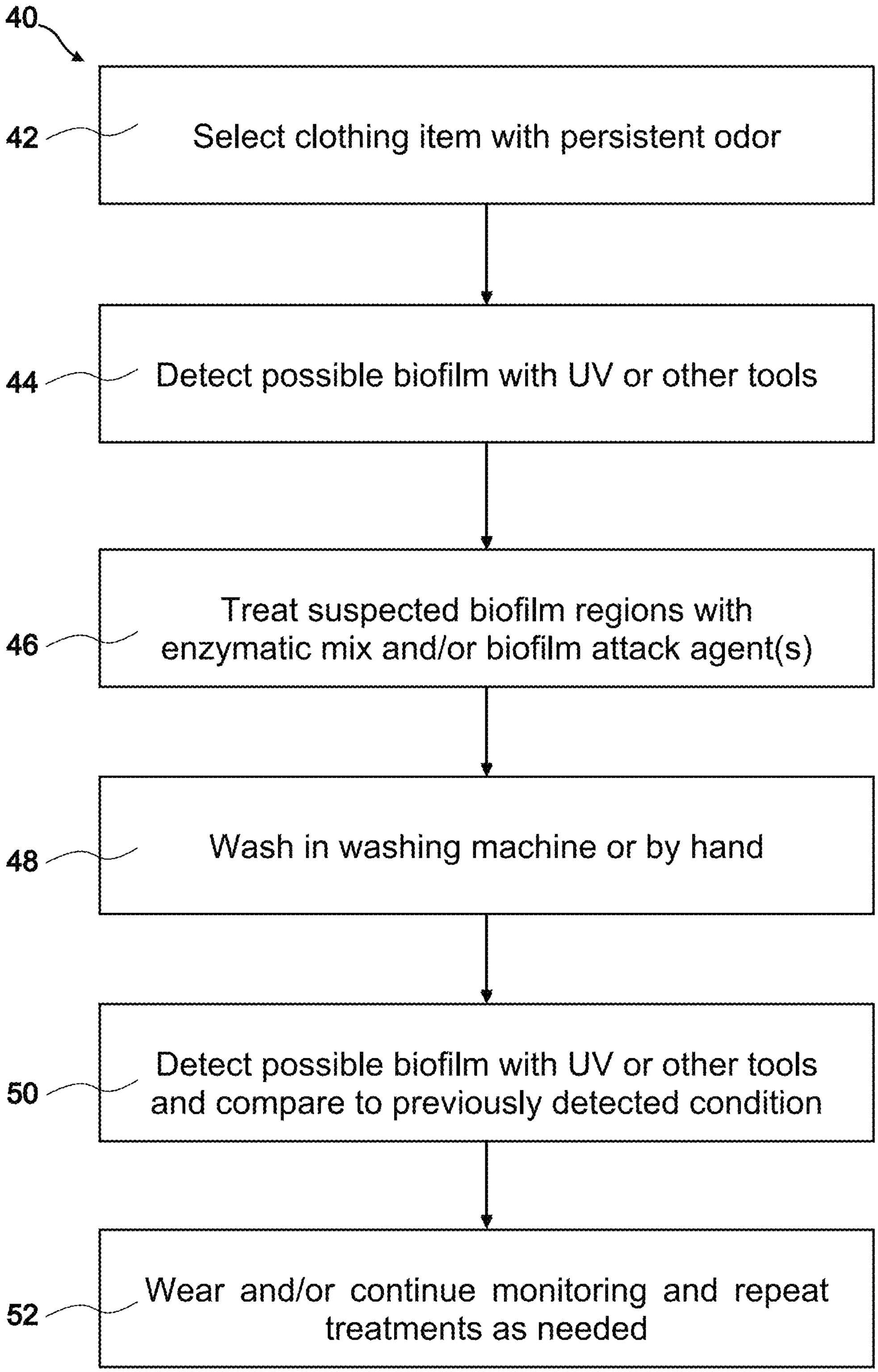
FIG. 3 depicts a flowchart showing a process in which biofilm visualization is used to guide treatment of clothing with persistent odor.

FIG. 3 is a flowchart 40 for one treatment method. In Step 42, a user selects a clothing item suspected of having persistent odor and/or a biofilm. In Step 44, the user may detect evidence of a biofilm using UV visualization or other tools (these may include confocal microscopy, fluorescence microscopy, dye staining with Crustal Violet, Congo Red, or other suitable dyes, inoculation of a sample from the item of clothing, etc.) to guide Step 46, the application of an enzymatic mix and/or biofilm attack agents to the locations likely to have biofilm. Then in Step 48, the item of clothing is washed and afterwards in Step 50, UV or other tools are applied to examine the remaining regions having apparent biofilm for comparison to the previous findings from Step 44, followed by Step 52, wearing or continuing monitoring and treating the item of clothing in additional cycles as needed. The result of the treatments should be not only reduced biofilm presence, but reduced malodor.

Figure 4:
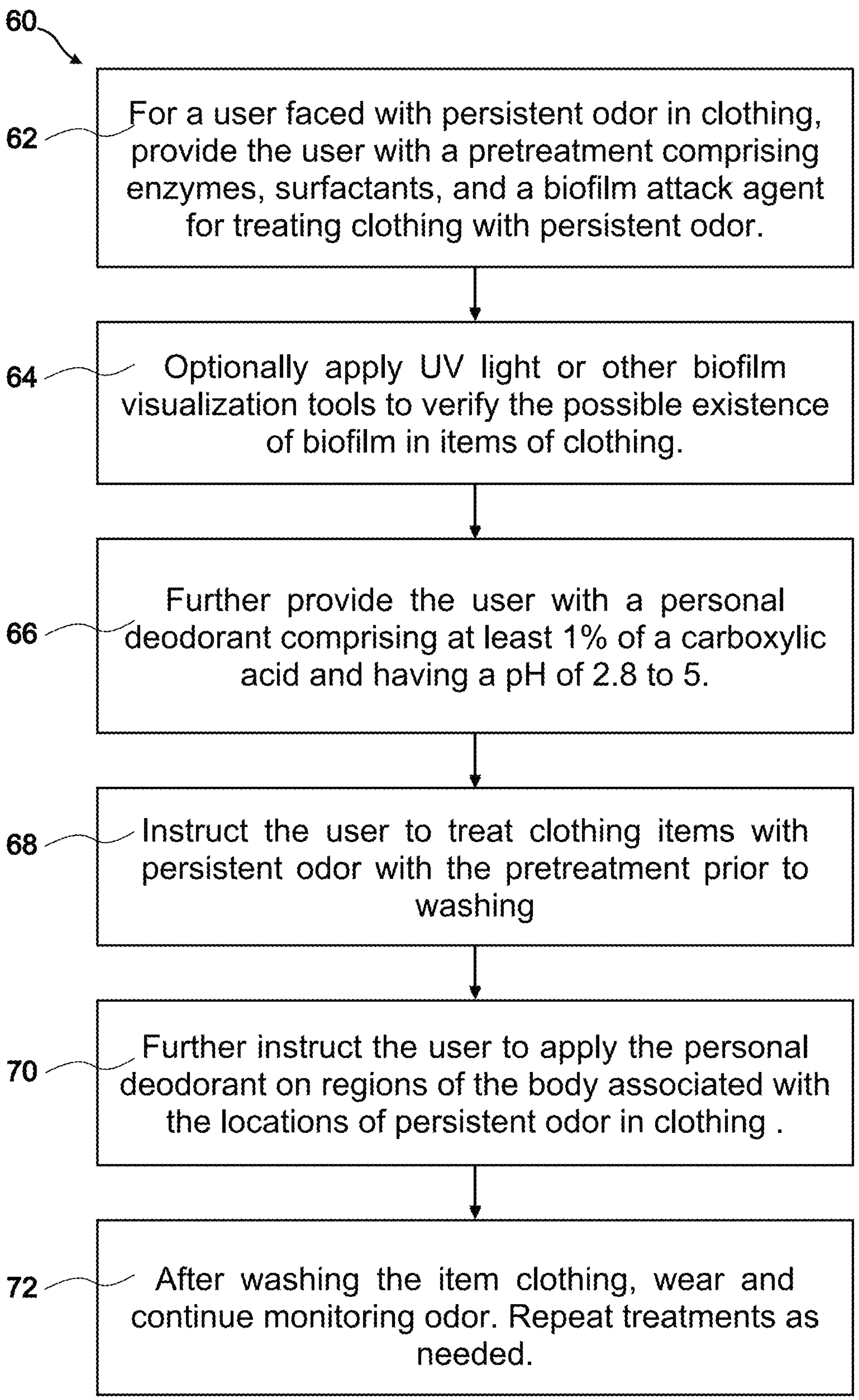
FIG. 4 depicts a flowchart showing steps in a process for treating clothing with persistent odor while also treating odor on the skin of the wearer.

FIG. 4 depicts another flowchart 60 beginning with Step 62, wherein a user faced with persistent odor in clothing is provided with a pretreatment product comprising in one or more parts comprising enzymes, surfactants, and a biofilm attack agent for treating clothing with persistent odor. In Step 64, the user may apply UV light or other biofilm visualization tools to verify the possible existence and location of biofilm in items of clothing. In Step 66, the user may also be further with a personal deodorant comprising at least 1% of a carboxylic acid such as an alpha hydroxy carboxylic acid such as mandelic acid and/or lactic acid, having a pH of 2.8 to 5.5 or from 2.8 to 5. The user in Step 68 us instructed to treat clothing items with persistent odor with the pretreatment product prior to washing, and is further instructed in Step 70 to apply the personal deodorant on regions of the body associated with the locations of persistent odor in clothing. In Step 72, after it is washed, the item of clothing may be worn and further monitored for odor or signs of biofilm, repeating any or all of Steps 62 through 70 as needed.

Figure 5:
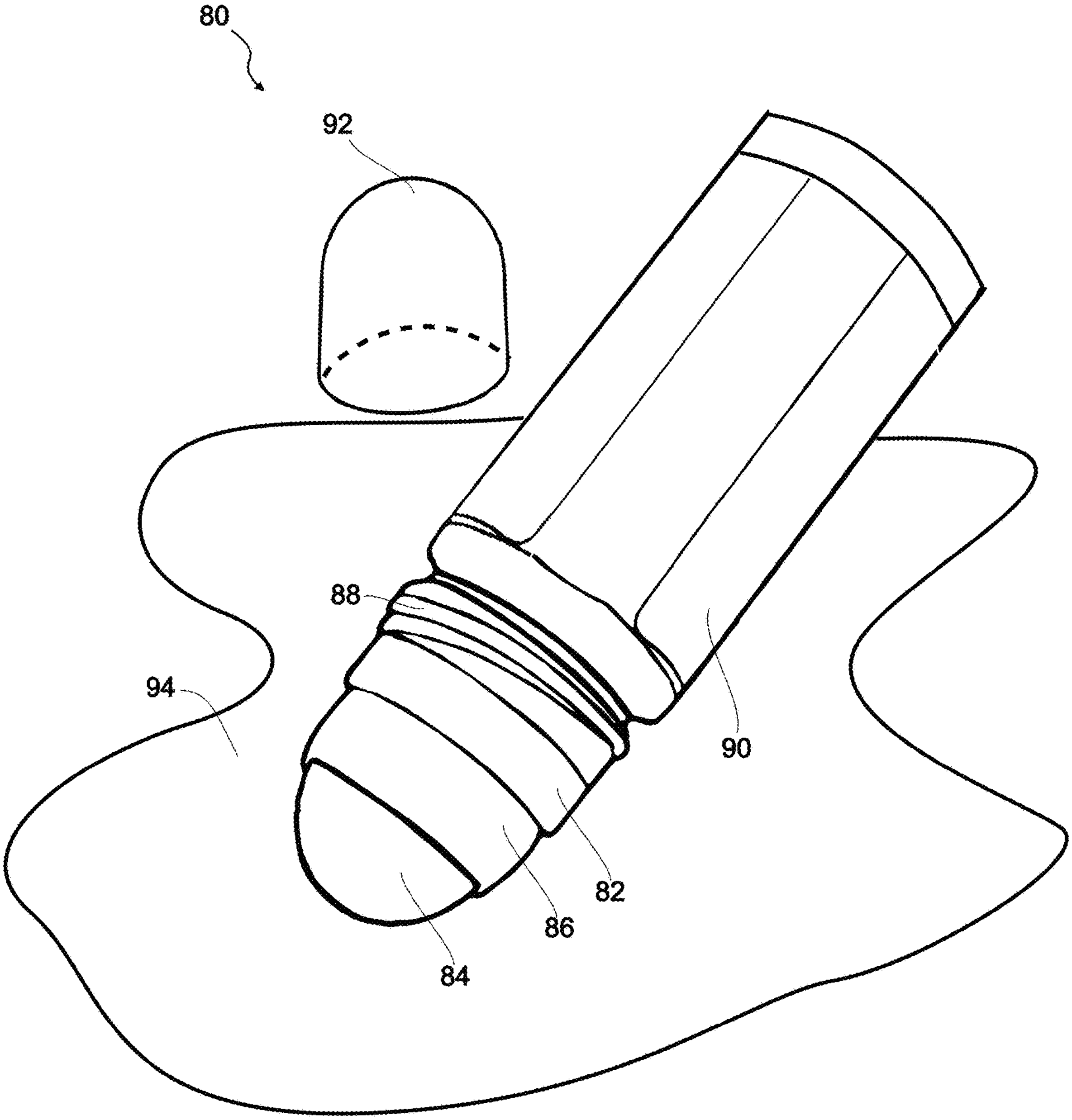
FIG. 5 depicts one form of a roll-on applicator for applying a biofilm attack solution to portions of clothing or other surfaces to reduce malodor.

FIG. 5 depicts a roll-on dispenser 80 comprising a cap 92 and a dispenser body 90 containing either (1) the enzymatic mix described herein, (2) the enzymatic mix coupled with a biofilm attack agent such as at least one of NAC, a flavanol solution, and a lysozyme inside (not shown), (3) a biofilm attack agent without laundering enzymes in a suitable carrier such as a base of water and a glycol, diol, or suitable solvent and surfactants or other agents, or (4) a freshener comprising at least one of an odor neutralizer such as cyclodextrin or cucurbituril compounds, a soya-based quat, an antibacterial agent, optionally with suitable fragrances, or a combination of any of the above, that can be dispensed using a roll-on ball 84, held in place with a roller body 86 which fits into the upper end of the dispenser body 82. The cap 92 attaches to the dispenser body 90 by engaging threads 88 thereon when it is twisted in the proper direction. The roll-on dispenser 80 can be used to apply a solution to clothing prior to laundering or directly onto clothing after laundering or between washes as a freshener. In some cases, it may be applied to clothing as the clothing is being worn. The contents may be refilled by opening a bottom cap (not shown) or unscrewing the roller body 86 or other portion of the dispenser 80.

Figure 6:
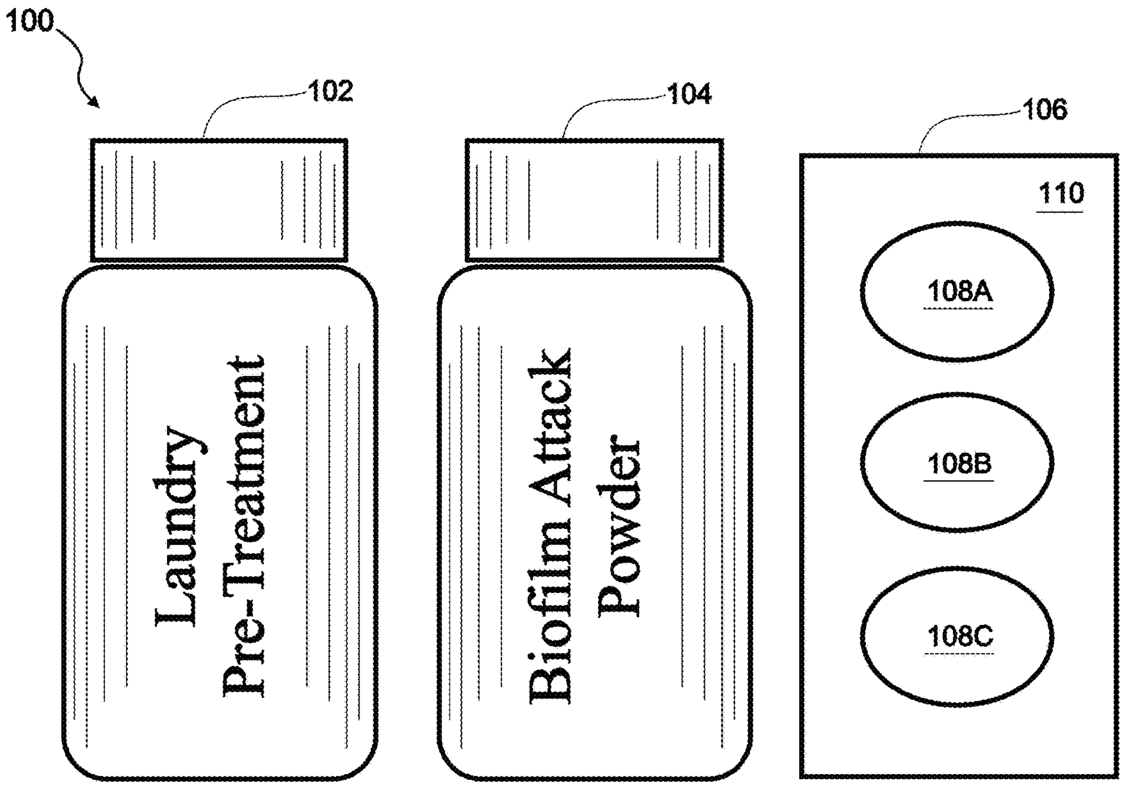
FIG. 6 depicts a packaged product with an assembly of a pre-treatment cleaning composition, a biofilm attack agent, and tablets or capsules to be used in a washing machine to reduce biofilm and odor sources.

FIG. 6 depicts a combined assembly 100 for combination in a single package (not shown) of a first container 102 containing a cleaner composition labeled as a "laundry pretreatment" comprising at least one of NAC, a suspension of bacteria or bacterial spores such as *Bacillus subtillis* spores, two or more laundering enzymes, panthenol, at least 5% surfactant such as from 10% to 70% surfactant, and a second container 104 comprising a biofilm attack agent and/or a biofilm modification agent. The contents of the second container 104 are labeled as a "biofilm attack powder," but in related embodiments may be a liquid, a slurry, a paste, a powder, individual powder capsules, and the like, and may further comprise a desiccant. The assembly 100 also comprises a blister pack 106 or other packaging system (film or paper packets, pouches, or sachets, sprinkle capsules, ordinary capsules, tablets such as effervescent tablets in a tube or foil pack, etc.) for providing solid material such as tablets or units of powder. Three tablets are shown here as 108A, 108B, and 108C with a blister pack backing 110 holding them together. The tablets or units 108A, 108B, 108C can be detached from the blister pack 106 and placed in or emptied into a washing machine to run a sanitizing cycle, in which the antimicrobial ingredients of the tablets 108A, 108B, 108C can be effective in reducing microbes dwelling in the washing machine (not shown). Alternatively, the tablets may be added to a liquid or other mixture such as a spray made from the cleaner composition of the first container 102 or a biofilm attack preparation made from the biofilm attack powder of the second container 104 to enhance their function, or may be added to a washing machine (not shown) for use in a wash cycle in which one or more articles of clothing therein have been pre-treated with the cleaner composition of the first container 102 or the biofilm attack agent of the second container 104.

The assembly 100 may also include a deodorant or antiperspirant product (not shown) designed to enhance the skin microbiome to reduce body odor, particularly one with synergistic benefits with the other components, such as one comprising a mandelic acid composition having at least 0.5% mandelic acid in a cream, stick, roll-on, wipe, spray, or other format, such as LUME® Deodorant.

Figure 7:
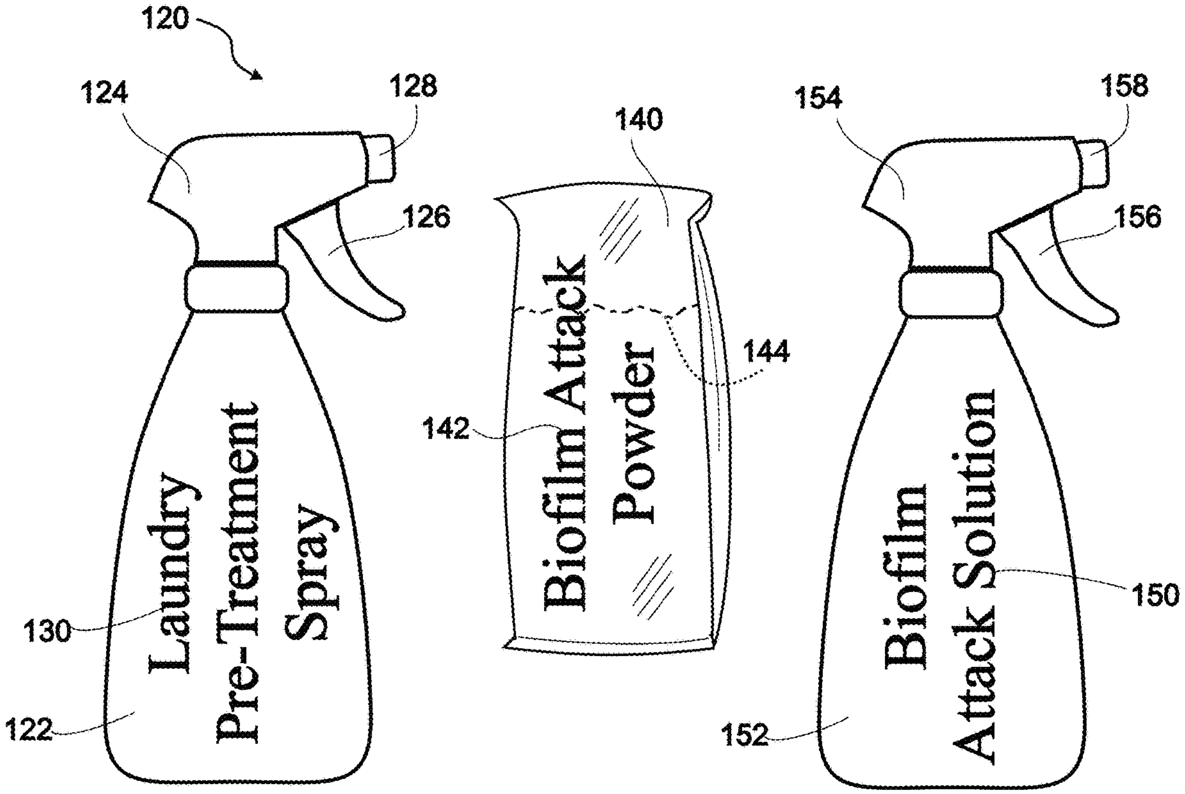
FIG. 7 depicts another assembly comprising a pre-treatment spray and a biofilm attack agent that can be added to water to form a biofilm attack solution, both of which can be used to spray malodorous regions of clothing or suspected biofilms.

FIG. 7 depicts an assembly 120 for a two-part system. A first container 122 labeled as a "laundry pre-treatment spray" holds an enzymatic mix comprising one or more surfactants, optional bacteria or bacterial spores such as *Bacillus subtilis*, and a mixture of three or more classes of enzymes comprising protease and at least two of lipase, amylase, cellulase, mannanase, and pectinase having a total protein content of at least 1% such as from 1% to 15% or from 2% to 10% or from 1% to 8%. The first container 122 is in the form of a trigger spray bottle having a trigger spray mechanism 124 with a trigger 126 operable by one or more fingers and a spray nozzle 128 such as an adjustable nozzle with multiple settings (e.g., jet, spray, on, off) which may have a foaming screen over the nozzle to promote foam formation which in some cases may help reduce the risk of creating minute aerosol droplets of enzymes that might be inhaled. Also shown is a packet 140 labeled "biofilm attack powder" 142 containing a powder 144 that may comprise NAC and/or other biofilm attack agents. The packet 140 may be torn open and emptied into a second container 152 or, when made from a water soluble film or the like, may simply be placed in the second container 152 coupled with water, where it will dissolve and allow the biofilm attack powder to become dissolved and able to be applied via the trigger spray mechanism 154 with its trigger 156 and nozzle 158 in liquid communication with the contents of the second container 152. The biofilm attack powder on a dry basis may comprise at least 10% NAC such as from 10% to 80% NAC or substantially pure NAC only. It may further comprise from 0.1% to 50% panthenol such as from 1% to 35%, 1% to 25%, 1% to 10% or 1% to 5% panthenol or derivatives thereof. It may further comprise agents to adjust pH, ionic strength, viscosity, wetting angle, rheology, aroma, etc., such as metal salts including magnesium hydroxide, magnesium oxide, magnesium sulfate or Epsom salt, magnesium citrate, magnesium acetate, magnesium chloride, and the like, sodium chloride, sodium citrate, sodium bicarbonate, sodium carbonate, etc., potassium chloride, potassium hydroxide, wherein the metal salts may comprise from 0.05% to 20% of the biofilm attack composition. In one embodiment, for example, the composition may comprise from 0.05 to 15% each or from 0.1% to 10% each or from 0.3% to 6% each of one or more magnesium salts and one or more sodium salts. The pH of the biofilm attack solution when diluted according to instructions may be from 2 to 10, such as an acidic formulation with a pH range of from 2.5 to 6.5, from 3 to 5.5, or from 3 to 4.8, or less than 4.5. Other pH ranges contemplated include from 3 to 9, 4 to 9, 5 to 9, 6 to 9 and 7 to 9, or from 3.5 to 8.5 or 4 to 9.

In another embodiment, the biofilm attack composition 144 comprises caffeine, such as from 0.5% to 20%, from 1% to 12%, or from 1% to 5% caffeine. Without wishing to be bound by theory, it is believed that caffeine can have an inhibitory effect on biofilm formation, based on extrapolating studies of caffeine on diverse biofilm situation such as biofilms in dental care and dentures in particular.

For embodiments in which a solid material such as an NAC-containing mixture is combined with water to make a biofilm attack agent, the packaging system may comprise loose powder in a container (not shown) that is scooped or otherwise metered or delivered to be combined with an amount of water in a container or dispenser. Alternatively, the solid particles may be combined in a solid tablet that can be dissolved in water, including an effervescent tablet that may comprise NAC and a carbon-dioxide releasing material such as sodium carbonate. In yet another embodiment, the solid particles may be provided in capsules with water-soluble shells that can be dropped into water to form a biofilm attack solution. In a related embodiment, the capsule shells can be discarded rather than dissolved. In particular, "sprinkle capsules" (not shown) may be used in which relatively large capsules can be readily gripped and twisted to cause them to separate and release their contents. Exemplary sprinkle capsules are described in U.S. patent Ser. No. 10/610,490, "Separable capsule for sprinkling applications," issued Apr. 7, 2020 to S. Stegemann et al. Such capsules may be made of insoluble material such as polypropylene (PP), PET, high density poly ethylene material, metal, aluminum, and glass.

Figure 8:
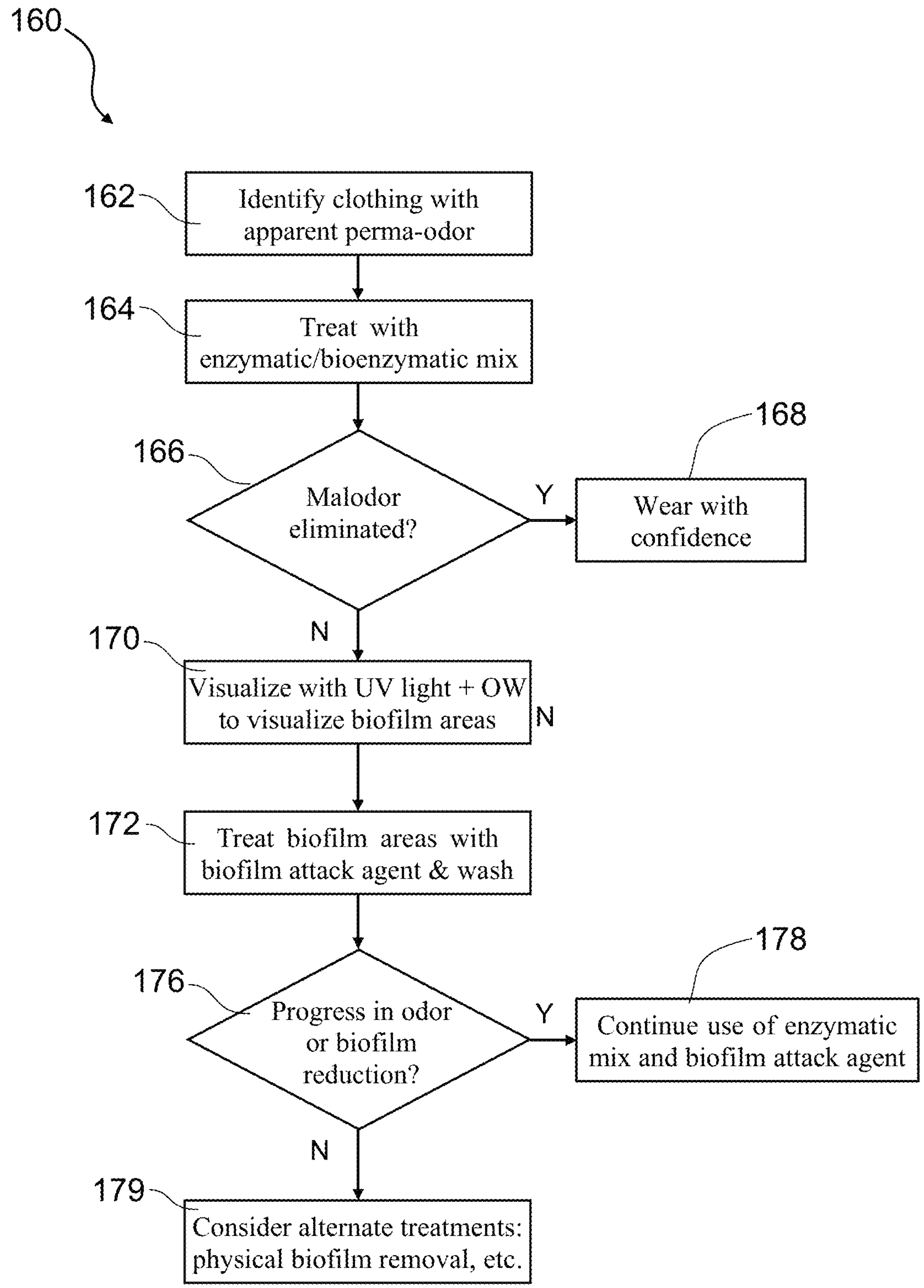
FIG. 8 depicts a flowchart showing steps in a process for treating clothing with persistent odor.

FIG. 8 depicts a flowchart 160 showing steps in a process for treating clothing with persistent odor. In Step 162, a user identifies clothing with apparent perma-odor and then in Step 164, treats the item of clothing with an enzymatic or bioenzymatic cleaning composition. If malodor is eliminated 166, the article can be worn with confidence 168, but if problems remain, in Step 170 the user may visualize potential biofilm areas using UV light or other tools to view fluorescence from absorbed optical whiteners/brighteners ("OW"), and then in Step 172 treat the biofilm candidate areas with a biofilm attack agent and optionally also with an enzymatic cleaning composition. If there is progress in odor or biofilm reduction 176 (biofilm reduction being known by again visualizing the bofilm area, not shown, for comparison to the previous visualization), then the use of the enzymatic cleaning composition and biofilm attack agent may be continued as needed 178, but if progress is lacking, there may be a need to consider alternate treatments 179 such as physical biofilm removal using a scrub brush, tooth brush, or other form of friction, or a water jet, ultrasonic cleaner, very low of high pH treatments, more intense chemical agents such as antimicrobial agents, high temperature, etc.

Figure 9:
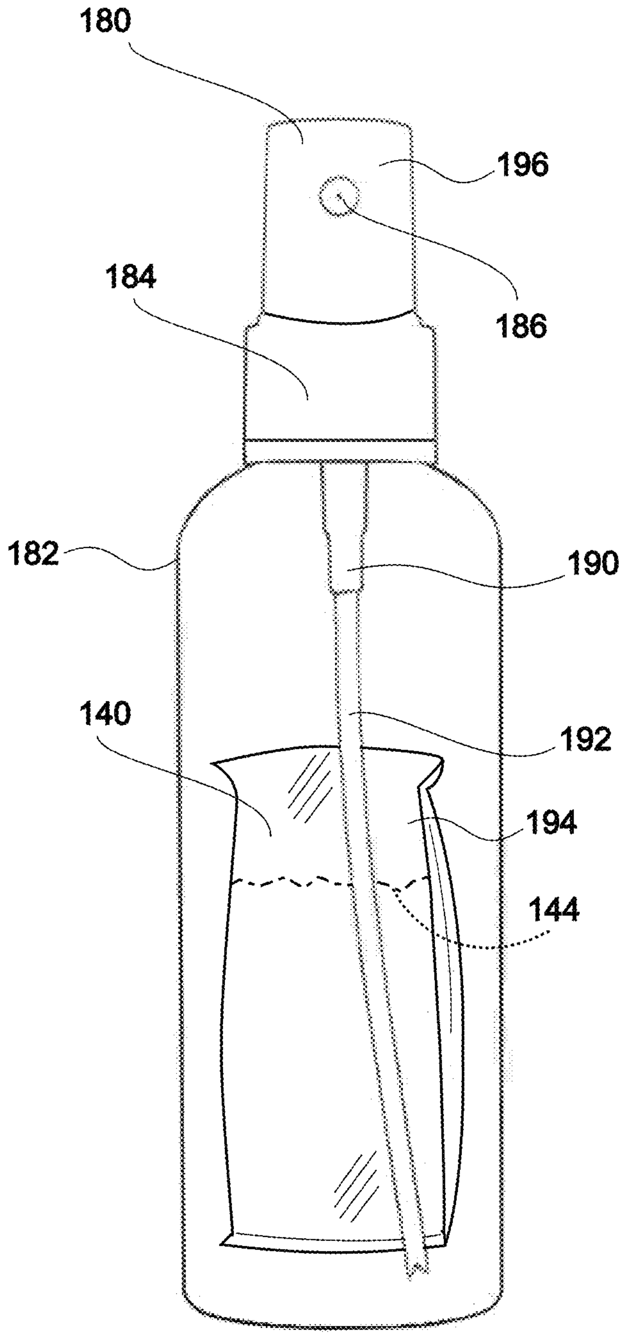
FIG. 9 depicts a spray bottle containing a biofilm attack agent inside.

FIG. 9 depicts a spray bottle 180 containing a biofilm attack agent shown as a powder 144 inside a packet 140. The packet 140 is made from a water soluble film 194 such that when water is added to the spray bottle 180, the film 194 dissolves allowing the internal powder 144 to also dissolve and turn the water into a biofilm attack solution (not shown). The bottle 180 comprises a spray bottle body 182, a cap 184 having a nozzle 186 and a spray button 196, from which descends a dip tube connector 190 joined to a dip tube 192 descending into the interior of the spray bottle body 182, providing fluid communication between any fluid (not shown) inside the spray bottle body 182 with the spray nozzle 186, wherein depressing the spray button 196 causes pumping of the liquid through the dip tube 192 to the nozzle 186.

The remaining figures are described below in the Examples section.

FURTHER DETAILED DESCRIPTION

Foam Systems

Foam applicators, which can be used to deliver fabric treatment compositions described herein, can comprise pressurized containers such as spray cans or foam delivery containers similar to popular foam-based shaving cream dispensers and non-pressurized foam delivery systems such as foam generating pumps. Examples of foam generating pumps are described in U.S. Pat. No. 8,267,284, issued Sep. 18, 2012 to E. W. Ray; U.S. Pat. No. 9,718,069, "Foam Pump," issued Aug. 1, 2017 to D. M. R. Creaghan et al.; U.S. Pat. No. 8,991,657, "Foam soap dispenser with stationary dispensing tube," issued Mar. 31, 2015 to Ciavarella et al.; US Pat. Publication No. 20140203047, "Pumps With Container Vents, issued Jul. 24, 2014 to McNulty; US Patent Publication No. 20140054323, "Horizontal Pumps, Refill Units and Foam Dispensers with Integral Air Compressors," issued Feb. 27, 2014 to McNulty; U.S. Pat. No. 8,591,207, "Pump with side inlet valve for improved functioning in an inverted container," issued Nov. 26, 2013 to Ciavarella; US Patent Publication No. 20130200098, "Foaming Liquid Dispenser," issued Aug. 8, 2013 to Li; U.S. Pat. No. 8,579,159, "Squeeze action foam pump," issued Jul. 23, 2009 to Nick E. Ciavarella; U.S. Pat. No. 8,336,737, "Foam Dispenser," issued Dec. 25, 2012 to E. I. M. van der Heijden; U.S. Pat. No. 6,082,586, "Liquid dispenser for dispensing foam," issued Jul. 4, 2007 to Banks; U.S. Pat. No. 5,445,288, "Liquid dispenser for dispensing foam," issued Aug. 28, 1995 to Banks; U.S. Pat. No. 5,238,155, "Foam generating device," issued Aug. 24, 1993 to Blake.

Synergy with Deodorant Products

The objective of reducing persistent malodor in clothing can be synergistic with efforts to alter the skin microbiome in regions where malodor occurs, such as the armpits. Synergy can occur when the compositions described herein are applied periodically to the armpits or other regions having malodor, while also taking steps to reduce the growth of microbial malodor sources in the associated regions on the body such as the armpits or groin. Synergy can occur, for example, when using a low pH deodorant such as LUME® brand deodorant or LUME® deodorant wipes that contain mandelic acid and have a relatively low pH, such as from 2.8 to 5 or from 3.2 to 4.8. Regular use of these mandelic acid-containing deodorant products can have a long-lasting effect on body odor due to the healthy change promoted in the skin microbiome. As the microbiome changes with reduced malodorous bacteria, the clothing being used can also experience reduced addition of malodorous bacteria in use that can strengthen or maintain malodor sources from clothing, particularly when a biofilm exists or is in the process of being established. Meanwhile, reducing or eliminating the biofilm using the bioenzymatic products described herein can help support the objective of reduced body odor on the skin for those using LUME® deodorants. Thus, in some embodiments, synergy in odor reduction in clothing and on the body is achieved by providing a user with both a deodorant such as a low pH deodorant comprising mandelic acid and with the bioenzymatic compositions for treating items of clothing described herein.

In a related embodiment, a user of the bioenzymatic compositions for cleaning items of clothing described herein is also provided with a deodorant such as a cream, stick, spray, or deodorant wipe comprising at least 0.1%, 0.5%, 1%, or 2% of mandelic acid or another carboxylic acid such as an alpha hydroxy acid (in a wipe, this weight percentage is relative to the mass of the applied wetting solution or ointment and not the mass of the wipe itself) and having a pH from 2.8 to 5.5, more specifically from 2.8 to 5 or from 2.8 to 4.5, wherein the user is instructed to use the deodorant regularly such as at least once a week, twice a week, three times a week, daily or at least 3 times within a 10-day period in the underarms or the region on the body associated with malodor detected in clothing and/or a region associated with apparent biofilm, while also being instructed to use the enzymatic compositions described herein to treat a malodorous region of an item of clothing, followed or preceded at least once, alternatively two, three, four, or five times or more, by wearing the item of clothing while also using the deodorant applied to the portion of the body associated with a region of malodor in the item of clothing.

In one embodiment, the deodorant, particularly the wetting solution of deodorant wipes, may comprise at least 0.5% by weight of probiotic materials such as *saccharomyces* ferment filtrate, *lactobacillus* ferment, *lactobacillus*, or other bacterial ferments or bacteria or bacterial spores, and may have from 1% to 25% probiotic materials, or from 2% to 15%, 1% to 10%, etc. Without wishing to be bound by theory, it is believed that such materials can help improve the skin microbiome and reduce the presence of malodorous bacteria by encouraging healthy bacteria to proliferate. In one embodiment, both an alpha hydroxy acid such as mandelic acid is presence at a concentration of at least 0.3% and one or more of the aforementioned probiotic materials is present at a concentration of at least 0.5%. Also without wishing to be bound by theory, it is believed that such a combination can further enhance the skin microbiome and provide an environment that further supports the objective of overcoming biofilm in clothing by reducing the ability of malodorous bacteria to move from the skin to establish a biofilm in clothing, and by hindering the ability of an existing biofilm in clothing to spread effectively due to the presence of the acidic materials and/or the presence of the probiotic materials that hinder growth of undesirable bacteria.

Sprays

Aqueous solutions described herein can be applied with a variety of spray, including aerosol sprays driven by a propellant such as butane; pump sprays driven by manual spray pumps with levers, squeezable handles, push buttons, or other systems. Micron-sized spray droplets or larger may be useful in reducing the production of aerosols that can increase human inhalation of the spray. Coarse sprays can be useful in this regard. Liquid dispensers can also be used to deliver small, controlled quantities of liquid without creating aerosol droplets. Examples include known liquid pumps, airless pumps, soap dispensers, etc., including those described in U.S. Pat. No. 9,248,462, "Airless pump system," issued February 2.

Wipes

Wipes, whether dry, wet, or in other states, can be made from any suitable substrate that provides a flexible surface useful in applying compositions described herein. The wipe may be a porous, flexible wet wipe capable of retaining and applying a liquid solution, or may be flexible dry wipe that can apply a viscous formulation form its surface onto the pudendum. Suitable materials may include nonwoven or woven fabrics, tissue paper, composite or multilayered materials, etc, The wipe may be made from a conventional towelette or wet wipe material or other materials that have been proposed for wipes such as a nonwoven fabric including materials such as spunbond webs, meltblown webs, combinations of polymeric and natural fibers such as spunlace or coform webs, needlepunched webs, hydroentangled or spunlace materials, bonded carded webs, electrospun layers, composites or multilayer fabrics, woven textiles, apertured films, and the like. Polymeric materials used in the production of nonwoven webs, woven webs, and films may include polypropylene, polyethylene, PET, nylons, and the like. Foam pads or layers may be used, including open cell and closed cell foams, such as polyurethane foams, regenerated cellulose foams, and the like.

Examples of materials that may be used in producing wipes as described herein include those disclosed in any of the following, alone or in combination: U.S. Pat. No. 5,935,880, "Dispersible Nonwoven Fabric and Method of Making Same," issued Aug. 10, 1999 to Wang et al.; U.S. Pat. No. 6,315,864, "Cloth-Like Base Sheet and Method for Making the Same," issued Nov. 13, 2001 to Anderson et al.; U.S. Pat. No. 6,416,623, "Method of Producing an Extensible Paper Having a Three-Dimensional Pattern and a Paper Produced by the Method," issued Jul. 9, 2002 to Hollmark; and U.S. Pat. No. 6,737,068, "Wipe Formulation," May 19, 2004.

Wipes for use with the formulations described herein may also be made, used, or dispensed according to any of the following: U.S. Pat. No. 5,292,581, "Wet Wipe," issued Mar. 8, 1994 to Viazmensky et al.; and U.S. Pat. No. 6,537,631, "Roll of Wet Wipes," issued Mar. 25, 2003 to Rivera et al. Wipes may be provided from or in association with dispensers that provide a quantity of a formulation as described herein. Such a dispenser can include a combination of wipe dispenser and spray applicator for dispensing active ingredients, as described, for example, in US 20090057331, "Wipes Dispenser," published Mar. 5, 2009 by Fryan et al., herein incorporated by reference. Wipes be dispensed from containers such as plastic or metal tubs or cylinders, from flexible pouches such as resealable pouches, form cardboard or other cellulosic containers, and from other known devices for dispensing wipes, including U.S. Pat. No. 6,601,737, "Baby Wipe/Rash Cream Dispenser," issued Aug. 5, 2003 to Gartenberg.

Other Dispensers

A variety of dispenser forms may be used, such as roller ball (roll-on) type bottles, such as those described in U.S. patent Ser. No. 10/206,479, "Application head for a product, in particular skin care, comprising an applicator ball held by a magnet," issued to G. Gieux et al., Feb. 19, 2019. Bottles with sponge or perforated tops may be used, such as tops with silicone, rubber, neoprene, or various thermoplastic elastomers or thermoset elastomers, including styrenic block copolymers, thermoplastic polyolefinelastomers, thermoplastic vulcanizates, thermoplastic polyurethanes, thermoplastic copolyesters, thermoplastic polyamides, and various classified thermoplastic elastomers. These may be used to provide scrubbing action during or after application of a bioenzymatic liquid or slurry composition. Thus, a molded scrubbing unit comprising elastomeric or non-elastomeric elevated nubs, bristles, or other elements may be used, and the scrubbing unit may have one or more holes to allow delivery of the cleaning composition during scrubbing or application of friction. An ultraviolet LED or other UV light may also be combined with the applicator, integral with or separate from the applicator, to provide UV light (e.g., with a wavelength from 340 to 410 nm) to assist in visualizing the location of biofilm that may be fluorescent due to absorbing optical brighteners from typical laundry detergents. Examples of related scrubbing units include the elastomeric nubs on top of the OxiClean™ MaxForce™ Gel Stick marketed by Church & Dwight Co. (Ewing, New Jersey) and the Cosmogen Maxi Squeeze'n Scrub body and face scrubbing product with elastomeric bristles manufactured by Cosmogen (Paris, France), believed to be related to embodiments shown in US Patent Application No. 20100028070, "APPLICATOR FOR A FLUID PRODUCT SUCH AS A COSMETIC PRODUCT," published by G. Gieux et al., Feb. 4, 2010. Containers with applicator heads for dispensing the contents may also be provided with on/off features to seal or open the container, including the use of twist caps or other means to open or close a dispenser, including various forms described in U.S. Pat. No. 8,573,875, "Applicator for a fluid product such as a cosmetic product," issued Nov. 5, 2013 to G. Gieux et al.

Other Product Forms

A variety of other product forms can be considered. The compositions described herein can be applied in the form of a manually pumped spray or aerosol spray, a foam, a wipe, a wetted sponge such as a standalone sponge or a sponge applicator attached to a reservoir of material, a cream, a paste, a solid that can be wiped or rubbed onto clothing such as a laundry soap, a tablet such as a tablet for use in a laundry machine used in addition to laundry detergent, as a component in a laundry detergent or stain spray or fabric softener or bleach product, etc.

Single-use sponges in individual wraps can be used, for example, with instructions and indicia similar to those for wipe products. The sponge may be polyurethane, regenerated cellulose, and other known sponge materials. The compositions described herein may be impregnated in the sponge or applied shortly prior to use. The sponges may be attached to a wand or gripper element such as a plastic handle. A pre-wetted sponge may be wrapped in foil or plastic prior to use.

Additional odor-blocking compounds may be considered such as those described in United States Patent Application 20150182436, "Deodorant Compositions Having Antibacterial and Odor Blocking Properties and Methods For Using the Same," issued to C. Schmit, Jul. 2, 2015. Such compounds include agrumex (2-tert-butyl cyclohexyl acetate; 2-(1,1-dimethylethyl)-cyclohexanyl acetate); C14 aldehyde (1,4undecanolide; gamma-undecalactone); ambrettolide; anisyl aldehyde; CALONER1951 (7-methyl-3,4-dihydro-2H-1,5-benzodioxepin-3-one); 1-carvone; cedryl methyl ether; citronellol 950; citrylal; CLARITONE® (2,4,4,7-tetramethyl-oct-6-en-3-one); α-damascone (1-(2,6,6-trimethyl-2-cyclohexen-1-yl)-2-buten-1-one); Δ-damascone; DYNASCONE® 10 (145,5-dimethyl-1-cyclohexen-1-yl)4-penten-1-one); ethyl vanillin; eugenol; evernyl; FARENAL® (2,6,10-trimethyl-9-undecenal); floropal (2,4,6-trimethyl-4-phenyl-1,3-dioxane); GLOBALIDE® (oxacyclohexadecen-2-one); cyclohexadecenone; methyl dihydro jasmonate; patchouli oil; phenylethyl alcohol; E-isomer of 3-methyl-2-pentenoic acid ethyl ester; E-isomer of 3-methyl-2-octenoic acid ethyl ester; Z-isomer of 3-methyl-2-pentenoic acid ethyl ester; rosaphen (2-methyl-5-phenylpentan-1-ol; tetrahydro-4-methyl-2-(2-methyl-1-propenyl)-2H-pyran); rose oxide hc (4-methyl-2-(2-methyl-1-propenyl)tetrahydro-2H-pyran); sandel (santalum album); sandolene (2-ethyl-4-(2,2,3-trimethyl-3-cyclopenten-1-yl)-2-buten-1-01); tetrahydro linalool (3,7-Dimethyloctan-3-ol); timbranol (Isomethyltetrahydroionol); tonalide (7-Acetyl-1,1,3,4,4,6-hexamethyltetralin); and vertocitral (2,4-dimethyl-3-cyclohexene-1-carboxaldehyde), and the like. Also present may be useful bacteria in, for example, pro-biotic formulations. In some embodiments, microencapsulated beneficial microorganisms may be present, including lactic-acid producing microbes.

For formulations comprising gels, water is usually employed as the dispersion medium for the gel to optimize biocompatibility. Other possible dispersion mediums include non-aqueous solvents, including glycols, such as propylene glycol, butylene glycol, triethylene glycol, hexylene glycol, polyethylene glycols, ethoxydiglycol, and dipropyleneglycol; alcohols, such as ethanol, n-propanol, and isopropanol; triglycerides; ethyl acetate; acetone; triacetin; and combinations thereof. Typically, the medium (e.g., water) constitutes greater than about 75 wt/vol %.

Any suitable gelling agent, including gellan and other polymers and polysaccharides, may be used, including those described in U.S. Pat. No. 7,619,008, "Xylitol for Treatment of Vaginal Infections," issued Nov. 17, 2009 to Yang et al.

Minerals and inorganic compounds may also be present such as magnesium oxide, Ozokerite, diatomaceous earth, silicon oxide, amorphous sodium silicate (SiO2:Na2O), crystalline layered silicate of formula δ-Na2Si2O5, zeolites such as Zeolite A (hydrated sodium aluminosilicate), sodium carbonate, sodium bicarbonate, and sodium tripolyphosphate, Thus, in one embodiment, a ready-to-use pretreatment or post-treatment composition is contemplated comprising from 0.01% to 3% of at least one of NAC, panthenol, and catechins including EGCG and other catechins; 0.01% to 2% enzymes selected from protease, lipase, cellulose, amylase, laccase and mannnanase; 0.01% to 2% of a mineral comprising a metal oxide (e.g., MgO); 0.01% to 2% a chelant such as EDTA, about 0.1-0.5% essential oil, a surfactant and water.

Chelants

Complexing or sequestering agents may be employed such as sodium carbonate and sodium bicarbonate, and/or any known chelant or combinations thereof such as Dissolvine® GL-47-S(tetrasodium glutamate diacetate, also known as GLDA), a biodegradable chelate based upon L-glutamic acid, manufactured by Akzo Nobel. Other chelants to consider include tetrasodium dicarboxymethyl glutamate, EDTA, trisodium nitrilotriacetate, ethylenediamine, glutamic acid, histidine, organic diacids such as malates, polypeptides such as phytochelatin, citrates, silicates, polymers of acrylic and maleic acid, PBTC (2-phosphonobutane-1,2,4-tricarboxylic acid), VERSENOL™ (Dow Chemical, Midland, MI), etc. Iron and/or manganese chelating agents may also be considered. Such agents can be selected from the group consisting of amino carboxylates, amino phosphonates, polyfunctionally-substituted aromatic chelating agents and mixtures therein. Other chelating agents are disclosed in U.S. Pat. No. 5,728,671. If utilized, these chelating agents may comprise from about 0.01% to about 5% by weight of the compositions herein.

Rheology Modifying Ingredients

Many known rheology modifiers can be considered to obtain desired properties, particularly the bioadhesive properties of some embodiments. Gums such as guar gum or xanthan gum or other industrial gums, polyvinyl alcohols, polyacrylates, cellulose-derived polymers such as carboxymethylcellise or hydroxyalkylcellulose polymers, Laponite, clays, carboxomer polymers, starch derivatives including octenyl succinic anhydride (OSA) modified starch and numerous other compounds can be considered. Silicone elastomers can be considered, including those described in U.S. Ser. No. 09/613,266 (P&G),

Skin Benefit Agents

Non-limiting examples of skin benefit agents that may be considered for use herein are described in The CTFA Cosmetic Ingredient Handbook, 2nd Edition (1992), which includes a wide variety of ingredients commonly used in the skin care industry, and which may be suitable for use in various embodiments of the present invention. Non-limiting examples of skin benefit agents include absorbents, aesthetic components such as fragrances, natural extractives such as witch hazel or aloe vera, colorings/colorants, essential oils, skin sensates, astringents, etc. (e.g., clove oil, menthol, camphor, eucalyptus oil, eugenol, menthyl lactate, witch hazel distillate), anti-caking agents, antimicrobial agents (e.g., iodopropyl butylcarbamate), antioxidants, colorants, cosmetic astringents, cosmetic biocides, drug astringents, pH adjusters, skin-conditioning and/or moisturizing agents, skin soothing and/or healing agents (e.g., panthenol and derivatives such as ethyl panthenol, pantothenic acid and its derivatives, allantoin, bisabolol, and dipotassium glycyrrhizinate), retinoids, (e.g. retinol palmitate), tocopheryl nicotinate or Vit. E, skin treating agents, vitamins and derivatives thereof. It is to be understood that the actives useful herein can in some instances operate via more than one mode of action.

Foam Embodiments

In some embodiments, the active ingredients are delivered while in a foam state, such as stable foam, for example, that is produced with or without a propellant. In some versions, a foam is dispensed from a dispenser such as a propellant-free dispenser with pumping action to create the foam from a composition in a foamable carrier, and then applied to a textile material. Propellant-driving foam generators may also be used to deliver the composition in the form of a foam. Examples of foam-based systems are described in U.S. Pat. No. 6,818,204, "Stable Foam for Use in Disposable Wipe," issued to Lapidus on Nov. 16, 2004. At least one foam stabilizing agent may also be present in certain foamable embodiments. Suitable foam stabilizing agents may include, without limitation, natural or synthetic gums such as xanthan gum, polyalkylene glycols such as polyethylene glycol, alkylene polyols such as glycerine and propylene glycol and combinations thereof. Typically, the foam stabilizers may be present in an amount from about 0.10% to about 5%.

The foam may be produced using the F2 Finger Pump Foamer™ manufactured by AirSpray International (Pompano Beach, FL). Such a spring-loaded valve system operates without the use of gas propellants. Upon actuation, precise amounts of air and liquid are mixed, and a foam capable of maintaining its structure for a substantial length of time is dispensed. In addition, the dispenser can deliver a variable amount of foam, thereby reducing waste of the wipe agent contained therein. Details of propellantless foamers are described in U.S. Pat. No. 5,443,569, issued on Aug. 22, 1995, and U.S. Pat. No. 5,813,576, issued Sep. 29, 1998.

Directions for Use

Indicia placed on or otherwise associated with packaging may inform users of the benefits of the product, call attention to the relationship between odor on clothing, bacteria on the clothing, as well as possible relationships to bacteria on the skin and bacteria that may be present in washing machines or other locations that may affect clothing. Indicia may also provide guidelines for a regimen that can result in long-lasting reduction in odor on clothing and the body, including steps to take to treat clothing before laundering, steps to treat clothing after laundering or between washes, steps to take to treat armpits or other parts of the human body with products such as LUME® Deodorant for Underarms and Private Parts, and steps to take to mitigate bacteria in washing machines or other sources that may influence bacreria and odor on clothing and/or the human body.

Indicia may be placed on the packaging material holding a container of a composition such as an outer cardboard box, or may be placed on the container that directly holds the composition (e.g., a squeezable tube, a plastic or glass jar, a spray bottle, a foam dispenser, a tube of wipes, etc.). Alternatively or in addition, instructions for use may be associated with the product in a variety of ways other that directly printing on a package. The instructions may be provided on printed material that is distributed with the product but physically detached therefrom, or may be on a website or other information source that is associated with the product (e.g., accessible via a QR code, barcode, RFID tag, or URL printed on the package). Information about the product and its use may also be approved in promotional media such as in television commercials promoting the product.

An example of such indicia could be: "Apply the Pre-Treatment Spray to the most odorous parts of clothing (e.g., the armpit area) before tossing into a hamper, leaving at least 30 minutes before laundering for best results. If odor persists, use the Between Washes Freshener Spray to treat the smelly regions and allow to dry for about 5 minutes before wearing. To fight odorous bacteria residing in low-temperature washing machines, run a cycle once a week with the Germ Foe™ Washing Machine Tablet with warm or hot water (if available). Meanwhile, don't forget to use Lume® Deodorant for Underarms and Private Parts on your body regularly to reduce bacterial sources of malodor."

EXAMPLES

Enzymatic Sprays

Several enzymatic solutions were made:

E1: A first spray, labeled E1, comprised a buffered solution of Novozymes enzymes for laundry detergent in a buffered solution with surfactants and bacterial spores from J-Zyme™ AB-20X NFC distributed by J Tech Sales (Boca Raton, FL), said to employ spores from Nozozymes. The solution comprised about 20% J-Zyme which is said to have about $1.1\times10^9$ CFU/ml of bacterial spores. Ingredients:

Sodium citrate
Sodium bicarbonate
1,3 propanediol from natural feedstock
Alkypolyglucoside from sugar feedstock
Probiotic bacteria blend
Protease
Amylase
Pectate Lyase
Mannanase
2 types of Cellulase
Lipase
Preservative (0.1% of a blend of methylchloroisothiazolinone and methylisothiazolinone)
Water Total enzyme concentration was about 2% by weight. The enzymes here were selected to have optimum activity at a pH of about 7-8.

E2: Spray E2 was a mix similar to E1 but without lipase and with the addition of a gentle quat, soyaethyl morpholinium ethosulfate. Ingredients included naturally derived surfactants (from sugar), probiotic bacteria, an enzyme blend containing protease, amylase, pectate lyase, mannanase and cellulases (no lipase); a solvent system made from naturally derived glycerin that also served as an odor control agent, and naturally derived soyethyl morpholinium ethosulfate.

The concentration of the quat was about 0.5% and the enzyme concentration was about 2%.

E3: Spray E3 was made from a mix of enzymes, with a total of 5% enzymes comprising pectinase, amylase, mannanase, protease, lipase and cellulase. The solution comprised 20% glucopon-like surfactant from 100% biobased alkyl polyglycosides, sodium citrate and sodium bicarbonate for buffering to a pH in the 7-8 range, propanediol, a mix of bacterial spores approved for bio-enzymatic cleaning from a 10× concentrate comprising *Bacillus subtilis* spores, a solvent system derived from naturally derived glycerin and as an odor control agent, and a suitable preservative known to be compatible with the bacterial spore mix.

E4C: This liquid is a 4:1 concentrate intended upon dilution to give a solution similar to E3, but with slightly reduced surfactant levels to facilitate the concentrate form.

E4D: Upon 4:1 dilution, the concentrated E4C solution is diluted to normal strength and dubbed E4D.

E6C is another 4:1 concentrate intended upon dilution to give a solution similar to E3, but with slightly reduced surfactant levels to facilitate the concentrate form and with less lipase. This concentrate comprises mix of enzymes, with a total of about 10 to 18% liquid enzyme mixtures comprising pectinase, amylase, mannanase, protease, lipase and cellulase (the liquid enzyme mixtures themselves are estimated to have roughly 40 to 60% protein), about 30% surfactants comprising biobased alkyl polyglycosides, salts such as sodium citrate and sodium bicarbonate, propanediol, a mix of bacterial spores approved for bio-enzymatic cleaning from a 10× concentrate, a solvent system derived from naturally derived glycerin, and a suitable preservative known to be compatible with the bacterial spore mix. Upon dilution (3 parts water to 1 part E6C) the result is E6D (the "D" indicates dilution has occurred).

EN2: 11.1 ml of KOH 0.1M solution was combined with 11.8 g of 1.8% NAC solution at pH 3.0, giving a pH of 4.85. Then 20.4 g of this solution was combined with 39 g of NIC solution, giving a pH of 7.00

Other enzymes used included:

- Pectinase from Phygene Biotechnology Co (Fuzhou, Chna), product PH1561, activity>500 u/mg, CAS 9032-7501.
- Pectinase in Kitchen Alchemy Pectinex® Ultra SP-L solution from Modernist Pantry, LLC (Eliot, Maine).
- Pectinase powder ("pectic enzyme"), L. D. Carlson Co. (Kent, Ohio).
- Alpha-amylase from BOSF (1,4-alpha-D-glucan glucanohydrolase), 10 kU/g, CAS 9000-90-2, EC 232-565-6, powder form.
- Amylase powder, BSG (Shakopee, Minnesota), product 10019.
- Papain, Phygene Biotechnology Co (Fuzhou, Chna), product PH9028, activity>800 u/mg, CAS 9001-73-4.
- Papain tablets, Beazyme brand, MCM (Malaysia Chemical Company, Kuala Lumpur), 150,000 USP, purchased in Kuala Lumpur, Malaysia.
- Lipase (triacylglycerol acylhydrolase) from *Candida rugosa*, Ekear Co. (Shanghai, China), product P0114, CAS 9001-62-1
- Cellulase, Phygene Biotechnology Co (Fuzhou, Chna), product PH9018, activity>400 u/mg, CAS 9012-54-8.
- Cellulase powder from Heshibi Biotech, China, activity 100,000 u/g.
- Cellulase powder, Henan Wan Bang Industrial Co. (Henan Province, China).
- Cellulase powder, Zhejiang Yiruo Biotech (Zhejiang Province, China).
- Cellulase powder, Shandong Longda Biotech (Shandon Province, China).
- Cellulase powder, Yin brand (China).
- Lysozyme from egg whites, Bomei Biotech, activity>20,000 u/mg, CAS 12650-88-3.
- Lysozyme chloride, Homecare Noflux® brand, 90 mg per tablet, purchased in Kuala Lumpur, Malaysia.
- E-Zyme® Troche lysozyme chloride tablets, 200 mg each, from AV Manufacturing S/B (Malaysia) purchased in Kota Kinabalu, Malaysia.
- NattoEnzym: nattokinase powder purchased in Hanoi, Vietnam marketed by DHG Pharam (Can Tho City, Vietnam), made from nattokinase from the Japanese Nattokinase Association (Osaka, Japan).

Other Enzyme Solutions

AmylaseA: BSG amylase, 1.137 g and BOST amylase, 0.717 g, were stirred unto 28.0 ml of water.

CellulaseA: 1.1 g of Shandong Longda cellulase powder and 0.45 g of Phygene cellulase powder were mixed into 22 ml of water.

CellulaseB: 1.3 g of Heshibi cellulase powder was mixed into 29 ml of water.

CellulaseC: 1.8 g of Wanbang cellulase, 0.38 g of Phygene cellulase, 1.10 g of Yin cellulase, and 1 g of Heshibi cellulase were was mixed into 53.5 ml of water.

CellAmylA: 12.19 g of 2% NAC at pH 6.14 was combined with 5.2 g of 2% NAC at pH 9.17, 17.69 g of CellulaseC, 4 g of 2% NAC at pH 6.4, a few grains of citric acid to bring the pH from 9.5 to 8.82, and then 0.55 g of BOSF amylase powder.

LysoA: 1 tablet of E-Zyme® lysozyme chloride (200 mg) was dissolved into 8.5 ml of water.

LysoPap: Grind one table of Homecare Noflux® lysozyme chloride (90 mg of lysozyme) with one tablet of MCM Beazyme papain and dissolve the powder into 12 ml of water.

LysoB: Pulverize 2 tablets of E-zyme Troche lysozyme chloride (200 mg each) and dissolve in 30 ml water.

PAPA: 1.05 g of Phygene papain was combined with 21.7 ml of water.

PAPB: 1.3 tablets of MCM papain were ground and dissolved into 15 ml of water. Some residual solids remained even after heating. The slurry was then passed through a fine cloth to filter out some solids. 13 g of solution were obtained.

PAPC: 5.65 g of papain from Pangbo Enzymes (Nanning Pangbo Biol. Eng. Co.), 10,000 U/g, was combined with 53 ml of water. (p. 52)

PANNAC: 33 ml of 3.6% NAC at pH 4.9 combined with 0.643 g of panthenol powder.

PANNAC2: 3.6 g of NAC and 1.65 g of panthenol powder were combined in 108 ml of water, with 2.1 g of $NaHCO_3$ added to reach a pH of 4.7.

NattoNAC: 0.6 g of commercial nattokinase powder was purchased in Hanoi, Vietnam under the brand name of NattoEnzym marketed by DHG Pharam (Can Tho City, Vietnam), made from nattokinase from the Japanese Nattokinase Association made by Japan Bio Science Laboratory (Osaka, Japan). Capsules with 0.6 g of powder, said to have 670 FU (fibrin units, a measure of activity based on fibrinolytic activity) per capsule, were used.

Biofilm Attack (BA) Agents

Pretreatments to attack biofilm were made as follows:

NAC-AL: To test the interaction of allantoin with NAC, 0.75 g of NAC were combined with 0.24 g allantoin in 46.5 g hot water. The pH was 3.16. The characteristic sulfur odor of NAC appeared to be absent, suggesting that allantoin may be useful in reducing the odor of NAC solution.

NAC Solutions:

NAC powder was dissolved distilled water to give a 2.1% strength solution, a 1% solution, and a 20% solution.

NAC solution at 1.4% concentration was adjusted with citric acid and sodium carbonate to achieve a pH of 3.0.

NAC solution at 2% was made by mixing 3.9 g of NAC in 185 ml of water.

EGCG-NAC solution was made by combining 1.40 g of EGCG powder with 1.69 g of NAC in 50 ml of water, and placed in a 100 ml spray bottle.

1 g of NAC in 50 ml of 0.1M KOH solution was prepared with a pH of 9.17.

1.0 g NAC plus 15 ml of 0.1 M KOH solution was prepared with 35 ml water, with a pH of 3.55. $Na_2CO_3$ was then added (0.18 g) to bring the pH to 7.8.

Another 2% NAC solution was prepared with KOH added to give a pH of 8.19 in 51 ml of water, to which another 0.22 g NAC was added to bring the pH down to 4.33. Adding 6 ml of 0.1M KOH solution brought the pH to 6.4.

28.1 ml of NIC (Naturally It's Clean®) enzyme solution was combined with 0.36 g NAC and 0.16 g sodium carbonate to give a pH of 8.37. This was adjusted by adding 0.04 g NAC to give a pH of 8.08. This is labeled 1.4% NAC in NIC.

A 2.1% NAC solution at pH 4.0 was made using 1.51 g of Biotal NAC, 0.648 g $NaHCO_3$, and 71 ml of water.

Pectinase Solutions

PNAC1: 0.2 g of BOSF pectinase powder (believed to be a fruit pectinase best suited for operation around a pH of 4 to 5, unlike typical laundry detergent pectinases which are engineered for higher pH solutions such as from 7 to 9) having an activity of 10 kU/g was combined with 0.41 g NAC powder and 0.13 g sodium bicarbonate. The powder was prepared and mixed, and placed in dry form into a sealed 100 ml spray bottle. After a period of time, distilled water was added, 57 ml. The mix dissolved rapidly at 22° C. The pH was 6.7. To better optimize performance of the pectinase, 0.21 g of NAC was further added to the solution plus 0.32 g ascorbic acid, bringing the pH to 4.6. This was spray PNAC1.

PNAC2: In 55.7 ml of water, 0.22 g of pectinase powder from BOSF was added with 0.44 g of NAC powder to form a pectinase-NAC solution having a pH of 3.2. Then in 12.65 ml of water, 0.26 g sodium bicarbonate was added. 4.5 ml of this solution was added to the pectinase-NAC solution, bringing the pH to 4.71. This was adjusted by adding 0.06 g NAC, giving a pH of 4.08. This was put into a 100 ml spray bottle and labeled PNAC2.

PNAC3: 0.6 g NAC are combined with 0.5 g BOSF pectinase powder with 0.13 g sodium bicarbonate and 0.1 g ascorbic acid. The powder mix was then combined with 60 ml of water (references to water are generally to distilled water unless indicated otherwise). The pH was 4.31, believed to be suitable for the fruit pectinase used, but generally too low for typical laundry enzymes.

PNAC4: 1.14 g NAC powder was combined with 0.88 g of pectinase powder (BOSF polygactouronase, product G0200, CAS 9032-75-1, EC 232-885-6, >10 kU/g), 0.08 g citric acid powder, and 0.5 g $NaHCO_3$ in 106 ml of water, resulting in a solution with a pH of 4.38, believed to be suitable for fruit pectinases.

PNAC5: Combine 1.256 g NAC with 1.033 BOSF pectinase (polygalacturonase) into 106 ml g water.

PMIX1: 0.174 g of Phygene pectinase, 0.802 g of Pectinex® solution, and 24.5 ml of water were combined to create PMIX1 solution.

Lysozyme Solutions: Three Malaysian E-Zyme® Troche lysozyme chloride tablets, 200 mg each, from AV Mfg. (Malaysia) bought in Kota Kinabalu, Malaysia, were ground and dissolved in 51 ml of water to form 1.2% lysozyme solution, LYS1.

Herbal Solutions

BJC1: 500 g of the herbal product *Herba patriniae*, also known as Bai Jiang Cao or Su Jiang Bai, were obtained from a traditional Chinese medicine outlet in downtown Shanghai, the Beijing Tongren Pharmacy. The material is from the woody roots of the plant and is provided in thin chips and flakes. 58.65 g of the dry material was combined with 600 ml of water an heated in a large pan and stirred for about 30 minutes to form a concentrated extract which was filtered, and 100 ml therefrom was stored in a spray bottle with the label BJC1. The material was relative dark, probably too dark for use in clothing unless further lightened first.

BJC2: 5 g of Bai Jiang Cao matter were combined with 55 g of 70% ethanol and heated in a pan for about 30 minutes and filtered out, giving 44.5 g of extract. This was combined with 66 g of water to bring the material to a non-flammable range. The light yellow extract was labeled BJC2.

Steps Toward Perma-Odor

An effort was made to artificially create persistent odor problems in several shirts, including the following:

- Shirt RD1: a red 100% polyester sports shirt under the Voit brand
- Shirt RW1: a red and white striped shirt made from 75% cotton and 25% polyester with high stretch.
- Shirt Dec1: A 100% polyester men's sports top made by Decathlon of China.
- Shirt M1: A maroon shirt made from 47.5% Modal (rayon), 47.5% cotton, and 5% spandex.
- Shirt BS1: a black casual short-sleeved shirt made from 100% polyester The first four of these shirts were obtained at a second-hand store in Shanghai, while the last was purchased new in Shanghai but had been worn periodically for several years.

Two malodor sprays were created to add malodor and a biological load in an attempt to infect clothing with malodor sources, Stink Spray 1 and Stink Spray 2.

To create a more persistent odor problem, a cheese believed to be rich in *Micrococcus* bacteria was obtained: Fourme D'Ambert, a well known mild surface smeared blue cheese where surface materials from prior blue cheeses are rubbed onto the surface of new cheese being formed, maintaining an ongoing colony of bacteria, molds and years that have been in use for many centuries in the manufacturing of this historic, ancient cheese.

Shirt BS1: A black-striped polyester shirt was given 6 sprays (about 1 gram) onto each put of Stink Spray 1 and of Stink Spray 2. Then to add additional bacteria, 0.5 g of Fourme D'Ambert cheese, including material from the outer rind, was applied to each pit over an approximately 9 cm×9 cm square centered around the underarm stitching for each pit. The cheese was slowly rubbed into the fabric. The two wetted and cheese-smeared pits were folded to be in contact with each other, and then the shirt was rolled up with the pits toward the center of the rolled shirt. About 50 ml of water was sprinkled on the outer surfaces of the rolled shirt to provide moisture to keep the shirt from becoming too dry.

The shirt was placed in a plastic bag to seal it and it sat at about 25° C. for 36 hours. The smell was revolting. The odorous shirt was then prepared for washing by enzymatic pretreatment of each pit using the enzyme solution, Naturally It's Clean® marketed by Enzyme Solutions, Inc. (Garrett, IN). Each pit was saturated with the enzyme mix and then washed by hand after about 5 minutes of dwell time. In the hand washing, efforts were made to remove all visible traces of the cheese. The entire shirt was then thoroughly rinsed and then washed in a Siemens front-loading washing machine in a regular wash cycle of 78 minutes using about 100 ml of the Chinese liquid laundry detergent, Blue Bright Moon, a high-performance detergent with enzymes. After this wash, the distinctly malodorous smell in the pits persisted, though it was greatly reduced.

At this point, about 1 g each of Stink Spray 1 and Stink Spray 2 was again applied to each pit, and about 1 g of Fourme D'Ambert cheese was again smeared onto each pit while still moist from the wash, and again rolled up and stored in a translucent plastic bag. The bag was placed in direct sunlight at an outdoor temperature (in the shade) of 29° C. for 3 hours to seek to further promote brewing of bacteria in the shirt. After 3 hours, the shirt was hand washed in cold water to remove traces of visible cheese and then washed in a washing machine on the fast cycle (38 minutes/cycle). There was no enzymatic pretreatment, but the same laundry detergent was used with approximately the same amount. After the washing, it was noted that the malodor has persisted. The shirt was worn by a male volunteer for one hour to add additional odor. This shirt is BS1.

Shirt BS1 was later treated with enzymatic spray E2. The left pit was saturated with spray application of 7.0 g of E2, while the right pit was sprayed and saturated with 6 g of BA-2AEG. After about 20 minutes, the shirt was washed in a fast cycle with laundry detergent.

After washing, the left pit had a pleasant smell, with the right pit still had some malodor, suggesting that the enzymes, bacteria, and soy quat were more effective in this case than the BA-2AEG spray.

Other Shirts

Shirt Dec1 was treated with 0.7 g of Fourme D'Ambert cheese total smeared on both armpits over a 10 cm×5 cm area, and then sprayed with about 1 g of Stink Spray 1 on each pit. Then a total of 4.9 g of Stink Spray 2 was applied on the two pits (about 2.45 g per pit). The moist pits were rolled in contact with each other and the outer layers of the shirt were moistened with about 20 ml of warm water. The shirt was allowed to sit for two hours, at which time the cheese was rinsed off. Then BA-2AEG spray was applied to moisten the left pit. After 10 minutes, the entire shirt was washed with laundry detergent in a fast cycle (38 minutes). After washing, the right pit had malodor, but not the left, suggesting that BA-2AEG spray was effective.

Another round of odor application followed for shirts RW1, Dec1, M1, and RD1. For each shirt, about 1.2 g of Stink Spray 1 and 1.2 g of Stink Spray 2 were applied to both pits, followed by rubbing in 0.5 g of Fourme D'Ambert cheese to each pit. The moistened pits were placed in contact with each other, rolled up to be within the shirt, and the outer layers were wetted with 50 ml of water sprinkled thereon, then placed in a plastic bag and set into direct sunlight at an outdoor temperature of 29° C. (in the shade) for about 7 hours.

Shirt Dec 1 after washing had odor in both pits. Shirt M1 was treated with 1.7 g OCACDScl solution on the right pit and 1.56 g of E2 on the left pit, with reduced odor in the left pit. Shirt RW1 was treated with 3.7 g of 2AEG on the right pit and 1.15 g of Oderase® suspension on the left pit, with reduced odor in both pits.

Four of the shirts acquired from a second-hand clothing store in Shanghai were given further treatments, following the attempt to brew perma-odor and following washing. The red and white striped shirt, RW1 (75% cotton, 25% polyester), had retained a slight cheese odor in both pits in spite of washing with an enzyme pretreatment. The red Voit shirt, RD1, 100% polyester, had slight odor (about 1 on a scale of 1 to 5) in both pits. The Dec1 shirt had no detectable odor, and the maroon 47.5% Modal shirt M1 had a sour, stale odor rated at 1 in both pits following washing.

On RD1, 0.68 g of the exterior matter of Fourme D'Ambert bleu cheese was applied to an 8-cm diameter circle at the right pit, with cheese applied to the inside and outside regions, being smeared in and rubbed. Then 0.73 g of the cheese was applied in the same manner to the left pit. The same was done to shirt Dec1, with 0.63 g of cheese on the right pit and 0.61 g of cheese on the left pit. For these two cheese-treated shirts, the nutrient spray Nut1 was applied, with 4.8 g to the right pit of Dec1 and 4.5 g to the left pit, and 5.8 g each to the right and left pits of RD1.

Stink spray 1 was then used, which had been refrigerated for over a month. Filtering though linen cloth was again conducted to remove particulates, then 0.9 g each were applied to the right and left pits of RD1, and 1.4 g each applied to the pits of Dec1. Both shirts were then wrapped with the wetted pits within each shirt in contact with each other and at the center of the wrapped shirt. The outer layer were then sprinkled with about 30 ml of water and then placed in a plastic bag to keep the shirts from drying. The sealed bags were then stored at about 70° F. for 7 hours.

After washing, Dec1 had noticeable odor in the right pit. Another brewing session was conducted, with 2.5 g of Stink Spray 2 applied to each pit and 0.5 g of Stink Spray 1 applied to each pit, followed by 1.15 g of Nut1 spray on both pits. This was placed in a plastic bag and stored on a solid surface above the water level of hot water in a closed cast-iron pot, where the water was kept at about 30-40° C. for about 10 hours. The shirt was then removed and the right pit was treated with 10 ml of NIC enzyme solution on the left pit and then 10 ml of 1.4% NAC in NIC at a pH of 8.08 on the right pit. The treated shirt was allowed to sit for 20 minutes, then was washed in a fast cycle using Bright Blue Moon detergent.

Later the sheet was treated to brew additional clothing infection. 2.3 g of Nut1 spray was applied to each pit area, followed by 1.86 g of Stink Spray 2 to the left pit and 1.93 g of Stink Spray 1 to the right pit. The shirt was wrapped up into a cylindrical form with the pits in the inside and the outer layers of the cylindrical form were sprinkled with 20 ml of water, then put into a plastic bag overnight. After about 24 hours, the shirt was washed. Both bits manifested malodor after the wash. Now the right pit was sprayed with 1.6 g of 1.8% NAC solution and washed with a standard wash cycle requiring 78 minutes in a Siemens front-loading washer, using Bright Blue Moon laundry detergent.

Although the detergent has a fragrance, it was observed that after washing, the left pit appeared to have no malodor nor fragrance, while the right pit manifested fragrance. After drying, the left pit still had no sign of malodor, while the right pit had some odor. It appears that NAC can be effective when used in combination with other agents such as enzymes or catechins.

UK Triathlon Shirt (TR1)

A volunteer triathlon runner from the United Kingdom provided a 100% polyester shirt suffering from persistent odor believed to be a prime example of perma-odor and a possible biofilm infection. The shirt, code named TR1, received in a triathlon event from 2013, had been worn periodically for heavy exercise for six years and was about to be discarded because of strong odor, even after washing, that would become strong after relatively short periods of exercising, unlike new shirts. The shirt was received after exercise, with both pits manifesting odor levels of about 5 on a scale of 0 to 5. The left pit was treated with NIC enzyme solution alone, with 5.9 g applied. The right pit was treated with 1% NAC solution at pH 3.0, with 1.85 g applied. After two minutes, 6.87 g of EN2 (a mixture of NAC and NIC) at pH 7.00 was also applied to the right pit, After five minutes, the shirt was rinsed in warm water at about 40° C. and then washed in a standard cycle with room-temperature water with Unilever Comfort® brand laundry detergent purchased in Asia.

After drying the washed shirt, it was noted that the right pit was substantially free of odor and fragrance, while the left pit manifested fragrance. After an exercise session with the shirt, the right pit had very little odor while the left pit had rapidly developed intense odor, uncharacteristic for the male doing the exercise. It appeared that the left pit suffered from perma-odor in which odor rapidly develops.

The shirt was washed in a fully cycle with Bright Blue Moon detergent. The left pit had slight fragrance while the right pit did not have readily detectable fragrance. After air drying, the left pit fragrance level was at about 1, while the right pit remained at a 0 rating. One tester detected both malodor and fragrance in the left pit, estimating the odor level at about 1. After two more hours, the right pit appeared to have some residual odor while the left pit odor was difficult to detect. After an exercise session, the left pit developed strong odor, a level of about 3, while the right pit had mild odor, about 0.5 or 1 (nearly no odor).

The shirt was again washed with Comfort® brand detergent. Both pits smelled acceptable (essentially no malodor). Then, after another exercise session similar to each of the two previous sessions with this shirt, followed by 1 hour of walking, the left pit had strong malodor as it did previously, at a level of about 3.5 or 4, while the right pit had much less malodor, at a level of about 2.

Now to treat the left pit, which appeared to have a perma-odor problem possibly from a biofilm, a combination of pectinase and NAC was tried. 8 g of PNAC2 spray was applied to the left pit and allowed to sit for 15 minutes at about 22° C. The shirt was then washed with Comfort® detergent in a fast cycle.

After drying, the shirt was worn for exercise similar to previous sessions and the pits were wetted with sweat, as usual. However, this time, there was relatively low odor in both pits. The high odor levels created previously in the left pit prior to treatment with biofilm-attack agents did not occur this time, and the two pits were substantially similar in odor levels (around 1). This suggests that the NAC-pectinase treatment was successful in reducing a biofilm or the source of the perma-odor, whatever its nature.

Neon Orange Champion Shirt

A neon orange sports top for women made under the Champion® brand, code named CH1, a semi-fitted L/G, 100% polyester shirt was selected. It had been in regular use for exercise over the past 5 years and appeared to have symptoms of perma-odor. Slight odor would still generally be present after washing, and the odor would become strong after a single exercise session.

As a first attempt at reducing bacteria on the shirt, about 1 g of PuriShield® wound healing agent made by FarnAm Co. (Phoenix, AZ) was applied to the right pit. This product contains 0.4% of a cationic steroidal antimicrobial that is said to be effective against a wide range of microbes. Treating the pit did not appear to reduce odor. However, after rinsing, the odor appeared to be significantly reduced. A typical exercise session was conducted to apply normal sweat levels to the shirt. No obvious difference in the odor between left and right was apparent.

Solution EGCD-1 was sprayed onto the left pit of the neon orange shirt after it has been acidified by spraying 1.27 g of citric acid solution (0.9 g citric acid in 100 ml water). 2.84 g of EGCD-1 is applied to the left pit and allowed to sit for 10 minutes. The pit is then rinsed in diluted vinegar (about 20 ml of distilled vinegar at 5% acidity in 500 ml of water).

The right side of the shirt is first rinsed with warm water and then sprayed with E2, giving 1.55 g in the pit area, saturating the pit, and it was allowed to sit for 5 minutes to allow enzymes to function at about 24° C.

After hand rinsing the entire shirt thoroughly in warm water and air drying, the left pit that had been treated with EGCD-1 solution smelled noticeably better than the right pit. The shirt was then washed in a standard laundry cycle with Bright Blue Moon (a Chinese brand, Lan Yue Liang) detergent and used in exercise. After exercise, the smell returned in both pits, though after washing the left pit again smelled noticeably better than the right pit when evaluated after two days of air drying. After further cycles of washing and exercise, the right pit had malodor while the left pit had noticeably weaker malodor.

Several days after the initial trials with the neon orange shirt, further trials were conducted in Borneo, Malaysia. Nova® brand N-Acetyl cysteine powder in 300 mg capsules (Nova Laboratories Sdn. Bhd., Sungai Pelek, Sepang, Selangor, Malaysia, product MAL 17046003NZ) was purchased from Sunlight Pharmacy in Kota Kinabalu, Malaysia. Each capsule contained 300 mg of acetyl cysteine and 70 mg of other materials, believed to primarily be gelatin forming the edible, water soluble capsules or additional gelatin mixed with the powder.

1.97 g of NAC powder removed from the Nova® brand capsules was stirred into 52 ml of water to form a solution which was slightly cloudy, likely due to the presence of some gelatin or other polymer in the powder. The resulting solution, approximately 3.2% NAC, was applied to the right pit area of the neon orange shirt, with 2 g of NAC solution being applied to both the outside and inside surfaces of the shirt side over a roughly circular area about 12 cm in diameter. After two minutes of dwell time, the right pit was then sprayed with the enzymatic laundry pre-treatment spray, Naturally It's Clean® from Enzyme Solutions, Inc. (Garrett, IN), with 2.33 g applied to the exterior surface and 2.5 g applied to the interior surface.

The left pit of the neon orange shirt was treated with Naturally It's Clean enzyme solution only, with 3.4 g applied to the outer surface and 4 g applied to the inner surface, for a total of 7.4 g of solution applied to the pit. After five minutes of further dwell time, the entire shirt was handwashed in warm, soapy water using a clear shampoo provided by a local hotel. After air drying, the right pit, which previously smelled worse than the left, now smelled better than the left. Both smelled better than before washing, but there was residual malodor in the left pit.

A second biofilm-attack treatment was then applied to the right pit. A solution of NAC from an effervescent NAC tablet with 600 mg of NAC, also purchased in a Malaysian pharmacy, was made by dissolving the tablet in 100 ml of water. 8 ml of this solution was then applied to the right pit to substantially saturate it. Then 5.3 ml of solution EGCD-A comprising EGCG, acids, and ethanol was applied to the right pit and allowed to sit for 20 minutes before handwashing and air drying.

After an exercise session, it was observed that the right pit continued to smell better than the left pit. The same tendency applied to the shirt after being stored for 48 hours at room temperature, even though the odor intensity had increased over this time period, with the left pit exhibiting an odor intensity of about 4 to 5 (0 to 5 scale), while the right pit was rated at about 2 to 3.

The right pit was then treated again. First the right pit and sleeve were moistened with 21 g of 2% NAC solution made from 100 ml of water and 2 g of NAC powder extracted from Swanson's 600 mg capsules of N-acetyl cysteine (Swanson Health Products, Fargo, ND) which also contain gelatin (capsule shell) and magnesium stearate. Then 5.94 g of EGCD-A solution was applied to the moistened right pit area. After 10 minutes, the wetted region was sprayed with 7 g of Naturally It's Clean laundry spray (Enzyme Solutions, Inc., Garrett, IN). This was then rinsed in cold water and then handwashed with laundry detergent and warm water. After drying, the right pit had no odor, neither malodor nor fragrance from the laundry detergent, while the left pit exhibited both malodor and fragrance.

After further washing and two exercise sessions, the right pit still smelled better than the left, but both have made progress in terms of decreased odor levels previously experienced after one session of exercise. It may be that both the EGCG treatment and the NAC treatment (and possibly the NAC plus EGCG treatment) have helped reduce the impact of a biofilm in this shirt. As odor developed, it was observed that the treatments (NAC+EGCG) appeared to make the shirt display longer lasting odor reduction when treated with a freshener after exercising. Later, after further exercising and washing, the right pit of the neon orange shirt after exercise could still develop odor, but not as intensely as before. After exercise, the left pit had strong odor, even after being treated with fresheners comprising cucurbituril and after treatment with Febreze Free from Procter & Gamble.

Now the left pit was treated with a biofilm attack protocol. 10 g of a 2% NAC solution was applied to the pit and allowed to sit for 10 minutes, after which 9 g of Naturally It's Clean Enzyme Spray was applied and allowed to sit for 15 minutes, whereupon the shirt was rinsed by hand and then washed with commercial laundry detergent (Bright Blue Moon).

After further exercise, the right pit was still superior to the left pit (odor rating of about 1 in the right and 2 to 3 in the left). To further treat the left pit, the lysozyme solution LYS1 was applied, with 7.3 g of solution applied over an area of about 10 cm×8 cm around the left pit. This sat for 20 minutes, then 5 g of Naturally It's Clean enzyme spray was applied. After a 5-minute wait, the shirt was placed in a washing machine and washed.

Following subsequent exercise, the left pit still had mild odor, though reduced in comparison with previous states while the right pit had very little odor. After several more hours of sitting, the two pits seems roughly equivalent when tested again, both rated at about 2 on a scale of 0 to 5.

The right pit was then treated with 3.11 g of EGCD-B spray, immediately followed by application of 3.46 g of t1% NAC spray at a PH of 6.4. The left pit was treated with 2% NAC at a pH of 9.17, with 3.6 g applied, followed by treatment with 1% NAC at a pH of 7.8 with 2.68 g applied. Then NIC was applied to the right pit, 2.0 g, and then 1.76 g of NIC was applied to the left pit. The shirt was hand washed in warm water with laundry soap and air dried. After an exercise session (a jog of 3 to 5 km is typical for the exercise sessions referred to herein), it was observed that the right pit smelled better than the left. Perhaps the elevated pH NAC solutions are less effective than the low pH solutions in opening or attacking the biofilm. The left pit was then treated with EGCD-B spray, about 3 gm. After a 3-hour wait, both the right and left pits were sprayed with 2% NAC solution, 6 g on the left and 7.5 g on the right. After a five minute wait, the shirt was rinsed in warm water and air dried. After two exercise sessions, the pits were at an odor level of about 5. The left pit was treated with NIC, 1.48 g, while the right pit was treated with EN2, 1.44 g, and air dried. The odor level in the right pit was estimated at 3 on a scale of 0 to 5, while the left pit had an odor level of about 3.5. A second evaluator gave scores of about 2 for each pit.

The pH 3.0 NAC solution was now applied to the right pit, 2.4 g, and after 5 minutes, the shirt was washed in a short cycle with Bright Blue Moon brand detergent. After washing, both pits had slight odor, about 0.5 on a scale of 0 to 5. After another exercise session, both pits had an odor level of about 4. The right pit was then treated with PNAC3 comprising pectinase. 7.3 g of PNAC3 was applied to the pit and surrounding region, saturating the pit area.

After washing, the shirt was again evaluated following exercise. Both pits had low odor. But where odor existed, it appeared to be correlated with slightly darkened zones in the pits, believed to be staining associated with a prior biofilm where deposits of polysachharides, proteins, and other biofilm matter may have provided a platform for absorption of dyes or dyed particles. The darkened areas remained following the several treatments with enzymes that the shirt has received, though the intensity of the darkened regions has declined.

After further exercise, with the odor level at 2 in the left pit and 2.5 in the right, solution 1.57 g of Aq14 freshener was applied to the right. After air drying, about 30 minutes later, the right pit odor level was about 1.

Steps were then taken to reduce the darkened color regions in the pits. The inner right pit was treated with 3.6 of PNAC4 and allowed to sit for 5 minutes. Then 0.9 g of E2 was applied to that spot. After 2 more minutes, 1.4 g of NIC was applied, and finally 1.4 g of 2.1% NAC was applied. The shirt was then washed with Comfort® detergent (1.5 ounces of detergent used in a full cycle at 40° C. requiring slightly over one hour, and then air dried).

After further exercise sessions, the shirt achieved odor levels of 1-2 in the right pit and 0.2-1 in the left. The left was then treated with 4.65 g of PNAC4, seeking to further eliminate the residual staining in the pit believed to be associated with biofilm residual matter. The shirt was then washed using Comfort® brand detergent.

After further exercise, the dark stain region on the inner right put was treated with PNAC4, saturating with 3.6 g of spray. After 5 minutes, 0.9 g of spray E2 was applied. After two more minutes, 1.4 g of NIC spray was applied to the pit and finally 1.4 g of 2.1% NAC were applied. The shirt was then washed with 1.5 oz of Comfort® detergent in a full cycle at 40° C. After 5 additional exercise sessions without washing, the pits now had developed strong malodor with an odor level of about 5. The right put was treated with 2% NAC solution and washed. After further exercise, the odor in the right pit was significantly reduced relative to the left pit.

Additional Shirts: Series K

A blue Decathlon sports top, KB1, 100% polyester and essentially the same as the neon orange shirt above except for color, had also developed strong odor through repeated exercise and was a possible perma-odor candidate which still had malodor after washing. The left pit was treated with EGCD-1, with 6.3 g applied. It sat for 10 minutes, then the shirt was rinsed and washed. After air drying, the treated pit smelled much better.

A white shirt, Notations® brand, KW1, 100% polyester, had malodor in both pits after exercise, with an odor level at about 5 on a scale of 0 to 5. The right pit was treated with Febreze Free, 1.63 g. The left pit was treated with Oderase®, 1.72 g. After drying, both pits had reduced odor, although the odor slowly returned over time and the pit treated with Febreze had lower odor than the other.

Washing pre-treatments were now applied to the white shirt. Unilever Comfort® brand anti-microbial laundry spray, 4.2 g, was applied to the right pit, while EN2 (6.19 g) was applied to the left. After washing, no odor was obvious in either pit.

A blue Danskin® polyester sports shirt for women, BD1, was also tested. After exercise, it had a left pit odor level of about 4 and a right pit odor level of about 2 (scale of 0 to 5). It was treated in the right pit with PNAC4, 4.7 g. After a 3-minute wait, it was washed Comfort® laundry detergent.

A red Danskin sport top, 100 polyester, code name KR1 was also tested.

Additional Shirts, Series AA-AC

Several shirts from an athletic female volunteer were obtained, including:

- Shirt AA, a pink Forever 21 shirt believed to be made from cotton and polyester with relatively stronger odor in the right pit after prior washing.
- Shirt AB, a Downeast Basics "Wonder Tee" made from 95% cotton and 5% spandex, a brand said by some customers to have pronounced odor issues, perhaps due to surface sizing chemistry. After washing, both the right and left pits had malodor.
- Shirt AC, a purple Disney® shirt made with 50% cotton and 50% polyester.

Treatments of 2.1% NAC solution were applied. For shirt AA, 12.7 g total was applied across both pits and adjoining shoulder area. For shirt AB, 8.2 g was applied to the right pit and shoulder area, leaving the left pit untreated. For shirt AC, 8.5 g was applied to the right pit. After about 10 minutes, each shirt was then treated with Naturally It's Clean (NIC) enzyme spray for laundry. For shirt AA, a total of 11 g of spray was applied to the previously wetted areas. Further, for the right pit only, 2 g of E2 bio-enzymatic spray was applied. For shirt AB, 3.3. g of NIC was applied to the right pit followed by 5.4 g of LPS1 also to the right pit. For shirt AC, 13.8 g of NIC was applied to the right pit and adjacent areas, followed by 3.3 g of E2.

After about 15 minutes of dwell time, the shirts were washed with a standard cycle using Bright Blue Moon laundry detergent. In each case, treated pits smelled better than before and smelled better than the untreated pits or the pits treated without NAC. Following exercise, the results were mixed. Shirt AB was reported to smell better in general. Perhaps the enzymes in the detergent and the added enzymes and NAC present in the wash from the 3 treated shirts being washed contributed to effective odor reduction for both pits on shirt AB. But for shirt AA, after one work day the right pit was reported to smell again, while the left pit remained smelling fresh. For this shirt, it is proposed that an additional treatment with pectinase and NAC may be needed to achieve more complete odor reduction in the right pit. Post-exercise data is not available yet for shirt AC.

Perma-Odor Candidates: Series L

Exercise clothes from a heavy exerciser (male) were provided for further testing. Several items of clothing appeared to have perma-odor, for even after washing some residual odor remained, and the user had noted that malodor returns swiftly during or after exercise unlike the way the clothing behaved when it was relatively new. The clothing appeared to be suitable candidates for a perma-odor problems that may be due to a biofilm. Several approaches were tried.

Three items were involved: a red polyester shirt (shirt RL), a white polyester Lintrel shirt (shirt WL), and a blue polyester sports shirt (shirt BL). There were also three pairs of washable children's shoes that had serious odor issues that had not been removed with previous washing, including soaking in a solution made from Oxi-Clean® detergent with bleaching agents.

Initial treatments includes the use of E2 spray (about 3 g) on the right pit of RL, and a similar amount of E2 spray on the right pit of the white shirt WL. After sitting overnight to allow bacterial spores to activate and then being laundered with a conventional washing machine and laundry detergent, the treated pit of the white shirt smelled significantly better than the other pit, while the pits on shirt RL both smelled about the same with some persistent odor still present. The blue shirt, BL, had both pits smelling acceptable after the treatment and wash.

An antimicrobial agent, PureShield® wound care spray, was applied to each of the right shoes among two of the pairs, followed later by washing. After drying, it was observed that this treatment by itself did not appear to have any effect on the odor problems in the shoes.

Treatments with EGCG and NAC

Recognizing that biofilm may be present in some of the shirts, a new round was conducted aimed at reducing the impact of potential biofilm. A three-step program was implemented in some cases involving treatment with NAC, then acidic EGCG solution, followed by treatment with enzymes. The hypothesis was that the biofilm might be weakened or opened by the NAC and EGCG, allowing the enzyme solution to more effectively remove materials that may have been previously deposited or protected by the biofilm and perhaps help reduce the foothold of bacteria in the clothing. Testing showed reduction in odor after washing and reduced odor once the washed shirt was exposed to further sweating during exercise.

In the first trial following the initial treatments described above, 2.1% NAC solution was applied to the right pit of each of the shirts RL, BL, and WL, bringing the pits to saturation. 12 g were applied to RL, 12 g to WL, and 13.5 g to BL. Then RL was further treated with 5.5 g of EGCD-B solution on the right pit. BL was treated with 6.6 g of EGCD-2 solution on the right pit, and WL was treated with 8.7 g of EGCD-B on the right pit. After about 5 more minutes, shirt RL had 5.0 g of Naturally It's Clean (NIC) enzyme solution for laundry applied to the right pit. Shirt WL received 6.3 g of NIC applied to the right pit. Shirt RL was then washed in a regular wash cycle, while shirts WL and BL were hand rinsed in warm water. The shirts were then air dried and later worn. When the owner later reported the results, it was determined that shirts treated with NAC solution had significantly reduced odor after washing, and after exercise, the odor in the treated pit would generally be less than in the untreated pit.

In a subsequent trial, after washing and exercise, shirt RL was reported to have an odor level of about 2 (scale of 0 to 5) in both pits, while shirt BL had an odor level of about 2 in the left and 1 in the right pit. Shirt WL had very little odor and was reported as being significantly better than it was prior to treatment. Shirt RL was treated in the right pit with 9.1 g of 2% NAC at a pH of 7.8. (Prior to treatment, odor level was estimated to be about 0.5 in the right pit and 1 in the left.) After about 11 minutes, NIC enzyme spray was applied with 5.8 g on the right pit and 10 g on the left and the shirt was washed. While the residual odor in the shirt appeared to have been eliminated, after heavy exercise, shirt RD was reported to have developed strong odor on both sides. It was speculated that a different enzyme treatment might be helpful. Thus, the right pit and surrounding area was treated with 15 g of PNAC3 and after about one hour was washed using liquid Tide® detergent. The owner reported substantial improvement in the shirt.

Shirt WL, manifesting odor levels of about 2 in the left pit and 0 in the right (following exercise) before treatment was treated with 4.8 g of 2% NAC (pH 7.8) in the left pit, then after 2 minutes, 6.5 g of NIC enzyme spray was applied. After 10 minutes, another 5 g of NIC spray was applied. After washing as usual with liquid Tide® detergent and exercising with the shirt, the owner reported substantial improvement in both pits. After exercising, however, the right pit had slightly more odor than the left, so an additional treatment was conducted aimed at the right pit, which was treated with PNAC3 (2.2 g) applied to the center of the pit, and then PNAC1 (7 g) applied more broadly to the pit and sleeve. The left pit was treated with NIC only, 4 g. The shirt was then washed. The owner noted that the odor problems of the past had been essentially overcome, and the shirt could now be used for exercise without the residual odor that had previously been present after washing.

For shirt BL, the left pit was treated with 1.4% NAC in NIC solution, with 9.67 g applied, and after about 30 minutes the shirt was washed using liquid Tide® laundry detergent. Following further use during exercise, the owner reported substantial improvement. However, the left pit had slightly stronger malodor. The left pit was then treated with PNAC1, with 11 g applied to a broad area around the pit followed by 1.9 g of PNAC3 in the pit area itself. The shirt was them washed after about an hour. After exercise, the owner reported significant improvement with no residual odor. Odor no longer rapidly returned during exercise, more like a new shirt.

Other Shirts: Series XH

A shirt from SUIS School in Shanghai, male subjects shirt, Sport Bay brand, XL, with perma-odor symptoms. The right pit was treated with 1.8% NAC solution at pH 3.0, with 13 g applied on and around the pit, plus 4 g of EGCD-1 solution was applied. After 6 minutes, it was rinsed, then again 3.8 g of 1.8% NAC was applied to the pit, followed by 7.9 g of N.I.C. enzyme solution after a 3 minute pause, then 2.1 g of EN2 solution. The shirt was then washed with Comfort® detergent, air dried, and returned to its owner for more exercise.

A 100% cotton blue "Superman" T-shirt, codenamed NS, was reported to have perma-odor by an athletic adult male. The shirt was treated in the left pit only with 5.6 g of PNAC4 sprayed onto the pit area, followed by washing with Purex Free® detergent in a fast wash cycle. The owner, not knowing that only the left pit had been treated, later reported that there was substantial improvement in the left pit.

Another shirt, a dark gray 100% polyester basketball shooting shirt with the Decathlon "Tarmak" mark, assigned code name KV, was provided in an unwashed state with intense malodor at a level of about 5, with notes of ammonia and other malodors in the pits and adjacent zones. The right side of the shirt including the pit and surrounding area was treated with 23 g og 1.8% NAC. The left side was treated with 13 g of PNAC3. It sat for 18 minutes then was washed in a short cycle at 30° C. with Comfort® detergent and returned to the user.

Another shirt, code named CH, a gray partially cotton T-shirt had a right odor level of 4 and 2 in the left pit. The right pit was treated 6.25 g of PNAC4. A soccer shirt from Ghana, an FCP TMN polyester shirt, codename JG, had a right pit odor level of 4-5 and a left pit level of 3-4. The right pit was treated with 4.9 g of PNAC4. A Decathlon polyester 2-layer shirt, codenamed TF, having been heavily used for exercise over the past few months, was treated in the right pit with PNAC4, 6.9 g over a broad region. The left pit was treated with 4.58 g of 2% NAC followed by 3.3 g of NIC solution. After a 30 minute delay, the shirt was washed in a full cycle at 40° C. with Comfort® detergent.

A 60% cotton, 40% polyester T-shirt, code name MD, was received from an athletic male with high odor in both pits. 0.8 g of NIC was applied to each pit. The right pit also received 2.5 g of 2% NAC at pH 9.17.

A blue Macron sports shirt, 100% polyester, code named BM, was received from an athletic male with an odor level of about 5 in the left pit and 4 in the right pit. The left pit was treated with 6.15 g of 2.15% NAC at pH 6.4 and 3.59 g of E3D, while the right pit received 5.9 g of NIC.

A black Rodeo shirt, 100% polyester code named KB, was received with both pits at an odor level of 3. The right pit was treated with E3D, 2.92 g, and the left pit was treated with 4.0 g of 2.1% NAC at a pH of 7.8 followed by 3.00 g of E3D.

Thick soccer socks from an athletic young male were received with high odor, each labeled to indicate right and left. The socks were first wetted with 10 g of water spray, then the foot region was treated with 10.6 g of 2% NAC at pH 7.8 and then 7.1 g of E3D. The right was treated with 6.2 g of E3D, but no NAC.

A gray polyester woven jacket was received with mild odor in the pits. The right pit was treated with 9 g of PNAC5 and 3.3 g of E3D.

The shirts, jacket, and socks were put in plastic bags and keps at about 33° C. for 2 hours, then washed in a full cycle at 40° C. using liquid Tide® detergent. All seemed odor free after washing. Visualization in UV light revealed no signs of optical brightener accumulation in the pits after washing, in spite of the detergent having strong optical brightener. No obvious fluorescence was visible in the shirts before washing, either, though it is not known if they had been washed recently with a detergent containing optical brighteners.

Rags with Perma-Odor

Several freshly washed kitchen rags said to have perma-odor were obtained from a family with small children in Wisconsin. Rag 1, a dark green rag about 30 cm square and made from 100% polyster microfiber, had a cheese odor akin to Limburger cheese. Rag 2, a pink doily, had a mildew odor. Rag 3, a cotton rag, had a cheesy odor. Rag 4, apparently cotton, had a musty odor.

Rag 3 was treated with E4C in one quadrant, labeled quadrant 2, with 5.86 g applied followed by addition of 6 g of water. Rag 2, with a dry mass of 23 g, was sprayed with 5.6 g water and then 5 g of E4C. Rag 1 was wetted with 9.45 g water and then 12.2 g of E4C. The three treated rags were wrapped in plastic and allowed to sit overnight to allow time for bacterial action.

The rags then went through two wash cycles, first one cycle without added laundry detergent and then a cycle with Persil Pro Clean, a fragrance free detergent. After drying, Rag 2 smelled noticeably better. The treated quadrant of Rag 3 smelled noticeably better while the untreated portions still had a cheesy smell. Unfortunately, Rag 1 still had a cheesy smell. It was hypothesized that the use of the viscous concentrate resulted in poor uniformity in spraying the compound, or that additional agents were needed to better attack a biofilm.

Four quadrants on the rag were identified. Quadrants 2 and 3 were treated with PNAC4, applying 9.4 g and 10 g, respectively. Herbal solution BJC1, 5.65 g and BJC2, 5.7 g were applied to quadrant 1. ENC was then applied to quadrant 2, 5.4 g, then quadrant 3, 5.8 g, and then quadrant 4, 10.3 g. Quadrant 4 was also given 5 g of water. After sitting for about an hour, Rag 1 was then hand washed in dilute Persil Pro Clean (about 15 g in 2 liters of water) and then machine washed with the same detergent in a regular washing cycle with Persil Pro Clean and dried. After washing, Rag 2 had dramatically reduced odor, essentially odor free on all quadrants.

Shoe Treatments 3 pairs of children's shoes were treated. Two pairs were of the Keen® band, shoes SL1 (a larger pair) and SL2, and one pair was of the New Feel® brand, shoes SL3. For shoes SL1, both the right and the left were treated with 5 g per shoe of 2.1% NAC solution. Shoes SL2 were treated in the right shoe only, first with 10 g of EGCD-1 and then 10.5 g of 2.1% NAC solution. Shoes SL3 were treated in the right shoe with 11.9 g of 2% NAC solution at a pH of 7.8, while the left was treated with 22.5 g of 1% NAC at a pH of 2.18. Following a dwell time of 20 minutes, PuriShield® spray was also applied. To shoes SL2, both were given a total of about 10 g of PuriShield®. After 3 minutes, 11.5 g of EGCD-1 was applied to the right shoe only. The shoes were then rinsed in warm water, and 1.8 g of PuriShield® spray was applied to the right shoe only and allowed to air dry.

The shoes were hand rinsed in warm water and then air dried. Residual odor was significantly reduced in the treated shoes, but after a few days' of use, odor returned, indicating further treatment was needed.

Shoes SL3 then had an odor level of about 2 (max of 5) in the left and about 1 in the right shoe. SL1 had an odor level of about 2 in the left and 3 in the right. SL2 had 1 in the left and 2 in the right. Enzymatic treatment was now applied. Shoes SL3 were treated with PNAC3, with 2.7 g sprayed into the right shoe, emphasizing the forward interior region around the toes, and 3.8 g likewise applied to the left shoe. Shoes SL2 were treated with 5.1 g of PNAC3 in the left shoe and 4.8 g of 1.8% NAC at pH 3 was applied to the right shoe, followed by 3.6 g of PNAC3, again emphasizing the regions around the toes but also spraying the complete interior of the shoe. Shoes SL1 were treated with 1.7 g EGCD-1 and 3.9 g of PNAC3 in the right while the left was treated with about 4 g of PNAC1 only. After about 20 minutes, the shoes were rinsed thoroughly in warm water (about 45° C.), then rinsed in a dilute solution of liquid Tide® in warm water (about 3%), and then rinsed again.

Fluorescence and Dye Testing

In the photographs discussed in this section, the following numbering system is used: 200 represents an item of clothing, 202 represents a stain or darkened spot on a fabric or other visible biofilm candidate, 204 represents a fluorescing region, 206 represents a region having diminished fluorescence following a treatment, 208 denotes a boundary marker for the a treatment zone (e.g., a rubber band or other object denoting the area to be treated or a circle drawn on the figure), and 210 denotes a treatment zone where particular compounds will be applied to reduce a biofilm or for other objectives. Initial tests with dyes explored the use of crystal violet to detect biofilms in textiles. Unfortunately, even with polyester, the dye was too strongly absorbed to readily distinguish biofilm from fibers themselves.

Three UV lamps were used in testing fluorescence in potential biofilms. These included a Lightfe® UV301D lamp providing a beam at 365 nm, a UVBeast V3 lamp operating at 395 nm, and a UV Nova 108-LED UV lamp operating at 395 nm.

In one approach, biofilm candidates were stained using Calcofluor White M2R dye, a fluorescent brightener purchased from Phyto Technology Laboratories (Shawnee Mission, Kansas), CAS No. 4404-43-7. A solution was prepared of 0.074% Calcofluor white in water, and given the name CF1.

Two 100% polyester sports tops, the above-mentioned orange shirt CH1, and a blue top from Danskin, BD1, both with similar design and material, were examined. Both had been used for exercise for several years with persistent odor issues, although CH1 now showed substantial improvement in both pits following the previously described treatments. At this time, the orange top CH1 had been used in multiple exercise sessions since the previously discussed treatments with very little washing to create odor trouble and possible to promote biofilm growth again.

In examining fluorescence, it was eventually noted that both an SLR camera and an iPhone camera could not easily capture the fine details of fluorescence when using any of the UV lamps available for this study, probably because the fluorescence, including some background fluorescence, may have interfered with the camera's visible light operations. Such images often required enhancement (increasing contrast to around 30% and decreasing brightness to around −15%, for example) to show the fluorescent regions clearly visible to the naked eye, though sometimes the enhancement resulted in non-fluorescent zones also appearing as bright as the fluorescent zones in black and white images. However, it was found that better images could be obtained by placing a yellow UV-absorbing lens form UV safety glasses over the eye of the camera. A rubber band was sufficient for holding it in place.

Shirt CH1 (Orange Champion Shirt)

For shirt CH1, following the previously described treatments, 8.5 g of Tide® (Procter and Gamble, Cincinnati, Ohio) liquid laundry detergent in 15 ml of water was applied to the left pit of the wet shirt, while 6.8 g of CF1 was applied to the right pit and arm area and it was then rinsed in warm water for about 1 minute. Tide® liquid laundry detergent is believed to contain Calcofluor White, and its fluorescence under UV is consistent with that of Calcofluor White.

Figure 10A:
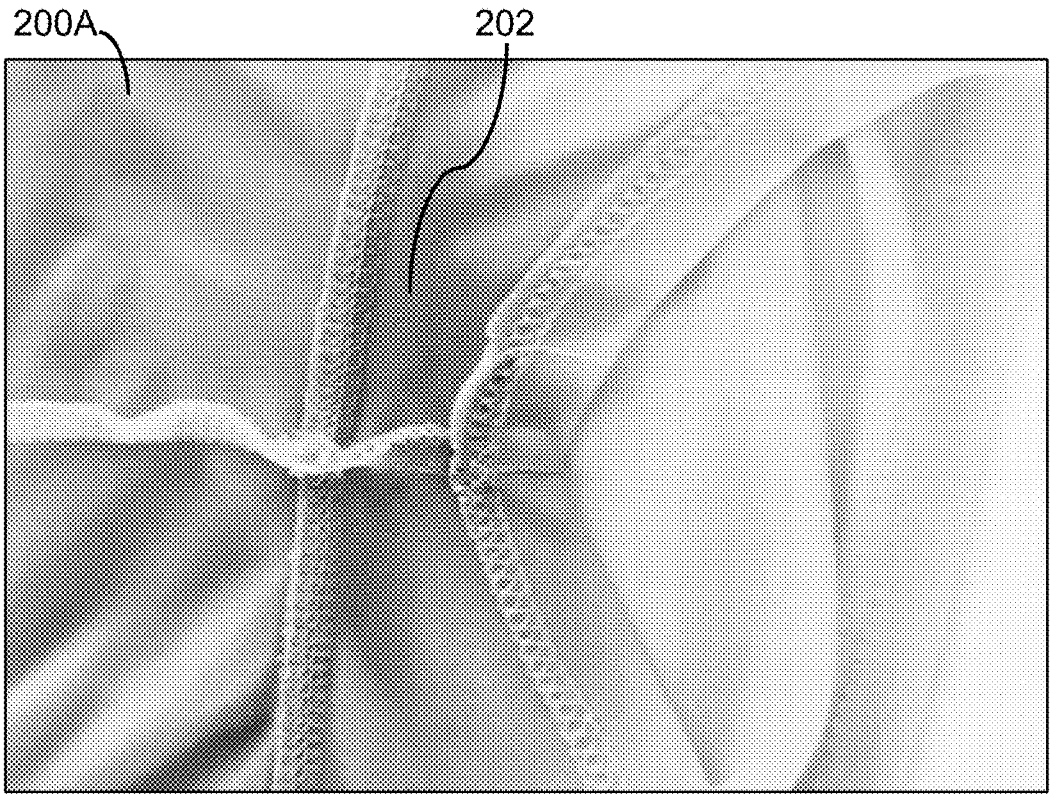
FIGS. 10A to 10J depict photos of portions an orange 100% polyester shirt, Chanpion brand, that was believed to afflicted with perma-odor, showing remnants of a possible biofilm visible as a dark region in visible light and with blue fluorescence in UV light, especially after treatment with an optical brightener, Calcofluor White. Treatments with various biofilm attack agents were applied resulting in reduction but not complete elimination of the darkened matter and the associated fluorescence. Details for these and following photos of clothing items are given in the Examples section below.
Figure 10B:
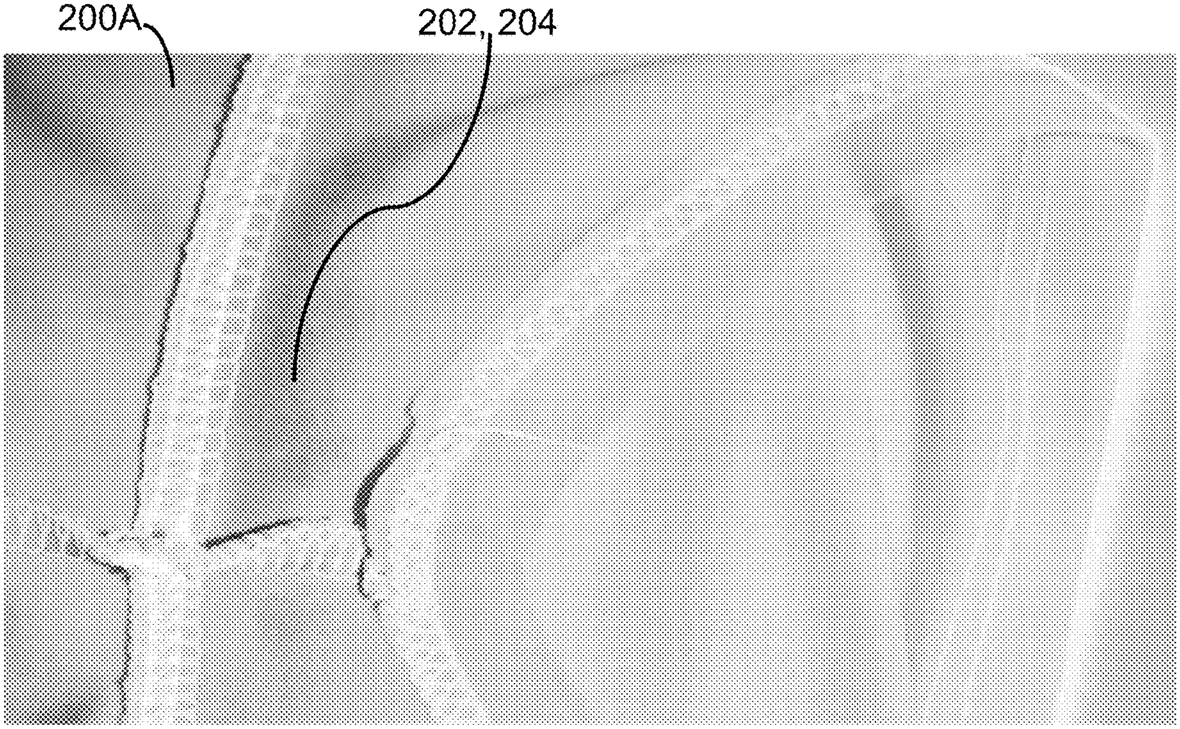

FIG. 10A depicts the left pit of shirt CH1 in visible light after the treatments described previously (as well as the treatment with optical brighter). A dark region 202 is still present that appears to come from within the fabric rather than resting on its surface. It is believed to come from biofilm material such as polysaccharides, proteins, and genetic material, that is capable of adhering to optical brighteners such as CF1 solution. FIG. 10B depicts the same region in UV light using the UVBeast V3 lamp. The dark region 202 of FIG. 10A is now a fluorescent region 204 with the appearance of a purple color, believed to result from Calcofluor White fluorescence couple with the dark matter's blocking of the fluorescence of the shirt material itself. UV light revealed regions in both pits of CH1 where the optical brightener was apparently adhering. The fluorescence in CH1 was bright enough to be detected even with the orange dye of the shirt brightly fluorescing at the same time.

Figure 10C:
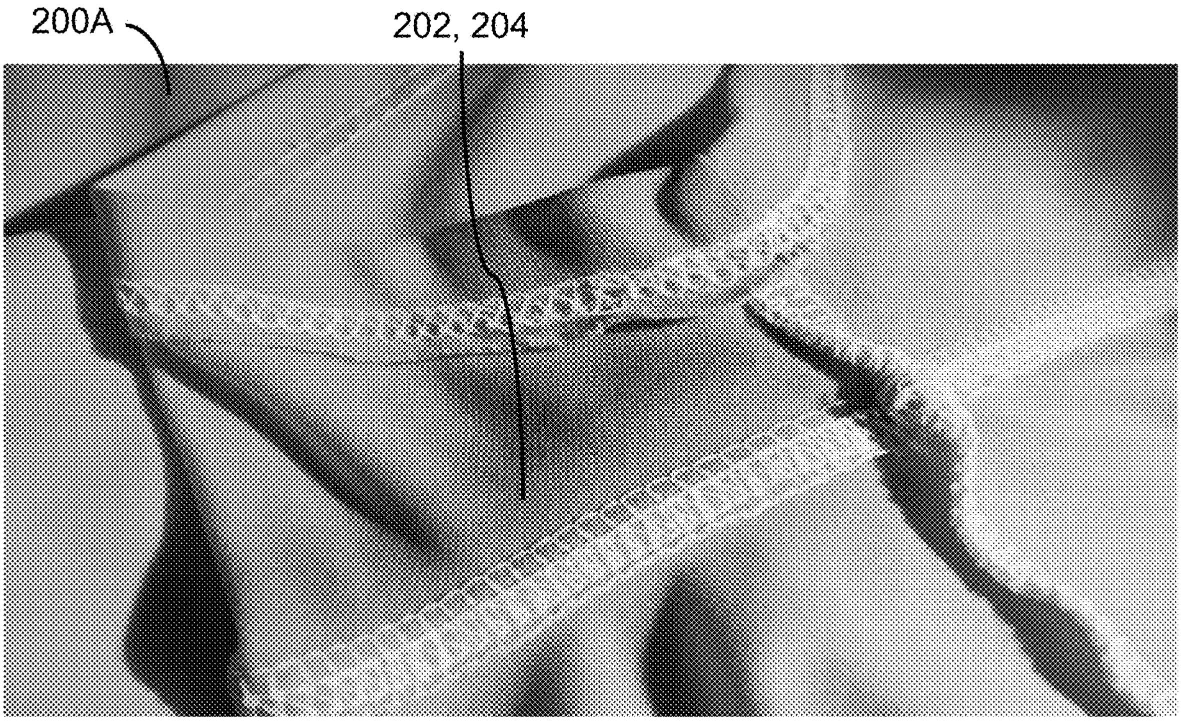
Figure 10D:
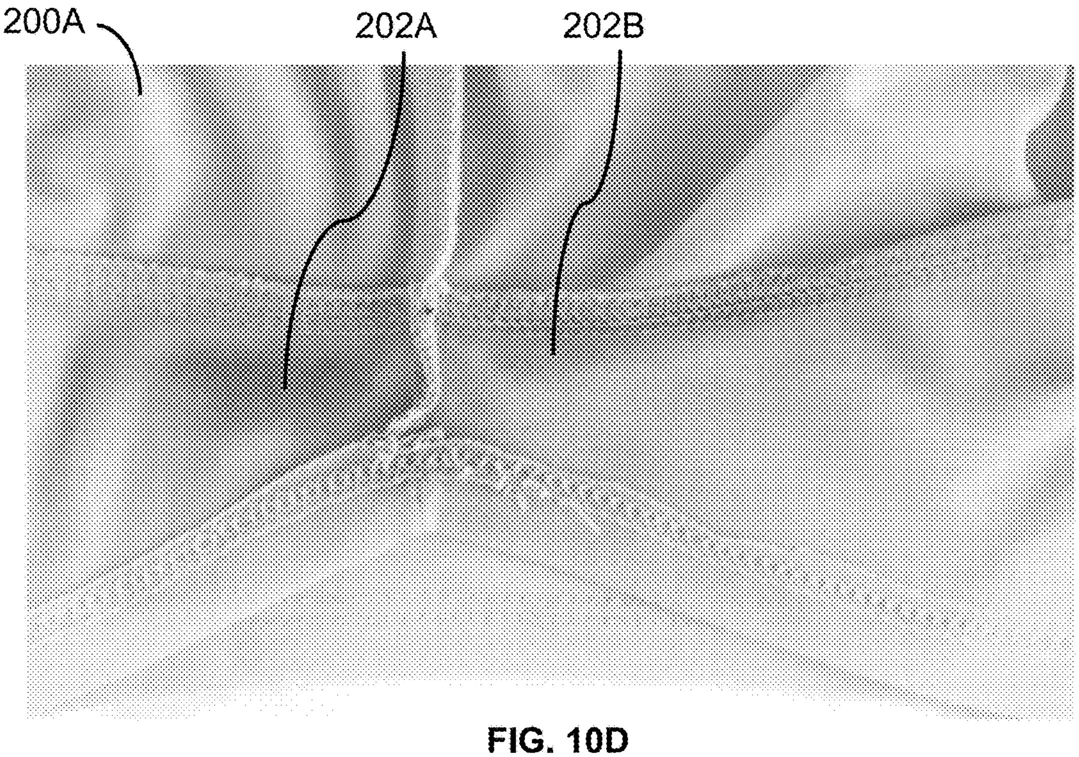
Figure 10E:
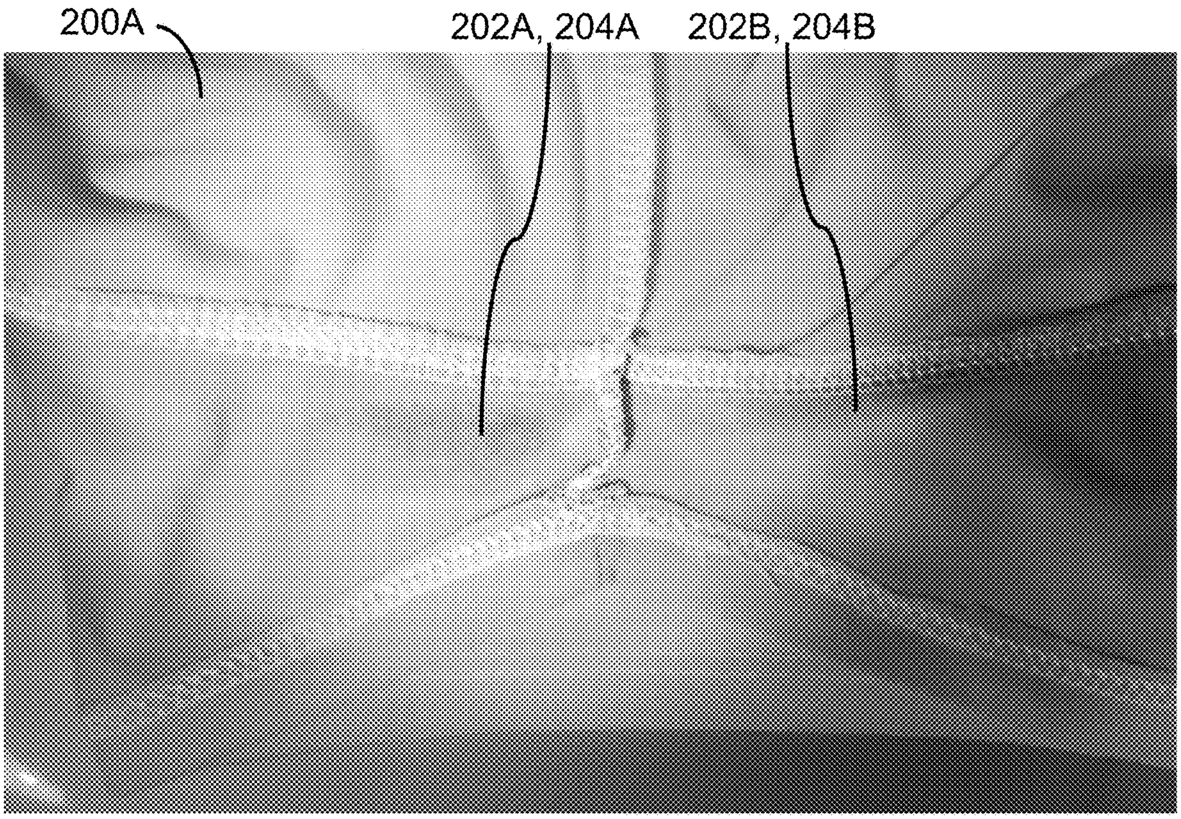

FIG. 10C offers another view of fluorescence in the left pit. FIG. 10D shows the right pit in visible light, where dark regions 202A and 202B are manifest. FIG. 10E shows the right pit in UV light, where the dark regions 202A and 202B now fluoresce as fluorescent regions 204A and 204B, respectively.

Figure 10F:
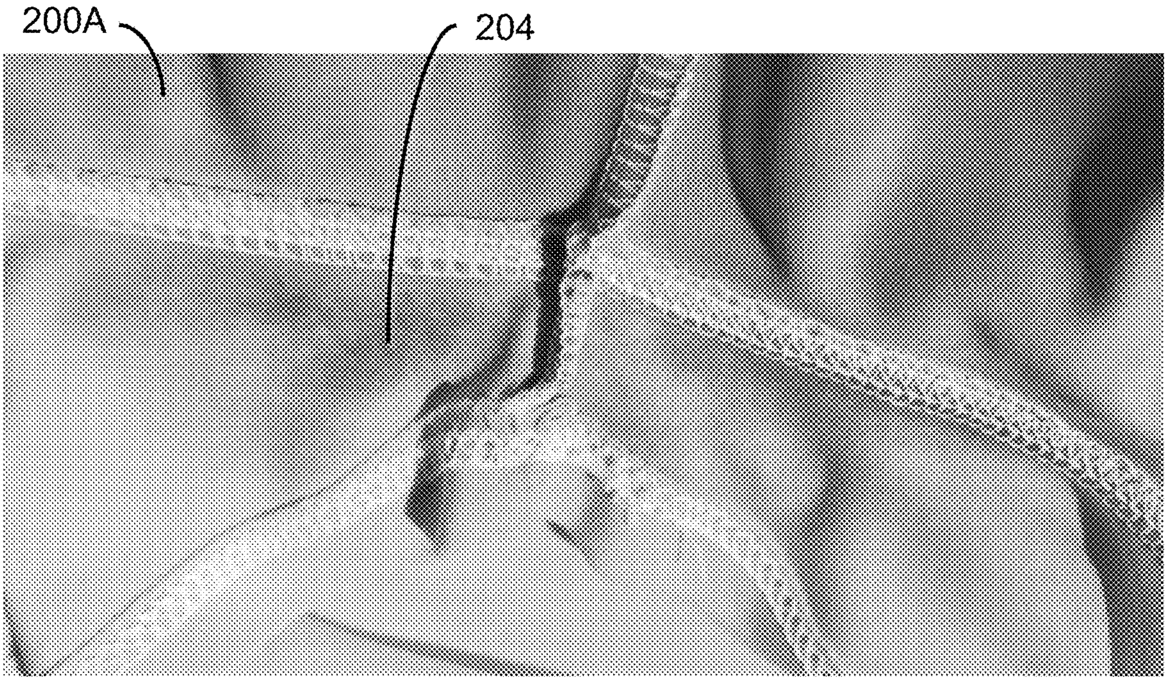

On the possibility that biofilm was being visualized with the optical brightener, a biofilm treatment was attempted. The left pit of CH1 was treated with 6 g of 2.1% NAC. Then 1.95 g of E3 was applied to the same region. For the right pit, 2.1 g of E3 was applied without NAC. After about 20 minutes, the shirt was washed in a short cycle at 30° C. with Purex® detergent. Darkened regions remained, though perhaps slightly lighter. For example, FIG. 10F shows the treated right pit, which still has a darkened region that becomes fluorescent region 204 in UV light.

Figure 10G:
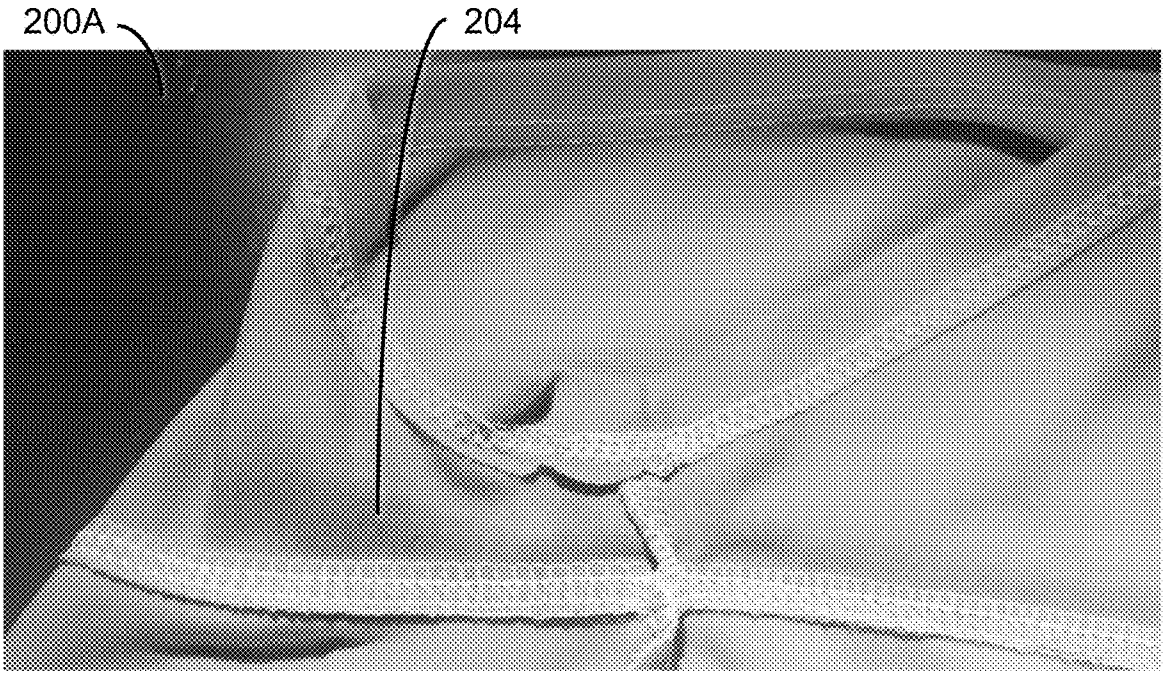
Figure 10H:
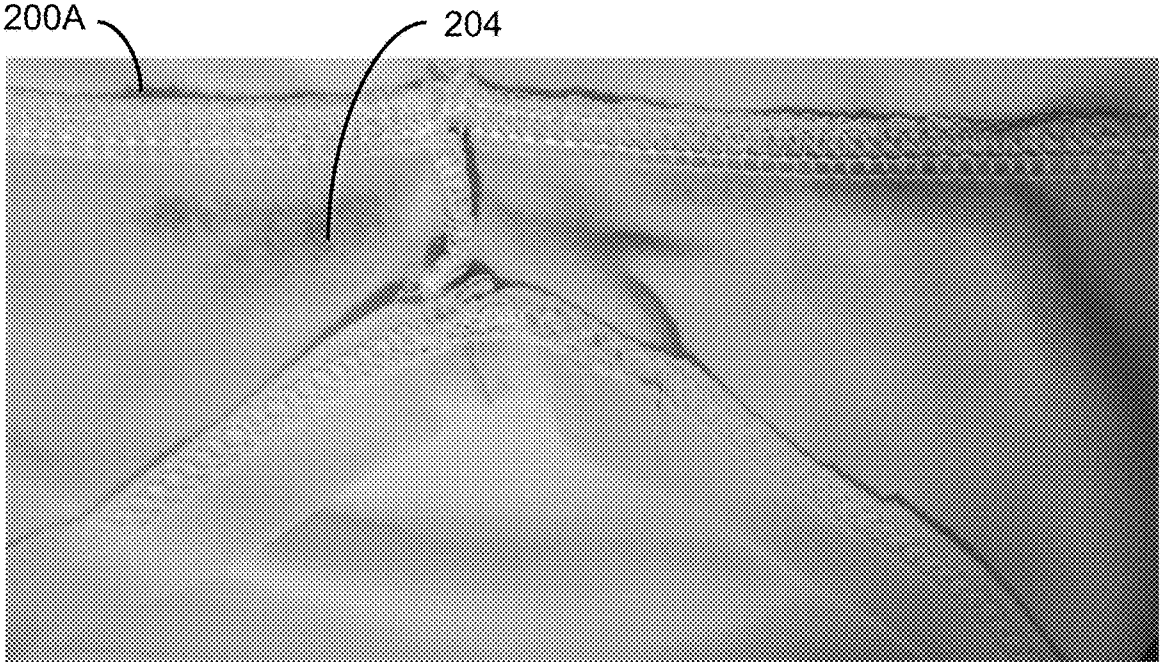
Figure 10I:
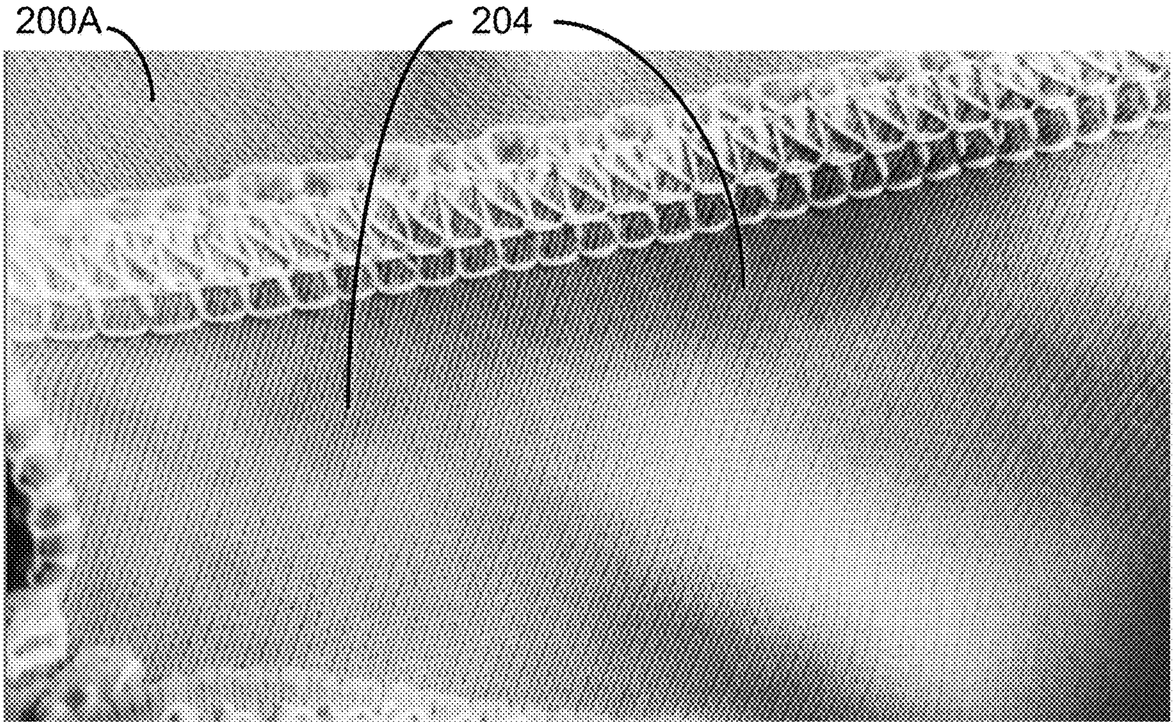

The right pit was treated with 7.6 g of CF1 and the left with 7.2 g of CF1. FIG. 10G shows the left pit under the light of the Lightfe® UV301D at 365 nm, showing fluorescence remains, though perhaps weaker than initially seen. FIG. 10H shows the fluorescent region 204 of the right pit also with the Lightfe® UV301D lamp. After further washing, two exercise sessions, and treatment with 3.44 g of CF1, the right pit of CH1 shows fluorescence, as shown in FIG. 10I, but it seems less than was initially present in FIG. 10D.

In CH1, one of the dark patches was treated with a needle jet from a Waterpik® Water Flosser for dental hygiene, delivering about 1 liter of water to roughly a 1 cm×1 cm patch, resulting in significant lightening of the patch, but still with remaining darkened matter that appeared to be deep in the textile material. This is believed to be a remnant of a biofilm that has left material possibly comprising polysaccharides and proteins that can adhere to colorants in wash and may form a platform allowing bacteria to more easily attach to the clothing. In general, mechanical means such as a needle jet, brushing, friction, and so forth may be helpful in freeing biofilm remnants from fabric. The treated area was them sprayed with 6.7 g of CF1, rinsed in about 2 liters of warm water for 1 minute, and then examined in UV light showing improvement in the treated spot.

Figure 10J:
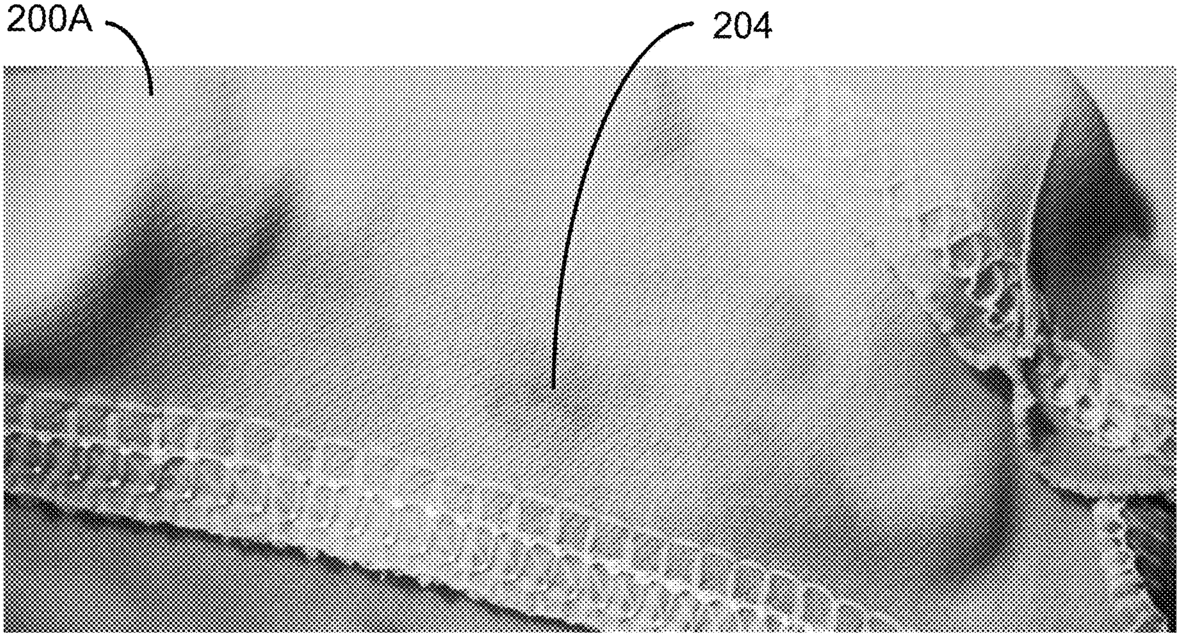

3.76 g of spray E3D was applied to CH1's left pit and rubbed into the slightly moist shirt (about 50% moisture). The shirt was put into a plastic bag and rolled up and kept at about 29° C. for over 4 hours, then washed in a fast cycle at 30° C. with Purex® detergent. After washing, the shirt was again sprayed with CF1 and viewed in UV light, as shown in FIG. 10J. The fluorescent spots 204 were still present but the intensity of the fluorescence had noticeably but slightly decreased.

Shirt BD1 (Blue Danskin Shirt)

Figure 11A:
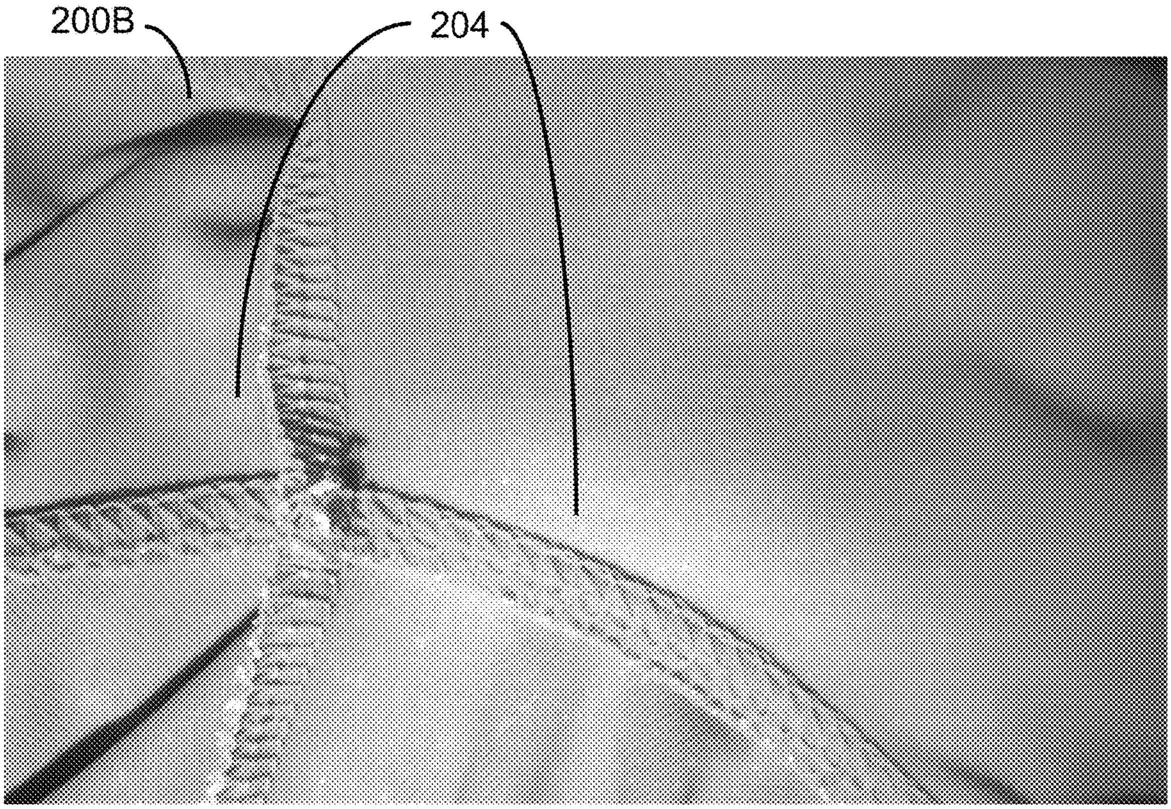
FIGS. 11A to 11F present photos of a blue polyester sports shirt showing evidence of fluorescence from biofilm matter in the shirt that can absorb optical brighteners.
Figure 11B:
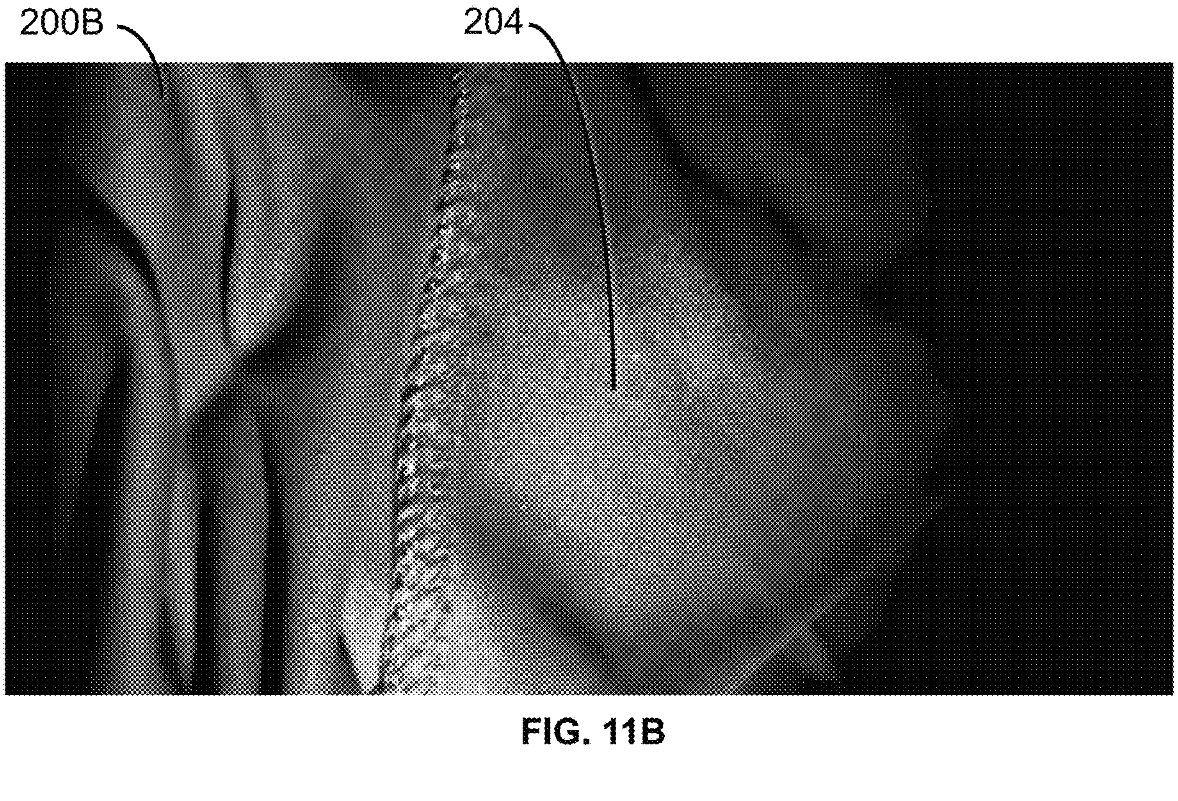
Figure 11C:
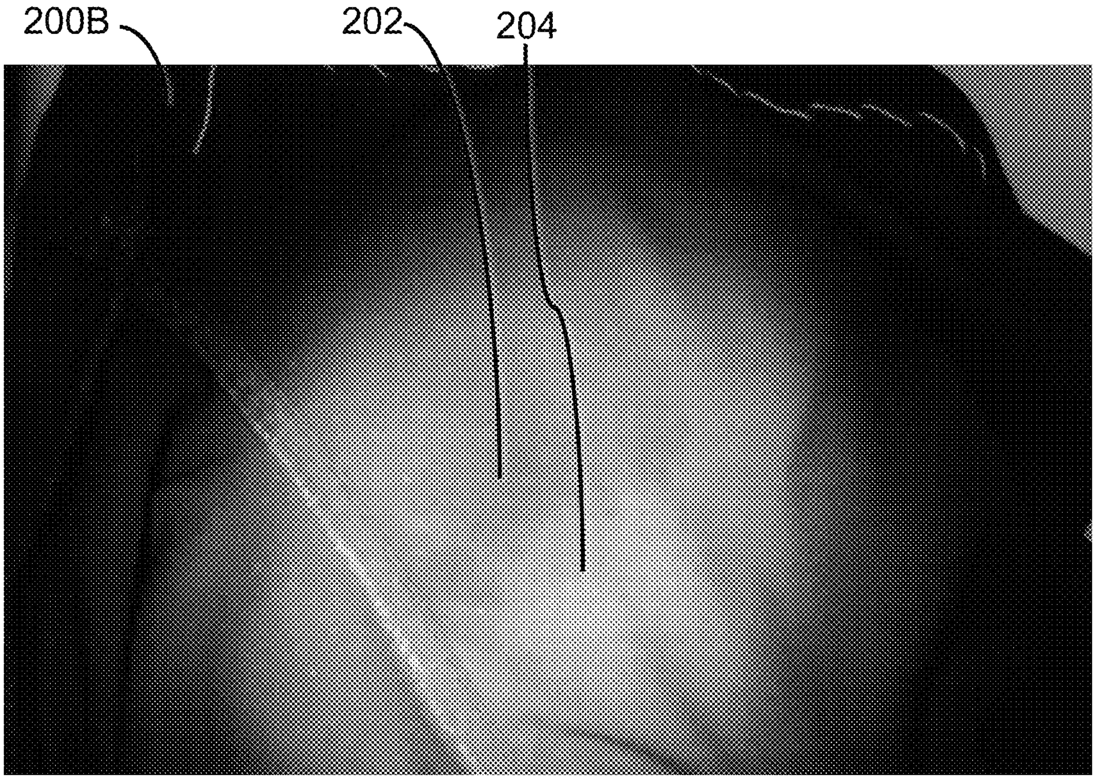
Figure 11D:
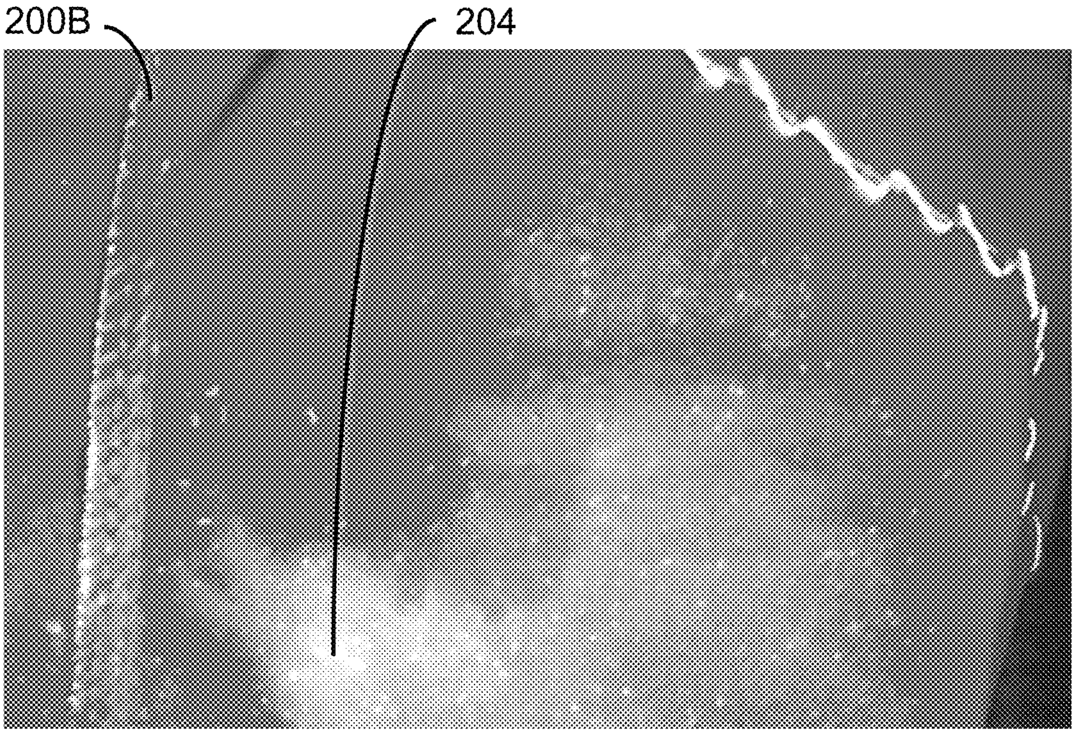

The blue Danskin shirt, BD1, was sprayed with CF1 on both pits, about 4.8 g each, then immersed in warm water for 1 minute. UV examination revealed little fluorescence after rinsing. After removing from immersion, the still wet shirt was further treated with 7.5 g CF1 to the right pit and 11.6 g to the left pit. The shirt was rinsed again. Fluorescence was still present in portions of the pits. For example, FIG. 11A shows fluorescent regions 204 in the right pit where the optical brightener adhered, photographed with an iPhone 6 Plus camera using a UV-absorbing yellow filer over the lens to block out some of the purple fluorescence of the shirt itself, while FIG. 11B, which shows a fluorescent region 204 in the left pit, was photographed without a filter, making it more difficult to get a meaningful image. FIG. 11C shows the fluorescent zone 204 also present in FIG. 11B, but with better clarity. BD1 had oblong patches of fluorescence about 2 cm wide and 6 cm long in the left pit and less in the right pit, apart from the above-mentioned fluorescent region 204 of FIGS. 11B and 11C on the sleeve about 9 cm from the center of the pit. FIG. 11D is another view of the left pit taken without the UV filter and requiring increased contrast to make the fluorescent region 204 more visible (it was plainly visible to the naked eye).

After further exercise in shirt BD1, bringing both puts to an odor level of about 3, shirt BD1 was treated with 5.2 g of 2.1% NAC (pH 4) in the right pit, followed by 2.9 g of E3C. The left pit was untreated. The shirt was washed with Purex® detergent. After washing and drying, the right pit appeared to have an odor level of 0 while some residual odor remained in the left pit at a level of about 1 (scale of 1 to 5). The fluorescent zones were slightly decreased in intensity.

Further treatments were conducted in BD1. 5.2 g of 2.1% NAC at pH 6.4 was applied to the right pit followed by 3.0 g of E3D. The left pit was wetted 3.9 g of water followed by 3.28 g of E3D. The shirt was put in a plastic bag and kept at a temperature of about 33° C. for 2 hours, then washed in a full cycle at 40° C. (78 minutes) with liquid Tide® detergent. Fluorescent zones remained as revealed through use of a UV Beast V3 lamp (the default lamp used herein; exceptions with a different lamp will be noted), though again the intensity may have decreased slightly.

Shirt BD1 was then treated in the right pit only with multiple agents in this order, all applied via spray: 2.51 g of 2% NAC at pH 9, 1.54 g of LysoB, 1.26 g of CellulaseC, 1.305 g of AmylaseA, 2.38 g of PAPA, 1.06 g of PNAC5, 1.37 g of PMIX1, and 1.21 g of E3D. The short was kept at about 35° C. for about one hour, then further treated with about 0.5 ml of Melaluca brand Lite Brite detergent that was rubbed in with warm water as the shirt was then rubbed and immersed into a tub of warm water, followed by washing with liquid Tide® detergent in a short cycle at 30° C. Fluorescent zones were somewhat visible after the rinse, but following the wash cycle, the treated fluorescent zones were largely removed in the right pit.

The untreated left pit still retained a fluorescent spot at the outside of a yellowish region in the blue shirt that did not fluoresce. The left pit was now treated. Focused on the yellow zone and the adjacent fluorescent patch, 2.89 g of PAPA and 2.11 g of E3D were applied and rubbed into the treated area. The shirt was then rolled up and outer layers were wetted with about 50 ml of water. The shirt was placed in a bowl set in a metal pan with about 5 cm deep of hot water in the bottom, intended to help heat the environment and keep the shirt at a relatively stable temperature with a lid over the contents. The shirt in this environment was initially at a temperature of about 48° C. to 40° C. for the initial hour or so, followed by reheating about 2 hours later. The shirt stayed in the container overnight, with heating again in the morning bringing the temperature to about 40° C. Shirt BD1 was then washed with Tide® liquid detergent in a short cycle and then the left pit area was visualized in UV light. The fluorescent region was still present, though perhaps slightly weaker. In visible light, it was apparent that the previously noted yellow region (about 7 cm wide and 3 cm tall) was substantially reduced in size and intensity.

Figure 11E:
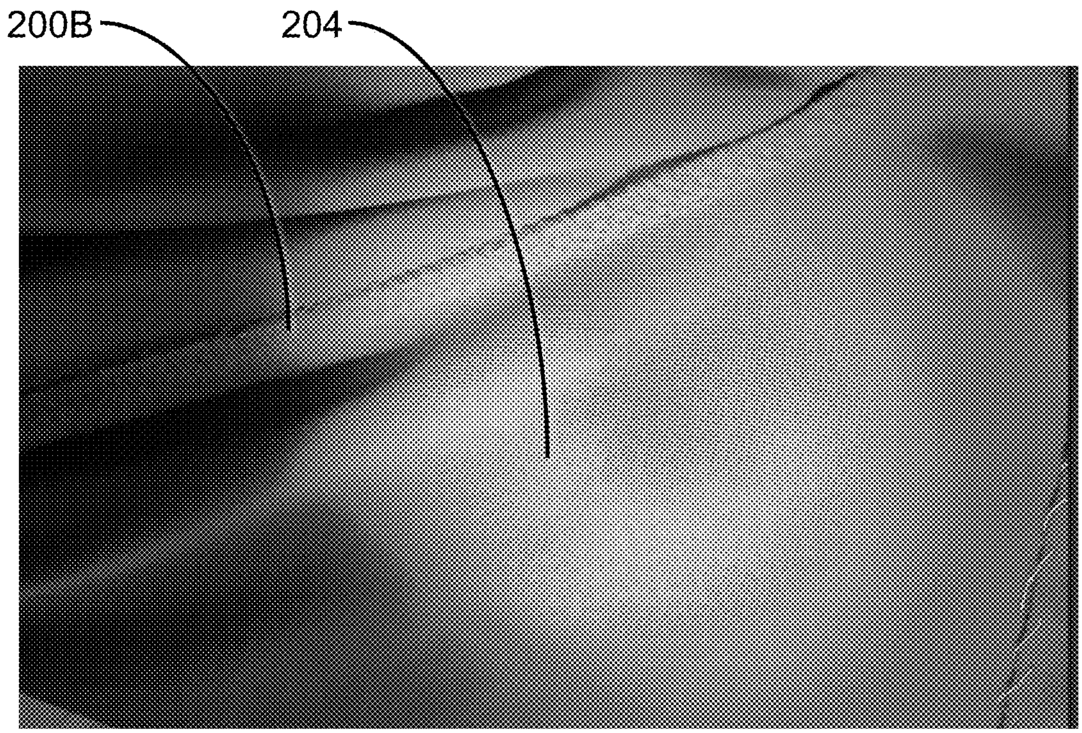
Figure 11F:
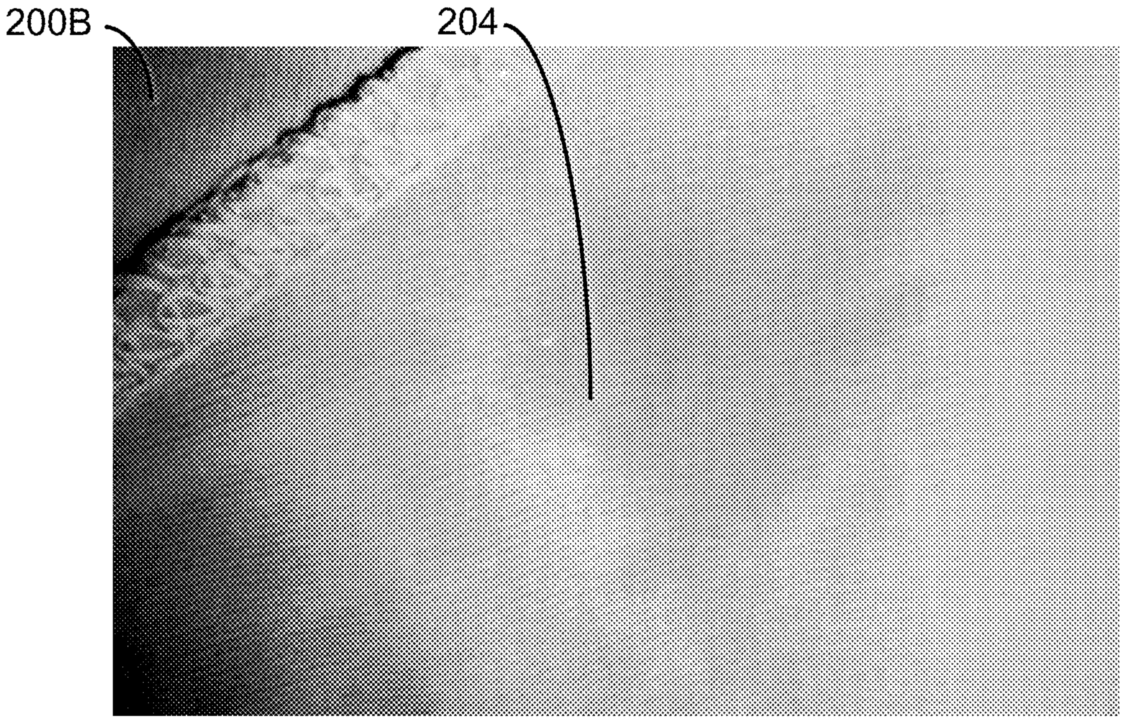

In hopes of repeating the removal of the white fluorescence that was seen in the right pit, the left pit was then further treated with a similar mix to the previous mix given to the right pit. In this order, the applied compounds were 3.5 g of NAC 2.1% at pH 9, 1.32 g of LysoB and 0.50 g of LysoB2, 1.3 g of CellulaseC, 1.18 g of AmylaseA, 1.58 g of PAPA, 1.0 g of PNAC5, 1.16 g of PMIX1, and 1.6 g of E3D rubbed into the fabric. This was stored in a covered pan with a bowl with some hot water inside the pan to keep the temperature at about 47° C. to 40° C. for about 70 minutes. About 0.5 g of Lemon Brite dish detergent was then applied to the treated region and rubbed into the shirt, then rinsed out in warm water. The targeted fluorescent zone was still present, though apparently slightly weaker, while the yellowish zone had been largely removed. The result for the treated left pit is shown in FIG. 11E showing the fluorescent region 204. The shirt was then washed in a full cycle with Tide® liquid detergent at 40° C. FIG. 11F shows the result for the treated left pit. These results in FIGS. 11E and 11F still show the fluorescent patch 204, but its intensity to the naked eye was significantly reduced through these treatments.

Fluorescent Testing with a Gray Perma-Odor Sports Shirt

Figure 12A:
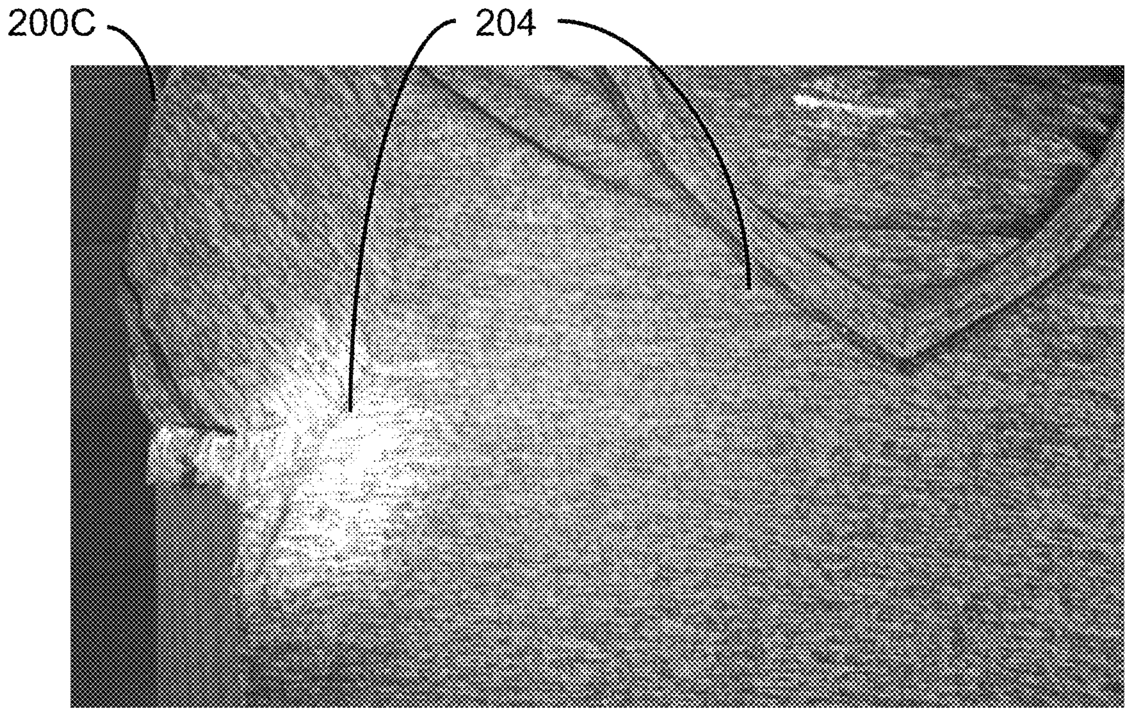
FIGS. 12A to 12S show photos of a gray polyester sports shirt previously afflicted with perma-odor, showing remnants of a possible biofilm visible via Calcofluor White fluorescence in UV light.
Figure 12B:
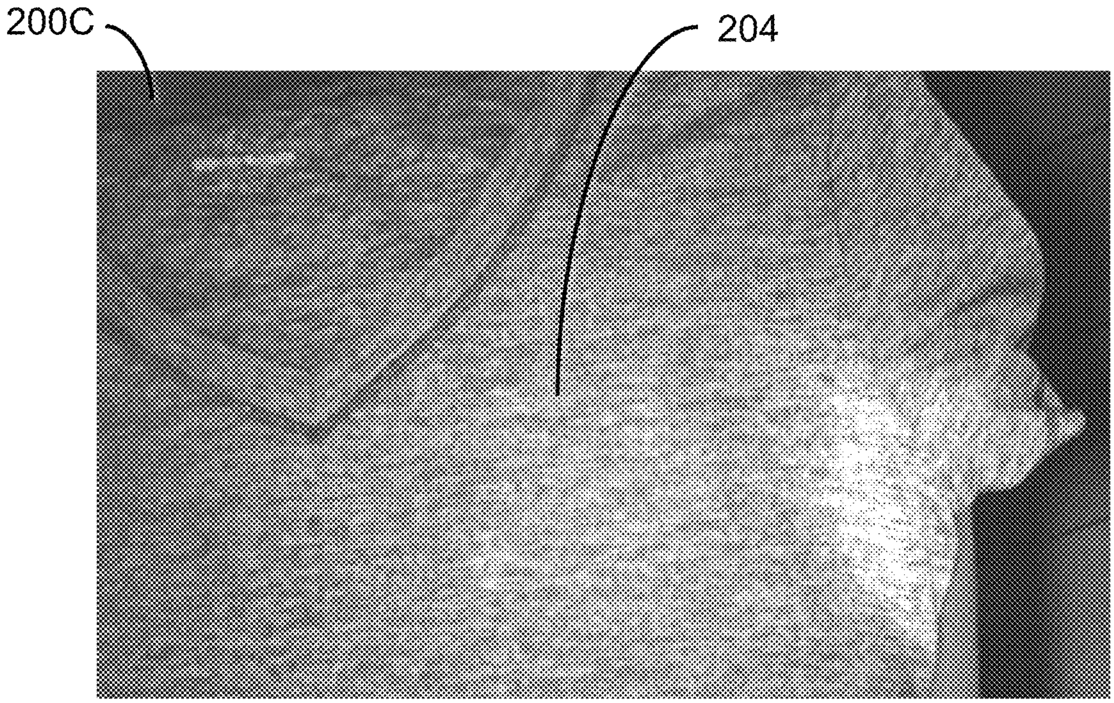
Figure 12C:
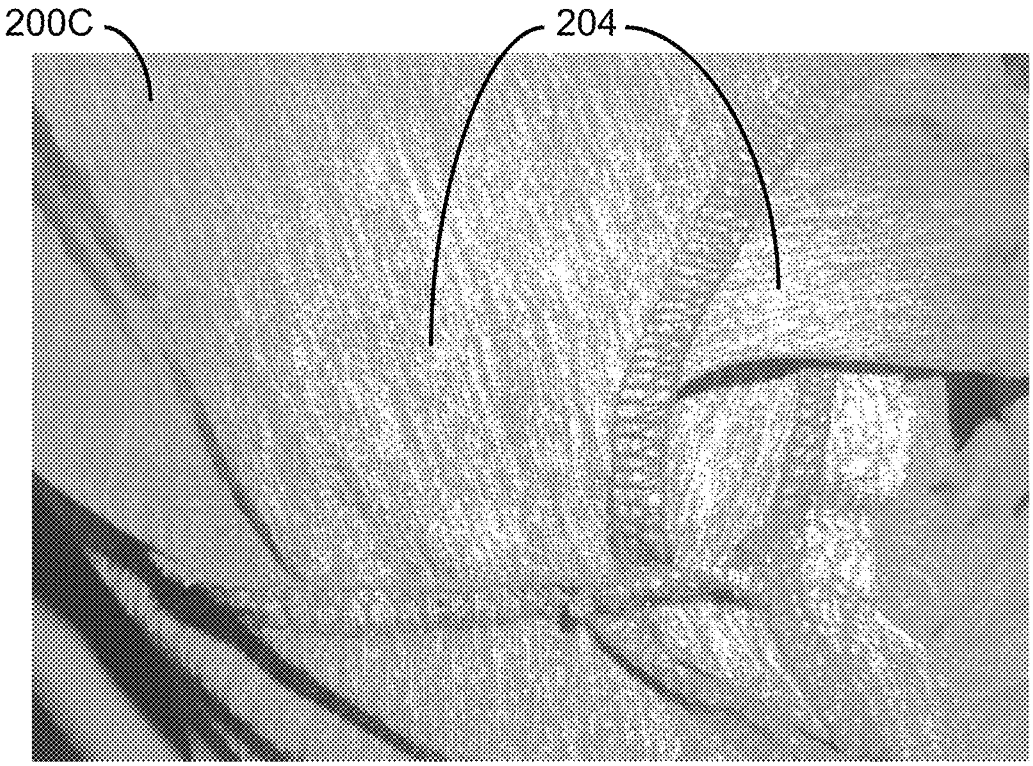
Figure 12D:
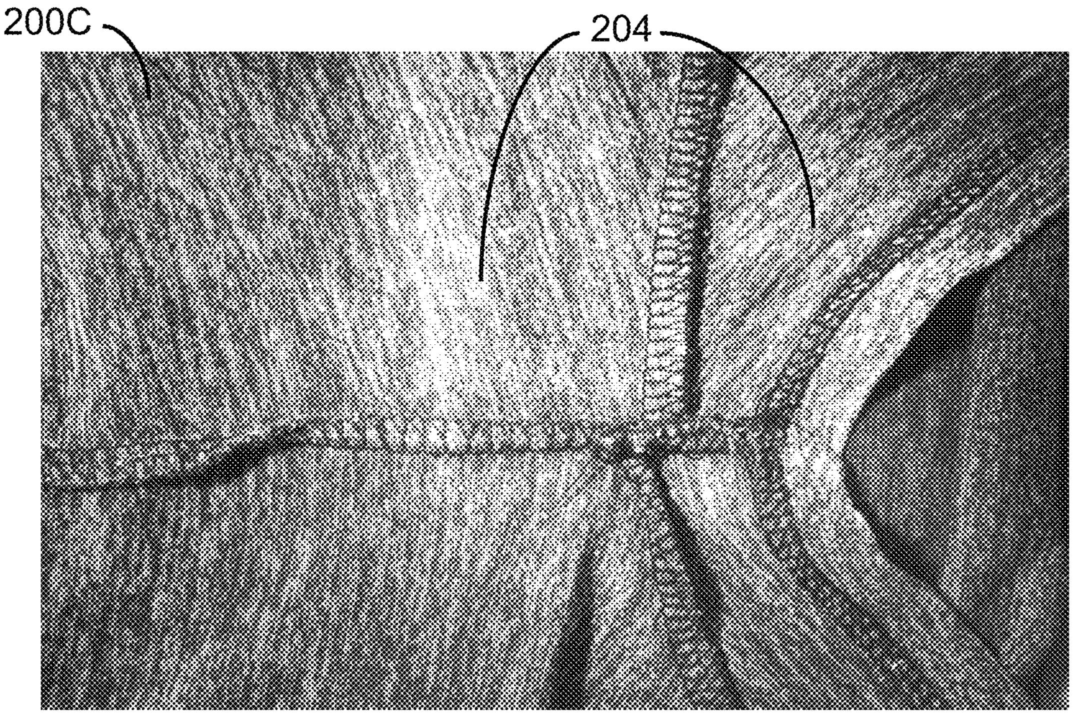
Figure 12E:
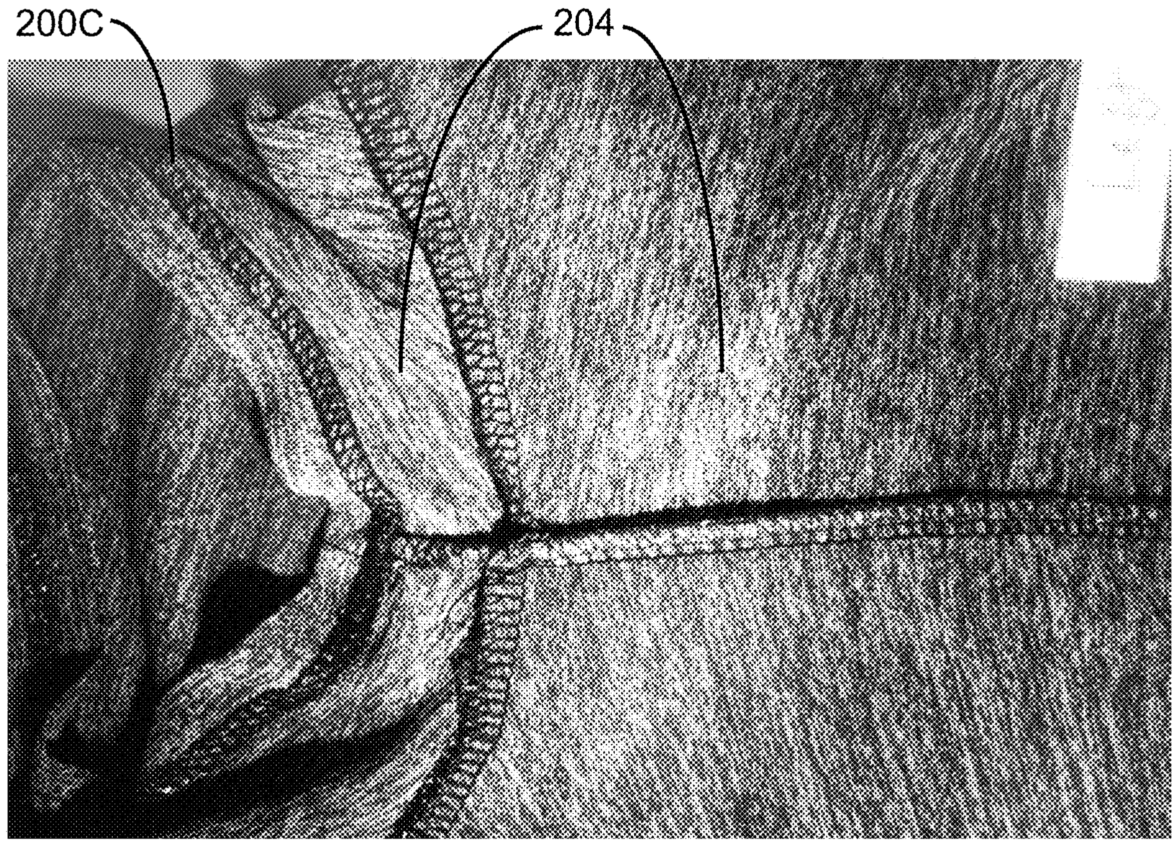
Figure 12F:
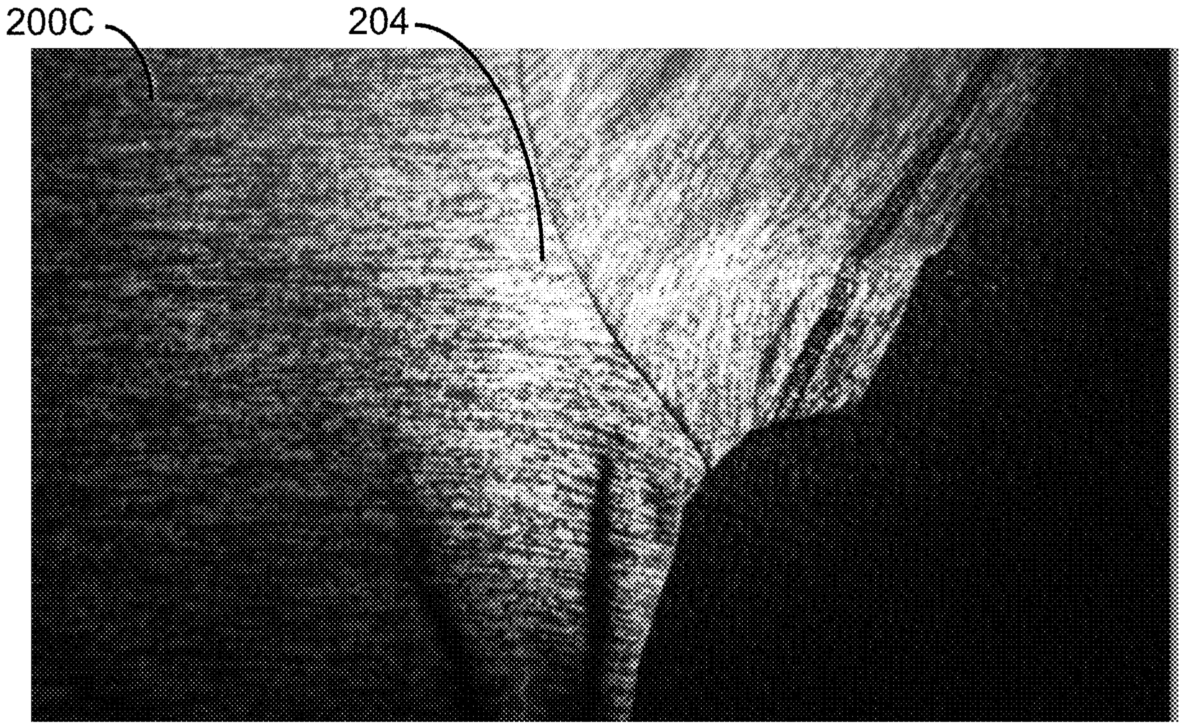

An athletic female who exercises almost daily reported that her polyester sports top showed symptoms of perma-odor following extensive use. This shirt, code named RA1, was a 100% polyester gray Melange Jersey knit shirt from Academy, Ltd. (Katy, Texas), made in Kenya. It exhibited strong fluorescence as is in both pits, with no need to treat with Calcofluor. FIG. 12A shows a photo of the right pit under UV light, and FIG. 12B shows the left pit under UV light. After turning the shirt inside out, FIG. 12C shows a close-up of the right pit under UV light without a UV filter over the camera lens. The result with the filter in place is shown in FIG. 12D for the right pit for comparison, and for the left pit in FIG. 12E. Fluorescence is visible on the inside and outside. A close-up of the left pit, right-side out, is shown in FIG. 12F.

It is believed that biofilm formation in the pits had created regions capable of firmly retaining optical brightening agents from typical laundry detergents. The shape, size, and position of the fluorescent zones were entirely consistent with biofilm regions formed by bacteria interacting with sweat from the armpit of an active exerciser. The fluorescent zones includes cuff regions of the short sleeves near the pits and occupied the center of the pits but centered slightly away from the center of the pit, shifted slightly toward the front of the body, consistent with the a slight forward lean during jogging or many other exercise routines that would allow the sweat to be inclined slight toward the front of the body. The intensity of the fluorescence was relatively high and seemed unaffected by ordinary washing. Several treatments were attempted to find ways to reduce the fluorescent zones.

Figure 12G:
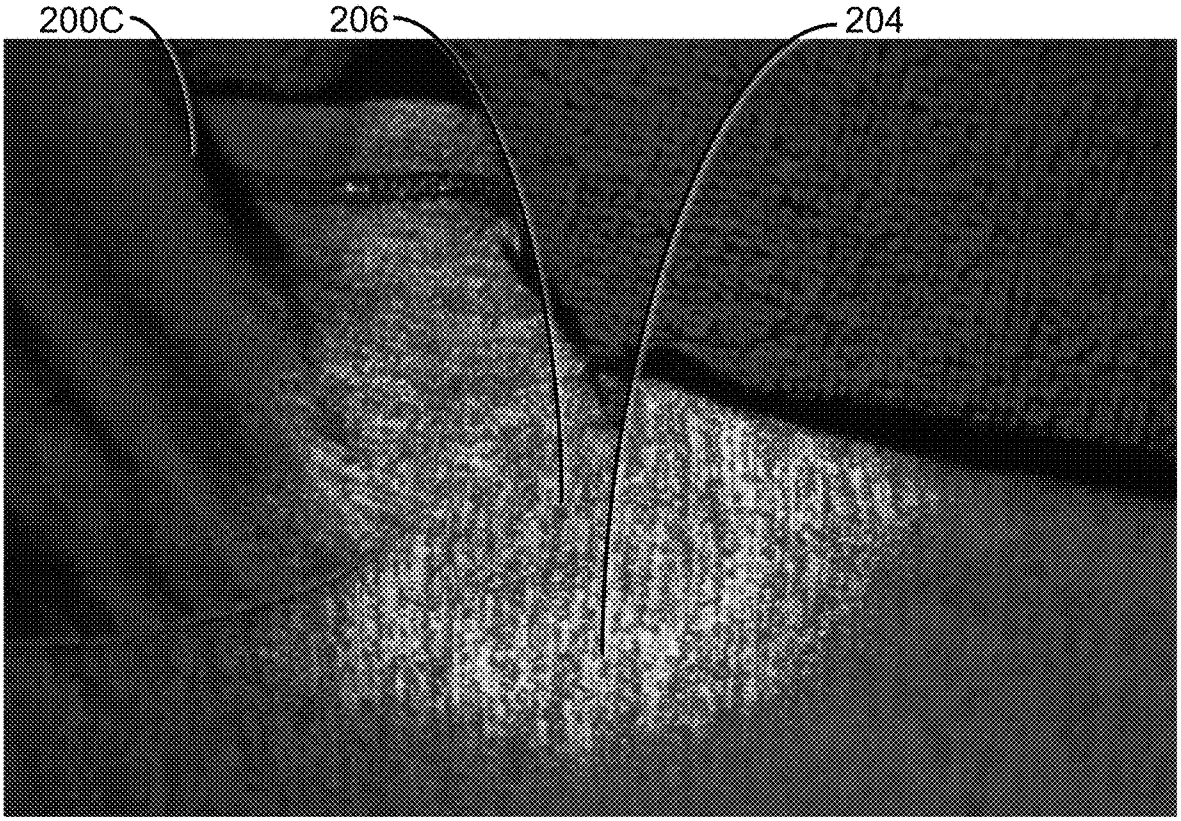

Shirt RA1 was then treated with E3D with 9.2 g in the right pit region and the left pit first treated 2.1% NAC, 4.54 g, and then 10.7 g of E3D. The initially dry shirt was then misted with about 40 g of water and placed in a plastic bag and kept at about 33° C. for 2 hours, then washed in a short cycle at 30° C. with Purex® Dirt Lift Action® Free and Clear detergent. After washing, the shirt was examined under UV light it was noted that the central region of the left pit showed significant reduction in fluorescence, giving a donut-shaped ring of fluorescence with a central void about 5 cm in diameter and an outer diameter of about 12 cm in diameter. See FIG. 12G, which was taken without the UV filter in place. The region with diminished fluorescent 208 is adjacent the more highly fluorescent region 204. The diminished fluorescence is clearer in color to the naked eye than in the images converted to black and white. The right pit (not shown) still appeared bright and lacked the visible reduction seen in the left pit, though it may have been slightly reduced in intensity also.

Figure 12H:
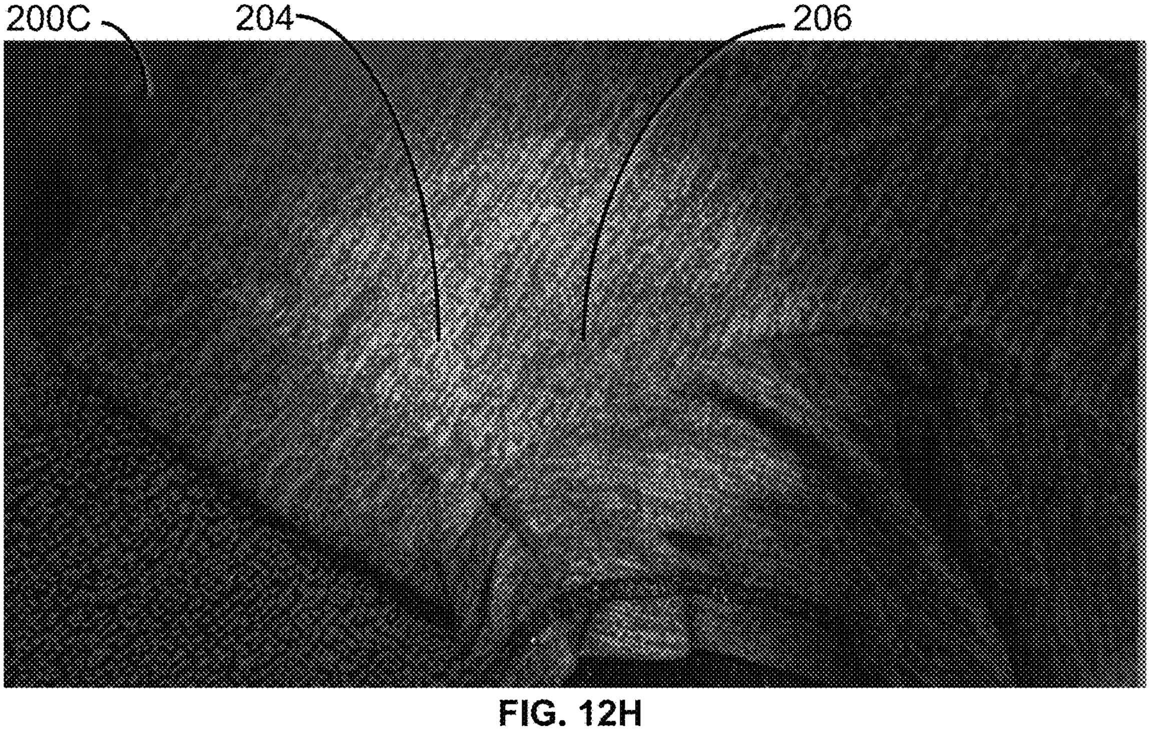
Figure 12I:
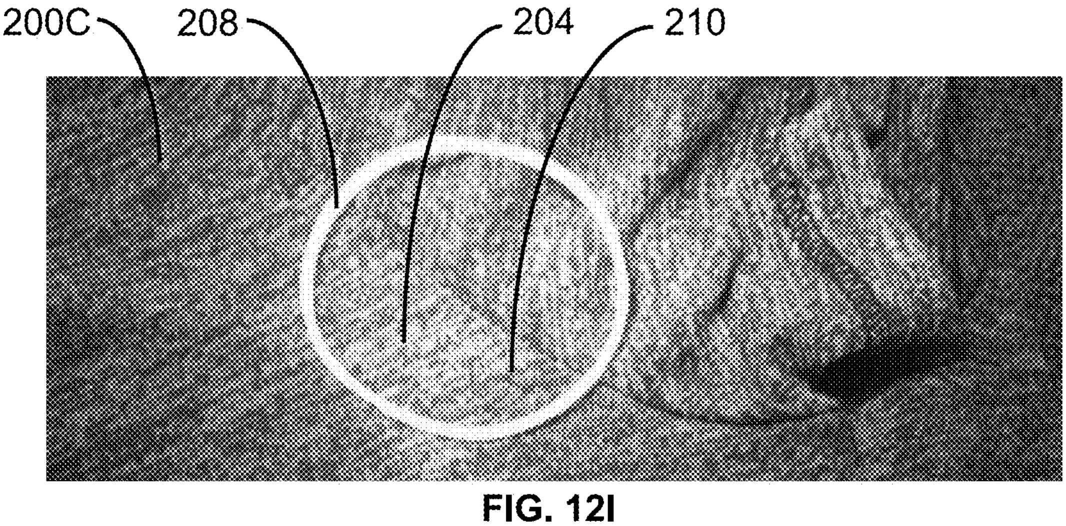
Figure 12J:
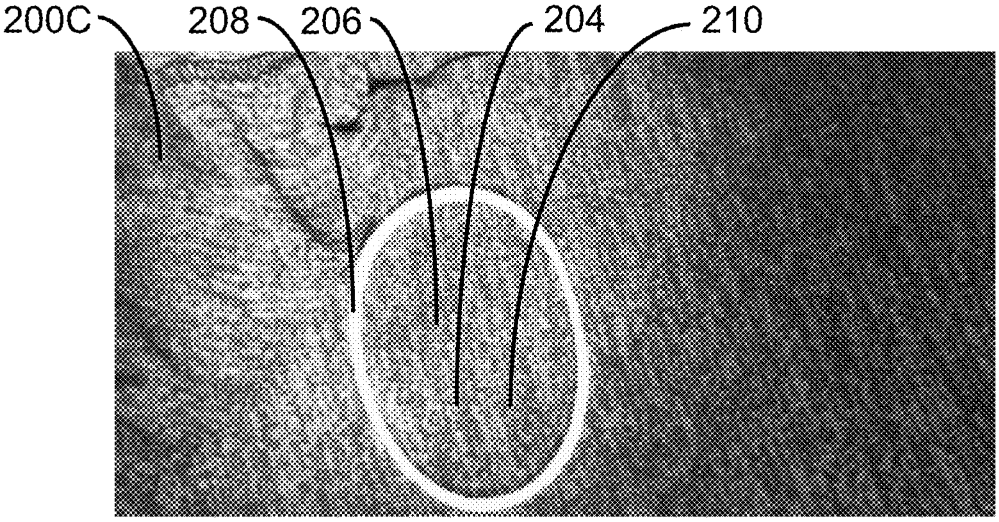
Figure 12K:
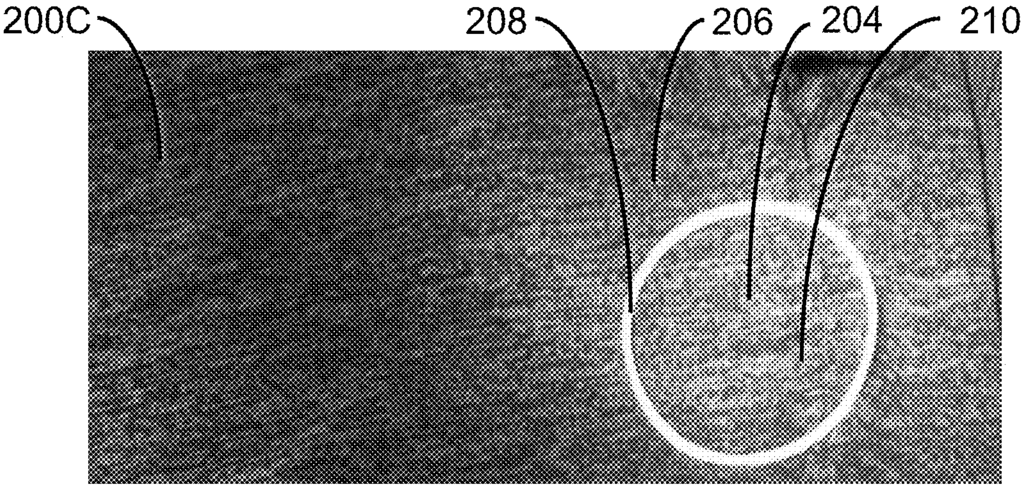

A second treatment was applied to the left pit of RA1 as 14 g of PNAC4 was applied to the pit and surrounding area. The shirt was heated to about 33° C. for 10 minutes. Then E3D was applied to both pits and adjacent areas, 9.6 g for the left and 9.9 g for the right. The shirt was them kept warm for about 10 more minutes then washed again in a short cycle. The washed shirt was exposed to UV light and a slight reduction in intensity was seen in both pits, but the glowing regions persisted with much the same size and shape they had prior to this wash cycle. The left pit under UV light is shown in FIG. 12H, also taken without the UV filter in place The washed and dried shirt was now used to test different treatments applied to three sections of the major fluorescent area of the left pit, as shown under UV light in FIGS. 12I, 12J, and 12K, showing upper, middle, and lower treatment zones 210, each marked by a respective boundary marker 208. The entire left pit and sleeve area was treated with 6.1 g of NAC spray, 2.1% at pH 4.0, followed by individual treatments in the treatment zones.

In the upper treatment zone shown in FIG. 12I, relatively high in the fluorescent area (toward the shoulder region), the treatment zone 210 (roughly a 5-cm diameter circle) was treated with amylase solution, but was first sprayed with 1.76 g of 2% NAC at pH 9.17 to raise the pH to about 7, as confirmed with pH testing paper, followed by dropwise application by pipette of 2.6 g of AmylaseA solution.

The lower treatment zone shown in FIG. 12K, received 2.45 g of PMIX1 dropwise by pipette to apply a mix of pectinases to a roughly 5 cm diameter circle in a lower fluorescent zone in the pit. FIG. 12K shows the boundary marker 208 (here a rubber band) marking the upper treatment zone 210 for pectinase solution. Treatment zone 210 contains portions of the fluorescent zone 204 in the left pit.

In FIG. 12J, the middle treatment zone 210 between the above-mentioned two zones, received treatment with papain and lysozyme. 1.7 ml of LysoPap solution was pipetted onto the oval treatment zone 210 about 5 cm wide and 3 cm tall. Then the right pit was prepared by spraying about 2 g of 2.15% NAC solution at a pH of 6.4 over the lower half of the fluorescent pit zone (not shown), then 2.3 ml of CellulaseA solution was applied by pipette to that region. Then 1.0 g of E3D was sprayed onto the treated area of the right pit and 1.6 g of E3D was sprayed into the treated regions of the left pit. After 10 minutes, the shirt was rinsed in 1 liter of hot water (about 45° C.) containing 1 g of Lemon Brite dish detergent. The shirt was gently agitated by hand for about 1 minute and then rinsed in fresh water for about 1 minute.

Figure 12L:
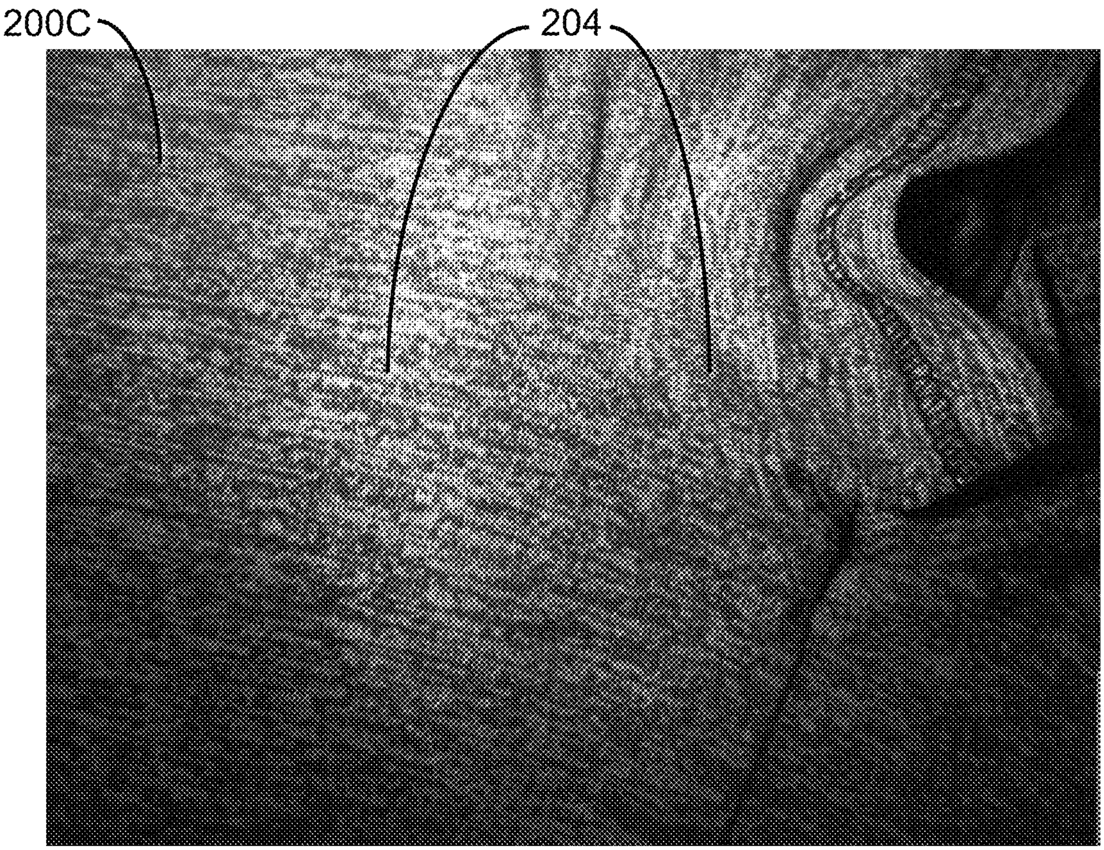
Figure 12M:
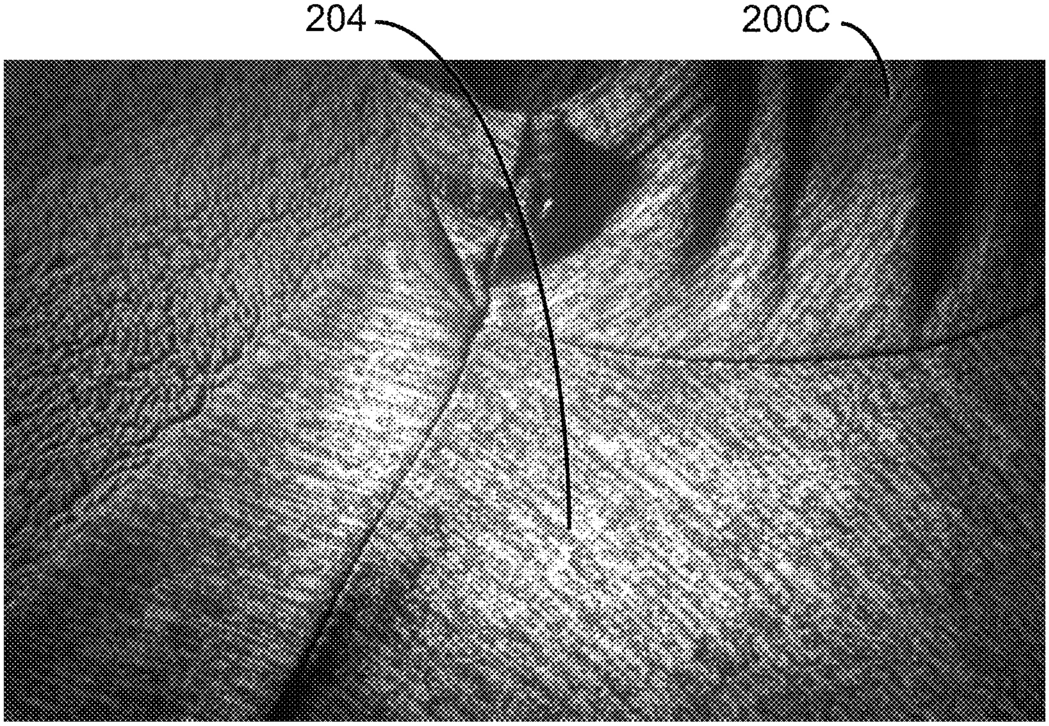

The treated regions were then rinsed in warm water and wrung to partial dryness. It was observed that the region of the left pit that had been treated with LysoPap solution (lysozyme and papain), the middle zone of FIG. 12J, had reduced fluorescence. The other regions looked much the same as before, though may have had slightly reduced intensity. The lower left pit was now treated with 0.76 g of 2.15% NAC solution at pH 6.4, and then 1.1 ml of PAPB solution were applied via pipette, plus 1.0 ml of AmylaseA, all in a 5-cm diameter circles over a fluorescent zone. After 5 minutes, another 0.3 ml of PAPB solution was applied followed by 0.1 g of Lemon Brite dish detergent in the targeted spot, which was then rubbed in. The fluorescence was not dramatically different, though it seemed slightly attenuated in both cases. The pit were examined in UV light and photographed with a UV lens in place, with results for the left pit shown in FIG. 12L and the right pit in FIG. 12M.

Figure 12N:
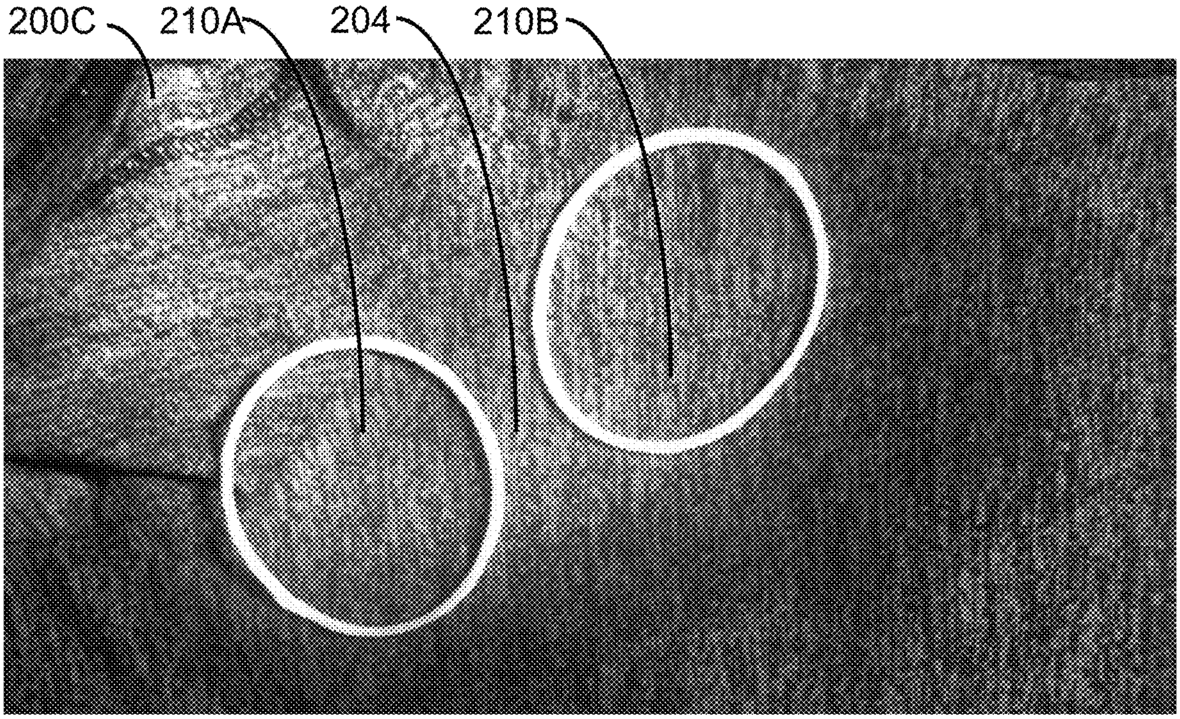
Figure 12O:
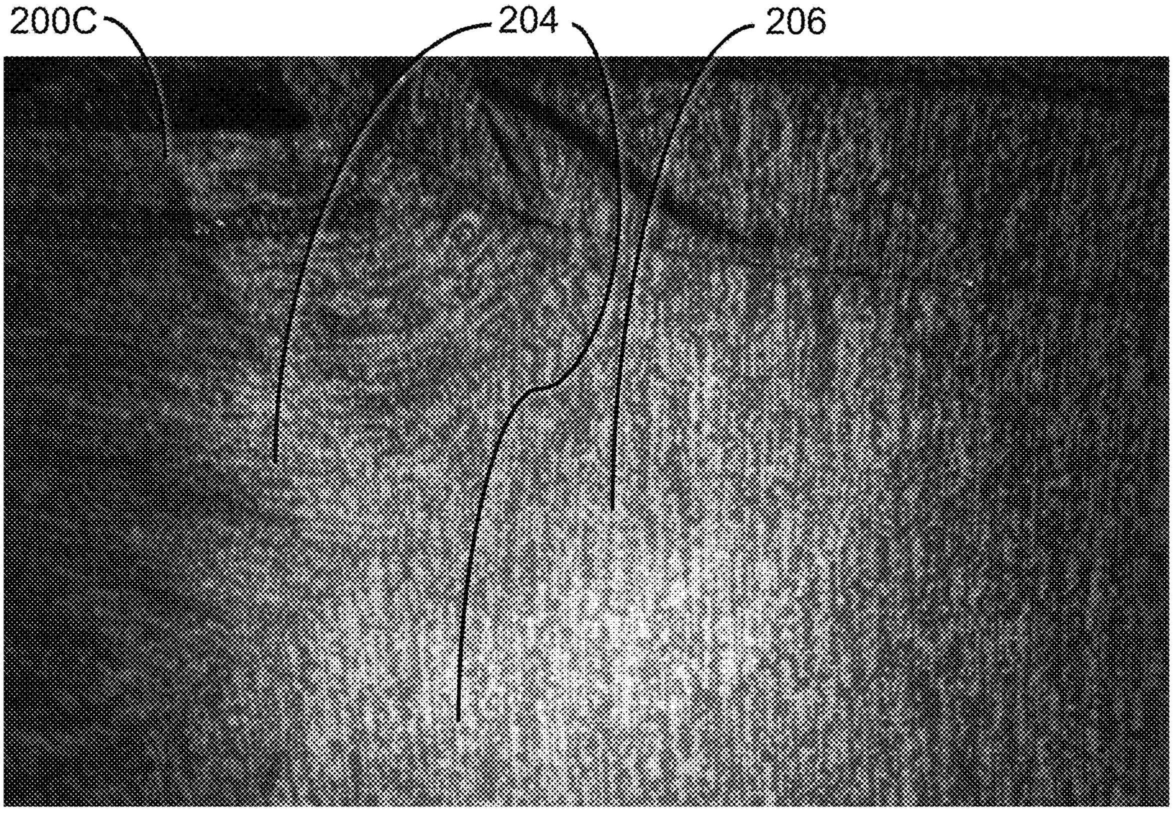
Figure 12P:
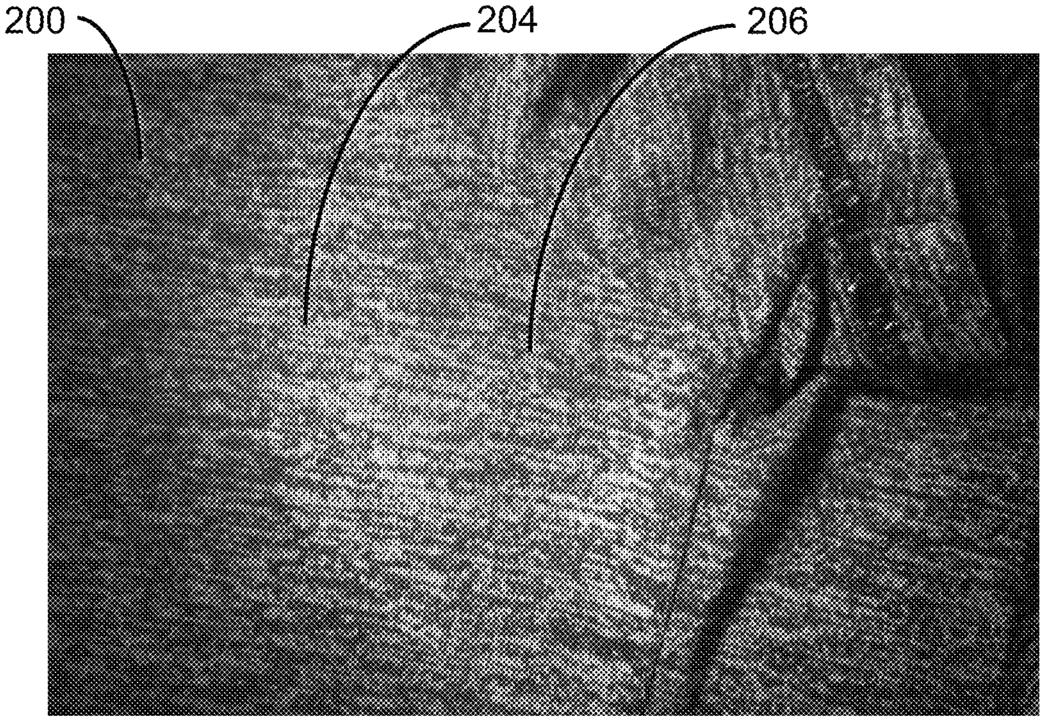

Now two treatment zones in the left pit were considered, both circles about 5 cm in diameters, as shown with UV light in FIG. 12N, showing a first treatment zone 210A and a second treatment zone 210B. The first treatment zone 210A was on the seam between the sleeve and the shirt in the pit area, and the second 210B was centered about 9 cm lower than the seem toward the adjacent side of the garment. In the second treatment zone 210B, 1.6 g of 2.15% NAC (pH 6.4) was applied, then 1.856 g of LysoA solution was applied by pipette uniformly in the section. In the first treatment zone 210A, 1.7 g of LysoA solution and then 0.75 ml of PAPB were applied by pipette, followed by spraying 1.0 g of E3D. The shirt after these applications beut before washing is shown in FIG. 12O, taken with the UV filter About 3 minutes later, 0.4 gm of Lemon Brite dish detergent was applied roughly uniformly to the two sections and rubbed in. The shirt was then rinsed in warm water. Reduced fluorescence was observed in the second treatment zone 210B of the left pit. See FIG. 12P, taken with the UV filter.

Now 2.2 g of 2.15% NAC was applied to the lower half of the fluorescent zone in the left pit, and 1.3 g of LysoA solution was the glowing portions on the cuff of the sleeve, with 1.6 g of 2.1% NAC at pH 6.4 and 0.3 g of Lemon Brite detergent over the sections. In the lower part of the left pit area, 2.3 g of LysoB were applied, with 1.67 g of PAPB and 2.58 g of CellulaseB, using a pipette. The shirt was kept at 32° C. for about 10 minutes in a plastic bag. The bag was then removed and the treated region was further provided with 7.7 g of PNAC5 (fluorescing regions: the lower left pit area and the cuff region on the left sleeve).

Figure 12Q:
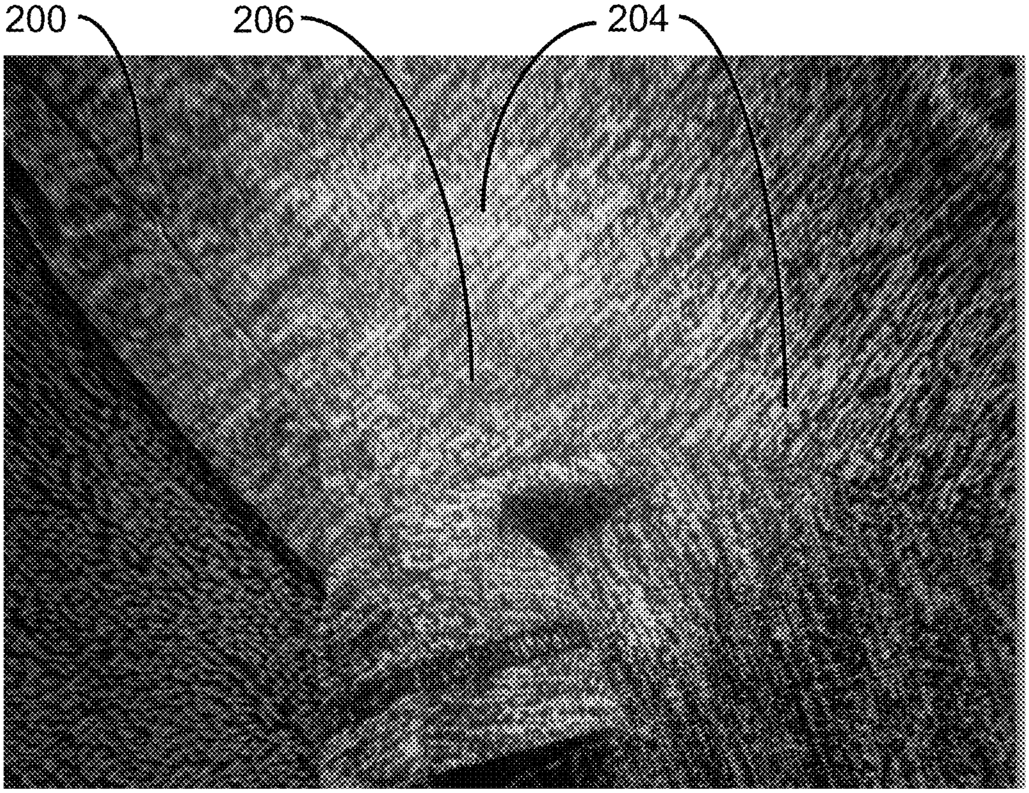

To raise the pH, a solution at pH 9.89 was prepared from 1.56 g sodium carbonate and 1.0 g NaHCO3 in 91 ml of water. 13 g of this alkaline solution were applied to the treated regions of the shirt and it was then returned to the plastic bag and kept at about 32° C. The shirt was then rinsed and examined. The fluorescence was perhaps slightly less but the dimensions of the fluorescing areas were substantially the same. See FIG. 12Q for the left pit.

The left pit was treated again with 3.76 g of 2.15% NAC at pH 6.4 applied to the lower half of the left pit along with 2.16 g of 2.15% NAC at pH 9.17. The upper half of the left pit was sprayed with 5 g of water. Then 5.6 g of CellulaseC solution was applied dropwise to both the upper and lower left pit, along with 1.94 g of AmylaseA. The shirt was kept at about 28° C. for 30 minutes, then rinsed with a roughly 1% solution of Comfort® brand laundry detergent. Residual fluorescence was still visible, but had declined more strongly in the lower half of the pit.

Figure 12R:
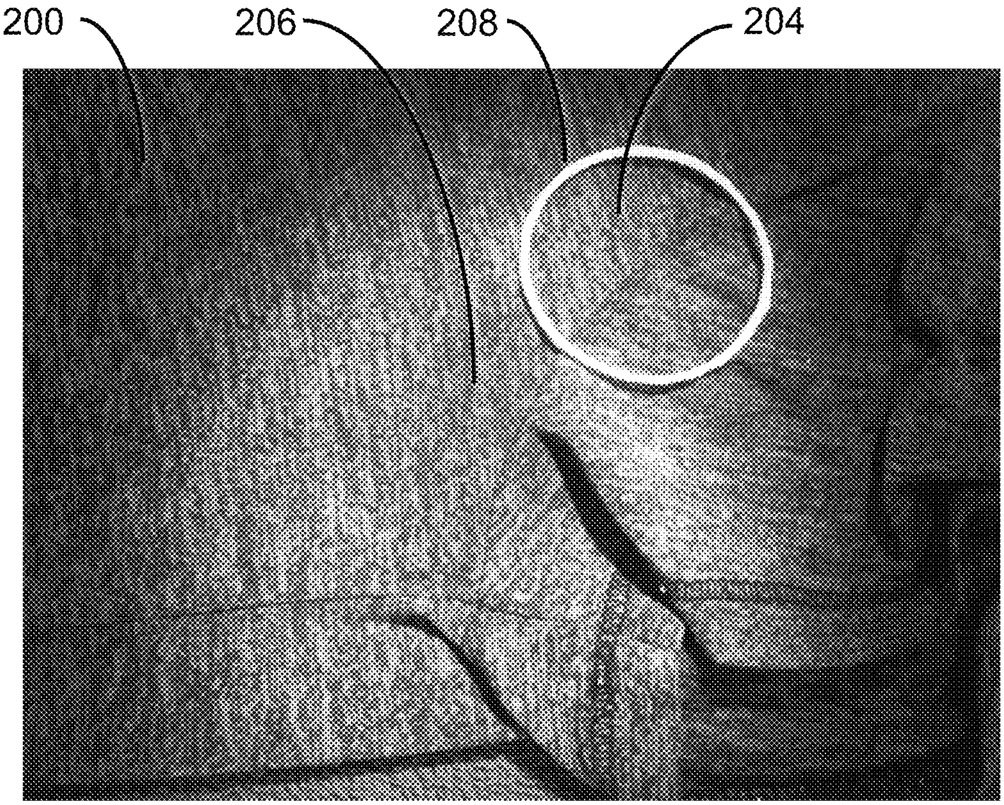

In a further test, 12 g of CellAmylA was applied by pipette to the entire fluorescing area of the lift pit and sleeve. After 5 minutes, 2.5 g of E3D was applied to the fluorescing areas of the left side. Then 1.4 g of 2% NAC at pH 6.4 and 2.25 g of PAPA solution was applied by pipette to the upper portion of the glowing zone, as shown in FIG. 12R under UV light and with the UV filter in place, also showing the state of fluorescence in the left pit with significant decline compared to early states and a prominent central region of diminished fluorescence 206, more plainly visible in color to the naked eye. The shirt was put in a plastic bag and held at about 33° for 1 hour. Slightly reduced fluorescence was again observed.

Figure 12S:
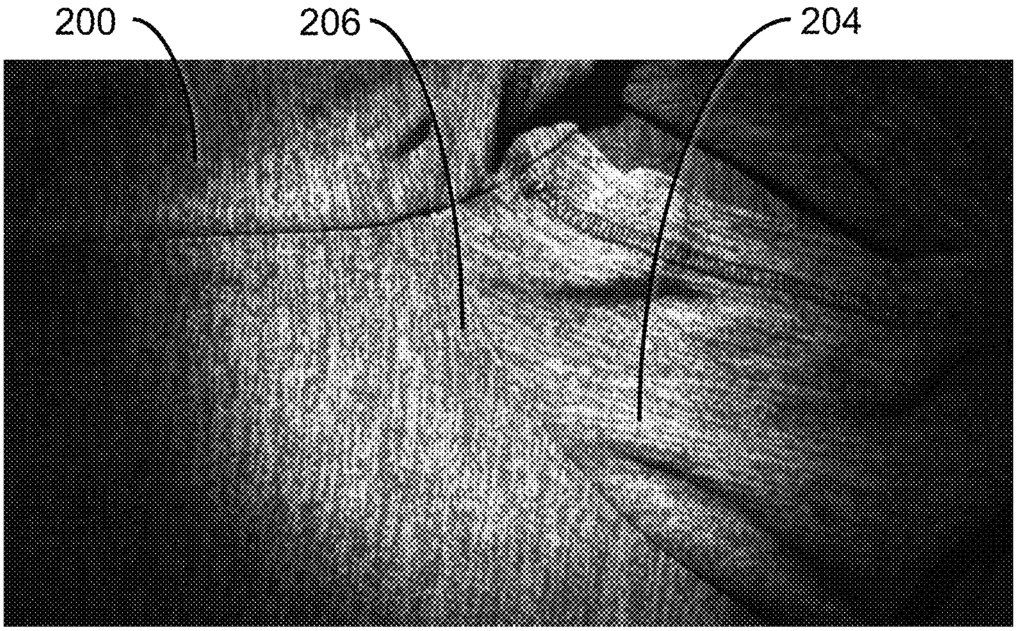

Next the right pit was considered. An upper zone, Section A, in the pit comprising the cuff of the right shirt sleeve having an oval shape about 5 cm wide and 3 cm tall was treated with 3 g of water and then 2.6 g of PAPA. A lower region of similar dimensions was denoted Section B was centered on the seam at the side of the shirt about 8 cm below the seam connecting the sleeve to the shirt. It was treated with 1.1 g of 2% NAC at pH 6.4 and 1.8 g of PAPA. After 20 seconds of mild rubbing, and rinsing, UV light showed further progress in removing the fluorescing material. The same pit was treated again. 3.46 g of 2% NAC solution at pH 9.17 was applied to the upper portion of the pit, while 2.35 g of LysoB was then applied to the upper regions and 2.25 g of LysoB was applied to the lower area. After rinsing, it was observed that fluorescence had been slightly reduced again. See FIG. 12S.

In another series, the effect of high sodium citrate concentration was tested. Based on a speculative hypothesis regarding high ionic strength and citrate ions in particular, a 12% solution of sodium citrate was prepared and 7 g was applied dropwise to the remaining fluorescent zone of the left pit and to a previously untreated fluorescent spot near the center of the shirt several inches below the neckline, followed by spraying 1.72 g of E3D over the treated regions. This was kept at about 30° C. for 3 hours, then rubbed with 0.3 g Lemon Brite detergent and rinsed in warm water. Water was then wrung out by wringing the shirt rolled up in a dry towel, and the treated area was visualized. The previously treated pits showed only very slight improvement at best, but the previously untreated fluorescent spot had been significantly reduced in brightness and appeared to be slightly smaller in extent. A reddish fluorescent zone that was adjacent the more central blue fluorescent zone, possibly from a newly incubated biofilm during a period of illness in which the shirt was worn, also showed significant reduction.

The right pit, whose fluorescence was much brighter than the left pit since the right pit had received relatively fewer biofilm busting treatments, was now treated. Two zones in the right pit were defined, a lower and an upper, both with strong fluorescence and both about 5 cm in diameter. Each received about 2.3 g of the 12% citrate solution. The upper received no further treatment agents, while the lower zone was sprayed with 1.86 g of E3D. The shirt was then incubated at about 40-45° C. for two hours, and then washed and rinsed as described for the left pit above. Examination in UV light showed only little reduction in fluorescence. The benefit of the citrate treatment may be most useful for biofilms that have not been treated multiple times already, though it is also believed to have an impact in disrupting living bacteria to reduce their potential to form further biofilms.

In another test, a strongly fluorescent zone on the cuff of the left arm closest to the left pit was treated with nattokinase and NAC by applying 2 g of the NattoNAC solution, waiting 5 minutes, and then applying 1.0 g of E4D solution. This was kept at 21-22° C. for about 4 hours, with about 0.7 g of moisture added again after 4 hours to keep the cuff moist to best permit bacterial spores to be effective. *

In another test, a fluorescent zone under the right pit, on the front of the shirt about 10 cm below the pit along the seam, was treated with both GASTRO-1 and PANNAC. First 0.79 g of PANNAC was applied to a circular area about 2 cm in diameter, and after about 5 minutes 1.0 g of GASTRO-1 was applied to the same spot. After 15 further minutes, 0.75 g of E4D was applied. This was kept at about 22° C. for about 4 hours.

The Triathlon Shirt, TR1

The triathlon shirt TR1 was examined. Since initial biofilm busting treatments, it had been worn many days without washing and the pits had a cheesy smell. CF1 was applied to both pits, 6.48 g to the left and 4.45 g to the right. In a test spot elsewhere on TR1, it was observed that the Calcofluor White dye persisted after rinsing with water, but could be substantially removed with the aid of a surfactant.

A laundry cycle (short cycle, 38 minutes at 30° C.) was run with shirt TR1 and Dec1. Based on UV visualization, the optical brightener washed out of TR1 except in the pits, suggesting strong attachment, perhaps due to biofilm material.

Figure 13A:
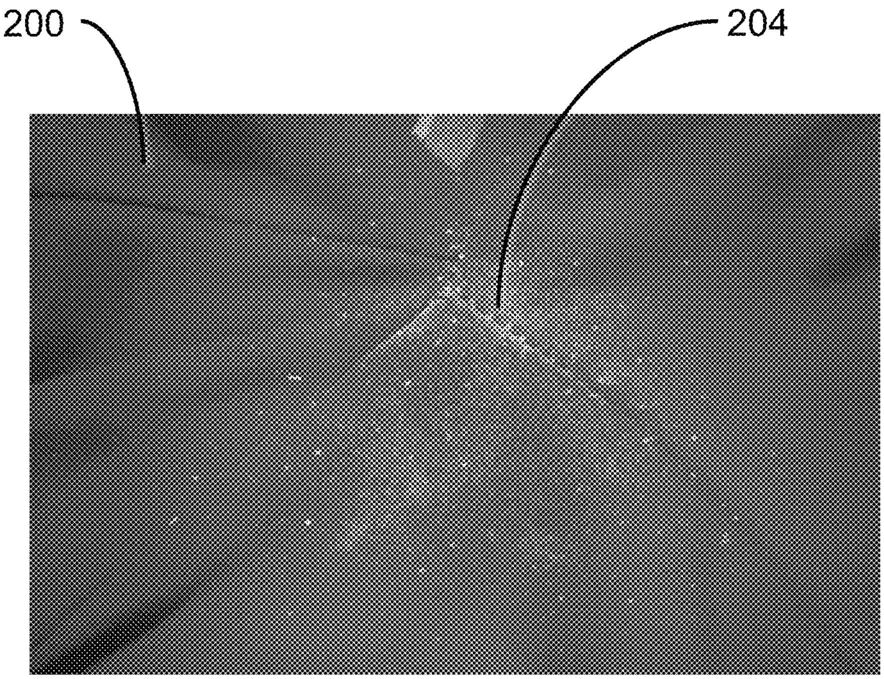
FIGS. 13A and 13B show photos of the right and left pits of a triathlon shirt under UV light.
Figure 13B:
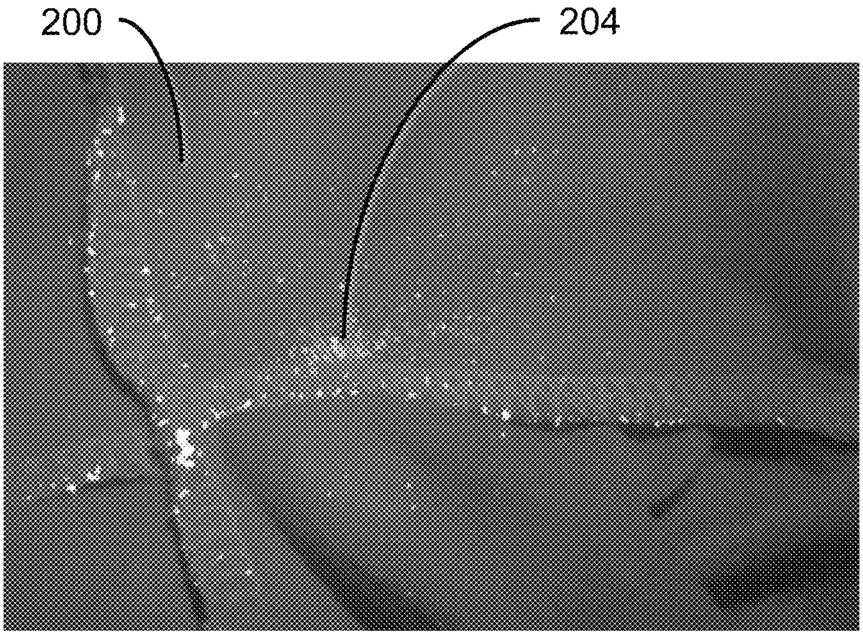

FIGS. 13A and 13B show pits of shirt TR1 under UV light from the Lightfe® mini-UV lamp with the UV filter in place. This image was taken after the initial perma-odor problem had been overcome with biofilm buster treatments previously described. Since that time, it had been worn during roughly a dozen exercise sessions and many hours of wear to try to revive the biofilm problem. UV visualization shows what may be biofilm material.

Artificial Sweat Trials

Several shirts were treated with an artificial sweat composition, bringing together several approaches in past research. Human sweat comprises a variety of lipids such as squalene, urea, cholesterol, and several fatty acids, proteins and amino acids, sugars, salts, and other agents. Initial efforts involved a concentrate with many components 2 or more times more abundant than occurs in sweat, but effort to grow biofilm with the concentrate were poor, perhaps because the sodium level was too high. Then a non-concentrated mixture was prepared, labeled AS-B. A 400-ml batch was prepared. An aqueous phase was first prepared with 1.50 g NaCl, 1.3 g lactic acid, 0.6 g urea, 1.2 g glycerin, 1.2 g of peptone (a source of amino acids), 0.25 g of a Centrum® MultiGummies vitamin pill for adults (a product of Pfizer, New York, NY) to provide some of the vitamin and mineral nutrients in sweat, and 2.0 g of honey (Chinese vetch honey) to provide glucose and other carbohydrates, and the mixture was blended into 30 ml of water and then heated to boiling (in part to denature any enzymes in the honey). Then 1.1 g of squalene was stirred in. The pH was 6.5. An oil phase was then prepared with 0.65 g of liquid lecitihin, 3.5 g of oleic acid, 0.405 g of palmitic acid, 0.006 g of ascorbic acid, 0.438 g of stearic acid, 0.008 g of vitamin E, 0.79 g of jojoba oil, 0.405 g of cholesterol, which was heated and blended with 8.6 g of the watery extract of soft Japanese tofu (tofu on cloth in a woven reed basket, through which the watery extract drains). This was then blended vigorously with the water-phase solution as water was added to reach a total volume of 400 ml and labeled AS-B.

Several shirts were treated with various doses of AS-B. The triathlon shirt (TR1) described above was treated, after the tests already described, with 3.5 g of AS-B in each pit and kept at about 27° C. for 24 hours. Changes in the fluorescence in the pits were difficult to assess, and it is unclear if the trial was successful.

More visible success came after considering recent research results on the tenacity and heat resistance of some microbes in dry biofilms. It was then hypothesized that better visible biofilm growth in a shirt might occur if the biofilm is allowed to dry, be remoistened, and dried again several times before finally being washed and dried.

Figure 14A:
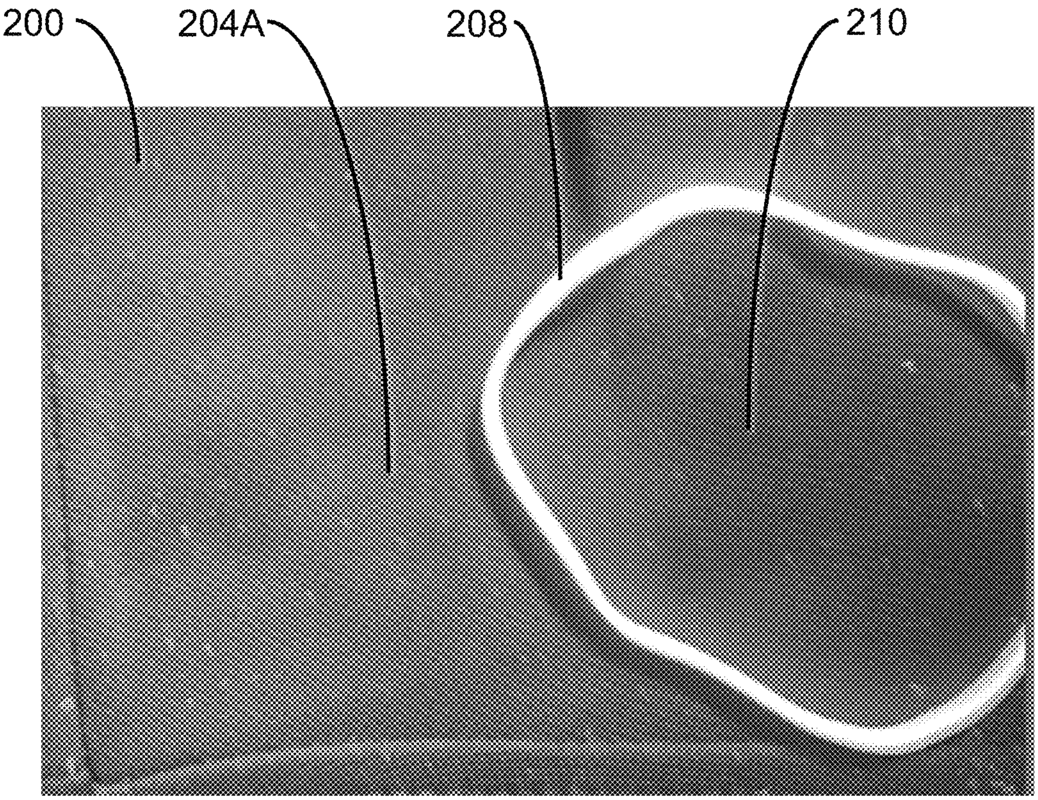
FIGS. 14A and 14B are photos of a pit in a men's polyester golf shirt having apparent biofilm, in which additional biofilm was grown through application of an artificial sweat composition.
Figure 14B:
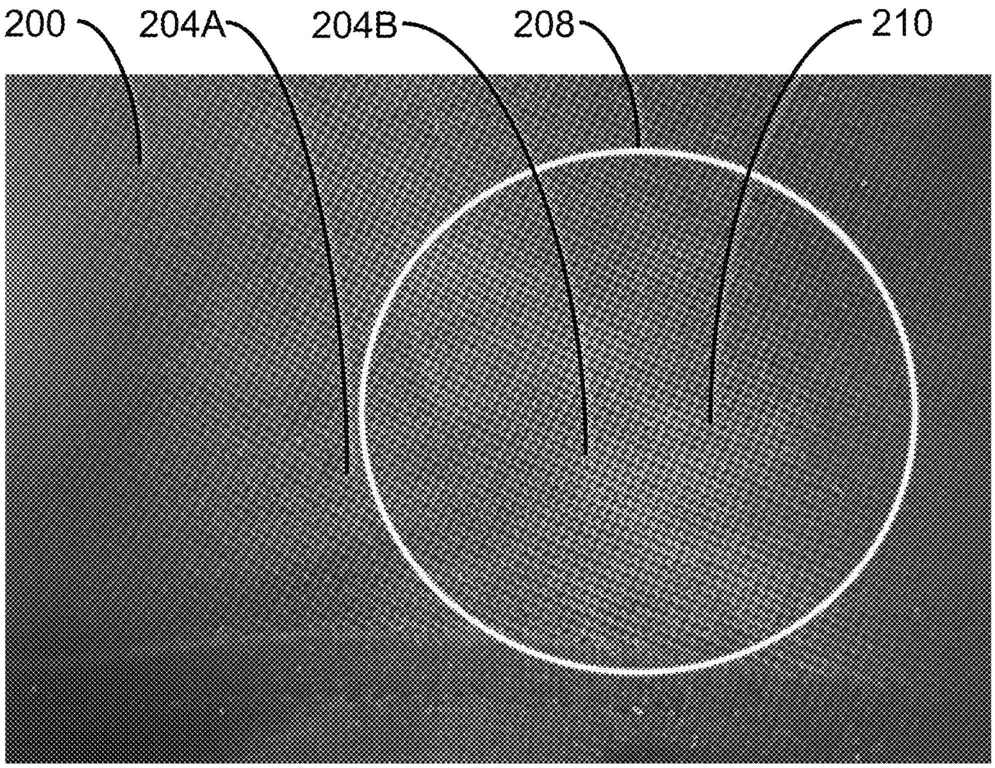

For that experiment, a men's polyester Walter Hagen brand long-sleeved golf shirt, black in color, was purchased at a Goodwill store in Appleton, Wisconsin that showed fluorescence in both pits under UV light, most strongly in the right pit, a shown in FIG. 14A, where a rubber band serves as a boundary marker 208 for the treatment zone 210 about to be sprayed with artificial sweat spray AS-B. The initial fluorescent region 204A is visible in this image taken through a UV filter by an iPhone 11 camera. Before treating with artificial sweat, both pits were treated with about 3.7 g each of E7D spray, wrapped in plastic, and allowed to site overnight before being washed with TIDE® liquid detergent and tumble dried. The fluorescent zone in the right pit appeared slightly weaker at best and was still prominent. Then the AS-B artificial sweat solution was applied to the right pit, at the edge of the existing biofilm area over an approximately 8 cm square area with about 1.5 to 1.8 g of AS-B applied per application, and also applied to a non-fluorescent region at the lower hem directly below the right pits with a dose of about 1.2 to 1.5 g per application over about a 6 cm square area, with applications occurring 5 times spaced apart by 6 to 12 hours over a 3 day period, and generally maintained around 24° C. while wrapped in a plastic bag, with added moisture throughout the shirt (about 40 g of added moisture) to reduce wicking and premature drying of the treated areas in the right pit and lower hem. After the first 4 treatments, the shirt was treated again but allowed to air dry without being wrapped in a plastic bag. This, any biofilm would have experienced repeated cycles of wetness and dryness, with the goal of creating a "hardened" dry biofilm. After the last drying stage, the shirt was hand-washed for about 10 minutes in about 3 liters of warm water with 8 g of added TIDE® Simply Clean laundry detergent, a detergent highly fluorescent in UV light and believed to contain Calcofluor White. After rinsing and tumble drying, the shirt 200 was examined in UV light, as shown in FIG. 14B and in addition to the initial fluorescent region 204A, was seen to have an new fluorescent region 204B that may represent the growth of new biofilm material capable of absorbing the optical brightener in the laundry detergent. Here the approximate treatment area 210 is shown as a circle drawn on the image serving as a boundary marker 208. The new fluorescent region 204B had developed outward and over the rightmost edge of the initial fluorescent region 204A, with the new fluorescent region 204B displaying stronger fluorescence than the original biofilm region 204A. However, the region that had been sprayed with AS-B on the hem, where no biofilm had been established before, did not show visible biofilm growth when observed in UV light. Thus, without wishing to be bound by theory, at least in this case it is believed that rapid biofilm growth with the AS-B artificial sweat mixture and perhaps with real sweat may be most successful when an active biofilm is already present that can rapidly exploit the nutrients provided in the artificial sweat to grow and expand in size.

Confocal and Fluorescent Microscopy

To further examine potential biofilm zones in various clothing items with a history of perma-odor, work was carried out with confocal and fluorescent microscopy at the NanoCenter at the University of Minnesota using a Nikon C2 Confocal microscope operated with Nikon Elements software. The microscope functions as a manual inverted microscope, a fluorescence-enabled microscope, or a confocal microscope system, depending on preference. Further details are provided in K. VanderWaal, "University of Minnesota Nano Center Standard Operating Procedure [for the Nikon C2 Confocal Microscope]," 2016; http://apps.mnc.umn.edu/pub/pdf/equipment/nikon_confocal_sop.pdf. For observing fluorescent regions in shirts, rather than cutting and mounting samples, the shirts were preserved by measuring them in situ while stretched across the measurement space. For confocal microscopy, the UV laser at 405 nm wavelength was used, while for fluorescent microscopy, the UV fluorescence was observed from a widefield white light observed through a DAPI filter cube was used to see the resulting blue fluorescence (this filters the light to an excitation band of 340-380 nm, and then filters the emission band to 435-485 nm). In both cases, no fluorescent dyes were added to the material, but the inherent fluorescence in the clothing, believed to be due to optical brighteners, was relied on.

Figure 15A:
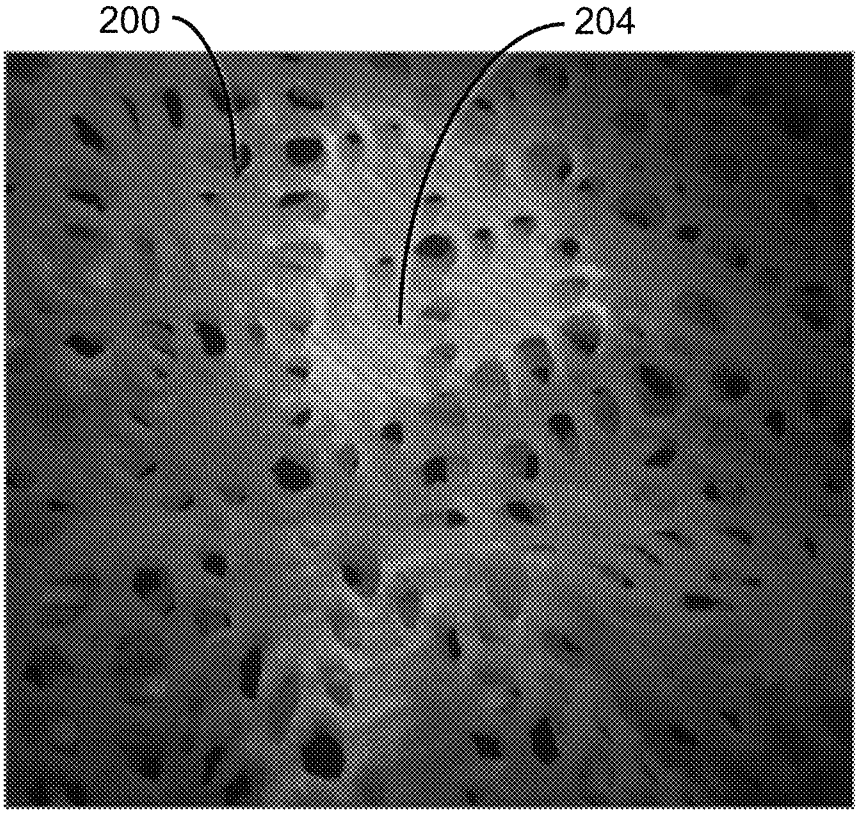
FIGS. 15A and 15B show views in UV light of the left and right pits of a lace dress with a perma-odor problem, displaying strong fluorescence in the pit.
Figure 15B:
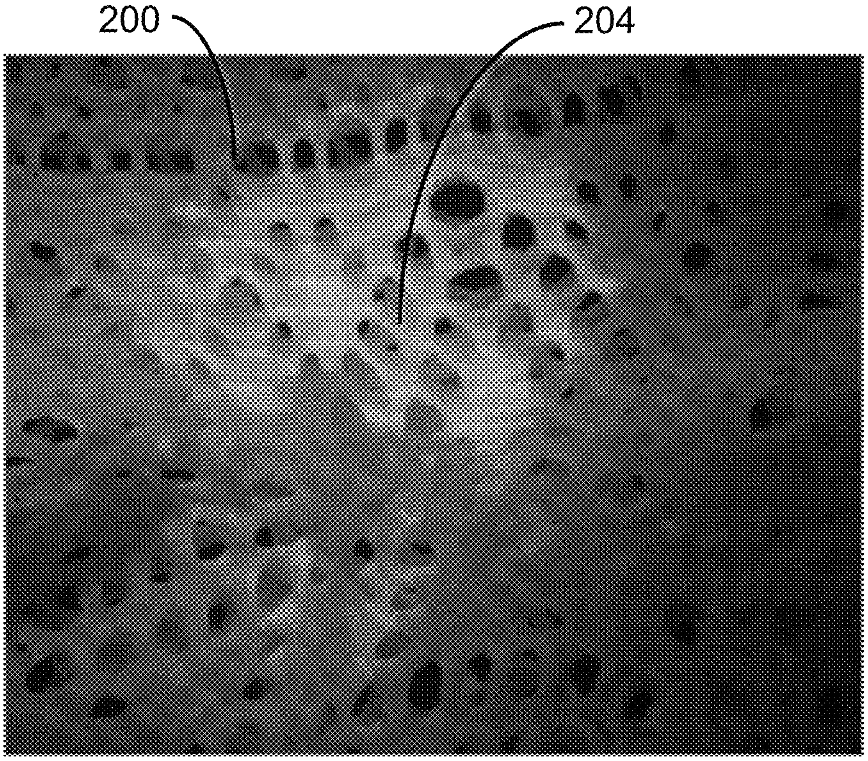
Figure 16A:
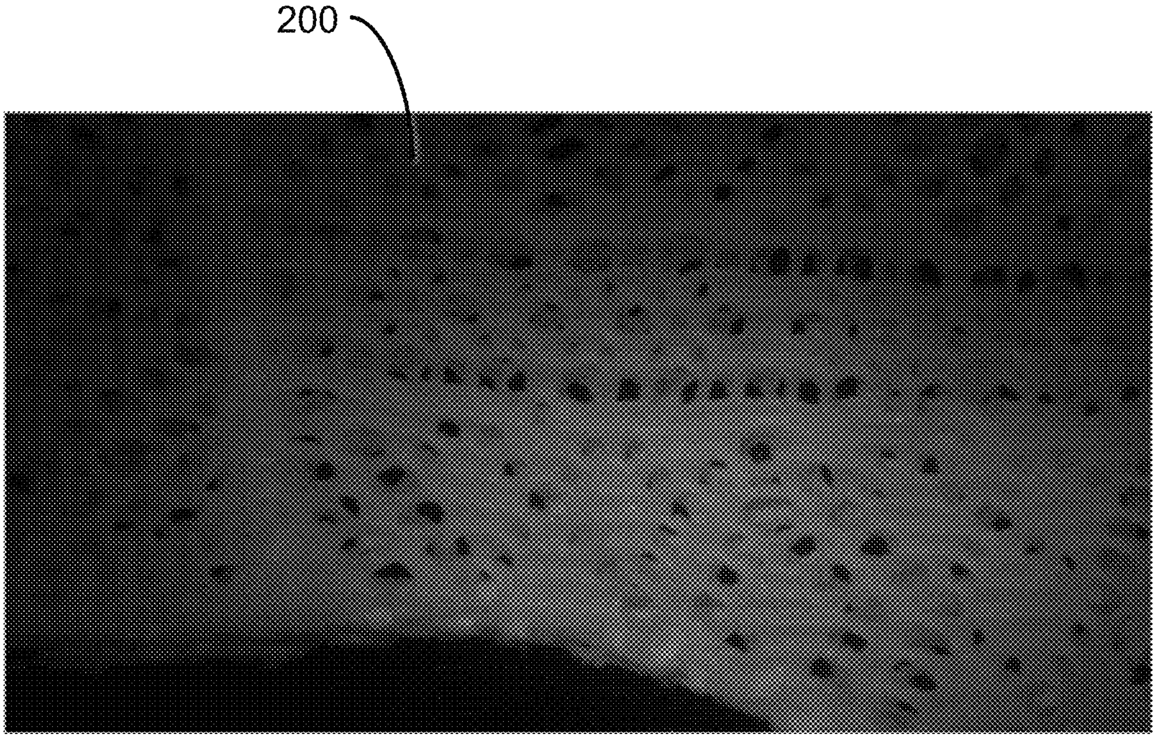
FIGS. 16A and 16B show views of the pits of the lace dress in UV light after treatment with bioenzymatic liquid and a biofilm attack agent.
Figure 16B:
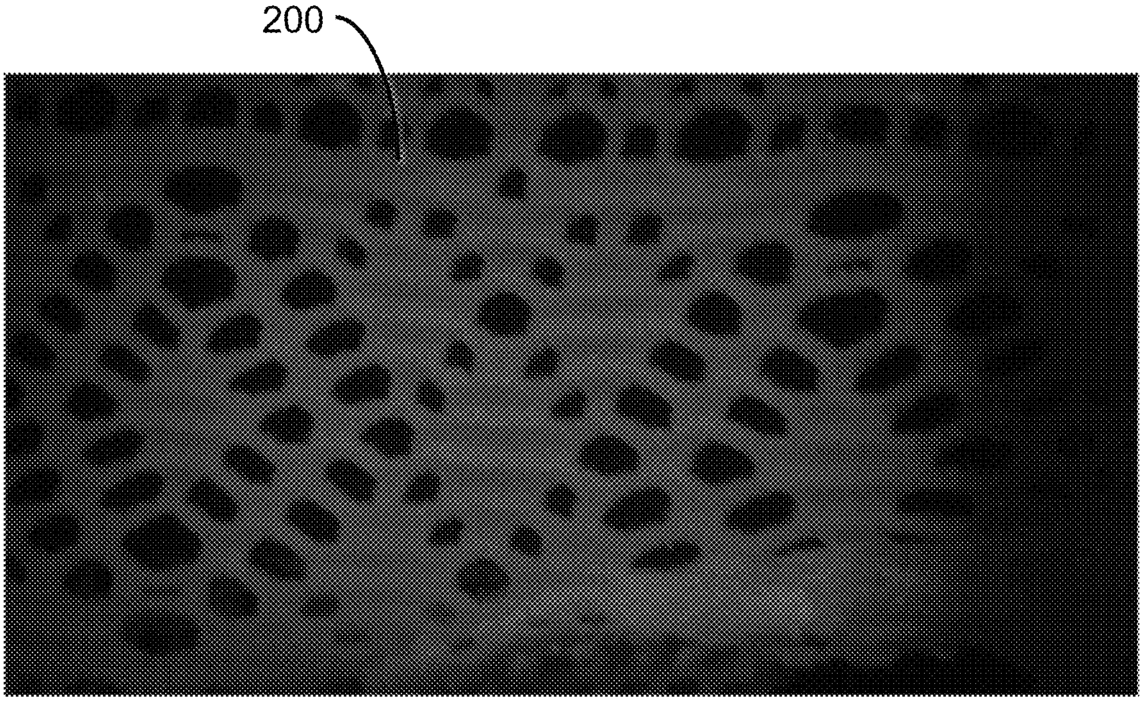

FIGS. 15A and 15B show the left and right pits in UV light, respectively, of a lace dress provided by a subject who complained of persistent odor that would not wash out from the dress. The washed dress 200 was examined under UV light and prominent fluorescent zones 204 in the arm pit areas were observed, with typical characteristics: the were biased toward the front of the body and in the pits, consistent with typical sweat patterns in clothing. The fluorescent zones 204 were examined with both fluorescent and confocal microscopy (discussed below). The pits of the dress were then treated. The right pit was treated with 0.7 g of E6C (a bioenzymatic mix described above), with added moisture present in that portion of the dress resulting in roughly a 2:1 dilution. For the left pit, first a pretreatment was applied by spraying 2 g of a biofilm attack solution, PANNAC, onto the biofilm region and adjacent fabric. After a 5-minute wait, 1.54 g of E6D was applied to the same region. With some moisture present in the dress, it is estimated that the effective dilution of the E6C solution was about 3:1. The dress was wrapped in a plastic bag and kept at about 27° C. for 11 hours, then washed by hand in warm water with GAIN® detergent. Surprisingly, as shown in FIGS. 16A and 16B for the left and right pits, respectively, in UV light after treatment, the fluorescent matter in both pits was almost completely eliminated, with only a small region (about 2% of the original extent) still fluorescing in the left pit, but essentially nothing visible to the eye remaining in the right pit.

Figure 17A:
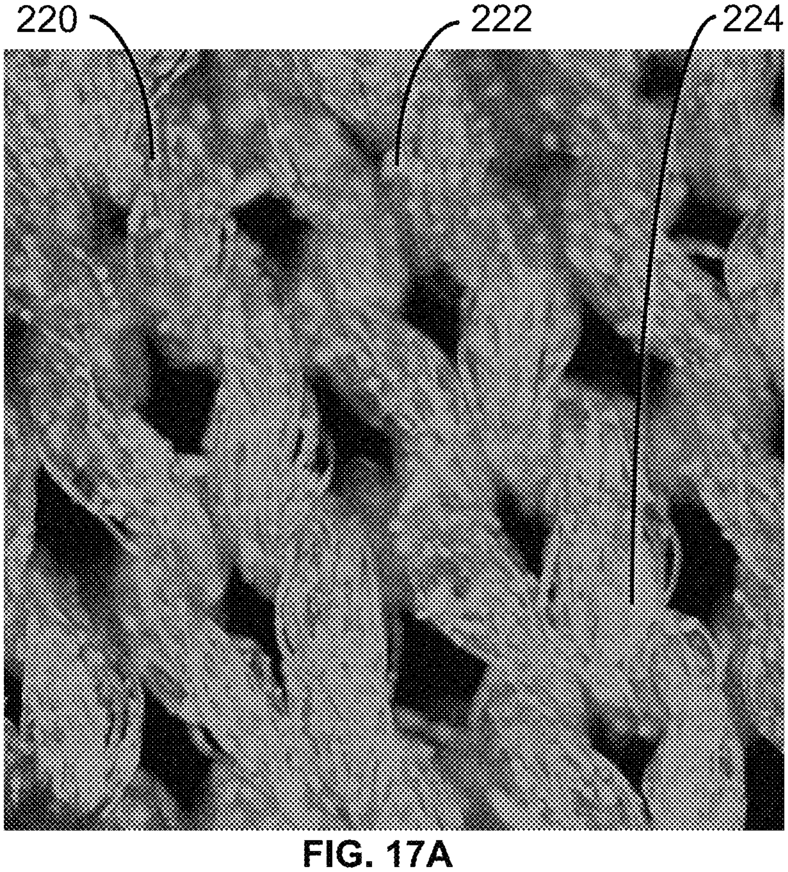
FIGS. 17A and 17B are before-and-after images of the biofilm region of a pit in the lace dress taken with confocal microscopy with a UV laser and no added dye.
Figure 17B:
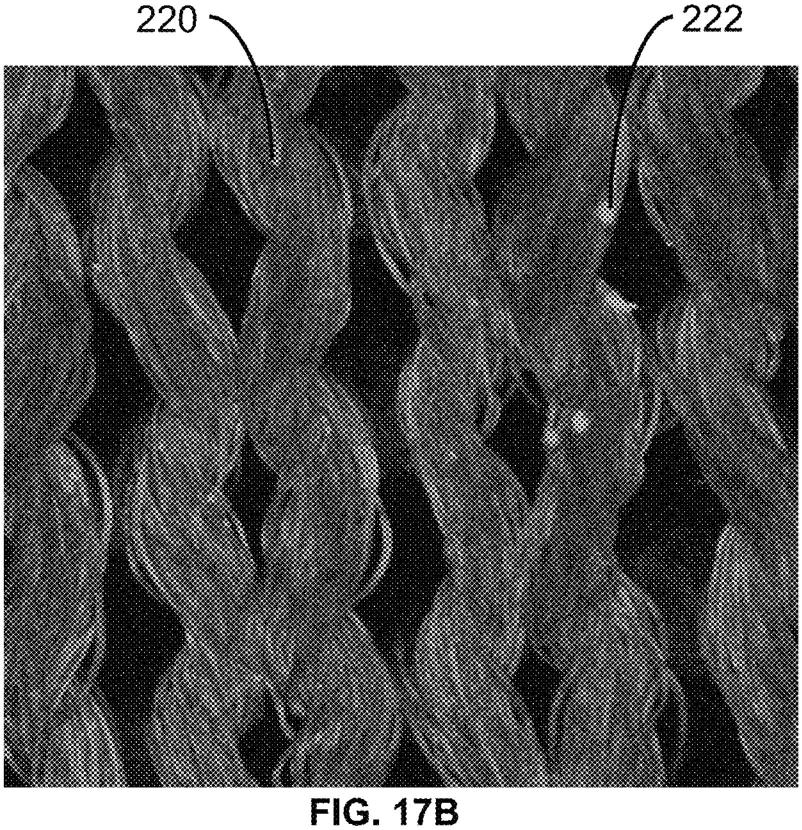

FIGS. 17A and 17B show before and after confocal microscopy views of what was the original fluorescent region in the left pit, using the same settings for laser intensity, dwell time, and other characteristics of the microscope using the UV laser. FIG. 17A shows the fluorescent matter prior to the bioenzymatic treatment, showing the presence of fibrous yarns 220 with numerous fluorescent “islands” 222 on the fibers, and occasionally larger patches 224 where fluorescent matter seems to bridge multiple fibers. What was the fluorescent region is again shown after the bioenzymatic treatment in FIG. 17B, where a few lone islands 222 of fluorescence remain, but overall showing much less presence of apparent biofilm matter. The bioenzymatic spray was effective, but was somewhat more effective when coupled with the NAC plus panthenol mixture, the PANNAC spray.

Further Observations

In several shirts with apparent perma-odor, it was observed that after an apparently successful treatment aimed at reducing biofilm, the treated pits when washed in a laundry detergent with fragrance, failed to emit the fragrance that was present elsewhere in the shirt. It was speculated that biofilms or the residual materials left by stains, fabric softeners, and other foreign materials that may be present in clothing, may serve as a scaffolding for absorption and release of both fragrances and odorants beyond what typical synthetic fibers might do on their own. Removing some of the biofilm or other embedded materials on the fibers may take away an odor reservoir for fragrance and malodor alike.

REMARKS

When introducing elements of aspects of the invention or the embodiments thereof, the articles “a,” “an,” “the,” and “said” are intended to mean that there are one or more of the elements. The terms “comprising,” “including,” and “having” are intended to be inclusive and mean that there may be additional elements other than the listed elements.

All patents and patent publications cited herein may be presumed to be incorporated by reference to the extent it is non-contradictory herewith. When a document is explicitly said to be “incorporated by reference,” it is also implied that it is incorporated by reference to the extent it is non-contradictory herewith.

Having described aspects of the invention in detail, it will be apparent that modifications and variations are possible without departing from the scope of aspects of the invention as defined in the appended claims. As various changes could be made in the above compositions, products, and methods without departing from the scope of aspects of the invention, it is intended that all matter contained in the above description shall be interpreted as illustrative and not in a limiting sense.

While the foregoing makes reference to particular illustrative embodiments, these examples should not be construed as limitations. The inventive system, methods, and products can be adapted for other uses or forms not explicitly listed above, and can be modified in numerous ways within the spirit of the present disclosure. Thus, the present invention is not limited to the disclosed embodiments, but is to be accorded the widest scope consistent with the claims below.

Portions of this work were conducted in the Minnesota Nano Center, which is supported by the National Science Foundation through the National Nano Coordinated Infrastructure Network (NNCIN) under Award Number ECCS-1542202.

We claim:

1. A method for treating a textile item having or suspected of having biofilm matter in one or more regions associated with persistent odor, the method comprising:

i. applying an enzymatic composition to the one or more regions having biofilm matter, ii. waiting a suitable time for the enzymatic composition to act on the biofilm, and iii. washing the textile item, wherein the enzymatic composition comprises: (a) water, (b) from 5% to 60% of a first surfactant, (c) a second surfactant, (d) from 1% to 20% of an enzyme mixture comprising at least four enzymes taken from at least three different categories of enzymes selected from the group consisting of lysozyme enzymes, proteinase enzymes, amylase enzymes, mannanase enzymes, pectinase enzymes, and cellulase enzymes, and (e) an antimicrobial agent, wherein at least one of the first and second surfactant is a nonionic surfactant.

2. The method of claim 1, wherein the enzymatic composition further comprises from 0.01% to 8% by weight of bacterial spores.

3. The method of claim 2, wherein the concentration of the bacterial spores is between $1\times10^5$ and $5\times10^{10}$ colony forming units per ml.

4. The method of claim 1, wherein the suitable time for the enzymatic composition to act on the biofilm is at least 5 minutes; and wherein the step of washing comprises washing the textile item in water with a laundry detergent.

5. The method of claim 4, wherein a portion of the enzymatic composition is provided as a liquid.

6. The method of claim 1, wherein the method is effective:

a) in reducing the amount and/or surface area of biofilm matter present in the textile item, and b) in reducing malodor in the textile item, wherein the enzymatic composition is substantially free of non-enzymatic bleaching agents.

7. The method of claim 1, further comprising visualizing the presence of suspected biofilm matter using UV light.

8. The method of claim 7, wherein prior to step i), the method comprises applying a suitable dye that fluoresces in UV light to the textile item to identify one or more regions that show relatively high fluorescence in UV light, and wherein step i) comprises applying the enzymatic composition to at least one of the one or more regions that show relatively high fluorescence.

9. The method of claim 1 wherein the enzymatic composition is substantially free of lipase.

10. A method for reducing a biofilm in an item of clothing, the method comprising:

a) applying an effective amount of a naturally-derived biofilm attack agent to the target region;

b) simultaneously, subsequently, or previously applying a bioenzymatic mixture comprising bacterial spores suitable for attacking typical energy sources for bacteria, one or more surfactants, and an enzyme mixture comprising at least four enzymes taken from at least three different categories of enzymes selected from the group consisting of lysozyme enzymes, proteinase enzymes, amylase enzymes, mannanase enzymes, pectinase enzymes, and cellulase enzymes;

c) providing suitable conditions for the spores to become active; and d) washing the item of clothing.

11. The method of claim 10, further comprising using UV light having a wavelength from 330 nm to 420 nm to identify target regions having biofilm matter, wherein the item of clothing has been previously washed with a laundry detergent comprising an optical brightener that preferentially absorbs onto the biofilm.

12. The method of claim 11, wherein after step 4, UV light is again used to examine the target regions and reveals decreased fluorescence relative to the fluorescence observed when identifying target regions.

13. A composition for reducing persistent odor in a textile garment worn on the body of a user in the form of an aqueous solution comprising at least one surfactant, and an enzyme mixture comprising at least four enzymes taken from at least three different categories of enzymes selected from the group consisting of lysozyme enzymes, proteinase enzymes, amylase enzymes, mannanase enzymes, pectinase enzymes, and cellulase enzymes.

14. The composition of claim 13, wherein the aqueous solution comprises 0.1% to 5% protease.

15. The method of claim 1, wherein at least one of said first surfactant and said second surfactant is a biosurfactant.

16. The method of claim 1, wherein the enzymatic composition further comprises citric acid.

17. The method of claim 1, wherein the enzymatic composition further comprises a preservative.

* * * * *